(12) United States Patent
Gill et al.

(10) Patent No.: US 12,529,076 B2
(45) Date of Patent: *Jan. 20, 2026

(54) CRISPR SYSTEMS WITH ENGINEERED DUAL GUIDE NUCLEIC ACIDS

(71) Applicants: Celyntra Therapeutics SA, Mont-Saint-Guibert (BE); DANMARKS TEKNISKE UNIVERSITET, Kgs. Lyngby (DK)

(72) Inventors: Ryan T. Gill, Denver, CO (US); Tanya Warnecke, Boulder, CO (US); Andrea Barghetti, Cophenhagen (DK); Line Dahl Poulsen, Ballerup (DK)

(73) Assignees: Celyntra Therapeutics SA, Mont-Saint-Guibert (BE); DANMARKS TEKNISKE UNIVERSITET, Kgs. Lyngby (DK)

(*) Notice: Subject to any disclaimer, the term of this patent is extended or adjusted under 35 U.S.C. 154(b) by 936 days.

This patent is subject to a terminal disclaimer.

(21) Appl. No.: 17/506,572

(22) Filed: Oct. 20, 2021

(65) Prior Publication Data
US 2022/0136014 A1 May 5, 2022

Related U.S. Application Data

(63) Continuation of application No. PCT/US2020/054050, filed on Oct. 2, 2020.

(60) Provisional application No. 62/910,055, filed on Oct. 3, 2019.

(51) Int. Cl.
*C12N 9/22* (2006.01)
*C12N 15/11* (2006.01)
*C12N 15/70* (2006.01)
*C12N 15/85* (2006.01)
*C12N 15/90* (2006.01)

(52) U.S. Cl.
CPC .......... *C12N 15/907* (2013.01); *C12N 9/22* (2013.01); *C12N 15/11* (2013.01); *C12N 15/70* (2013.01); *C12N 15/85* (2013.01); C12N 2310/20 (2017.05); C12N 2800/22 (2013.01)

(58) Field of Classification Search
None
See application file for complete search history.

(56) References Cited

U.S. PATENT DOCUMENTS

| | | | |
|---|---|---|---|
| 7,446,190 B2 | 11/2008 | Sadelain et al. | |
| 8,399,645 B2 | 3/2013 | Campana et al. | |
| 8,697,359 B1 | 4/2014 | Zhang | |
| 8,906,682 B2 | 12/2014 | June et al. | |
| 9,181,527 B2 | 11/2015 | Sentman | |
| 9,266,960 B2 | 2/2016 | Morgan et al. | |
| 9,272,002 B2 | 3/2016 | Powell, Jr. et al. | |
| 9,580,727 B1 * | 2/2017 | Donohoue | C12N 15/111 |
| 9,790,490 B2 * | 10/2017 | Zhang | C12N 15/102 |
| 9,890,396 B2 | 2/2018 | Chatterjee et al. | |
| 9,896,696 B2 | 2/2018 | Begemann et al. | |
| 9,982,278 B2 | 5/2018 | Gill et al. | |
| 9,982,279 B1 | 5/2018 | Gill et al. | |
| 10,011,849 B1 * | 7/2018 | Gill | C12N 15/111 |
| 10,113,167 B2 | 10/2018 | Doudna et al. | |
| 10,113,179 B2 | 10/2018 | Begemann et al. | |
| 12,270,043 B2 * | 4/2025 | Barghetti | C12N 15/907 |
| 12,270,044 B2 * | 4/2025 | Gill | C12N 15/70 |
| 2009/0222937 A1 | 9/2009 | Arnould et al. | |
| 2009/0271881 A1 | 10/2009 | Arnould et al. | |
| 2010/0229252 A1 | 9/2010 | Perez-Michaut | |
| 2010/0311124 A1 | 12/2010 | Liu et al. | |
| 2011/0016540 A1 | 1/2011 | Weinstein et al. | |
| 2011/0023139 A1 | 1/2011 | Weinstein et al. | |
| 2011/0023144 A1 | 1/2011 | Weinstein et al. | |
| 2011/0023145 A1 | 1/2011 | Weinstein et al. | |
| 2011/0023146 A1 | 1/2011 | Weinstein et al. | |
| 2011/0023153 A1 | 1/2011 | Weinstein et al. | |
| 2011/0091441 A1 | 4/2011 | Gouble et al. | |
| 2011/0158957 A1 | 6/2011 | Bonini et al. | |
| 2011/0182867 A1 | 7/2011 | Orkin et al. | |
| 2011/0225664 A1 | 9/2011 | Smith | |
| 2012/0159653 A1 | 6/2012 | Weinstein et al. | |
| 2012/0328580 A1 | 12/2012 | Edge et al. | |
| 2013/0145487 A1 | 6/2013 | Cedrone | |

(Continued)

FOREIGN PATENT DOCUMENTS

| | | |
|---|---|---|
| WO | 2013126794 A1 | 8/2013 |
| WO | 2013142034 A1 | 9/2013 |

(Continued)

OTHER PUBLICATIONS

European Patent Office, International Search Report and Written Opinion for PCT/US20/54050 mailed Dec. 3, 2021, 13 pages.

Labun, Kornel et al., "Accurate analysis of genuine CRISPR editing events with ampliCan", Published by Cold Spring Harbor Laboratory Press, 2019 pp. 843-847.

Swarts, Daan C. et al: 11 Cas9 versus Cas12a/Cpf1: Structure-function comparisons and implications for genome editing, Wiley Interdisciplinary Reviews: RNA, vol. 9, No. 5, May 22, 2018 (May 22, 2018), 19 pages.

(Continued)

*Primary Examiner* — Neil P Hammell
*Assistant Examiner* — Khaleda B Hasan
(74) *Attorney, Agent, or Firm* — Ipsilon USA—NLO

(57) ABSTRACT

The present invention relates to an engineered Clustered Regularly Interspaced Short Palindromic Repeats (CRISPR) system comprising engineered dual guide nucleic acids (e.g., RNAs) capable of activating a CRISPR-Associated (Cas) nuclease, such as a type V-A Cas nuclease. Also provided are methods of targeting, editing, and/or modifying a nucleic acid using the engineered CRISPR system, and compositions and cells comprising the engineered CRISPR system.

30 Claims, 20 Drawing Sheets

Specification includes a Sequence Listing.

(56) References Cited

U.S. PATENT DOCUMENTS

| | | |
|---|---|---|
| 2013/0202678 A1 | 8/2013 | Yu et al. |
| 2015/0344912 A1 | 12/2015 | Kim et al. |
| 2016/0200824 A1 | 7/2016 | Chmielewski et al. |
| 2016/0289675 A1 | 10/2016 | Ryan et al. |
| 2016/0311917 A1 | 10/2016 | Beatty et al. |
| 2016/0362472 A1 | 12/2016 | Bitter et al. |
| 2017/0107539 A1 | 4/2017 | Yu et al. |
| 2017/0355985 A1 | 12/2017 | Dellinger et al. |
| 2018/0003696 A1 | 1/2018 | Sharei et al. |
| 2018/0044700 A1 | 2/2018 | Doudna et al. |
| 2018/0119140 A1 | 5/2018 | Porteus et al. |
| 2018/0282763 A1 | 10/2018 | Cigan et al. |
| 2018/0363009 A1 | 12/2018 | Doudna et al. |
| 2018/0371498 A1 | 12/2018 | Gill et al. |

FOREIGN PATENT DOCUMENTS

| | | |
|---|---|---|
| WO | 2013176772 A1 | 11/2013 |
| WO | 2013163628 A3 | 1/2014 |
| WO | 2015048577 A2 | 4/2015 |
| WO | 2015070083 A1 | 5/2015 |
| WO | 2015089354 A1 | 6/2015 |
| WO | 2015120180 A1 | 8/2015 |
| WO | 2015134812 A1 | 9/2015 |
| WO | 2015138510 A1 | 9/2015 |
| WO | 2015148670 A1 | 10/2015 |
| WO | 2015148860 A1 | 10/2015 |
| WO | 2015153780 A1 | 10/2015 |
| WO | 2015153789 A1 | 10/2015 |
| WO | 2015153791 A1 | 10/2015 |
| WO | 2015148863 A3 | 12/2015 |
| WO | 2016120220 A1 | 8/2016 |
| WO | 2015188141 A2 | 10/2016 |
| WO | 2016164356 A1 | 10/2016 |
| WO | 2017017184 A1 | 2/2017 |
| WO | 2017040945 A1 | 3/2017 |
| WO | 2017053729 A1 | 3/2017 |
| WO | 2017/106569 A1 | 6/2017 |

OTHER PUBLICATIONS

Zetsche, Bernd, et al., "Cpf1 Is a Single RNA-Guided Endonuclease of a Class 2 CRISPR-Cas System", CellPress, Oct. 22, 2015, pp. 759-771.

* cited by examiner crRNA2 crRNA1

COMBINATIONS 5 AND 6
Secondary structure:
ΔG = -8.3 kcal/mol

COMBINATIONS 3 AND 4
Secondary structure:
ΔG = -8.0 kcal/mol

COMBINATIONS 9 AND 10
Secondary structure:
ΔG = -14.1 kcal/mol

COMBINATIONS 7 AND 8
Secondary structure:
ΔG = -11.0 kcal/mol

COMBINATIONS 13 AND 14
Secondary structure:
ΔG = -10.9 kcal/mol

COMBINATIONS 11 AND 12
Secondary structure:
ΔG = -7.9 kcal/mol

COMBINATIONS 15 AND 16
Secondary structure:
ΔG = -13.7 kcal/mol

SEQUENCE LISTING

<160> NUMBER OF SEQ ID NOS: 159

<210> SEQ ID NO 1

```
<211> LENGTH: 1263
<212> TYPE: PRT
<213> ORGANISM: Unknown
<220> FEATURE:
<221> NAME/KEY: source
<223> OTHER INFORMATION: /note="Description of Unknown:
      MAD7 sequence"

<400> SEQUENCE: 1
```

Met Asn Asn Gly Thr Asn Asn Phe Gln Asn Phe Ile Gly Ile Ser Ser
1               5                   10                  15

Leu Gln Lys Thr Leu Arg Asn Ala Leu Ile Pro Thr Glu Thr Thr Gln
            20                  25                  30

Gln Phe Ile Val Lys Asn Gly Ile Ile Lys Glu Asp Glu Leu Arg Gly
        35                  40                  45

Glu Asn Arg Gln Ile Leu Lys Asp Ile Met Asp Asp Tyr Tyr Arg Gly
    50                  55                  60

Phe Ile Ser Glu Thr Leu Ser Ser Ile Asp Asp Ile Asp Trp Thr Ser
65              70                  75                  80

Leu Phe Glu Lys Met Glu Ile Gln Leu Lys Asn Gly Asp Asn Lys Asp
            85                  90                  95

Thr Leu Ile Lys Glu Gln Thr Glu Tyr Arg Lys Ala Ile His Lys Lys
        100                 105                 110

Phe Ala Asn Asp Asp Arg Phe Lys Asn Met Phe Ser Ala Lys Leu Ile
        115                 120                 125

Ser Asp Ile Leu Pro Glu Phe Val Ile His Asn Asn Asn Tyr Ser Ala
    130                 135                 140

Ser Glu Lys Glu Glu Lys Thr Gln Val Ile Lys Leu Phe Ser Arg Phe
145                 150                 155                 160

Ala Thr Ser Phe Lys Asp Tyr Phe Lys Asn Arg Ala Asn Cys Phe Ser
                165                 170                 175

Ala Asp Asp Ile Ser Ser Ser Cys His Arg Ile Val Asn Asp Asn
            180                 185                 190

Ala Glu Ile Phe Phe Ser Asn Ala Leu Val Tyr Arg Arg Ile Val Lys
        195                 200                 205

Ser Leu Ser Asn Asp Asp Ile Asn Lys Ile Ser Gly Asp Met Lys Asp
210                 215                 220

Ser Leu Lys Glu Met Ser Leu Glu Glu Ile Tyr Ser Tyr Glu Lys Tyr
225                 230                 235                 240

Gly Glu Phe Ile Thr Gln Glu Gly Ile Ser Phe Tyr Asn Asp Ile Cys
                245                 250                 255

Gly Lys Val Asn Ser Phe Met Asn Leu Tyr Cys Gln Lys Asn Lys Glu
            260                 265                 270

Asn Lys Asn Leu Tyr Lys Leu Gln Lys Leu His Lys Gln Ile Leu Cys
        275                 280                 285

Ile Ala Asp Thr Ser Tyr Glu Val Pro Tyr Lys Phe Glu Ser Asp Glu
        290                 295                 300

Glu Val Tyr Gln Ser Val Asn Gly Phe Leu Asp Asn Ile Ser Ser Lys
305                 310                 315                 320

His Ile Val Glu Arg Leu Arg Lys Ile Gly Asp Asn Tyr Asn Gly Tyr
                325                 330                 335

Asn Leu Asp Lys Ile Tyr Ile Val Ser Lys Phe Tyr Glu Ser Val Ser
            340                 345                 350

Gln Lys Thr Tyr Arg Asp Trp Glu Thr Ile Asn Thr Ala Leu Glu Ile
        355                 360                 365

-continued

```
His Tyr Asn Asn Ile Leu Pro Gly Asn Gly Lys Ser Lys Ala Asp Lys
    370                 375                 380

Val Lys Lys Ala Val Lys Asn Asp Leu Gln Lys Ser Ile Thr Glu Ile
385                 390                 395                 400

Asn Glu Leu Val Ser Asn Tyr Lys Leu Cys Ser Asp Asp Asn Ile Lys
                405                 410                 415

Ala Glu Thr Tyr Ile His Glu Ile Ser His Ile Leu Asn Asn Phe Glu
            420                 425                 430

Ala Gln Glu Leu Lys Tyr Asn Pro Glu Ile His Leu Val Glu Ser Glu
                435                 440                 445

Leu Lys Ala Ser Glu Leu Lys Asn Val Leu Asp Val Ile Met Asn Ala
450                 455                 460

Phe His Trp Cys Ser Val Phe Met Thr Glu Glu Leu Val Asp Lys Asp
465                 470                 475                 480

Asn Asn Phe Tyr Ala Glu Leu Glu Glu Ile Tyr Asp Glu Ile Tyr Pro
                485                 490                 495

Val Ile Ser Leu Tyr Asn Leu Val Arg Asn Tyr Val Thr Gln Lys Pro
                500                 505                 510

Tyr Ser Thr Lys Lys Ile Lys Leu Asn Phe Gly Ile Pro Thr Leu Ala
                515                 520                 525

Asp Gly Trp Ser Lys Ser Lys Glu Tyr Ser Asn Asn Ala Ile Ile Leu
            530                 535                 540

Met Arg Asp Asn Leu Tyr Tyr Leu Gly Ile Phe Asn Ala Lys Asn Lys
545                 550                 555                 560

Pro Asp Lys Lys Ile Ile Glu Gly Asn Thr Ser Glu Asn Lys Gly Asp
                565                 570                 575

Tyr Lys Lys Met Ile Tyr Asn Leu Leu Pro Gly Pro Asn Lys Met Ile
            580                 585                 590

Pro Lys Val Phe Leu Ser Ser Lys Thr Gly Val Glu Thr Tyr Lys Pro
            595                 600                 605

Ser Ala Tyr Ile Leu Glu Gly Tyr Lys Gln Asn Lys His Ile Lys Ser
        610                 615                 620

Ser Lys Asp Phe Asp Ile Thr Phe Cys His Asp Leu Ile Asp Tyr Phe
625                 630                 635                 640

Lys Asn Cys Ile Ala Ile His Pro Glu Trp Lys Asn Phe Gly Phe Asp
                645                 650                 655

Phe Ser Asp Thr Ser Thr Tyr Glu Asp Ile Ser Gly Phe Tyr Arg Glu
            660                 665                 670

Val Glu Leu Gln Gly Tyr Lys Ile Asp Trp Thr Tyr Ile Ser Glu Lys
        675                 680                 685

Asp Ile Asp Leu Leu Gln Glu Lys Gly Gln Leu Tyr Leu Phe Gln Ile
690                 695                 700

Tyr Asn Lys Asp Phe Ser Lys Lys Ser Thr Gly Asn Asp Asn Leu His
705                 710                 715                 720

Thr Met Tyr Leu Lys Asn Leu Phe Ser Glu Asn Leu Lys Asp Ile
                725                 730                 735

Val Leu Lys Leu Asn Gly Glu Ala Glu Ile Phe Phe Arg Lys Ser Ser
                740                 745                 750

Ile Lys Asn Pro Ile Ile His Lys Lys Gly Ser Ile Leu Val Asn Arg
                755                 760                 765

Thr Tyr Glu Ala Glu Lys Asp Gln Phe Gly Asn Ile Gln Ile Val
770                 775                 780

Arg Lys Asn Ile Pro Glu Asn Ile Tyr Gln Glu Leu Tyr Lys Tyr Phe
```

-continued

```
            785                 790                 795                 800
Asn Asp Lys Ser Asp Lys Glu Leu Ser Asp Glu Ala Ala Lys Leu Lys
                    805                 810                 815

Asn Val Val Gly His His Glu Ala Ala Thr Asn Ile Val Lys Asp Tyr
                    820                 825                 830

Arg Tyr Thr Tyr Asp Lys Tyr Phe Leu His Met Pro Ile Thr Ile Asn
                    835                 840                 845

Phe Lys Ala Asn Lys Thr Gly Phe Ile Asn Asp Arg Ile Leu Gln Tyr
                    850                 855                 860

Ile Ala Lys Glu Lys Asp Leu His Val Ile Gly Ile Asp Arg Gly Glu
865                 870                 875                 880

Arg Asn Leu Ile Tyr Val Ser Val Ile Asp Thr Cys Gly Asn Ile Val
                    885                 890                 895

Glu Gln Lys Ser Phe Asn Ile Val Asn Gly Tyr Asp Tyr Gln Ile Lys
                    900                 905                 910

Leu Lys Gln Gln Glu Gly Ala Arg Gln Ile Ala Arg Lys Glu Trp Lys
                    915                 920                 925

Glu Ile Gly Lys Ile Lys Glu Ile Lys Glu Gly Tyr Leu Ser Leu Val
            930                 935                 940

Ile His Glu Ile Ser Lys Met Val Ile Lys Tyr Asn Ala Ile Ile Ala
945                 950                 955                 960

Met Glu Asp Leu Ser Tyr Gly Phe Lys Lys Gly Arg Phe Lys Val Glu
                    965                 970                 975

Arg Gln Val Tyr Gln Lys Phe Glu Thr Met Leu Ile Asn Lys Leu Asn
                    980                 985                 990

Tyr Leu Val Phe Lys Asp Ile Ser Ile Thr Glu Asn Gly Gly Leu Leu
            995                 1000                1005

Lys Gly Tyr Gln Leu Thr Tyr Ile Pro Asp Lys Leu Lys Asn Val
        1010                1015                1020

Gly His Gln Cys Gly Cys Ile Phe Tyr Val Pro Ala Ala Tyr Thr
        1025                1030                1035

Ser Lys Ile Asp Pro Thr Thr Gly Phe Val Asn Ile Phe Lys Phe
        1040                1045                1050

Lys Asp Leu Thr Val Asp Ala Lys Arg Glu Phe Ile Lys Lys Phe
        1055                1060                1065

Asp Ser Ile Arg Tyr Asp Ser Glu Lys Asn Leu Phe Cys Phe Thr
        1070                1075                1080

Phe Asp Tyr Asn Asn Phe Ile Thr Gln Asn Thr Val Met Ser Lys
        1085                1090                1095

Ser Ser Trp Ser Val Tyr Thr Tyr Gly Val Arg Ile Lys Arg Arg
        1100                1105                1110

Phe Val Asn Gly Arg Phe Ser Asn Glu Ser Asp Thr Ile Asp Ile
        1115                1120                1125

Thr Lys Asp Met Glu Lys Thr Leu Glu Met Thr Asp Ile Asn Trp
        1130                1135                1140

Arg Asp Gly His Asp Leu Arg Gln Asp Ile Ile Asp Tyr Glu Ile
        1145                1150                1155

Val Gln His Ile Phe Glu Ile Phe Arg Leu Thr Val Gln Met Arg
        1160                1165                1170

Asn Ser Leu Ser Glu Leu Glu Asp Arg Asp Tyr Asp Arg Leu Ile
        1175                1180                1185

Ser Pro Val Leu Asn Glu Asn Asn Ile Phe Tyr Asp Ser Ala Lys
        1190                1195                1200
```

-continued

```
Ala Gly Asp Ala Leu Pro Lys Asp Ala Asp Ala Asn Gly Ala Tyr
    1205                1210                1215

Cys Ile Ala Leu Lys Gly Leu Tyr Glu Ile Lys Gln Ile Thr Glu
    1220                1225                1230

Asn Trp Lys Glu Asp Gly Lys Phe Ser Arg Asp Lys Leu Lys Ile
    1235                1240                1245

Ser Asn Lys Asp Trp Phe Asp Phe Ile Gln Asn Lys Arg Tyr Leu
    1250                1255                1260

<210> SEQ ID NO 2
<211> LENGTH: 1334
<212> TYPE: PRT
<213> ORGANISM: Unknown
<220> FEATURE:
<221> NAME/KEY: source
<223> OTHER INFORMATION: /note="Description of Unknown:
      MAD2 sequence"

<400> SEQUENCE: 2

Met Ser Ser Leu Thr Lys Phe Thr Asn Lys Tyr Ser Lys Gln Leu Thr
1               5                   10                  15

Ile Lys Asn Glu Leu Ile Pro Val Gly Lys Thr Leu Glu Asn Ile Lys
            20                  25                  30

Glu Asn Gly Leu Ile Asp Gly Asp Glu Gln Leu Asn Glu Asn Tyr Gln
        35                  40                  45

Lys Ala Lys Ile Ile Val Asp Asp Phe Leu Arg Asp Phe Ile Asn Lys
    50                  55                  60

Ala Leu Asn Asn Thr Gln Ile Gly Asn Trp Arg Glu Leu Ala Asp Ala
65                  70                  75                  80

Leu Asn Lys Glu Asp Glu Asp Asn Ile Glu Lys Leu Gln Asp Lys Ile
                85                  90                  95

Arg Gly Ile Ile Val Ser Lys Phe Glu Thr Phe Asp Leu Phe Ser Ser
            100                 105                 110

Tyr Ser Ile Lys Lys Asp Glu Lys Ile Ile Asp Asp Asn Asp Val
        115                 120                 125

Glu Glu Glu Glu Leu Asp Leu Gly Lys Lys Thr Ser Ser Phe Lys Tyr
    130                 135                 140

Ile Phe Lys Lys Asn Leu Phe Lys Leu Val Leu Pro Ser Tyr Leu Lys
145                 150                 155                 160

Thr Thr Asn Gln Asp Lys Leu Lys Ile Ile Ser Ser Phe Asn Phe
                165                 170                 175

Ser Thr Tyr Phe Arg Gly Phe Glu Asn Arg Lys Asn Ile Phe Thr
            180                 185                 190

Lys Lys Pro Ile Ser Thr Ser Ile Ala Tyr Arg Ile Val His Asp Asn
        195                 200                 205

Phe Pro Lys Phe Leu Asp Asn Ile Arg Cys Phe Asn Val Trp Gln Thr
    210                 215                 220

Glu Cys Pro Gln Leu Ile Val Lys Ala Asp Asn Tyr Leu Lys Ser Lys
225                 230                 235                 240

Asn Val Ile Ala Lys Asp Lys Ser Leu Ala Asn Tyr Phe Thr Val Gly
                245                 250                 255

Ala Tyr Asp Tyr Phe Leu Ser Gln Asn Gly Ile Asp Phe Tyr Asn Asn
            260                 265                 270

Ile Ile Gly Gly Leu Pro Ala Phe Ala Gly His Glu Lys Ile Gln Gly
        275                 280                 285
```

Leu Asn Glu Phe Ile Asn Gln Glu Cys Gln Lys Asp Ser Glu Leu Lys
290                 295                 300

Ser Lys Leu Lys Asn Arg His Ala Phe Lys Met Ala Val Leu Phe Lys
305                 310                 315                 320

Gln Ile Leu Ser Asp Arg Glu Lys Ser Phe Val Ile Asp Glu Phe Glu
            325                 330                 335

Ser Asp Ala Gln Val Ile Asp Ala Val Lys Asn Phe Tyr Ala Glu Gln
            340                 345                 350

Cys Lys Asp Asn Asn Val Ile Phe Asn Leu Leu Asn Leu Ile Lys Asn
            355                 360                 365

Ile Ala Phe Leu Ser Asp Asp Glu Leu Asp Gly Ile Phe Ile Glu Gly
370                 375                 380

Lys Tyr Leu Ser Ser Val Ser Gln Lys Leu Tyr Ser Asp Trp Ser Lys
385                 390                 395                 400

Leu Arg Asn Asp Ile Glu Asp Ser Ala Asn Ser Lys Gln Gly Asn Lys
                405                 410                 415

Glu Leu Ala Lys Lys Ile Lys Thr Asn Lys Gly Asp Val Glu Lys Ala
                420                 425                 430

Ile Ser Lys Tyr Glu Phe Ser Leu Ser Glu Leu Asn Ser Ile Val His
    435                 440                 445

Asp Asn Thr Lys Phe Ser Asp Leu Leu Ser Cys Thr Leu His Lys Val
    450                 455                 460

Ala Ser Glu Lys Leu Val Lys Val Asn Glu Gly Asp Trp Pro Lys His
465                 470                 475                 480

Leu Lys Asn Asn Glu Glu Lys Gln Lys Ile Lys Glu Pro Leu Asp Ala
                485                 490                 495

Leu Leu Glu Ile Tyr Asn Thr Leu Leu Ile Phe Asn Cys Lys Ser Phe
            500                 505                 510

Asn Lys Asn Gly Asn Phe Tyr Val Asp Tyr Asp Arg Cys Ile Asn Glu
            515                 520                 525

Leu Ser Ser Val Val Tyr Leu Tyr Asn Lys Thr Arg Asn Tyr Cys Thr
530                 535                 540

Lys Lys Pro Tyr Asn Thr Asp Lys Phe Lys Leu Asn Phe Asn Ser Pro
545                 550                 555                 560

Gln Leu Gly Glu Gly Phe Ser Lys Ser Lys Glu Asn Asp Cys Leu Thr
                565                 570                 575

Leu Leu Phe Lys Lys Asp Asp Asn Tyr Tyr Val Gly Ile Ile Arg Lys
            580                 585                 590

Gly Ala Lys Ile Asn Phe Asp Asp Thr Gln Ala Ile Ala Asp Asn Thr
            595                 600                 605

Asp Asn Cys Ile Phe Lys Met Asn Tyr Phe Leu Leu Lys Asp Ala Lys
    610                 615                 620

Lys Phe Ile Pro Lys Cys Ser Ile Gln Leu Lys Glu Val Lys Ala His
625                 630                 635                 640

Phe Lys Lys Ser Glu Asp Asp Tyr Ile Leu Ser Asp Lys Glu Lys Phe
                645                 650                 655

Ala Ser Pro Leu Val Ile Lys Lys Ser Thr Phe Leu Leu Ala Thr Ala
            660                 665                 670

His Val Lys Gly Lys Gly Asn Ile Lys Lys Phe Gln Lys Glu Tyr
    675                 680                 685

Ser Lys Glu Asn Pro Thr Glu Tyr Arg Asn Ser Leu Asn Glu Trp Ile
690                 695                 700

Ala Phe Cys Lys Glu Phe Leu Lys Thr Tyr Lys Ala Ala Thr Ile Phe

-continued

```
           705                 710                 715                 720
       Asp Ile Thr Thr Leu Lys Lys Ala Glu Glu Tyr Ala Asp Ile Val Glu
                       725                 730                 735
       Phe Tyr Lys Asp Val Asp Asn Leu Cys Tyr Lys Leu Glu Phe Cys Pro
                       740                 745                 750
       Ile Lys Thr Ser Phe Ile Glu Asn Leu Ile Asp Asn Gly Asp Leu Tyr
                       755                 760                 765
       Leu Phe Arg Ile Asn Asn Lys Asp Phe Ser Ser Lys Ser Thr Gly Thr
                       770                 775                 780
       Lys Asn Leu His Thr Leu Tyr Leu Gln Ala Ile Phe Asp Glu Arg Asn
       785                 790                 795                 800
       Leu Asn Asn Pro Thr Ile Met Leu Asn Gly Gly Ala Glu Leu Phe Tyr
                       805                 810                 815
       Arg Lys Glu Ser Ile Glu Gln Lys Asn Arg Ile Thr His Lys Ala Gly
                       820                 825                 830
       Ser Ile Leu Val Asn Lys Val Cys Lys Asp Gly Thr Ser Leu Asp Asp
                       835                 840                 845
       Lys Ile Arg Asn Glu Ile Tyr Gln Tyr Glu Asn Lys Phe Ile Asp Thr
       850                 855                 860
       Leu Ser Asp Glu Ala Lys Lys Val Leu Pro Asn Val Ile Lys Lys Glu
       865                 870                 875                 880
       Ala Thr His Asp Ile Thr Lys Asp Lys Arg Phe Thr Ser Asp Lys Phe
                       885                 890                 895
       Phe Phe His Cys Pro Leu Thr Ile Asn Tyr Lys Glu Gly Asp Thr Lys
                       900                 905                 910
       Gln Phe Asn Asn Glu Val Leu Ser Phe Leu Arg Gly Asn Pro Asp Ile
                       915                 920                 925
       Asn Ile Ile Gly Ile Asp Arg Gly Glu Arg Asn Leu Ile Tyr Val Thr
                       930                 935                 940
       Val Ile Asn Gln Lys Gly Glu Ile Leu Asp Ser Val Ser Phe Asn Thr
       945                 950                 955                 960
       Val Thr Asn Lys Ser Ser Lys Ile Glu Gln Thr Val Asp Tyr Glu Glu
                       965                 970                 975
       Lys Leu Ala Val Arg Glu Lys Glu Arg Ile Glu Ala Lys Arg Ser Trp
                       980                 985                 990
       Asp Ser Ile Ser Lys Ile Ala Thr Leu Lys Glu Gly Tyr Leu Ser Ala
                       995                 1000                1005
       Ile Val His Glu Ile Cys Leu Leu Met Ile Lys His Asn Ala Ile
       1010                1015                1020
       Val Val Leu Glu Asn Leu Asn Ala Gly Phe Lys Arg Ile Arg Gly
       1025                1030                1035
       Gly Leu Ser Glu Lys Ser Val Tyr Gln Lys Phe Glu Lys Met Leu
       1040                1045                1050
       Ile Asn Lys Leu Asn Tyr Phe Val Ser Lys Lys Glu Ser Asp Trp
       1055                1060                1065
       Asn Lys Pro Ser Gly Leu Leu Asn Gly Leu Gln Leu Ser Asp Gln
       1070                1075                1080
       Phe Glu Ser Phe Glu Lys Leu Gly Ile Gln Ser Gly Phe Ile Phe
       1085                1090                1095
       Tyr Val Pro Ala Ala Tyr Thr Ser Lys Ile Asp Pro Thr Thr Gly
       1100                1105                1110
       Phe Ala Asn Val Leu Asn Leu Ser Lys Val Arg Asn Val Asp Ala
       1115                1120                1125
```

-continued

```
Ile Lys Ser Phe Phe Ser Asn Phe Asn Glu Ile Ser Tyr Ser Lys
    1130                1135                1140

Lys Glu Ala Leu Phe Lys Phe Ser Phe Asp Leu Asp Ser Leu Ser
    1145                1150                1155

Lys Lys Gly Phe Ser Ser Phe Val Lys Phe Ser Lys Ser Lys Trp
    1160                1165                1170

Asn Val Tyr Thr Phe Gly Glu Arg Ile Ile Lys Pro Lys Asn Lys
    1175                1180                1185

Gln Gly Tyr Arg Glu Asp Lys Arg Ile Asn Leu Thr Phe Glu Met
    1190                1195                1200

Lys Lys Leu Leu Asn Glu Tyr Lys Val Ser Phe Asp Leu Glu Asn
    1205                1210                1215

Asn Leu Ile Pro Asn Leu Thr Ser Ala Asn Leu Lys Asp Thr Phe
    1220                1225                1230

Trp Lys Glu Leu Phe Phe Ile Phe Lys Thr Thr Leu Gln Leu Arg
    1235                1240                1245

Asn Ser Val Thr Asn Gly Lys Glu Asp Val Leu Ile Ser Pro Val
    1250                1255                1260

Lys Asn Ala Lys Gly Glu Phe Phe Val Ser Gly Thr His Asn Lys
    1265                1270                1275

Thr Leu Pro Gln Asp Cys Asp Ala Asn Gly Ala Tyr His Ile Ala
    1280                1285                1290

Leu Lys Gly Leu Met Ile Leu Glu Arg Asn Asn Leu Val Arg Glu
    1295                1300                1305

Glu Lys Asp Thr Lys Lys Ile Met Ala Ile Ser Asn Val Asp Trp
    1310                1315                1320

Phe Glu Tyr Val Gln Lys Arg Arg Gly Val Leu
    1325                1330

<210> SEQ ID NO 3
<211> LENGTH: 1307
<212> TYPE: PRT
<213> ORGANISM: Acidaminococcus sp.

<400> SEQUENCE: 3

Met Thr Gln Phe Glu Gly Phe Thr Asn Leu Tyr Gln Val Ser Lys Thr
1               5                   10                  15

Leu Arg Phe Glu Leu Ile Pro Gln Gly Lys Thr Leu Lys His Ile Gln
                20                  25                  30

Glu Gln Gly Phe Ile Glu Glu Asp Lys Ala Arg Asn Asp His Tyr Lys
            35                  40                  45

Glu Leu Lys Pro Ile Ile Asp Arg Ile Tyr Lys Thr Tyr Ala Asp Gln
        50                  55                  60

Cys Leu Gln Leu Val Gln Leu Asp Trp Glu Asn Leu Ser Ala Ala Ile
65                  70                  75                  80

Asp Ser Tyr Arg Lys Glu Lys Thr Glu Glu Thr Arg Asn Ala Leu Ile
                85                  90                  95

Glu Glu Gln Ala Thr Tyr Arg Asn Ala Ile His Asp Tyr Phe Ile Gly
            100                 105                 110

Arg Thr Asp Asn Leu Thr Asp Ala Ile Asn Lys Arg His Ala Glu Ile
        115                 120                 125

Tyr Lys Gly Leu Phe Lys Ala Glu Leu Phe Asn Gly Lys Val Leu Lys
    130                 135                 140

Gln Leu Gly Thr Val Thr Thr Thr Glu His Glu Asn Ala Leu Leu Arg
```

```
           145                 150                 155                 160
Ser Phe Asp Lys Phe Thr Thr Tyr Phe Ser Gly Phe Tyr Glu Asn Arg
                165                 170                 175

Lys Asn Val Phe Ser Ala Glu Asp Ile Ser Thr Ala Ile Pro His Arg
                180                 185                 190

Ile Val Gln Asp Asn Phe Pro Lys Phe Lys Glu Asn Cys His Ile Phe
            195                 200                 205

Thr Arg Leu Ile Thr Ala Val Pro Ser Leu Arg Glu His Phe Glu Asn
        210                 215                 220

Val Lys Lys Ala Ile Gly Ile Phe Val Ser Thr Ser Ile Glu Glu Val
225                 230                 235                 240

Phe Ser Phe Pro Phe Tyr Asn Gln Leu Leu Thr Gln Thr Gln Ile Asp
                245                 250                 255

Leu Tyr Asn Gln Leu Leu Gly Gly Ile Ser Arg Glu Ala Gly Thr Glu
            260                 265                 270

Lys Ile Lys Gly Leu Asn Glu Val Leu Asn Leu Ala Ile Gln Lys Asn
        275                 280                 285

Asp Glu Thr Ala His Ile Ile Ala Ser Leu Pro His Arg Phe Ile Pro
    290                 295                 300

Leu Phe Lys Gln Ile Leu Ser Asp Arg Asn Thr Leu Ser Phe Ile Leu
305                 310                 315                 320

Glu Glu Phe Lys Ser Asp Glu Glu Val Ile Gln Ser Phe Cys Lys Tyr
                325                 330                 335

Lys Thr Leu Leu Arg Asn Glu Asn Val Leu Glu Thr Ala Glu Ala Leu
            340                 345                 350

Phe Asn Glu Leu Asn Ser Ile Asp Leu Thr His Ile Phe Ile Ser His
        355                 360                 365

Lys Lys Leu Glu Thr Ile Ser Ser Ala Leu Cys Asp His Trp Asp Thr
    370                 375                 380

Leu Arg Asn Ala Leu Tyr Glu Arg Arg Ile Ser Glu Leu Thr Gly Lys
385                 390                 395                 400

Ile Thr Lys Ser Ala Lys Glu Lys Val Gln Arg Ser Leu Lys His Glu
                405                 410                 415

Asp Ile Asn Leu Gln Glu Ile Ile Ser Ala Ala Gly Lys Glu Leu Ser
            420                 425                 430

Glu Ala Phe Lys Gln Lys Thr Ser Glu Ile Leu Ser His Ala His Ala
        435                 440                 445

Ala Leu Asp Gln Pro Leu Pro Thr Thr Leu Lys Lys Gln Glu Glu Lys
    450                 455                 460

Glu Ile Leu Lys Ser Gln Leu Asp Ser Leu Leu Gly Leu Tyr His Leu
465                 470                 475                 480

Leu Asp Trp Phe Ala Val Asp Glu Ser Asn Glu Val Asp Pro Glu Phe
                485                 490                 495

Ser Ala Arg Leu Thr Gly Ile Lys Leu Glu Met Glu Pro Ser Leu Ser
            500                 505                 510

Phe Tyr Asn Lys Ala Arg Asn Tyr Ala Thr Lys Lys Pro Tyr Ser Val
        515                 520                 525

Glu Lys Phe Lys Leu Asn Phe Gln Met Pro Thr Leu Ala Ser Gly Trp
    530                 535                 540

Asp Val Asn Lys Glu Lys Asn Asn Gly Ala Ile Leu Phe Val Lys Asn
545                 550                 555                 560

Gly Leu Tyr Tyr Leu Gly Ile Met Pro Lys Gln Lys Gly Arg Tyr Lys
                565                 570                 575
```

```
Ala Leu Ser Phe Glu Pro Thr Glu Lys Thr Ser Glu Gly Phe Asp Lys
            580                 585                 590

Met Tyr Tyr Asp Tyr Phe Pro Asp Ala Ala Lys Met Ile Pro Lys Cys
            595                 600                 605

Ser Thr Gln Leu Lys Ala Val Thr Ala His Phe Gln Thr His Thr Thr
            610                 615                 620

Pro Ile Leu Leu Ser Asn Asn Phe Ile Glu Pro Leu Glu Ile Thr Lys
625                 630                 635                 640

Glu Ile Tyr Asp Leu Asn Asn Pro Gly Lys Glu Pro Lys Lys Phe Gln
            645                 650                 655

Thr Ala Tyr Ala Lys Lys Thr Gly Asp Gln Lys Gly Tyr Arg Glu Ala
            660                 665                 670

Leu Cys Lys Trp Ile Asp Phe Thr Arg Asp Phe Leu Ser Lys Tyr Thr
            675                 680                 685

Lys Thr Thr Ser Ile Asp Leu Ser Ser Leu Arg Pro Ser Ser Gln Tyr
            690                 695                 700

Lys Asp Leu Gly Glu Tyr Tyr Ala Glu Leu Asn Pro Leu Leu Tyr His
705                 710                 715                 720

Ile Ser Phe Gln Arg Ile Ala Glu Lys Glu Ile Met Asp Ala Val Glu
            725                 730                 735

Thr Gly Lys Leu Tyr Leu Phe Gln Ile Tyr Asn Lys Asp Phe Ala Lys
            740                 745                 750

Gly His His Gly Lys Pro Asn Leu His Thr Leu Tyr Trp Thr Gly Leu
            755                 760                 765

Phe Ser Pro Glu Asn Leu Ala Lys Thr Ser Ile Lys Leu Asn Gly Gln
            770                 775                 780

Ala Glu Leu Phe Tyr Arg Pro Lys Ser Arg Met Lys Arg Met Ala His
785                 790                 795                 800

Arg Leu Gly Glu Lys Met Leu Asn Lys Lys Leu Lys Asp Gln Lys Thr
            805                 810                 815

Pro Ile Pro Asp Thr Leu Tyr Gln Glu Leu Tyr Asp Tyr Val Asn His
            820                 825                 830

Arg Leu Ser His Asp Leu Ser Asp Glu Ala Arg Ala Leu Leu Pro Asn
            835                 840                 845

Val Ile Thr Lys Glu Val Ser His Glu Ile Ile Lys Asp Arg Arg Phe
850                 855                 860

Thr Ser Asp Lys Phe Phe Phe His Val Pro Ile Thr Leu Asn Tyr Gln
865                 870                 875                 880

Ala Ala Asn Ser Pro Ser Lys Phe Asn Gln Arg Val Asn Ala Tyr Leu
            885                 890                 895

Lys Glu His Pro Glu Thr Pro Ile Ile Gly Ile Asp Arg Gly Glu Arg
            900                 905                 910

Asn Leu Ile Tyr Ile Thr Val Ile Asp Ser Thr Gly Lys Ile Leu Glu
            915                 920                 925

Gln Arg Ser Leu Asn Thr Ile Gln Gln Phe Asp Tyr Gln Lys Lys Leu
            930                 935                 940

Asp Asn Arg Glu Lys Glu Arg Val Ala Ala Arg Gln Ala Trp Ser Val
945                 950                 955                 960

Val Gly Thr Ile Lys Asp Leu Lys Gln Gly Tyr Leu Ser Gln Val Ile
            965                 970                 975

His Glu Ile Val Asp Leu Met Ile His Tyr Gln Ala Val Val Val Leu
            980                 985                 990
```

```
Glu Asn Leu Asn Phe Gly Phe Lys  Ser Lys Arg Thr Gly  Ile Ala Glu
            995                 1000                 1005

Lys Ala  Val Tyr Gln Gln Phe  Glu Lys Met Leu Ile  Asp Lys Leu
        1010                 1015                 1020

Asn Cys  Leu Val Leu Lys Asp  Tyr Pro Ala Glu Lys  Val Gly Gly
        1025                 1030                 1035

Val Leu  Asn Pro Tyr Gln Leu  Thr Asp Gln Phe Thr  Ser Phe Ala
        1040                 1045                 1050

Lys Met  Gly Thr Gln Ser Gly  Phe Leu Phe Tyr Val  Pro Ala Pro
        1055                 1060                 1065

Tyr Thr  Ser Lys Ile Asp Pro  Leu Thr Gly Phe Val  Asp Pro Phe
        1070                 1075                 1080

Val Trp  Lys Thr Ile Lys Asn  His Glu Ser Arg Lys  His Phe Leu
        1085                 1090                 1095

Glu Gly  Phe Asp Phe Leu His  Tyr Asp Val Lys Thr  Gly Asp Phe
        1100                 1105                 1110

Ile Leu  His Phe Lys Met Asn  Arg Asn Leu Ser Phe  Gln Arg Gly
        1115                 1120                 1125

Leu Pro  Gly Phe Met Pro Ala  Trp Asp Ile Val Phe  Glu Lys Asn
        1130                 1135                 1140

Glu Thr  Gln Phe Asp Ala Lys  Gly Thr Pro Phe Ile  Ala Gly Lys
        1145                 1150                 1155

Arg Ile  Val Pro Val Ile Glu  Asn His Arg Phe Thr  Gly Arg Tyr
        1160                 1165                 1170

Arg Asp  Leu Tyr Pro Ala Asn  Glu Leu Ile Ala Leu  Leu Glu Glu
        1175                 1180                 1185

Lys Gly  Ile Val Phe Arg Asp  Gly Ser Asn Ile Leu  Pro Lys Leu
        1190                 1195                 1200

Leu Glu  Asn Asp Asp Ser His  Ala Ile Asp Thr Met  Val Ala Leu
        1205                 1210                 1215

Ile Arg  Ser Val Leu Gln Met  Arg Asn Ser Asn Ala  Ala Thr Gly
        1220                 1225                 1230

Glu Asp  Tyr Ile Asn Ser Pro  Val Arg Asp Leu Asn  Gly Val Cys
        1235                 1240                 1245

Phe Asp  Ser Arg Phe Gln Asn  Pro Glu Trp Pro Met  Asp Ala Asp
        1250                 1255                 1260

Ala Asn  Gly Ala Tyr His Ile  Ala Leu Lys Gly Gln  Leu Leu Leu
        1265                 1270                 1275

Asn His  Leu Lys Glu Ser Lys  Asp Leu Lys Leu Gln  Asn Gly Ile
        1280                 1285                 1290

Ser Asn  Gln Asp Trp Leu Ala  Tyr Ile Gln Glu Leu  Arg Asn
        1295                 1300                 1305

<210> SEQ ID NO 4
<211> LENGTH: 1228
<212> TYPE: PRT
<213> ORGANISM: Unknown
<220> FEATURE:
<221> NAME/KEY: source
<223> OTHER INFORMATION: /note="Description of Unknown:
      Lachnospiraceae bacterium ND2006 sequence"

<400> SEQUENCE: 4

Met Ser Lys Leu Glu Lys Phe Thr Asn Cys Tyr Ser Leu Ser Lys Thr
1               5                   10                  15

Leu Arg Phe Lys Ala Ile Pro Val Gly Lys Thr Gln Glu Asn Ile Asp
```

```
            20                  25                  30
Asn Lys Arg Leu Leu Val Glu Asp Glu Lys Arg Ala Glu Asp Tyr Lys
            35                  40                  45
Gly Val Lys Lys Leu Leu Asp Arg Tyr Tyr Leu Ser Phe Ile Asn Asp
            50                  55                  60
Val Leu His Ser Ile Lys Leu Lys Asn Leu Asn Asn Tyr Ile Ser Leu
 65                  70                  75                  80
Phe Arg Lys Lys Thr Arg Thr Glu Lys Glu Asn Lys Glu Leu Glu Asn
                    85                  90                  95
Leu Glu Ile Asn Leu Arg Lys Glu Ile Ala Lys Ala Phe Lys Gly Asn
                100                 105                 110
Glu Gly Tyr Lys Ser Leu Phe Lys Lys Asp Ile Ile Glu Thr Ile Leu
            115                 120                 125
Pro Glu Phe Leu Asp Asp Lys Asp Glu Ile Ala Leu Val Asn Ser Phe
            130                 135                 140
Asn Gly Phe Thr Thr Ala Phe Thr Gly Phe Phe Asp Asn Arg Glu Asn
145                 150                 155                 160
Met Phe Ser Glu Glu Ala Lys Ser Thr Ser Ile Ala Phe Arg Cys Ile
                165                 170                 175
Asn Glu Asn Leu Thr Arg Tyr Ile Ser Asn Met Asp Ile Phe Glu Lys
                180                 185                 190
Val Asp Ala Ile Phe Asp Lys His Glu Val Gln Glu Ile Lys Glu Lys
            195                 200                 205
Ile Leu Asn Ser Asp Tyr Asp Val Glu Asp Phe Phe Glu Gly Glu Phe
            210                 215                 220
Phe Asn Phe Val Leu Thr Gln Glu Gly Ile Asp Val Tyr Asn Ala Ile
225                 230                 235                 240
Ile Gly Gly Phe Val Thr Glu Ser Gly Glu Lys Ile Lys Gly Leu Asn
                245                 250                 255
Glu Tyr Ile Asn Leu Tyr Asn Gln Lys Thr Lys Gln Lys Leu Pro Lys
                260                 265                 270
Phe Lys Pro Leu Tyr Lys Gln Val Leu Ser Asp Arg Glu Ser Leu Ser
            275                 280                 285
Phe Tyr Gly Glu Gly Tyr Thr Ser Asp Glu Glu Val Leu Glu Val Phe
            290                 295                 300
Arg Asn Thr Leu Asn Lys Asn Ser Glu Ile Phe Ser Ser Ile Lys Lys
305                 310                 315                 320
Leu Glu Lys Leu Phe Lys Asn Phe Asp Glu Tyr Ser Ser Ala Gly Ile
                325                 330                 335
Phe Val Lys Asn Gly Pro Ala Ile Ser Thr Ile Ser Lys Asp Ile Phe
                340                 345                 350
Gly Glu Trp Asn Val Ile Arg Asp Lys Trp Asn Ala Glu Tyr Asp Asp
            355                 360                 365
Ile His Leu Lys Lys Ala Val Val Thr Glu Lys Tyr Glu Asp Asp
            370                 375                 380
Arg Arg Lys Ser Phe Lys Lys Ile Gly Ser Phe Ser Leu Glu Gln Leu
385                 390                 395                 400
Gln Glu Tyr Ala Asp Ala Asp Leu Ser Val Val Glu Lys Leu Lys Glu
                405                 410                 415
Ile Ile Ile Gln Lys Val Asp Glu Ile Tyr Lys Val Tyr Gly Ser Ser
                420                 425                 430
Glu Lys Leu Phe Asp Ala Asp Phe Val Leu Glu Lys Ser Leu Lys Lys
            435                 440                 445
```

```
Asn Asp Ala Val Val Ala Ile Met Lys Asp Leu Leu Asp Ser Val Lys
    450                 455                 460

Ser Phe Glu Asn Tyr Ile Lys Ala Phe Phe Gly Glu Gly Lys Glu Thr
465                 470                 475                 480

Asn Arg Asp Glu Ser Phe Tyr Gly Asp Phe Val Leu Ala Tyr Asp Ile
                    485                 490                 495

Leu Leu Lys Val Asp His Ile Tyr Asp Ala Ile Arg Asn Tyr Val Thr
                500                 505                 510

Gln Lys Pro Tyr Ser Lys Asp Lys Phe Lys Leu Tyr Phe Gln Asn Pro
            515                 520                 525

Gln Phe Met Gly Gly Trp Asp Lys Asp Lys Glu Thr Asp Tyr Arg Ala
        530                 535                 540

Thr Ile Leu Arg Tyr Gly Ser Lys Tyr Tyr Leu Ala Ile Met Asp Lys
545                 550                 555                 560

Lys Tyr Ala Lys Cys Leu Gln Lys Ile Asp Lys Asp Val Asn Gly
                565                 570                 575

Asn Tyr Glu Lys Ile Asn Tyr Lys Leu Leu Pro Gly Pro Asn Lys Met
                580                 585                 590

Leu Pro Lys Val Phe Phe Ser Lys Lys Trp Met Ala Tyr Tyr Asn Pro
            595                 600                 605

Ser Glu Asp Ile Gln Lys Ile Tyr Lys Asn Gly Thr Phe Lys Lys Gly
        610                 615                 620

Asp Met Phe Asn Leu Asn Asp Cys His Lys Leu Ile Asp Phe Phe Lys
625                 630                 635                 640

Asp Ser Ile Ser Arg Tyr Pro Lys Trp Ser Asn Ala Tyr Asp Phe Asn
                645                 650                 655

Phe Ser Glu Thr Glu Lys Tyr Lys Asp Ile Ala Gly Phe Tyr Arg Glu
                660                 665                 670

Val Glu Glu Gln Gly Tyr Lys Val Ser Phe Glu Ser Ala Ser Lys Lys
            675                 680                 685

Glu Val Asp Lys Leu Val Glu Glu Gly Lys Leu Tyr Met Phe Gln Ile
        690                 695                 700

Tyr Asn Lys Asp Phe Ser Asp Lys Ser His Gly Thr Pro Asn Leu His
705                 710                 715                 720

Thr Met Tyr Phe Lys Leu Leu Phe Asp Glu Asn Asn His Gly Gln Ile
                725                 730                 735

Arg Leu Ser Gly Gly Ala Glu Leu Phe Met Arg Arg Ala Ser Leu Lys
                740                 745                 750

Lys Glu Glu Leu Val Val His Pro Ala Asn Ser Pro Ile Ala Asn Lys
            755                 760                 765

Asn Pro Asp Asn Pro Lys Lys Thr Thr Thr Leu Ser Tyr Asp Val Tyr
        770                 775                 780

Lys Asp Lys Arg Phe Ser Glu Asp Gln Tyr Glu Leu His Ile Pro Ile
785                 790                 795                 800

Ala Ile Asn Lys Cys Pro Lys Asn Ile Phe Lys Ile Asn Thr Glu Val
                805                 810                 815

Arg Val Leu Leu Lys His Asp Asp Asn Pro Tyr Val Ile Gly Ile Asp
                820                 825                 830

Arg Gly Glu Arg Asn Leu Leu Tyr Ile Val Val Asp Gly Lys Gly
            835                 840                 845

Asn Ile Val Glu Gln Tyr Ser Leu Asn Glu Ile Asn Asn Phe Asn
        850                 855                 860
```

```
Gly Ile Arg Ile Lys Thr Asp Tyr His Ser Leu Leu Asp Lys Lys Glu
865                 870                 875                 880

Lys Glu Arg Phe Glu Ala Arg Gln Asn Trp Thr Ser Ile Glu Asn Ile
                885                 890                 895

Lys Glu Leu Lys Ala Gly Tyr Ile Ser Gln Val Val His Lys Ile Cys
            900                 905                 910

Glu Leu Val Glu Lys Tyr Asp Ala Val Ile Ala Leu Glu Asp Leu Asn
        915                 920                 925

Ser Gly Phe Lys Asn Ser Arg Val Lys Val Lys Gln Val Tyr Gln
    930                 935                 940

Lys Phe Glu Lys Met Leu Ile Asp Lys Leu Asn Tyr Met Val Asp Lys
945                 950                 955                 960

Lys Ser Asn Pro Cys Ala Thr Gly Gly Ala Leu Lys Gly Tyr Gln Ile
                965                 970                 975

Thr Asn Lys Phe Glu Ser Phe Lys Ser Met Ser Thr Gln Asn Gly Phe
            980                 985                 990

Ile Phe Tyr Ile Pro Ala Trp Leu Thr Ser Lys Ile Asp Pro Ser Thr
        995                 1000                1005

Gly Phe Val Asn Leu Leu Lys Thr Lys Tyr Thr Ser Ile Ala Asp
    1010                1015                1020

Ser Lys Lys Phe Ile Ser Ser Phe Asp Arg Ile Met Tyr Val Pro
    1025                1030                1035

Glu Glu Asp Leu Phe Glu Phe Ala Leu Asp Tyr Lys Asn Phe Ser
    1040                1045                1050

Arg Thr Asp Ala Asp Tyr Ile Lys Lys Trp Lys Leu Tyr Ser Tyr
    1055                1060                1065

Gly Asn Arg Ile Arg Ile Phe Arg Asn Pro Lys Lys Asn Asn Val
    1070                1075                1080

Phe Asp Trp Glu Glu Val Cys Leu Thr Ser Ala Tyr Lys Glu Leu
    1085                1090                1095

Phe Asn Lys Tyr Gly Ile Asn Tyr Gln Gln Gly Asp Ile Arg Ala
    1100                1105                1110

Leu Leu Cys Glu Gln Ser Asp Lys Ala Phe Tyr Ser Ser Phe Met
    1115                1120                1125

Ala Leu Met Ser Leu Met Leu Gln Met Arg Asn Ser Ile Thr Gly
    1130                1135                1140

Arg Thr Asp Val Asp Phe Leu Ile Ser Pro Val Lys Asn Ser Asp
    1145                1150                1155

Gly Ile Phe Tyr Asp Ser Arg Asn Tyr Glu Ala Gln Glu Asn Ala
    1160                1165                1170

Ile Leu Pro Lys Asn Ala Asp Ala Asn Gly Ala Tyr Asn Ile Ala
    1175                1180                1185

Arg Lys Val Leu Trp Ala Ile Gly Gln Phe Lys Lys Ala Glu Asp
    1190                1195                1200

Glu Lys Leu Asp Lys Val Lys Ile Ala Ile Ser Asn Lys Glu Trp
    1205                1210                1215

Leu Glu Tyr Ala Gln Thr Ser Val Lys His
    1220                1225
```

<210> SEQ ID NO 5
<211> LENGTH: 1300
<212> TYPE: PRT
<213> ORGANISM: Francisella tularensis

<400> SEQUENCE: 5

```
Met Ser Ile Tyr Gln Glu Phe Val Asn Lys Tyr Ser Leu Ser Lys Thr
1               5                   10                  15
Leu Arg Phe Glu Leu Ile Pro Gln Gly Lys Thr Leu Glu Asn Ile Lys
            20                  25                  30
Ala Arg Gly Leu Ile Leu Asp Asp Glu Lys Arg Ala Lys Asp Tyr Lys
            35                  40                  45
Lys Ala Lys Gln Ile Ile Asp Lys Tyr His Gln Phe Phe Ile Glu Glu
50                  55                  60
Ile Leu Ser Ser Val Cys Ile Ser Glu Asp Leu Leu Gln Asn Tyr Ser
65                  70                  75                  80
Asp Val Tyr Phe Lys Leu Lys Lys Ser Asp Asp Asn Leu Gln Lys
                85                  90                  95
Asp Phe Lys Ser Ala Lys Asp Thr Ile Lys Lys Gln Ile Ser Glu Tyr
            100                 105                 110
Ile Lys Asp Ser Glu Lys Phe Lys Asn Leu Phe Asn Gln Asn Leu Ile
            115                 120                 125
Asp Ala Lys Lys Gly Gln Glu Ser Asp Leu Ile Leu Trp Leu Lys Gln
        130                 135                 140
Ser Lys Asp Asn Gly Ile Glu Leu Phe Lys Ala Asn Ser Asp Ile Thr
145                 150                 155                 160
Asp Ile Asp Glu Ala Leu Glu Ile Ile Lys Ser Phe Lys Gly Trp Thr
                165                 170                 175
Thr Tyr Phe Lys Gly Phe His Glu Asn Arg Lys Asn Val Tyr Ser Ser
            180                 185                 190
Asn Asp Ile Pro Thr Ser Ile Ile Tyr Arg Ile Val Asp Asp Asn Leu
            195                 200                 205
Pro Lys Phe Leu Glu Asn Lys Ala Lys Tyr Glu Ser Leu Lys Asp Lys
        210                 215                 220
Ala Pro Glu Ala Ile Asn Tyr Glu Gln Ile Lys Lys Asp Leu Ala Glu
225                 230                 235                 240
Glu Leu Thr Phe Asp Ile Asp Tyr Lys Thr Ser Glu Val Asn Gln Arg
                245                 250                 255
Val Phe Ser Leu Asp Glu Val Phe Glu Ile Ala Asn Phe Asn Asn Tyr
            260                 265                 270
Leu Asn Gln Ser Gly Ile Thr Lys Phe Asn Thr Ile Ile Gly Gly Lys
        275                 280                 285
Phe Val Asn Gly Glu Asn Thr Lys Arg Lys Gly Ile Asn Glu Tyr Ile
        290                 295                 300
Asn Leu Tyr Ser Gln Gln Ile Asn Asp Lys Thr Leu Lys Lys Tyr Lys
305                 310                 315                 320
Met Ser Val Leu Phe Lys Gln Ile Leu Ser Asp Thr Glu Ser Lys Ser
                325                 330                 335
Phe Val Ile Asp Lys Leu Glu Asp Ser Asp Val Val Thr Thr Met
                340                 345                 350
Gln Ser Phe Tyr Glu Gln Ile Ala Ala Phe Lys Thr Val Glu Glu Lys
        355                 360                 365
Ser Ile Lys Glu Thr Leu Ser Leu Leu Phe Asp Asp Leu Lys Ala Gln
370                 375                 380
Lys Leu Asp Leu Ser Lys Ile Tyr Phe Lys Asn Asp Lys Ser Leu Thr
385                 390                 395                 400
Asp Leu Ser Gln Gln Val Phe Asp Asp Tyr Ser Val Ile Gly Thr Ala
                405                 410                 415
```

-continued

Val Leu Glu Tyr Ile Thr Gln Gln Ile Ala Pro Lys Asn Leu Asp Asn
                420                 425                 430

Pro Ser Lys Lys Glu Gln Glu Leu Ile Ala Lys Lys Thr Glu Lys Ala
                435                 440                 445

Lys Tyr Leu Ser Leu Glu Thr Ile Lys Leu Ala Leu Glu Glu Phe Asn
                450                 455                 460

Lys His Arg Asp Ile Asp Lys Gln Cys Arg Phe Glu Glu Ile Leu Ala
465                 470                 475                 480

Asn Phe Ala Ala Ile Pro Met Ile Phe Asp Glu Ile Ala Gln Asn Lys
                485                 490                 495

Asp Asn Leu Ala Gln Ile Ser Ile Lys Tyr Gln Asn Gln Gly Lys Lys
                500                 505                 510

Asp Leu Leu Gln Ala Ser Ala Glu Asp Asp Val Lys Ala Ile Lys Asp
                515                 520                 525

Leu Leu Asp Gln Thr Asn Asn Leu Leu His Lys Leu Lys Ile Phe His
                530                 535                 540

Ile Ser Gln Ser Glu Asp Lys Ala Asn Ile Leu Asp Lys Asp Glu His
545                 550                 555                 560

Phe Tyr Leu Val Phe Glu Glu Cys Tyr Phe Glu Leu Ala Asn Ile Val
                565                 570                 575

Pro Leu Tyr Asn Lys Ile Arg Asn Tyr Ile Thr Gln Lys Pro Tyr Ser
                580                 585                 590

Asp Glu Lys Phe Lys Leu Asn Phe Glu Asn Ser Thr Leu Ala Asn Gly
                595                 600                 605

Trp Asp Lys Asn Lys Glu Pro Asp Asn Thr Ala Ile Leu Phe Ile Lys
                610                 615                 620

Asp Asp Lys Tyr Tyr Leu Gly Val Met Asn Lys Lys Asn Asn Lys Ile
625                 630                 635                 640

Phe Asp Asp Lys Ala Ile Lys Glu Asn Lys Gly Glu Gly Tyr Lys Lys
                645                 650                 655

Ile Val Tyr Lys Leu Leu Pro Gly Ala Asn Lys Met Leu Pro Lys Val
                660                 665                 670

Phe Phe Ser Ala Lys Ser Ile Lys Phe Tyr Asn Pro Ser Glu Asp Ile
                675                 680                 685

Leu Arg Ile Arg Asn His Ser Thr His Thr Lys Asn Gly Ser Pro Gln
                690                 695                 700

Lys Gly Tyr Glu Lys Phe Glu Phe Asn Ile Glu Asp Cys Arg Lys Phe
705                 710                 715                 720

Ile Asp Phe Tyr Lys Gln Ser Ile Ser Lys His Pro Glu Trp Lys Asp
                725                 730                 735

Phe Gly Phe Arg Phe Ser Asp Thr Gln Arg Tyr Asn Ser Ile Asp Glu
                740                 745                 750

Phe Tyr Arg Glu Val Glu Asn Gln Gly Tyr Lys Leu Thr Phe Glu Asn
                755                 760                 765

Ile Ser Glu Ser Tyr Ile Asp Ser Val Val Asn Gln Gly Lys Leu Tyr
                770                 775                 780

Leu Phe Gln Ile Tyr Asn Lys Asp Phe Ser Ala Tyr Ser Lys Gly Arg
785                 790                 795                 800

Pro Asn Leu His Thr Leu Tyr Trp Lys Ala Leu Phe Asp Glu Arg Asn
                805                 810                 815

Leu Gln Asp Val Val Tyr Lys Leu Asn Gly Glu Ala Glu Leu Phe Tyr
                820                 825                 830

Arg Lys Gln Ser Ile Pro Lys Lys Ile Thr His Pro Ala Lys Glu Ala

```
                  835                 840                 845
Ile Ala Asn Lys Asn Lys Asp Asn Pro Lys Lys Glu Ser Val Phe Glu
              850                 855                 860

Tyr Asp Leu Ile Lys Asp Lys Arg Phe Thr Glu Asp Lys Phe Phe Phe
865                 870                 875                 880

His Cys Pro Ile Thr Ile Asn Phe Lys Ser Ser Gly Ala Asn Lys Phe
                  885                 890                 895

Asn Asp Glu Ile Asn Leu Leu Lys Glu Lys Ala Asn Asp Val His
              900                 905                 910

Ile Leu Ser Ile Asp Arg Gly Glu Arg His Leu Ala Tyr Tyr Thr Leu
              915                 920                 925

Val Asp Gly Lys Gly Asn Ile Ile Lys Gln Asp Thr Phe Asn Ile Ile
930                 935                 940

Gly Asn Asp Arg Met Lys Thr Asn Tyr His Asp Lys Leu Ala Ala Ile
945                 950                 955                 960

Glu Lys Asp Arg Asp Ser Ala Arg Lys Asp Trp Lys Lys Ile Asn Asn
                  965                 970                 975

Ile Lys Glu Met Lys Glu Gly Tyr Leu Ser Gln Val Val His Glu Ile
              980                 985                 990

Ala Lys Leu Val Ile Glu Tyr Asn Ala Ile Val Val Phe Glu Asp Leu
              995                1000                1005

Asn Phe Gly Phe Lys Arg Gly Arg Phe Lys Val Glu Lys Gln Val
1010                1015                1020

Tyr Gln Lys Leu Glu Lys Met Leu Ile Glu Lys Leu Asn Tyr Leu
1025                1030                1035

Val Phe Lys Asp Asn Glu Phe Asp Lys Thr Gly Gly Val Leu Arg
1040                1045                1050

Ala Tyr Gln Leu Thr Ala Pro Phe Glu Thr Phe Lys Lys Met Gly
1055                1060                1065

Lys Gln Thr Gly Ile Ile Tyr Tyr Val Pro Ala Gly Phe Thr Ser
1070                1075                1080

Lys Ile Cys Pro Val Thr Gly Phe Val Asn Gln Leu Tyr Pro Lys
1085                1090                1095

Tyr Glu Ser Val Ser Lys Ser Gln Glu Phe Phe Ser Lys Phe Asp
1100                1105                1110

Lys Ile Cys Tyr Asn Leu Asp Lys Gly Tyr Phe Glu Phe Ser Phe
1115                1120                1125

Asp Tyr Lys Asn Phe Gly Asp Lys Ala Ala Lys Gly Lys Trp Thr
1130                1135                1140

Ile Ala Ser Phe Gly Ser Arg Leu Ile Asn Phe Arg Asn Ser Asp
1145                1150                1155

Lys Asn His Asn Trp Asp Thr Arg Glu Val Tyr Pro Thr Lys Glu
1160                1165                1170

Leu Glu Lys Leu Leu Lys Asp Tyr Ser Ile Glu Tyr Gly His Gly
1175                1180                1185

Glu Cys Ile Lys Ala Ala Ile Cys Gly Glu Ser Asp Lys Lys Phe
1190                1195                1200

Phe Ala Lys Leu Thr Ser Val Leu Asn Thr Ile Leu Gln Met Arg
1205                1210                1215

Asn Ser Lys Thr Gly Thr Glu Leu Asp Tyr Leu Ile Ser Pro Val
1220                1225                1230

Ala Asp Val Asn Gly Asn Phe Phe Asp Ser Arg Gln Ala Pro Lys
1235                1240                1245
```

Asn Met Pro Gln Asp Ala Asp Ala Asn Gly Ala Tyr His Ile Gly
    1250            1255                1260

Leu Lys Gly Leu Met Leu Leu Gly Arg Ile Lys Asn Asn Gln Glu
    1265            1270                1275

Gly Lys Lys Leu Asn Leu Val Ile Lys Asn Glu Glu Tyr Phe Glu
    1280            1285                1290

Phe Val Gln Asn Arg Asn Asn
    1295            1300

<210> SEQ ID NO 6
<211> LENGTH: 1257
<212> TYPE: PRT
<213> ORGANISM: Prevotella bryantii

<400> SEQUENCE: 6

Met Gln Ile Asn Asn Leu Lys Ile Ile Tyr Met Lys Phe Thr Asp Phe
1               5                   10                  15

Thr Gly Leu Tyr Ser Leu Ser Lys Thr Leu Arg Phe Glu Leu Lys Pro
            20                  25                  30

Ile Gly Lys Thr Leu Glu Asn Ile Lys Lys Ala Gly Leu Leu Glu Gln
        35                  40                  45

Asp Gln His Arg Ala Asp Ser Tyr Lys Lys Val Lys Lys Ile Ile Asp
    50                  55                  60

Glu Tyr His Lys Ala Phe Ile Glu Lys Ser Leu Ser Asn Phe Glu Leu
65                  70                  75                  80

Lys Tyr Gln Ser Glu Asp Lys Leu Asp Ser Leu Glu Glu Tyr Leu Met
                85                  90                  95

Tyr Tyr Ser Met Lys Arg Ile Glu Lys Thr Glu Lys Asp Lys Phe Ala
            100                 105                 110

Lys Ile Gln Asp Asn Leu Arg Lys Gln Ile Ala Asp His Leu Lys Gly
        115                 120                 125

Asp Glu Ser Tyr Lys Thr Ile Phe Ser Lys Asp Leu Ile Arg Lys Asn
    130                 135                 140

Leu Pro Asp Phe Val Lys Ser Asp Glu Glu Arg Thr Leu Ile Lys Glu
145                 150                 155                 160

Phe Lys Asp Phe Thr Thr Tyr Phe Lys Gly Phe Tyr Glu Asn Arg Glu
                165                 170                 175

Asn Met Tyr Ser Ala Glu Asp Lys Ser Thr Ala Ile Ser His Arg Ile
            180                 185                 190

Ile His Glu Asn Leu Pro Lys Phe Val Asp Asn Ile Asn Ala Phe Ser
        195                 200                 205

Lys Ile Ile Leu Ile Pro Glu Leu Arg Glu Lys Leu Asn Gln Ile Tyr
    210                 215                 220

Gln Asp Phe Glu Glu Tyr Leu Asn Val Glu Ser Ile Asp Glu Ile Phe
225                 230                 235                 240

His Leu Asp Tyr Phe Ser Met Val Met Thr Gln Lys Gln Ile Glu Val
                245                 250                 255

Tyr Asn Ala Ile Ile Gly Gly Lys Ser Thr Asn Asp Lys Lys Ile Gln
            260                 265                 270

Gly Leu Asn Glu Tyr Ile Asn Leu Tyr Asn Gln Lys His Lys Asp Cys
        275                 280                 285

Lys Leu Pro Lys Leu Lys Leu Leu Phe Lys Gln Ile Leu Ser Asp Arg
    290                 295                 300

Ile Ala Ile Ser Trp Leu Pro Asp Asn Phe Lys Asp Asp Gln Glu Ala

```
305                 310                 315                 320
Leu Asp Ser Ile Asp Thr Cys Tyr Lys Asn Leu Leu Asn Asp Gly Asn
                325                 330                 335

Val Leu Gly Glu Gly Asn Leu Lys Leu Leu Glu Asn Ile Asp Thr
                340                 345                 350

Tyr Asn Leu Lys Gly Ile Phe Ile Arg Asn Asp Leu Gln Leu Thr Asp
                355                 360                 365

Ile Ser Gln Lys Met Tyr Ala Ser Trp Asn Val Ile Gln Asp Ala Val
            370                 375                 380

Ile Leu Asp Leu Lys Lys Gln Val Ser Arg Lys Lys Glu Ser Ala
385                 390                 395                 400

Glu Asp Tyr Asn Asp Arg Leu Lys Lys Leu Tyr Thr Ser Gln Glu Ser
                405                 410                 415

Phe Ser Ile Gln Tyr Leu Asn Asp Cys Leu Arg Ala Tyr Gly Lys Thr
                420                 425                 430

Glu Asn Ile Gln Asp Tyr Phe Ala Lys Leu Gly Ala Val Asn Asn Glu
                435                 440                 445

His Glu Gln Thr Ile Asn Leu Phe Ala Gln Val Arg Asn Ala Tyr Thr
            450                 455                 460

Ser Val Gln Ala Ile Leu Thr Thr Pro Tyr Pro Glu Asn Ala Asn Leu
465                 470                 475                 480

Ala Gln Asp Lys Glu Thr Val Ala Leu Ile Lys Asn Leu Leu Asp Ser
                485                 490                 495

Leu Lys Arg Leu Gln Arg Phe Ile Lys Pro Leu Leu Gly Lys Gly Asp
                500                 505                 510

Glu Ser Asp Lys Asp Glu Arg Phe Tyr Gly Asp Phe Thr Pro Leu Trp
            515                 520                 525

Glu Thr Leu Asn Gln Ile Thr Pro Leu Tyr Asn Met Val Arg Asn Tyr
            530                 535                 540

Met Thr Arg Lys Pro Tyr Ser Gln Glu Lys Ile Lys Leu Asn Phe Glu
545                 550                 555                 560

Asn Ser Thr Leu Leu Gly Gly Trp Asp Leu Asn Lys Glu His Asp Asn
                565                 570                 575

Thr Ala Ile Ile Leu Arg Lys Asn Gly Leu Tyr Tyr Leu Ala Ile Met
                580                 585                 590

Lys Lys Ser Ala Asn Lys Ile Phe Asp Lys Lys Leu Asp Asn Ser
                595                 600                 605

Gly Asp Cys Tyr Glu Lys Met Val Tyr Lys Leu Leu Pro Gly Ala Asn
            610                 615                 620

Lys Met Leu Pro Lys Val Phe Phe Ser Lys Ser Arg Ile Asp Glu Phe
625                 630                 635                 640

Lys Pro Ser Glu Asn Ile Ile Glu Asn Tyr Lys Lys Gly Thr His Lys
                645                 650                 655

Lys Gly Ala Asn Phe Asn Leu Ala Asp Cys His Asn Leu Ile Asp Phe
                660                 665                 670

Phe Lys Ser Ser Ile Ser Lys His Glu Asp Trp Ser Lys Phe Asn Phe
            675                 680                 685

His Phe Ser Asp Thr Ser Tyr Glu Asp Leu Ser Asp Phe Tyr Arg
            690                 695                 700

Glu Val Glu Gln Gln Gly Tyr Ser Ile Ser Phe Cys Asp Val Ser Val
705                 710                 715                 720

Glu Tyr Ile Asn Lys Met Val Glu Lys Gly Asp Leu Tyr Leu Phe Gln
                725                 730                 735
```

-continued

```
Ile Tyr Asn Lys Asp Phe Ser Glu Phe Ser Lys Gly Thr Pro Asn Met
            740                 745                 750

His Thr Leu Tyr Trp Asn Ser Leu Phe Ser Lys Glu Asn Leu Asn Asn
            755                 760                 765

Ile Ile Tyr Lys Leu Asn Gly Gln Ala Glu Ile Phe Phe Arg Lys Lys
            770                 775                 780

Ser Leu Asn Tyr Lys Arg Pro Thr His Pro Ala His Gln Ala Ile Lys
785                 790                 795                 800

Asn Lys Asn Lys Cys Asn Glu Lys Lys Glu Ser Ile Phe Asp Tyr Asp
                    805                 810                 815

Leu Val Lys Asp Lys Arg Tyr Thr Val Asp Lys Phe Gln Phe His Val
            820                 825                 830

Pro Ile Thr Met Asn Phe Lys Ser Thr Gly Asn Thr Asn Ile Asn Gln
            835                 840                 845

Gln Val Ile Asp Tyr Leu Arg Thr Glu Asp Thr His Ile Ile Gly
            850                 855                 860

Ile Asp Arg Gly Glu Arg His Leu Leu Tyr Leu Val Val Ile Asp Ser
865                 870                 875                 880

His Gly Lys Ile Val Glu Gln Phe Thr Leu Asn Glu Ile Val Asn Glu
                    885                 890                 895

Tyr Gly Gly Asn Ile Tyr Arg Thr Asn Tyr His Asp Leu Leu Asp Thr
            900                 905                 910

Arg Glu Gln Asn Arg Glu Lys Ala Arg Glu Ser Trp Gln Thr Ile Glu
            915                 920                 925

Asn Ile Lys Glu Leu Lys Glu Gly Tyr Ile Ser Gln Val Ile His Lys
            930                 935                 940

Ile Thr Asp Leu Met Gln Lys Tyr His Ala Val Val Val Leu Glu Asp
945                 950                 955                 960

Leu Asn Met Gly Phe Met Arg Gly Arg Gln Lys Val Glu Lys Gln Val
                    965                 970                 975

Tyr Gln Lys Phe Glu Glu Met Leu Ile Asn Lys Leu Asn Tyr Leu Val
            980                 985                 990

Asn Lys Lys Ala Asp Gln Asn Ser Ala Gly Gly Leu Leu His Ala Tyr
            995                 1000                1005

Gln Leu Thr Ser Lys Phe Glu Ser Phe Gln Lys Leu Gly Lys Gln
    1010                1015                1020

Ser Gly Phe Leu Phe Tyr Ile Pro Ala Trp Asn Thr Ser Lys Ile
    1025                1030                1035

Asp Pro Val Thr Gly Phe Val Asn Leu Phe Asp Thr Arg Tyr Glu
    1040                1045                1050

Ser Ile Asp Lys Ala Lys Ala Phe Phe Gly Lys Phe Asp Ser Ile
    1055                1060                1065

Arg Tyr Asn Ala Asp Lys Asp Trp Phe Glu Phe Ala Phe Asp Tyr
    1070                1075                1080

Asn Asn Phe Thr Thr Lys Ala Glu Gly Thr Arg Thr Asn Trp Thr
    1085                1090                1095

Ile Cys Thr Tyr Gly Ser Arg Ile Arg Thr Phe Arg Asn Gln Ala
    1100                1105                1110

Lys Asn Ser Gln Trp Asp Asn Glu Glu Ile Asp Leu Thr Lys Ala
    1115                1120                1125

Tyr Lys Ala Phe Phe Ala Lys His Gly Ile Asn Ile Tyr Asp Asn
    1130                1135                1140
```

```
Ile Lys Glu Ala Ile Ala Met Glu Thr Glu Lys Ser Phe Phe Glu
    1145                1150                1155

Asp Leu Leu His Leu Leu Lys Leu Thr Leu Gln Met Arg Asn Ser
    1160                1165                1170

Ile Thr Gly Thr Thr Thr Asp Tyr Leu Ile Ser Pro Val His Asp
    1175                1180                1185

Ser Lys Gly Asn Phe Tyr Asp Ser Arg Ile Cys Asp Asn Ser Leu
    1190                1195                1200

Pro Ala Asn Ala Asp Ala Asn Gly Ala Tyr Asn Ile Ala Arg Lys
    1205                1210                1215

Gly Leu Met Leu Ile Gln Gln Ile Lys Asp Ser Thr Ser Ser Asn
    1220                1225                1230

Arg Phe Lys Phe Ser Pro Ile Thr Asn Lys Asp Trp Leu Ile Phe
    1235                1240                1245

Ala Gln Glu Lys Pro Tyr Leu Asn Asp
    1250                1255

<210> SEQ ID NO 7
<211> LENGTH: 1154
<212> TYPE: PRT
<213> ORGANISM: Proteocatella sphenisci

<400> SEQUENCE: 7

Met Glu Asn Phe Lys Asn Leu Tyr Pro Ile Asn Lys Thr Leu Arg Phe
1               5                   10                  15

Glu Leu Arg Pro Tyr Gly Lys Thr Leu Glu Asn Phe Lys Lys Ser Gly
                20                  25                  30

Leu Leu Glu Lys Asp Ala Phe Lys Ala Asn Ser Arg Arg Ser Met Gln
            35                  40                  45

Ala Ile Ile Asp Glu Lys Phe Lys Glu Thr Ile Glu Glu Arg Leu Lys
        50                  55                  60

Tyr Thr Glu Phe Ser Glu Cys Asp Leu Gly Asn Met Thr Ser Lys Asp
65                  70                  75                  80

Lys Lys Ile Thr Asp Lys Ala Ala Thr Asn Leu Lys Lys Gln Val Ile
                85                  90                  95

Leu Ser Phe Asp Asp Glu Ile Phe Asn Asn Tyr Leu Lys Pro Asp Lys
                100                 105                 110

Asn Ile Asp Ala Leu Phe Lys Asn Asp Pro Ser Asn Pro Val Ile Ser
            115                 120                 125

Thr Phe Lys Gly Phe Thr Thr Tyr Phe Val Asn Phe Phe Glu Ile Arg
        130                 135                 140

Lys His Ile Phe Lys Gly Glu Ser Ser Gly Ser Met Ala Tyr Arg Ile
145                 150                 155                 160

Ile Asp Glu Asn Leu Thr Thr Tyr Leu Asn Asn Ile Glu Lys Ile Lys
                165                 170                 175

Lys Leu Pro Glu Glu Leu Lys Ser Gln Leu Glu Gly Ile Asp Gln Ile
                180                 185                 190

Asp Lys Leu Asn Asn Tyr Asn Glu Phe Ile Thr Gln Ser Gly Ile Thr
            195                 200                 205

His Tyr Asn Glu Ile Ile Gly Gly Ile Ser Lys Ser Glu Asn Val Lys
        210                 215                 220

Ile Gln Gly Ile Asn Glu Gly Ile Asn Leu Tyr Cys Gln Lys Asn Lys
225                 230                 235                 240

Val Lys Leu Pro Arg Leu Thr Pro Leu Tyr Lys Met Ile Leu Ser Asp
                245                 250                 255
```

```
Arg Val Ser Asn Ser Phe Val Leu Asp Thr Ile Glu Asn Asp Thr Glu
            260                 265                 270

Leu Ile Glu Met Ile Ser Asp Leu Ile Asn Lys Thr Glu Ile Ser Gln
            275                 280                 285

Asp Val Ile Met Ser Asp Ile Gln Asn Ile Phe Ile Lys Tyr Lys Gln
            290                 295                 300

Leu Gly Asn Leu Pro Gly Ile Ser Tyr Ser Ile Val Asn Ala Ile
305                 310                 315                 320

Cys Ser Asp Tyr Asp Asn Asn Phe Gly Asp Gly Lys Arg Lys Lys Ser
                325                 330                 335

Tyr Glu Asn Asp Arg Lys Lys His Leu Glu Thr Asn Val Tyr Ser Ile
            340                 345                 350

Asn Tyr Ile Ser Glu Leu Leu Thr Asp Thr Asp Val Ser Ser Asn Ile
            355                 360                 365

Lys Met Arg Tyr Lys Glu Leu Glu Gln Asn Tyr Gln Val Cys Lys Glu
            370                 375                 380

Asn Phe Asn Ala Thr Asn Trp Met Asn Ile Lys Asn Ile Lys Gln Ser
385                 390                 395                 400

Glu Lys Thr Asn Leu Ile Lys Asp Leu Leu Asp Ile Leu Lys Ser Ile
                405                 410                 415

Gln Arg Phe Tyr Asp Leu Phe Asp Ile Val Asp Glu Asp Lys Asn Pro
            420                 425                 430

Ser Ala Glu Phe Tyr Thr Trp Leu Ser Lys Asn Ala Glu Lys Leu Asp
                435                 440                 445

Phe Glu Phe Asn Ser Val Tyr Asn Lys Ser Arg Asn Tyr Leu Thr Arg
450                 455                 460

Lys Gln Tyr Ser Asp Lys Lys Ile Lys Leu Asn Phe Asp Ser Pro Thr
465                 470                 475                 480

Leu Ala Lys Gly Trp Asp Ala Asn Lys Glu Ile Asp Asn Ser Thr Ile
                485                 490                 495

Ile Met Arg Lys Phe Asn Asn Asp Arg Gly Asp Tyr Asp Tyr Phe Leu
                500                 505                 510

Gly Ile Trp Asn Lys Ser Thr Pro Ala Asn Glu Lys Ile Ile Pro Leu
            515                 520                 525

Glu Asp Asn Gly Leu Phe Glu Lys Met Gln Tyr Lys Leu Tyr Pro Asp
530                 535                 540

Pro Ser Lys Met Leu Pro Lys Gln Phe Leu Ser Lys Ile Trp Lys Ala
545                 550                 555                 560

Lys His Pro Thr Thr Pro Glu Phe Asp Lys Lys Tyr Lys Glu Gly Arg
                565                 570                 575

His Lys Lys Gly Pro Asp Phe Lys Glu Phe Leu His Glu Leu Ile
            580                 585                 590

Asp Cys Phe Lys His Gly Leu Val Asn His Asp Glu Lys Tyr Gln Asp
            595                 600                 605

Val Phe Gly Phe Asn Leu Arg Asn Thr Glu Asp Tyr Asn Ser Tyr Thr
            610                 615                 620

Glu Phe Leu Glu Asp Val Glu Arg Cys Asn Tyr Asn Leu Ser Phe Asn
625                 630                 635                 640

Lys Ile Ala Asp Thr Ser Asn Leu Ile Asn Asp Gly Lys Leu Tyr Val
                645                 650                 655

Phe Gln Ile Trp Ser Lys Asp Phe Ser Ile Asp Ser Lys Gly Thr Lys
            660                 665                 670
```

```
Asn Leu Asn Thr Ile Tyr Phe Glu Ser Leu Phe Ser Glu Glu Asn Met
            675                 680                 685

Ile Glu Lys Met Phe Lys Leu Ser Gly Glu Ala Glu Ile Phe Tyr Arg
        690                 695                 700

Pro Ala Ser Leu Asn Tyr Cys Glu Asp Ile Ile Lys Lys Gly His His
705                 710                 715                 720

His Ala Glu Leu Lys Asp Lys Phe Asp Tyr Pro Ile Ile Lys Asp Lys
                725                 730                 735

Arg Tyr Ser Gln Asp Lys Phe Phe His Val Pro Met Val Ile Asn
            740                 745                 750

Tyr Lys Ser Glu Lys Leu Asn Ser Lys Ser Leu Asn Asn Arg Thr Asn
        755                 760                 765

Glu Asn Leu Gly Gln Phe Thr His Ile Ile Gly Ile Asp Arg Gly Glu
770                 775                 780

Arg His Leu Ile Tyr Leu Thr Val Val Asp Val Ser Thr Gly Glu Ile
785                 790                 795                 800

Val Glu Gln Lys His Leu Asp Glu Ile Ile Asn Thr Asp Thr Lys Gly
                805                 810                 815

Val Glu His Lys Thr His Tyr Leu Asn Lys Leu Glu Glu Lys Ser Lys
                820                 825                 830

Thr Arg Asp Asn Glu Arg Lys Ser Trp Glu Ala Ile Glu Thr Ile Lys
            835                 840                 845

Glu Leu Lys Glu Gly Tyr Ile Ser His Val Ile Asn Glu Ile Gln Lys
        850                 855                 860

Leu Gln Glu Lys Tyr Asn Ala Leu Ile Val Met Glu Asn Leu Asn Tyr
865                 870                 875                 880

Gly Phe Lys Asn Ser Arg Ile Lys Val Glu Lys Gln Val Tyr Gln Lys
                885                 890                 895

Phe Glu Thr Ala Leu Ile Lys Lys Phe Asn Tyr Ile Ile Asp Lys Lys
            900                 905                 910

Asp Pro Glu Thr Tyr Ile His Gly Tyr Gln Leu Thr Asn Pro Ile Thr
        915                 920                 925

Thr Leu Asp Lys Ile Gly Asn Gln Ser Gly Ile Val Leu Tyr Ile Pro
930                 935                 940

Ala Trp Asn Thr Ser Lys Ile Asp Pro Val Thr Gly Phe Val Asn Leu
945                 950                 955                 960

Leu Tyr Ala Asp Asp Leu Lys Tyr Lys Asn Gln Glu Gln Ala Lys Ser
                965                 970                 975

Phe Ile Gln Lys Ile Asp Asn Ile Tyr Phe Glu Asn Gly Glu Phe Lys
            980                 985                 990

Phe Asp Ile Asp Phe Ser Lys Trp Asn Asn Arg Tyr Ser Ile Ser Lys
        995                 1000                1005

Thr Lys Trp Thr Leu Thr Ser Tyr Gly Thr Arg Ile Gln Thr Phe
        1010                1015                1020

Arg Asn Pro Gln Lys Asn Asn Lys Trp Asp Ser Ala Glu Tyr Asp
        1025                1030                1035

Leu Thr Glu Glu Phe Lys Leu Ile Leu Asn Ile Asp Gly Thr Leu
        1040                1045                1050

Lys Ser Gln Asp Val Glu Thr Tyr Lys Lys Phe Met Ser Leu Phe
        1055                1060                1065

Lys Leu Met Leu Gln Leu Arg Asn Ser Val Thr Gly Thr Asp Ile
        1070                1075                1080

Asp Tyr Met Ile Ser Pro Val Thr Asp Lys Thr Gly Thr His Phe
```

-continued

```
            1085                1090                1095
Asp Ser Arg Glu Asn Ile Lys Asn Leu Pro Ala Asp Ala Asp Ala
        1100                1105                1110

Asn Gly Ala Tyr Asn Ile Ala Arg Lys Gly Ile Met Ala Ile Glu
        1115                1120                1125

Asn Ile Met Asn Gly Ile Ser Asp Pro Leu Lys Ile Ser Asn Glu
        1130                1135                1140

Asp Tyr Leu Lys Tyr Ile Gln Asn Gln Gln Glu
        1145                1150

<210> SEQ ID NO 8
<211> LENGTH: 1235
<212> TYPE: PRT
<213> ORGANISM: Anaerovibrio sp.

<400> SEQUENCE: 8

Met Val Ala Phe Ile Asp Glu Phe Val Gly Gln Tyr Pro Val Ser Lys
1               5                   10                  15

Thr Leu Arg Phe Glu Ala Arg Pro Val Pro Glu Thr Lys Lys Trp Leu
            20                  25                  30

Glu Ser Asp Gln Cys Ser Val Leu Phe Asn Asp Gln Lys Arg Asn Glu
        35                  40                  45

Tyr Tyr Gly Val Leu Lys Glu Leu Leu Asp Asp Tyr Tyr Arg Ala Tyr
    50                  55                  60

Ile Glu Asp Ala Leu Thr Ser Phe Thr Leu Asp Lys Ala Leu Leu Glu
65                  70                  75                  80

Asn Ala Tyr Asp Leu Tyr Cys Asn Arg Asp Thr Asn Ala Phe Ser Ser
                85                  90                  95

Cys Cys Glu Lys Leu Arg Lys Asp Leu Val Lys Ala Phe Gly Asn Leu
            100                 105                 110

Lys Asp Tyr Leu Leu Gly Ser Asp Gln Leu Lys Asp Leu Val Lys Leu
        115                 120                 125

Lys Ala Lys Val Asp Ala Pro Ala Gly Lys Gly Lys Lys Ile Glu
    130                 135                 140

Val Asp Ser Arg Leu Ile Asn Trp Leu Asn Asn Asn Ala Lys Tyr Ser
145                 150                 155                 160

Ala Glu Asp Arg Glu Lys Tyr Ile Lys Ala Ile Glu Ser Phe Glu Gly
                165                 170                 175

Phe Val Thr Tyr Leu Thr Asn Tyr Lys Gln Ala Arg Glu Asn Met Phe
            180                 185                 190

Ser Ser Glu Asp Lys Ser Thr Ala Ile Ala Phe Arg Val Ile Asp Gln
        195                 200                 205

Asn Met Val Thr Tyr Phe Gly Asn Ile Arg Ile Tyr Glu Lys Ile Lys
    210                 215                 220

Ala Lys Tyr Pro Glu Leu Tyr Ser Ala Leu Lys Gly Phe Glu Lys Phe
225                 230                 235                 240

Phe Ser Pro Thr Ala Tyr Ser Glu Ile Leu Ser Gln Ser Lys Ile Asp
                245                 250                 255

Glu Tyr Asn Tyr Gln Cys Ile Gly Arg Pro Ile Asp Asp Ala Asp Phe
            260                 265                 270

Lys Gly Val Asn Ser Leu Ile Asn Glu Tyr Arg Gln Lys Asn Gly Ile
        275                 280                 285

Lys Ala Arg Glu Leu Pro Val Met Ser Met Leu Tyr Lys Gln Ile Leu
    290                 295                 300
```

Ser Asp Arg Asp Asn Ser Phe Met Ser Glu Val Ile Asn Arg Asn Glu
305                 310                 315                 320

Glu Ala Ile Glu Cys Ala Lys Asn Gly Tyr Lys Val Ser Tyr Ala Leu
            325                 330                 335

Phe Asn Glu Leu Leu Gln Leu Tyr Lys Lys Ile Phe Thr Glu Asp Asn
            340                 345                 350

Tyr Gly Asn Ile Tyr Val Lys Thr Gln Pro Leu Thr Glu Leu Ser Gln
            355                 360                 365

Ala Leu Phe Gly Asp Trp Ser Ile Leu Arg Asn Ala Leu Asp Asn Gly
    370                 375                 380

Lys Tyr Asp Lys Asp Ile Ile Asn Leu Ala Glu Leu Glu Lys Tyr Phe
385                 390                 395                 400

Ser Glu Tyr Cys Lys Val Leu Asp Ala Asp Ala Ala Lys Ile Gln
            405                 410                 415

Asp Lys Phe Asn Leu Lys Asp Tyr Phe Ile Gln Lys Asn Ala Leu Asp
            420                 425                 430

Ala Thr Leu Pro Asp Leu Asp Lys Ile Thr Gln Tyr Lys Pro His Leu
    435                 440                 445

Asp Ala Met Leu Gln Ala Ile Arg Lys Tyr Lys Leu Phe Ser Met Tyr
450                 455                 460

Asn Gly Arg Lys Lys Met Asp Val Pro Glu Asn Gly Ile Asp Phe Ser
465                 470                 475                 480

Asn Glu Phe Asn Ala Ile Tyr Asp Lys Leu Ser Glu Phe Ser Ile Leu
            485                 490                 495

Tyr Asp Arg Ile Arg Asn Phe Ala Thr Lys Lys Pro Tyr Ser Asp Glu
            500                 505                 510

Lys Met Lys Leu Ser Phe Asn Met Pro Thr Met Leu Ala Gly Trp Asp
            515                 520                 525

Tyr Asn Asn Glu Thr Ala Asn Gly Cys Phe Leu Phe Ile Lys Asp Gly
    530                 535                 540

Lys Tyr Phe Leu Gly Val Ala Asp Ser Lys Ser Lys Asn Ile Phe Asp
545                 550                 555                 560

Phe Lys Lys Asn Pro His Leu Leu Asp Lys Tyr Ser Ser Lys Asp Ile
            565                 570                 575

Tyr Tyr Lys Val Lys Tyr Lys Gln Val Ser Gly Ser Ala Lys Met Leu
            580                 585                 590

Pro Lys Val Val Phe Ala Gly Ser Asn Glu Lys Ile Phe Gly His Leu
    595                 600                 605

Ile Ser Lys Arg Ile Leu Glu Ile Arg Glu Lys Lys Leu Tyr Thr Ala
610                 615                 620

Ala Ala Gly Asp Arg Lys Ala Val Ala Glu Trp Ile Asp Phe Met Lys
625                 630                 635                 640

Ser Ala Ile Ala Ile His Pro Glu Trp Asn Glu Tyr Phe Lys Phe Lys
            645                 650                 655

Phe Lys Asn Thr Ala Glu Tyr Asp Asn Ala Lys Pro Tyr Glu Asp
            660                 665                 670

Ile Asp Lys Gln Thr Tyr Ser Leu Glu Lys Val Glu Ile Pro Thr Glu
            675                 680                 685

Tyr Ile Asp Glu Met Val Ser Gln His Lys Leu Tyr Leu Phe Gln Leu
            690                 695                 700

Tyr Thr Lys Asp Phe Ser Asp Lys Lys Lys Lys Gly Thr Asp Asn
705                 710                 715                 720

Leu His Thr Met Tyr Trp His Gly Val Phe Ser Asp Glu Asn Leu Lys

-continued

```
                725                 730                 735
Ala Val Thr Glu Gly Thr Gln Pro Ile Ile Lys Leu Asn Gly Glu Ala
                740                 745                 750
Glu Met Phe Met Arg Asn Pro Ser Ile Glu Phe Gln Val Thr His Glu
                755                 760                 765
His Asn Lys Pro Ile Ala Asn Lys Asn Pro Leu Asn Thr Lys Lys Glu
                770                 775                 780
Ser Val Phe Asn Tyr Asp Leu Ile Lys Asp Lys Arg Tyr Thr Glu Arg
785                 790                 795                 800
Lys Phe Tyr Phe His Cys Pro Ile Thr Leu Asn Phe Arg Ala Asp Lys
                805                 810                 815
Pro Ile Lys Tyr Asn Glu Lys Ile Asn Arg Phe Val Glu Asn Asn Pro
                820                 825                 830
Asp Val Cys Ile Ile Gly Ile Asp Arg Gly Glu Arg His Leu Leu Tyr
                835                 840                 845
Tyr Thr Val Ile Asn Gln Thr Gly Asp Ile Leu Glu Gln Gly Ser Leu
                850                 855                 860
Asn Lys Ile Ser Gly Ser Tyr Thr Asn Asp Lys Gly Glu Lys Val Asn
865                 870                 875                 880
Lys Glu Thr Asp Tyr His Asp Leu Leu Asp Arg Lys Glu Lys Gly Lys
                885                 890                 895
His Val Ala Gln Gln Ala Trp Glu Thr Ile Glu Asn Ile Lys Glu Leu
                900                 905                 910
Lys Ala Gly Tyr Leu Ser Gln Val Val Tyr Lys Leu Thr Gln Leu Met
                915                 920                 925
Leu Gln Tyr Asn Ala Val Ile Val Leu Glu Asn Leu Asn Val Gly Phe
                930                 935                 940
Lys Arg Gly Arg Thr Lys Val Glu Lys Gln Val Tyr Gln Lys Phe Glu
945                 950                 955                 960
Lys Ala Met Ile Asp Lys Leu Asn Tyr Leu Val Phe Lys Asp Arg Gly
                965                 970                 975
Tyr Glu Met Asn Gly Ser Tyr Ala Lys Gly Leu Gln Leu Thr Asp Lys
                980                 985                 990
Phe Glu Ser Phe Asp Lys Ile Gly Lys Gln Thr Gly Cys Ile Tyr Tyr
                995                1000                1005
Val Ile Pro Ser Tyr Thr Ser His Ile Asp Pro Lys Thr Gly Phe
                1010                1015                1020
Val Asn Leu Leu Asn Ala Lys Leu Arg Tyr Glu Asn Ile Thr Lys
                1025                1030                1035
Ala Gln Asp Thr Ile Arg Lys Phe Asp Ser Ile Ser Tyr Asn Ala
                1040                1045                1050
Lys Ala Asp Tyr Phe Glu Phe Ala Phe Asp Tyr Arg Ser Phe Gly
                1055                1060                1065
Val Asp Met Ala Arg Asn Glu Trp Val Val Cys Thr Cys Gly Asp
                1070                1075                1080
Leu Arg Trp Glu Tyr Ser Ala Lys Thr Arg Glu Thr Lys Ala Tyr
                1085                1090                1095
Ser Val Thr Asp Arg Leu Lys Glu Leu Phe Lys Ala His Gly Ile
                1100                1105                1110
Asp Tyr Val Gly Gly Glu Asn Leu Val Ser His Ile Thr Glu Val
                1115                1120                1125
Ala Asp Lys His Phe Leu Ser Thr Leu Leu Phe Tyr Leu Arg Leu
                1130                1135                1140
```

```
Val Leu Lys Met Arg Tyr Thr Val Ser Gly Thr Glu Asn Glu Asn
    1145                1150                1155

Asp Phe Ile Leu Ser Pro Val Glu Tyr Ala Pro Gly Lys Phe Phe
    1160                1165                1170

Asp Ser Arg Glu Ala Thr Ser Thr Glu Pro Met Asn Ala Asp Ala
    1175                1180                1185

Asn Gly Ala Tyr His Ile Ala Leu Lys Gly Leu Met Thr Ile Arg
    1190                1195                1200

Gly Ile Glu Asp Gly Lys Leu His Asn Tyr Gly Lys Gly Gly Glu
    1205                1210                1215

Asn Ala Ala Trp Phe Lys Phe Met Gln Asn Gln Glu Tyr Lys Asn
    1220                1225                1230

Asn Gly
    1235

<210> SEQ ID NO 9
<211> LENGTH: 1264
<212> TYPE: PRT
<213> ORGANISM: Moraxella caprae

<400> SEQUENCE: 9

Met Leu Phe Gln Asp Phe Thr His Leu Tyr Pro Leu Ser Lys Thr Met
1               5                   10                  15

Arg Phe Glu Leu Lys Pro Ile Gly Lys Thr Leu Glu His Ile His Ala
            20                  25                  30

Lys Asn Phe Leu Ser Gln Asp Glu Thr Met Ala Asp Met Tyr Gln Lys
        35                  40                  45

Val Lys Ala Ile Leu Asp Asp Tyr His Arg Asp Phe Ile Ala Asp Met
    50                  55                  60

Met Gly Glu Val Lys Leu Thr Lys Leu Ala Glu Phe Tyr Asp Val Tyr
65                  70                  75                  80

Leu Lys Phe Arg Lys Asn Pro Lys Asp Asp Gly Leu Gln Lys Gln Leu
                85                  90                  95

Lys Asp Leu Gln Ala Val Leu Arg Lys Glu Ile Val Lys Pro Ile Gly
            100                 105                 110

Asn Gly Gly Lys Tyr Lys Ala Gly Tyr Asp Arg Leu Phe Gly Ala Lys
        115                 120                 125

Leu Phe Lys Asp Gly Lys Glu Leu Gly Asp Leu Ala Lys Phe Val Ile
    130                 135                 140

Ala Gln Glu Gly Glu Ser Ser Pro Lys Leu Ala His Leu Ala His Phe
145                 150                 155                 160

Glu Lys Phe Ser Thr Tyr Phe Thr Gly Phe His Asp Asn Arg Lys Asn
                165                 170                 175

Met Tyr Ser Asp Glu Asp Lys His Thr Ala Ile Thr Tyr Arg Leu Ile
            180                 185                 190

His Glu Asn Leu Pro Arg Phe Ile Asp Asn Leu Gln Ile Leu Ala Thr
        195                 200                 205

Ile Lys Gln Lys His Ser Ala Leu Tyr Asp Gln Ile Ile Asn Glu Leu
    210                 215                 220

Thr Ala Ser Gly Leu Asp Val Ser Leu Ala Ser His Leu Asp Gly Tyr
225                 230                 235                 240

His Lys Leu Leu Thr Gln Glu Gly Ile Thr Ala Tyr Asn Thr Leu Leu
                245                 250                 255

Gly Gly Ile Ser Gly Glu Ala Gly Ser Arg Lys Ile Gln Gly Ile Asn
```

```
            260             265             270
Glu Leu Ile Asn Ser His His Asn Gln His Cys His Lys Ser Glu Arg
            275             280             285
Ile Ala Lys Leu Arg Pro Leu His Lys Gln Ile Leu Ser Asp Gly Met
            290             295             300
Gly Val Ser Phe Leu Pro Ser Lys Phe Ala Asp Ser Glu Met Cys
305             310             315             320
Gln Ala Val Asn Glu Phe Tyr Arg His Tyr Ala Asp Val Phe Ala Lys
            325             330             335
Val Gln Ser Leu Phe Asp Gly Phe Asp Asp His Gln Lys Asp Gly Ile
            340             345             350
Tyr Val Glu His Lys Asn Leu Asn Glu Leu Ser Lys Gln Ala Phe Gly
            355             360             365
Asp Phe Ala Leu Leu Gly Arg Val Leu Asp Gly Tyr Tyr Val Asp Val
            370             375             380
Val Asn Pro Glu Phe Asn Glu Arg Phe Ala Lys Ala Lys Thr Asp Asn
385             390             395             400
Ala Lys Ala Lys Leu Thr Lys Glu Lys Asp Lys Phe Ile Lys Gly Val
            405             410             415
His Ser Leu Ala Ser Leu Glu Gln Ala Ile Glu His Tyr Thr Ala Arg
            420             425             430
His Asp Asp Glu Ser Val Gln Ala Gly Lys Leu Gly Gln Tyr Phe Lys
            435             440             445
His Gly Leu Ala Gly Val Asp Asn Pro Ile Gln Lys Ile His Asn Asn
            450             455             460
His Ser Thr Ile Lys Gly Phe Leu Glu Arg Glu Arg Pro Ala Gly Glu
465             470             475             480
Arg Ala Leu Pro Lys Ile Lys Ser Gly Lys Asn Pro Glu Met Thr Gln
            485             490             495
Leu Arg Gln Leu Lys Glu Leu Leu Asp Asn Ala Leu Asn Val Ala His
            500             505             510
Phe Ala Lys Leu Leu Thr Thr Lys Thr Thr Leu Asp Asn Gln Asp Gly
            515             520             525
Asn Phe Tyr Gly Glu Phe Gly Ala Leu Tyr Asp Glu Leu Ala Lys Ile
            530             535             540
Pro Thr Leu Tyr Asn Lys Val Arg Asp Tyr Leu Ser Gln Lys Pro Phe
545             550             555             560
Ser Thr Glu Lys Tyr Lys Leu Asn Phe Gly Asn Pro Thr Leu Leu Asn
            565             570             575
Gly Trp Asp Leu Asn Lys Glu Lys Asp Asn Phe Gly Ile Ile Leu Gln
            580             585             590
Lys Asp Gly Cys Tyr Tyr Leu Ala Leu Leu Asp Lys Ala His Lys Lys
            595             600             605
Val Phe Asp Asn Ala Pro Asn Thr Gly Lys Asn Val Tyr Gln Lys Met
            610             615             620
Ile Tyr Lys Leu Leu Pro Gly Pro Asn Lys Met Leu Pro Lys Val Phe
625             630             635             640
Phe Ala Lys Ser Asn Leu Asp Tyr Tyr Asn Pro Ser Ala Glu Leu Leu
            645             650             655
Asp Lys Tyr Ala Gln Gly Thr His Lys Lys Gly Asn Asn Phe Asn Leu
            660             665             670
Lys Asp Cys His Ala Leu Ile Asp Phe Phe Lys Ala Gly Ile Asn Lys
            675             680             685
```

-continued

His Pro Glu Trp Gln His Phe Gly Phe Lys Phe Ser Pro Thr Ser Ser
690                     695                 700

Tyr Gln Asp Leu Ser Asp Phe Tyr Arg Glu Val Glu Pro Gln Gly Tyr
705                 710                  715                 720

Gln Val Lys Phe Val Asp Ile Asn Ala Asp Tyr Ile Asn Glu Leu Val
            725                 730                 735

Glu Gln Gly Gln Leu Tyr Leu Phe Gln Ile Tyr Asn Lys Asp Phe Ser
        740                 745                 750

Pro Lys Ala His Gly Lys Pro Asn Leu His Thr Leu Tyr Phe Lys Ala
    755                 760                 765

Leu Phe Ser Lys Asp Asn Leu Ala Asn Pro Ile Tyr Lys Leu Asn Gly
770                 775                 780

Glu Ala Gln Ile Phe Tyr Arg Lys Ala Ser Leu Asp Met Asn Glu Thr
785                 790                 795                 800

Thr Ile His Arg Ala Gly Glu Val Leu Glu Asn Lys Asn Pro Asp Asn
            805                 810                 815

Pro Lys Lys Arg Gln Phe Val Tyr Asp Ile Ile Lys Asp Lys Arg Tyr
        820                 825                 830

Thr Gln Asp Lys Phe Met Leu His Val Pro Ile Thr Met Asn Phe Gly
    835                 840                 845

Val Gln Gly Met Thr Ile Lys Glu Phe Asn Lys Lys Val Asn Gln Ser
850                 855                 860

Ile Gln Gln Tyr Asp Glu Val Asn Val Ile Gly Ile Asp Arg Gly Glu
865                 870                 875                 880

Arg His Leu Leu Tyr Leu Thr Val Ile Asn Ser Lys Gly Glu Ile Leu
            885                 890                 895

Glu Gln Arg Ser Leu Asn Asp Ile Thr Thr Ala Ser Ala Asn Gly Thr
        900                 905                 910

Gln Met Thr Thr Pro Tyr His Lys Ile Leu Asp Lys Arg Glu Ile Glu
    915                 920                 925

Arg Leu Asn Ala Arg Val Gly Trp Gly Glu Ile Glu Thr Ile Lys Glu
930                 935                 940

Leu Lys Ser Gly Tyr Leu Ser His Val Val His Gln Ile Ser Gln Leu
945                 950                 955                 960

Met Leu Lys Tyr Asn Ala Ile Val Val Leu Glu Asp Leu Asn Phe Gly
            965                 970                 975

Phe Lys Arg Gly Arg Phe Lys Val Glu Lys Gln Ile Tyr Gln Asn Phe
        980                 985                 990

Glu Asn Ala Leu Ile Lys Lys Leu Asn His Leu Val Leu Lys Asp Glu
    995                 1000                1005

Ala Asp Asp Glu Ile Gly Ser Tyr Lys Asn Ala Leu Gln Leu Thr
1010                1015                1020

Asn Asn Phe Thr Asp Leu Lys Ser Ile Gly Lys Gln Thr Gly Phe
1025                1030                1035

Leu Phe Tyr Val Pro Ala Trp Asn Thr Ser Lys Ile Asp Pro Glu
1040                1045                1050

Thr Gly Phe Val Asp Leu Leu Lys Pro Arg Tyr Glu Asn Ile Ala
1055                1060                1065

Gln Ser Gln Ala Phe Phe Gly Lys Phe Asp Lys Ile Cys Tyr Asn
1070                1075                1080

Ala Asp Lys Asp Tyr Phe Glu Phe His Ile Asp Tyr Ala Lys Phe
1085                1090                1095

-continued

```
Thr Asp Lys Ala Lys Asn Ser Arg Gln Ile Trp Lys Ile Cys Ser
    1100                1105                1110

His Gly Asp Lys Arg Tyr Val Tyr Asp Lys Thr Ala Asn Gln Asn
    1115                1120                1125

Lys Gly Ala Thr Lys Gly Ile Asn Val Asn Asp Glu Leu Lys Ser
    1130                1135                1140

Leu Phe Ala Arg His His Ile Asn Asp Lys Gln Pro Asn Leu Val
    1145                1150                1155

Met Asp Ile Cys Gln Asn Asn Asp Lys Glu Phe His Lys Ser Leu
    1160                1165                1170

Ile Tyr Leu Leu Lys Thr Leu Leu Ala Leu Arg Tyr Ser Asn Ala
    1175                1180                1185

Ser Ser Asp Glu Asp Phe Ile Leu Ser Pro Val Ala Asn Asp Glu
    1190                1195                1200

Gly Met Phe Phe Asn Ser Ala Leu Ala Asp Asp Thr Gln Pro Gln
    1205                1210                1215

Asn Ala Asp Ala Asn Gly Ala Tyr His Ile Ala Leu Lys Gly Leu
    1220                1225                1230

Trp Val Leu Glu Gln Ile Lys Asn Ser Asp Asp Leu Asn Lys Val
    1235                1240                1245

Lys Leu Ala Ile Asp Asn Gln Thr Trp Leu Asn Phe Ala Gln Asn
    1250                1255                1260

Arg
```

<210> SEQ ID NO 10
<211> LENGTH: 1230
<212> TYPE: PRT
<213> ORGANISM: Unknown
<220> FEATURE:
<221> NAME/KEY: source
<223> OTHER INFORMATION: /note="Description of Unknown: Lachnospiraceae bacterium COE1 sequence"

<400> SEQUENCE: 10

```
Met His Glu Asn Asn Gly Lys Ile Ala Asp Asn Phe Ile Gly Ile Tyr
1               5                   10                  15

Pro Val Ser Lys Thr Leu Arg Phe Glu Leu Lys Pro Val Gly Lys Thr
                20                  25                  30

Gln Glu Tyr Ile Glu Lys His Gly Ile Leu Asp Glu Asp Leu Lys Arg
            35                  40                  45

Ala Gly Asp Tyr Lys Ser Val Lys Lys Ile Ile Asp Ala Tyr His Lys
        50                  55                  60

Tyr Phe Ile Asp Glu Ala Leu Asn Gly Ile Gln Leu Asp Gly Leu Lys
65                  70                  75                  80

Asn Tyr Tyr Glu Leu Tyr Glu Lys Lys Arg Asp Asn Glu Glu Lys
                85                  90                  95

Glu Phe Gln Lys Ile Gln Met Ser Leu Arg Lys Gln Ile Val Lys Arg
            100                 105                 110

Phe Ser Glu His Pro Gln Tyr Lys Tyr Leu Phe Lys Lys Glu Leu Ile
        115                 120                 125

Lys Asn Val Leu Pro Glu Phe Thr Lys Asp Asn Ala Glu Glu Gln Thr
    130                 135                 140

Leu Val Lys Ser Phe Gln Glu Phe Thr Thr Tyr Phe Glu Gly Phe His
145                 150                 155                 160

Gln Asn Arg Lys Asn Met Tyr Ser Asp Glu Glu Lys Ser Thr Ala Ile
                165                 170                 175
```

-continued

```
Ala Tyr Arg Val Val His Gln Asn Leu Pro Lys Tyr Ile Asp Asn Met
            180                 185                 190

Arg Ile Phe Ser Met Ile Leu Asn Thr Asp Ile Arg Ser Asp Leu Thr
            195                 200                 205

Glu Leu Phe Asn Asn Leu Lys Thr Lys Met Asp Ile Thr Ile Val Glu
210                 215                 220

Glu Tyr Phe Ala Ile Asp Gly Phe Asn Lys Val Val Asn Gln Lys Gly
225                 230                 235                 240

Ile Asp Val Tyr Asn Thr Ile Leu Gly Ala Phe Ser Thr Asp Asp Asn
                245                 250                 255

Thr Lys Ile Lys Gly Leu Asn Glu Tyr Ile Asn Leu Tyr Asn Gln Lys
                260                 265                 270

Asn Lys Ala Lys Leu Pro Lys Leu Lys Pro Leu Phe Lys Gln Ile Leu
            275                 280                 285

Ser Asp Arg Asp Lys Ile Ser Phe Ile Pro Glu Gln Phe Asp Ser Asp
            290                 295                 300

Thr Glu Val Leu Glu Ala Val Asp Met Phe Tyr Asn Arg Leu Leu Gln
305                 310                 315                 320

Phe Val Ile Glu Asn Glu Gly Gln Ile Thr Ile Ser Lys Leu Leu Thr
                325                 330                 335

Asn Phe Ser Ala Tyr Asp Leu Asn Lys Ile Tyr Val Lys Asn Asp Thr
                340                 345                 350

Thr Ile Ser Ala Ile Ser Asn Asp Leu Phe Asp Asp Trp Ser Tyr Ile
            355                 360                 365

Ser Lys Ala Val Arg Glu Asn Tyr Asp Ser Glu Asn Val Asp Lys Asn
            370                 375                 380

Lys Arg Ala Ala Ala Tyr Glu Glu Lys Glu Lys Ala Leu Ser Lys
385                 390                 395                 400

Ile Lys Met Tyr Ser Ile Glu Glu Leu Asn Phe Phe Val Lys Lys Tyr
                405                 410                 415

Ser Cys Asn Glu Cys His Ile Glu Gly Tyr Phe Glu Arg Arg Ile Leu
            420                 425                 430

Glu Ile Leu Asp Lys Met Arg Tyr Ala Tyr Glu Ser Cys Lys Ile Leu
            435                 440                 445

His Asp Lys Gly Leu Ile Asn Asn Ile Ser Leu Cys Gln Asp Arg Gln
450                 455                 460

Ala Ile Ser Glu Leu Lys Asp Phe Leu Asp Ser Ile Lys Glu Val Gln
465                 470                 475                 480

Trp Leu Leu Lys Pro Leu Met Ile Gly Gln Glu Ala Asp Lys Glu
                485                 490                 495

Glu Ala Phe Tyr Thr Glu Leu Leu Arg Ile Trp Glu Glu Leu Glu Pro
            500                 505                 510

Ile Thr Leu Leu Tyr Asn Lys Val Arg Asn Tyr Val Thr Lys Lys Pro
            515                 520                 525

Tyr Thr Leu Glu Lys Val Lys Leu Asn Phe Tyr Lys Ser Thr Leu Leu
530                 535                 540

Asp Gly Trp Asp Lys Asn Lys Glu Lys Asp Asn Leu Gly Ile Ile Leu
545                 550                 555                 560

Leu Lys Asp Gly Gln Tyr Tyr Leu Gly Ile Met Asn Arg Arg Asn Asn
                565                 570                 575

Lys Ile Ala Asp Asp Ala Pro Leu Ala Lys Thr Asp Asn Val Tyr Arg
            580                 585                 590
```

-continued

Lys Met Glu Tyr Lys Leu Leu Thr Lys Val Ser Ala Asn Leu Pro Arg
            595                 600                 605

Ile Phe Leu Lys Asp Lys Tyr Asn Pro Ser Glu Glu Met Leu Glu Lys
            610                 615                 620

Tyr Glu Lys Gly Thr His Leu Lys Gly Glu Asn Phe Cys Ile Asp Asp
625                 630                 635                 640

Cys Arg Glu Leu Ile Asp Phe Phe Lys Gly Ile Lys Gln Tyr Glu
                    645                 650                 655

Asp Trp Gly Gln Phe Asp Phe Lys Ser Asp Thr Glu Ser Tyr Asp
            660                 665                 670

Asp Ile Ser Ala Phe Tyr Lys Glu Val Glu His Gln Gly Tyr Lys Ile
            675                 680                 685

Thr Phe Arg Asp Ile Asp Glu Thr Tyr Ile Asp Ser Leu Val Asn Glu
            690                 695                 700

Gly Lys Leu Tyr Leu Phe Gln Ile Tyr Asn Lys Asp Phe Ser Pro Tyr
705                 710                 715                 720

Ser Lys Gly Thr Lys Asn Leu His Thr Leu Tyr Trp Glu Met Leu Phe
                    725                 730                 735

Ser Gln Gln Asn Leu Gln Asn Ile Val Tyr Lys Leu Asn Gly Asn Ala
                    740                 745                 750

Glu Ile Phe Tyr Arg Lys Ala Ser Ile Asn Gln Lys Asp Val Val Val
            755                 760                 765

His Lys Ala Asp Leu Pro Ile Lys Asn Lys Asp Pro Gln Asn Ser Lys
            770                 775                 780

Lys Glu Ser Met Phe Asp Tyr Asp Ile Ile Lys Asp Lys Arg Phe Thr
785                 790                 795                 800

Cys Asp Lys Tyr Gln Phe His Val Pro Ile Thr Met Asn Phe Lys Ala
                    805                 810                 815

Leu Gly Glu Asn His Phe Asn Arg Lys Val Asn Arg Leu Ile His Asp
            820                 825                 830

Ala Glu Asn Met His Ile Ile Gly Ile Asp Arg Gly Glu Arg Asn Leu
            835                 840                 845

Ile Tyr Leu Cys Met Ile Asp Met Lys Gly Asn Ile Val Lys Gln Ile
850                 855                 860

Ser Leu Asn Glu Ile Ile Ser Tyr Asp Lys Asn Lys Leu Glu His Lys
865                 870                 875                 880

Arg Asn Tyr His Gln Leu Leu Lys Thr Arg Glu Asp Glu Asn Lys Ser
                    885                 890                 895

Ala Arg Gln Ser Trp Gln Thr Ile His Thr Ile Lys Glu Leu Lys Glu
            900                 905                 910

Gly Tyr Leu Ser Gln Val Ile His Val Ile Thr Asp Leu Met Val Glu
            915                 920                 925

Tyr Asn Ala Ile Val Val Leu Glu Asp Leu Asn Phe Gly Phe Lys Gln
            930                 935                 940

Gly Arg Gln Lys Phe Glu Arg Gln Val Tyr Gln Lys Phe Glu Lys Met
945                 950                 955                 960

Leu Ile Asp Lys Leu Asn Tyr Leu Val Asp Lys Ser Lys Gly Met Asp
                    965                 970                 975

Glu Asp Gly Gly Leu Leu His Ala Tyr Gln Leu Thr Asp Glu Phe Lys
            980                 985                 990

Ser Phe Lys Gln Leu Gly Lys Gln Ser Gly Phe Leu Tyr Tyr Ile Pro
            995                 1000                1005

Ala Trp Asn Thr Ser Lys Leu Asp Pro Thr Thr Gly Phe Val Asn

```
                    1010                1015                1020

Leu Phe Tyr Thr Lys Tyr Glu Ser Val Glu Lys Ser Lys Glu Phe
            1025                1030                1035

Ile Asn Asn Phe Thr Ser Ile Leu Tyr Asn Gln Glu Arg Glu Tyr
    1040                1045                1050

Phe Glu Phe Leu Phe Asp Tyr Ser Ala Phe Thr Ser Lys Ala Glu
    1055                1060                1065

Gly Ser Arg Leu Lys Trp Thr Val Cys Ser Lys Gly Glu Arg Val
    1070                1075                1080

Glu Thr Tyr Arg Asn Pro Lys Lys Asn Glu Trp Asp Thr Gln
    1085                1090                1095

Lys Ile Asp Leu Thr Phe Glu Leu Lys Lys Leu Phe Asn Asp Tyr
    1100                1105                1110

Ser Ile Ser Leu Leu Asp Gly Asp Leu Arg Glu Gln Met Gly Lys
    1115                1120                1125

Ile Asp Lys Ala Asp Phe Tyr Lys Lys Phe Met Lys Leu Phe Ala
    1130                1135                1140

Leu Ile Val Gln Met Arg Asn Ser Asp Glu Arg Glu Asp Lys Leu
    1145                1150                1155

Ile Ser Pro Val Leu Asn Lys Tyr Gly Ala Phe Phe Glu Thr Gly
    1160                1165                1170

Lys Asn Glu Arg Met Pro Leu Asp Ala Asp Ala Asn Gly Ala Tyr
    1175                1180                1185

Asn Ile Ala Arg Lys Gly Leu Trp Ile Ile Glu Lys Ile Lys Asn
    1190                1195                1200

Thr Asp Val Glu Gln Leu Asp Lys Val Lys Leu Thr Ile Ser Asn
    1205                1210                1215

Lys Glu Trp Leu Gln Tyr Ala Gln Glu His Ile Leu
    1220                1225                1230

<210> SEQ ID NO 11
<211> LENGTH: 1261
<212> TYPE: PRT
<213> ORGANISM: Eubacterium coprostanoligenes

<400> SEQUENCE: 11

Met Asp Phe Phe Lys Asn Asp Met Tyr Phe Leu Cys Ile Asn Gly Ile
1               5                   10                  15

Ile Val Ile Ser Lys Leu Phe Ala Tyr Leu Phe Leu Met Tyr Lys Arg
            20                  25                  30

Gly Val Val Met Ile Lys Asp Asn Phe Val Asn Val Tyr Ser Leu Ser
        35                  40                  45

Lys Thr Ile Arg Met Ala Leu Ile Pro Trp Gly Lys Thr Glu Asp Asn
    50                  55                  60

Phe Tyr Lys Lys Phe Leu Leu Glu Glu Asp Glu Arg Ala Lys Asn
65                  70                  75                  80

Tyr Ile Lys Val Lys Gly Tyr Met Asp Glu Tyr His Lys Asn Phe Ile
                85                  90                  95

Glu Ser Ala Leu Asn Ser Val Val Leu Asn Gly Val Asp Glu Tyr Cys
            100                 105                 110

Glu Leu Tyr Phe Lys Gln Asn Lys Ser Asp Ser Glu Val Lys Lys Ile
        115                 120                 125

Glu Ser Leu Glu Ala Ser Met Arg Lys Gln Ile Ser Lys Ala Met Lys
    130                 135                 140
```

```
Glu Tyr Thr Val Asp Gly Val Lys Ile Tyr Pro Leu Leu Ser Lys Lys
145                 150                 155                 160
Glu Phe Ile Arg Glu Leu Leu Pro Glu Phe Leu Thr Gln Asp Glu Glu
                165                 170                 175
Ile Glu Thr Leu Glu Gln Phe Asn Asp Phe Ser Thr Tyr Phe Gln Gly
            180                 185                 190
Phe Trp Glu Asn Arg Lys Asn Ile Tyr Thr Asp Glu Lys Ser Thr
        195                 200                 205
Gly Val Pro Tyr Arg Cys Ile Asn Asp Asn Leu Pro Lys Phe Leu Asp
        210                 215                 220
Asn Val Lys Ser Phe Glu Lys Val Ile Ala Leu Pro Gln Lys Ala
225                 230                 235                 240
Val Asp Glu Leu Asn Ala Asn Phe Asn Gly Val Tyr Asn Val Asp Val
                245                 250                 255
Gln Asp Val Phe Ser Val Asp Tyr Phe Asn Phe Val Leu Ser Gln Ser
                260                 265                 270
Gly Ile Glu Lys Tyr Asn Asn Ile Ile Gly Gly Tyr Ser Asn Ser Asp
                275                 280                 285
Ala Ser Lys Val Gln Gly Leu Asn Glu Lys Ile Asn Leu Tyr Asn Gln
290                 295                 300
Gln Ile Ala Lys Ser Asp Lys Ser Lys Lys Leu Pro Leu Leu Lys Pro
305                 310                 315                 320
Leu Tyr Lys Gln Ile Leu Ser Asp Arg Ser Ser Leu Ser Phe Ile Pro
                325                 330                 335
Glu Lys Phe Lys Asp Asp Asn Glu Val Leu Asn Ser Ile Asn Val Leu
                340                 345                 350
Tyr Asp Asn Ile Ala Glu Ser Leu Glu Lys Ala Asn Asp Leu Met Ser
                355                 360                 365
Asp Ile Ala Asn Tyr Asn Thr Asp Asn Ile Phe Ile Ser Ser Gly Val
                370                 375                 380
Ala Val Thr Asp Ile Ser Lys Lys Val Phe Gly Asp Trp Ser Leu Ile
385                 390                 395                 400
Arg Asn Asn Trp Asn Asp Glu Tyr Glu Ser Thr His Lys Lys Gly Lys
                405                 410                 415
Asn Glu Glu Lys Phe Tyr Glu Lys Glu Asp Lys Glu Phe Lys Lys Ile
                420                 425                 430
Lys Ser Phe Ser Val Ser Glu Leu Gln Arg Leu Ala Asn Ser Asp Leu
                435                 440                 445
Ser Ile Val Asp Tyr Leu Val Asp Glu Ser Ala Ser Leu Tyr Ala Asp
                450                 455                 460
Ile Lys Thr Ala Tyr Asn Asn Ala Lys Asp Leu Leu Ser Asn Glu Tyr
465                 470                 475                 480
Ser His Ser Lys Arg Leu Ser Lys Asn Asp Ala Ile Glu Leu Ile
                485                 490                 495
Lys Ser Phe Leu Asp Ser Ile Lys Asn Tyr Glu Ala Phe Leu Lys Pro
                500                 505                 510
Leu Cys Gly Thr Gly Lys Glu Glu Ser Lys Asp Asn Ala Phe Tyr Gly
                515                 520                 525
Ala Phe Leu Glu Cys Phe Glu Glu Ile Arg Gln Val Asp Ala Val Tyr
                530                 535                 540
Asn Lys Val Arg Asn His Ile Thr Gln Lys Pro Tyr Ser Asn Asp Lys
545                 550                 555                 560
Ile Lys Leu Asn Phe Gln Asn Pro Gln Phe Leu Ala Gly Trp Asp Lys
```

-continued

```
                565                 570                 575
Asn Lys Glu Arg Ala Tyr Arg Ser Val Leu Leu Arg Asn Gly Glu Lys
                580                 585                 590

Tyr Tyr Leu Ala Ile Met Glu Lys Gly Lys Ser Lys Leu Phe Glu Asp
                595                 600                 605

Phe Pro Glu Asp Glu Ser Ser Pro Phe Glu Lys Ile Asp Tyr Lys Leu
610                 615                 620

Leu Pro Glu Pro Ser Lys Met Leu Pro Lys Val Phe Phe Ala Thr Ser
625                 630                 635                 640

Asn Lys Asp Leu Phe Asn Pro Ser Asp Glu Ile Leu Asn Ile Arg Ala
                645                 650                 655

Thr Gly Ser Phe Lys Lys Gly Asp Ser Phe Asn Leu Asp Asp Cys His
                660                 665                 670

Lys Phe Ile Asp Phe Tyr Lys Ala Ser Ile Glu Asn His Pro Asp Trp
                675                 680                 685

Ser Lys Phe Asp Phe Asp Phe Ser Glu Thr Asn Asp Tyr Glu Asp Ile
                690                 695                 700

Ser Lys Phe Phe Lys Glu Val Ser Asp Gln Gly Tyr Ser Ile Gly Tyr
705                 710                 715                 720

Arg Lys Ile Ser Glu Ser Tyr Leu Glu Glu Met Val Asp Asn Gly Ser
                725                 730                 735

Leu Tyr Met Phe Gln Leu Tyr Asn Lys Asp Phe Ser Glu Asn Arg Lys
                740                 745                 750

Ser Lys Gly Thr Pro Asn Leu His Thr Leu Tyr Phe Lys Met Leu Phe
                755                 760                 765

Asp Glu Arg Asn Leu Glu Asp Val Val Tyr Lys Leu Ser Gly Gly Ala
                770                 775                 780

Glu Met Phe Tyr Arg Lys Pro Ser Ile Asp Lys Asn Glu Met Ile Val
785                 790                 795                 800

His Pro Lys Asn Gln Pro Ile Asp Asn Lys Asn Pro Asn Asn Val Lys
                805                 810                 815

Lys Thr Ser Thr Phe Glu Tyr Asp Ile Val Lys Asp Met Arg Tyr Thr
                820                 825                 830

Lys Pro Gln Phe Gln Leu His Leu Pro Ile Val Leu Asn Phe Lys Ala
                835                 840                 845

Asn Ser Lys Gly Tyr Ile Asn Asp Asp Val Arg Asn Val Leu Lys Asn
                850                 855                 860

Ser Glu Asp Thr Tyr Val Ile Gly Ile Asp Arg Gly Glu Arg Asn Leu
865                 870                 875                 880

Val Tyr Ala Cys Val Val Asp Gly Asn Gly Lys Leu Val Glu Gln Val
                885                 890                 895

Pro Leu Asn Val Ile Glu Ala Asp Asn Gly Tyr Lys Thr Asp Tyr His
                900                 905                 910

Lys Leu Leu Asn Asp Arg Glu Glu Lys Arg Asn Glu Ala Arg Lys Ser
                915                 920                 925

Trp Lys Thr Ile Gly Asn Ile Lys Glu Leu Lys Glu Gly Tyr Ile Ser
                930                 935                 940

Gln Val Val His Lys Ile Cys Gln Leu Val Val Lys Tyr Asp Ala Val
945                 950                 955                 960

Ile Ala Met Glu Asp Leu Asn Ser Gly Phe Val Asn Ser Arg Lys Lys
                965                 970                 975

Val Glu Lys Gln Val Tyr Gln Lys Phe Glu Arg Met Leu Thr Gln Lys
                980                 985                 990
```

```
Leu Asn Tyr Leu Val Asp Lys Lys  Leu Asp Pro Asn Glu  Met Gly Gly
        995                 1000                 1005

Leu Leu Asn Ala Tyr Gln Leu  Thr Asn Glu Ala Thr  Lys Val Arg
        1010                1015                1020

Asn Gly Arg Gln Asp Gly Ile  Ile Phe Tyr Ile Pro  Ala Trp Leu
        1025                1030                1035

Thr Ser Lys Ile Asp Pro Thr  Thr Gly Phe Val Asn  Leu Leu Lys
        1040                1045                1050

Pro Lys Tyr Asn Ser Val Ser  Ala Ser Lys Glu Phe  Phe Ser Lys
        1055                1060                1065

Phe Asp Glu Ile Arg Tyr Asn  Glu Lys Glu Asn Tyr  Phe Glu Phe
        1070                1075                1080

Ser Phe Asn Tyr Asp Asn Phe  Pro Lys Cys Asn Ala  Asp Phe Lys
        1085                1090                1095

Arg Glu Trp Thr Val Cys Thr  Tyr Gly Asp Arg Ile  Arg Thr Phe
        1100                1105                1110

Arg Asp Pro Glu Asn Asn Asn  Lys Phe Asn Ser Glu  Val Val Val
        1115                1120                1125

Leu Asn Asp Glu Phe Lys Asn  Leu Phe Val Glu Phe  Asp Ile Asp
        1130                1135                1140

Tyr Thr Asp Asn Leu Lys Glu  Gln Ile Leu Ala Met  Asp Glu Lys
        1145                1150                1155

Ser Phe Tyr Lys Lys Leu Met  Gly Leu Leu Ser Leu  Thr Leu Gln
        1160                1165                1170

Met Arg Asn Ser Ile Ser Lys  Asn Val Asp Val Asp  Tyr Leu Ile
        1175                1180                1185

Ser Pro Val Lys Asn Ser Asn  Gly Glu Phe Tyr Asp  Ser Arg Asn
        1190                1195                1200

Tyr Asp Ile Thr Ser Ser Leu  Pro Cys Asp Ala Asp  Ser Asn Gly
        1205                1210                1215

Ala Tyr Asn Ile Ala Arg Lys  Gly Leu Trp Ala Ile  Asn Gln Ile
        1220                1225                1230

Lys Gln Ala Asp Asp Glu Thr  Lys Ala Asn Ile Ser  Ile Lys Asn
        1235                1240                1245

Ser Glu Trp Leu Gln Tyr Ala  Gln Asn Cys Asp Glu  Val
        1250                1255                1260

<210> SEQ ID NO 12
<211> LENGTH: 1064
<212> TYPE: PRT
<213> ORGANISM: Smithella sp.

<400> SEQUENCE: 12

Met Glu Lys Tyr Lys Ile Thr Lys Thr Ile Arg Phe Lys Leu Leu Pro
1               5                   10                  15

Asp Lys Ile Gln Asp Ile Ser Arg Gln Val Ala Val Leu Gln Asn Ser
            20                  25                  30

Thr Asn Ala Glu Lys Lys Asn Asn Leu Leu Arg Leu Val Gln Arg Gly
        35                  40                  45

Gln Glu Leu Pro Lys Leu Leu Asn Glu Tyr Ile Arg Tyr Ser Asp Asn
    50                  55                  60

His Lys Leu Lys Ser Asn Val Thr Val His Phe Arg Trp Leu Arg Leu
65                  70                  75                  80

Phe Thr Lys Asp Leu Phe Tyr Asn Trp Lys Lys Asp Asn Thr Glu Lys
```

```
                    85                  90                  95
Lys Ile Lys Ile Ser Asp Val Val Tyr Leu Ser His Val Phe Glu Ala
                100                 105                 110

Phe Leu Lys Glu Trp Glu Ser Thr Ile Glu Arg Val Asn Ala Asp Cys
        115                 120                 125

Asn Lys Pro Glu Glu Ser Lys Thr Arg Asp Ala Glu Ile Ala Leu Ser
    130                 135                 140

Ile Arg Lys Leu Gly Ile Lys His Gln Leu Pro Phe Ile Lys Gly Phe
145                 150                 155                 160

Val Asp Asn Ser Asn Asp Lys Asn Ser Glu Asp Thr Lys Ser Lys Leu
                165                 170                 175

Thr Ala Leu Leu Ser Glu Phe Glu Ala Val Leu Lys Ile Cys Glu Gln
            180                 185                 190

Asn Tyr Leu Pro Ser Gln Ser Ser Gly Ile Ala Ile Ala Lys Ala Ser
        195                 200                 205

Phe Asn Tyr Tyr Thr Ile Asn Lys Lys Gln Lys Asp Phe Glu Ala Glu
    210                 215                 220

Ile Val Ala Leu Lys Lys Gln Leu His Ala Arg Tyr Gly Asn Lys Lys
225                 230                 235                 240

Tyr Asp Gln Leu Leu Arg Glu Leu Asn Leu Ile Pro Leu Lys Glu Leu
                245                 250                 255

Pro Leu Lys Glu Leu Pro Leu Ile Glu Phe Tyr Ser Glu Ile Lys Lys
            260                 265                 270

Arg Lys Ser Thr Lys Lys Ser Glu Phe Leu Glu Ala Val Ser Asn Gly
        275                 280                 285

Leu Val Phe Asp Asp Leu Lys Ser Lys Phe Pro Leu Phe Gln Thr Glu
    290                 295                 300

Ser Asn Lys Tyr Asp Glu Tyr Leu Lys Leu Ser Asn Lys Ile Thr Gln
305                 310                 315                 320

Lys Ser Thr Ala Lys Ser Leu Leu Ser Lys Asp Ser Pro Glu Ala Gln
                325                 330                 335

Lys Leu Gln Thr Glu Ile Thr Lys Leu Lys Lys Asn Arg Gly Glu Tyr
            340                 345                 350

Phe Lys Lys Ala Phe Gly Lys Tyr Val Gln Leu Cys Glu Leu Tyr Lys
        355                 360                 365

Glu Ile Ala Gly Lys Arg Gly Lys Leu Lys Gly Gln Ile Lys Gly Ile
    370                 375                 380

Glu Asn Glu Arg Ile Asp Ser Gln Arg Leu Gln Tyr Trp Ala Leu Val
385                 390                 395                 400

Leu Glu Asp Asn Leu Lys His Ser Leu Ile Leu Ile Pro Lys Glu Lys
                405                 410                 415

Thr Asn Glu Leu Tyr Arg Lys Val Trp Gly Ala Lys Asp Gly Ala
            420                 425                 430

Ser Ser Ser Ser Ser Ser Thr Leu Tyr Tyr Phe Glu Ser Met Thr Tyr
        435                 440                 445

Arg Ala Leu Arg Lys Leu Cys Phe Gly Ile Asn Gly Asn Thr Phe Leu
    450                 455                 460

Pro Glu Ile Gln Lys Glu Leu Pro Gln Tyr Asn Gln Lys Glu Phe Gly
465                 470                 475                 480

Glu Phe Cys Phe His Lys Ser Asn Asp Asp Lys Glu Ile Asp Glu Pro
                485                 490                 495

Lys Leu Ile Ser Phe Tyr Gln Ser Val Leu Lys Thr Asp Phe Val Lys
            500                 505                 510
```

-continued

```
Asn Thr Leu Ala Leu Pro Gln Ser Val Phe Asn Glu Val Ala Ile Gln
            515                 520                 525
Ser Phe Glu Thr Arg Gln Asp Phe Gln Ile Ala Leu Glu Lys Cys Cys
            530                 535                 540
Tyr Ala Lys Lys Gln Ile Ile Ser Glu Ser Leu Lys Lys Glu Ile Leu
545                 550                 555                 560
Glu Asn Tyr Asn Thr Gln Ile Phe Lys Ile Thr Ser Leu Asp Leu Gln
                565                 570                 575
Arg Ser Glu Gln Lys Asn Leu Lys Gly His Thr Arg Ile Trp Asn Arg
            580                 585                 590
Phe Trp Thr Lys Gln Asn Glu Glu Ile Asn Tyr Asn Leu Arg Leu Asn
            595                 600                 605
Pro Glu Ile Ala Ile Val Trp Arg Lys Ala Lys Lys Thr Arg Ile Glu
            610                 615                 620
Lys Tyr Gly Glu Arg Ser Val Leu Tyr Glu Pro Glu Lys Arg Asn Arg
625                 630                 635                 640
Tyr Leu His Glu Gln Tyr Thr Leu Cys Thr Thr Val Thr Asp Asn Ala
                645                 650                 655
Leu Asn Asn Glu Ile Thr Phe Ala Phe Glu Asp Thr Lys Lys Lys Gly
            660                 665                 670
Thr Glu Ile Val Lys Tyr Asn Glu Lys Ile Asn Gln Thr Leu Lys Lys
            675                 680                 685
Glu Phe Asn Lys Asn Gln Leu Trp Phe Tyr Gly Ile Asp Ala Gly Glu
            690                 695                 700
Ile Glu Leu Ala Thr Leu Ala Leu Met Asn Lys Asp Lys Glu Pro Gln
705                 710                 715                 720
Leu Phe Thr Val Tyr Glu Leu Lys Lys Leu Asp Phe Phe Lys His Gly
                725                 730                 735
Tyr Ile Tyr Asn Lys Glu Arg Glu Leu Val Ile Arg Glu Lys Pro Tyr
            740                 745                 750
Lys Ala Ile Gln Asn Leu Ser Tyr Phe Leu Asn Glu Glu Leu Tyr Glu
            755                 760                 765
Lys Thr Phe Arg Asp Gly Lys Phe Asn Glu Thr Tyr Asn Glu Leu Phe
            770                 775                 780
Lys Glu Lys His Val Ser Ala Ile Asp Leu Thr Thr Ala Lys Val Ile
785                 790                 795                 800
Asn Gly Lys Ile Ile Leu Asn Gly Asp Met Ile Thr Phe Leu Asn Leu
                805                 810                 815
Arg Ile Leu His Ala Gln Arg Lys Ile Tyr Glu Glu Leu Ile Glu Asn
            820                 825                 830
Pro His Ala Glu Leu Lys Glu Lys Asp Tyr Lys Leu Tyr Phe Glu Ile
            835                 840                 845
Glu Gly Lys Asp Lys Asp Ile Tyr Ile Ser Arg Leu Asp Phe Glu Tyr
            850                 855                 860
Ile Lys Pro Tyr Gln Glu Ile Ser Asn Tyr Leu Phe Ala Tyr Phe Ala
865                 870                 875                 880
Ser Gln Gln Ile Asn Glu Ala Arg Glu Glu Gln Ile Asn Gln Thr
                885                 890                 895
Lys Arg Ala Leu Ala Gly Asn Met Ile Gly Val Ile Tyr Tyr Leu Tyr
            900                 905                 910
Gln Lys Tyr Arg Gly Ile Ile Ser Ile Glu Asp Leu Lys Gln Thr Lys
            915                 920                 925
```

```
Val Glu Ser Asp Arg Asn Lys Phe Glu Gly Asn Ile Glu Arg Pro Leu
    930                 935                 940

Glu Trp Ala Leu Tyr Arg Lys Phe Gln Gln Gly Tyr Val Pro Pro
945                 950                 955                 960

Ile Ser Glu Leu Ile Lys Leu Arg Glu Leu Glu Lys Phe Pro Leu Lys
                965                 970                 975

Asp Val Lys Gln Pro Lys Tyr Glu Asn Ile Gln Gln Phe Gly Ile Ile
                980                 985                 990

Lys Phe Val Ser Pro Glu Glu Thr Ser Thr Thr Cys Pro Lys Cys Leu
                995                1000                1005

Arg Arg Phe Lys Asp Tyr Asp Lys Asn Lys Gln Glu Gly Phe Cys
    1010                1015                1020

Lys Cys Gln Cys Gly Phe Asp Thr Arg Asn Asp Leu Lys Gly Phe
    1025                1030                1035

Glu Gly Leu Asn Asp Pro Asp Lys Val Ala Ala Phe Asn Ile Ala
    1040                1045                1050

Lys Arg Gly Phe Glu Asp Leu Gln Lys Tyr Lys
    1055                1060

<210> SEQ ID NO 13
<211> LENGTH: 1232
<212> TYPE: PRT
<213> ORGANISM: Sulfuricurvum sp.

<400> SEQUENCE: 13

Met Leu His Ala Phe Thr Asn Gln Tyr Gln Leu Ser Lys Thr Leu Arg
1               5                   10                  15

Phe Gly Ala Thr Leu Lys Glu Asp Glu Lys Lys Cys Lys Ser His Glu
                20                  25                  30

Glu Leu Lys Gly Phe Val Asp Ile Ser Tyr Glu Asn Met Lys Ser Ser
                35                  40                  45

Ala Thr Ile Ala Glu Ser Leu Asn Glu Asn Glu Leu Val Lys Lys Cys
            50                  55                  60

Glu Arg Cys Tyr Ser Glu Ile Val Lys Phe His Asn Ala Trp Glu Lys
65                  70                  75                  80

Ile Tyr Tyr Arg Thr Asp Gln Ile Ala Val Tyr Lys Asp Phe Tyr Arg
                85                  90                  95

Gln Leu Ser Arg Lys Ala Arg Phe Asp Ala Gly Lys Gln Asn Ser Gln
                100                 105                 110

Leu Ile Thr Leu Ala Ser Leu Cys Gly Met Tyr Gln Gly Ala Lys Leu
                115                 120                 125

Ser Arg Tyr Ile Thr Asn Tyr Trp Lys Asp Asn Ile Thr Arg Gln Lys
            130                 135                 140

Ser Phe Leu Lys Asp Phe Ser Gln Gln Leu His Gln Tyr Thr Arg Ala
145                 150                 155                 160

Leu Glu Lys Ser Asp Lys Ala His Thr Lys Pro Asn Leu Ile Asn Phe
                165                 170                 175

Asn Lys Thr Phe Met Val Leu Ala Asn Leu Val Asn Glu Ile Val Ile
                180                 185                 190

Pro Leu Ser Asn Gly Ala Ile Ser Phe Pro Asn Ile Ser Lys Leu Glu
                195                 200                 205

Asp Gly Glu Glu Ser His Leu Ile Glu Phe Ala Leu Asn Asp Tyr Ser
            210                 215                 220

Gln Leu Ser Glu Leu Ile Gly Glu Leu Lys Asp Ala Ile Ala Thr Asn
225                 230                 235                 240
```

```
Gly Gly Tyr Thr Pro Phe Ala Lys Val Thr Leu Asn His Tyr Thr Ala
            245                 250                 255
Glu Gln Lys Pro His Val Phe Lys Asn Asp Ile Asp Ala Lys Ile Arg
            260                 265                 270
Glu Leu Lys Leu Ile Gly Leu Val Glu Thr Leu Lys Gly Lys Ser Ser
            275                 280                 285
Glu Gln Ile Glu Glu Tyr Phe Ser Asn Leu Asp Lys Phe Ser Thr Tyr
            290                 295                 300
Asn Asp Arg Asn Gln Ser Val Ile Val Arg Thr Gln Cys Phe Lys Tyr
305                 310                 315                 320
Lys Pro Ile Pro Phe Leu Val Lys His Gln Leu Ala Lys Tyr Ile Ser
            325                 330                 335
Glu Pro Asn Gly Trp Asp Glu Asp Ala Val Ala Lys Val Leu Asp Ala
            340                 345                 350
Val Gly Ala Ile Arg Ser Pro Ala His Asp Tyr Ala Asn Asn Gln Glu
            355                 360                 365
Gly Phe Asp Leu Asn His Tyr Pro Ile Lys Val Ala Phe Asp Tyr Ala
            370                 375                 380
Trp Glu Gln Leu Ala Asn Ser Leu Tyr Thr Thr Val Thr Phe Pro Gln
385                 390                 395                 400
Glu Met Cys Glu Lys Tyr Leu Asn Ser Ile Tyr Gly Cys Glu Val Ser
            405                 410                 415
Lys Glu Pro Val Phe Lys Phe Tyr Ala Asp Leu Leu Tyr Ile Arg Lys
            420                 425                 430
Asn Leu Ala Val Leu Glu His Lys Asn Asn Leu Pro Ser Asn Gln Glu
            435                 440                 445
Glu Phe Ile Cys Lys Ile Asn Asn Thr Phe Glu Asn Ile Val Leu Pro
            450                 455                 460
Tyr Lys Ile Ser Gln Phe Glu Thr Tyr Lys Lys Asp Ile Leu Ala Trp
465                 470                 475                 480
Ile Asn Asp Gly His Asp His Lys Lys Tyr Thr Asp Ala Lys Gln Gln
            485                 490                 495
Leu Gly Phe Ile Arg Gly Gly Leu Lys Gly Arg Ile Lys Ala Glu Glu
            500                 505                 510
Val Ser Gln Lys Asp Lys Tyr Gly Lys Ile Lys Ser Tyr Tyr Glu Asn
            515                 520                 525
Pro Tyr Thr Lys Leu Thr Asn Glu Phe Lys Gln Ile Ser Ser Thr Tyr
            530                 535                 540
Gly Lys Thr Phe Ala Glu Leu Arg Asp Lys Phe Lys Glu Lys Asn Glu
545                 550                 555                 560
Ile Thr Lys Ile Thr His Phe Gly Ile Ile Glu Asp Lys Asn Arg
            565                 570                 575
Asp Arg Tyr Leu Leu Ala Ser Glu Leu Lys His Glu Gln Ile Asn His
            580                 585                 590
Val Ser Thr Ile Leu Asn Lys Leu Asp Lys Ser Ser Glu Phe Ile Thr
            595                 600                 605
Tyr Gln Val Lys Ser Leu Thr Ser Lys Thr Leu Ile Lys Leu Ile Lys
            610                 615                 620
Asn His Thr Thr Lys Lys Gly Ala Ile Ser Pro Tyr Ala Asp Phe His
625                 630                 635                 640
Thr Ser Lys Thr Gly Phe Asn Lys Asn Glu Ile Glu Lys Asn Trp Asp
            645                 650                 655
```

-continued

Asn Tyr Lys Arg Glu Gln Val Leu Val Glu Tyr Val Lys Asp Cys Leu
            660                 665                 670

Thr Asp Ser Thr Met Ala Lys Asn Gln Asn Trp Ala Glu Phe Gly Trp
        675                 680                 685

Asn Phe Glu Lys Cys Asn Ser Tyr Glu Asp Ile Glu His Glu Ile Asp
    690                 695                 700

Gln Lys Ser Tyr Leu Leu Gln Ser Asp Thr Ile Ser Lys Gln Ser Ile
705                 710                 715                 720

Ala Ser Leu Val Glu Gly Gly Cys Leu Leu Pro Ile Ile Asn Gln
                725                 730                 735

Asp Ile Thr Ser Lys Glu Arg Lys Asp Lys Asn Gln Phe Ser Lys Asp
            740                 745                 750

Trp Asn His Ile Phe Glu Gly Ser Lys Glu Phe Arg Leu His Pro Glu
        755                 760                 765

Phe Ala Val Ser Tyr Arg Thr Pro Ile Glu Gly Tyr Pro Val Gln Lys
    770                 775                 780

Arg Tyr Gly Arg Leu Gln Phe Val Cys Ala Phe Asn Ala His Ile Val
785                 790                 795                 800

Pro Gln Asn Gly Glu Phe Ile Asn Leu Lys Lys Gln Ile Glu Asn Phe
                805                 810                 815

Asn Asp Glu Asp Val Gln Lys Arg Asn Val Thr Glu Phe Asn Lys Lys
            820                 825                 830

Val Asn His Ala Leu Ser Asp Lys Glu Tyr Val Val Ile Gly Ile Asp
        835                 840                 845

Arg Gly Leu Lys Gln Leu Ala Thr Leu Cys Val Leu Asp Lys Arg Gly
    850                 855                 860

Lys Ile Leu Gly Asp Phe Glu Ile Tyr Lys Lys Glu Phe Val Arg Ala
865                 870                 875                 880

Glu Lys Arg Ser Glu Ser His Trp Glu His Thr Gln Ala Glu Thr Arg
                885                 890                 895

His Ile Leu Asp Leu Ser Asn Leu Arg Val Glu Thr Thr Ile Glu Gly
            900                 905                 910

Lys Lys Val Leu Val Asp Gln Ser Leu Thr Leu Val Lys Lys Asn Arg
        915                 920                 925

Asp Thr Pro Asp Glu Glu Ala Thr Glu Glu Asn Lys Gln Lys Ile Lys
    930                 935                 940

Leu Lys Gln Leu Ser Tyr Ile Arg Lys Leu Gln His Lys Met Gln Thr
945                 950                 955                 960

Asn Glu Gln Asp Val Leu Asp Leu Ile Asn Asn Glu Pro Ser Asp Glu
                965                 970                 975

Glu Phe Lys Lys Arg Ile Glu Gly Leu Ile Ser Ser Phe Gly Glu Gly
            980                 985                 990

Gln Lys Tyr Ala Asp Leu Pro Ile Asn Thr Met Arg Glu Met Ile Ser
        995                 1000                1005

Asp Leu Gln Gly Val Ile Ala Arg Gly Asn Asn Gln Thr Glu Lys
    1010                1015                1020

Asn Lys Ile Ile Glu Leu Asp Ala Ala Asp Asn Leu Lys Gln Gly
    1025                1030                1035

Ile Val Ala Asn Met Ile Gly Ile Val Asn Tyr Ile Phe Ala Lys
    1040                1045                1050

Tyr Ser Tyr Lys Ala Tyr Ile Ser Leu Glu Asp Leu Ser Arg Ala
    1055                1060                1065

Tyr Gly Gly Ala Lys Ser Gly Tyr Asp Gly Arg Tyr Leu Pro Ser

```
                1070                1075                1080

Thr Ser Gln Asp Glu Asp Val Asp Phe Lys Glu Gln Gln Asn Gln
        1085                1090                1095

Met Leu Ala Gly Leu Gly Thr Tyr Gln Phe Phe Glu Met Gln Leu
        1100                1105                1110

Leu Lys Lys Leu Gln Lys Ile Gln Ser Asp Asn Thr Val Leu Arg
        1115                1120                1125

Phe Val Pro Ala Phe Arg Ser Ala Asp Asn Tyr Arg Asn Ile Leu
        1130                1135                1140

Arg Leu Glu Glu Thr Lys Tyr Lys Ser Lys Pro Phe Gly Val Val
        1145                1150                1155

His Phe Ile Asp Pro Lys Phe Thr Ser Lys Lys Cys Pro Val Cys
        1160                1165                1170

Ser Lys Thr Asn Val Tyr Arg Asp Lys Asp Ile Leu Val Cys
        1175                1180                1185

Lys Glu Cys Gly Phe Arg Ser Asp Ser Gln Leu Lys Glu Arg Glu
        1190                1195                1200

Asn Asn Ile His Tyr Ile His Asn Gly Asp Asp Asn Gly Ala Tyr
        1205                1210                1215

His Ile Ala Leu Lys Ser Val Glu Asn Leu Ile Gln Met Lys
        1220                1225                1230

<210> SEQ ID NO 14
<211> LENGTH: 1057
<212> TYPE: PRT
<213> ORGANISM: Unknown
<220> FEATURE:
<221> NAME/KEY: source
<223> OTHER INFORMATION: /note="Description of Unknown:
      Microgenomates (Roizmanbacteria) bacterium sequence"

<400> SEQUENCE: 14

Met Glu Ile Gln Glu Leu Lys Asn Leu Tyr Glu Val Lys Lys Thr Val
1               5                   10                  15

Arg Phe Glu Leu Lys Pro Ser Lys Lys Ile Phe Glu Gly Gly Asp
            20                  25                  30

Val Ile Lys Leu Gln Lys Asp Phe Glu Lys Val Gln Lys Phe Phe Leu
            35                  40                  45

Asp Ile Phe Val Tyr Lys Asn Glu His Thr Lys Leu Glu Phe Lys Lys
        50                  55                  60

Lys Arg Glu Ile Lys Tyr Thr Trp Leu Arg Thr Asn Thr Lys Asn Glu
65                  70                  75                  80

Phe Tyr Asn Trp Arg Gly Lys Ser Asp Thr Gly Lys Asn Tyr Ala Leu
                85                  90                  95

Asn Lys Ile Gly Phe Leu Ala Glu Glu Ile Leu Arg Trp Leu Asn Glu
            100                 105                 110

Trp Gln Glu Leu Thr Lys Ser Leu Lys Asp Leu Thr Gln Arg Glu Glu
        115                 120                 125

His Lys Gln Glu Arg Lys Ser Asp Ile Ala Phe Val Leu Arg Asn Phe
    130                 135                 140

Leu Lys Arg Gln Asn Leu Pro Phe Ile Lys Asp Phe Asn Ala Val
145                 150                 155                 160

Ile Asp Ile Gln Gly Lys Gln Gly Lys Glu Ser Asp Asp Lys Ile Arg
                165                 170                 175

Lys Phe Arg Glu Glu Ile Lys Glu Ile Glu Lys Asn Leu Asn Ala Cys
            180                 185                 190
```

```
Ser Arg Glu Tyr Leu Pro Thr Gln Ser Asn Gly Val Leu Leu Tyr Lys
        195                 200                 205

Ala Ser Phe Ser Tyr Tyr Thr Leu Asn Lys Thr Pro Lys Glu Tyr Glu
        210                 215                 220

Asp Leu Lys Lys Glu Lys Glu Ser Glu Leu Ser Ser Val Leu Leu Lys
225                 230                 235                 240

Glu Ile Tyr Arg Arg Lys Arg Phe Asn Arg Thr Thr Asn Gln Lys Asp
                245                 250                 255

Thr Leu Phe Glu Cys Thr Ser Asp Trp Leu Val Lys Ile Lys Leu Gly
            260                 265                 270

Lys Asp Ile Tyr Glu Trp Thr Leu Asp Glu Ala Tyr Gln Lys Met Lys
        275                 280                 285

Ile Trp Lys Ala Asn Gln Lys Ser Asn Phe Ile Glu Ala Val Ala Gly
        290                 295                 300

Asp Lys Leu Thr His Gln Asn Phe Arg Lys Gln Phe Pro Leu Phe Asp
305                 310                 315                 320

Ala Ser Asp Glu Asp Phe Glu Thr Phe Tyr Arg Leu Thr Lys Ala Leu
                325                 330                 335

Asp Lys Asn Pro Glu Asn Ala Lys Lys Ile Ala Gln Lys Arg Gly Lys
            340                 345                 350

Phe Phe Asn Ala Pro Asn Glu Thr Val Gln Thr Lys Asn Tyr His Glu
        355                 360                 365

Leu Cys Glu Leu Tyr Lys Arg Ile Ala Val Lys Arg Gly Lys Ile Ile
        370                 375                 380

Ala Glu Ile Lys Gly Ile Glu Asn Glu Glu Val Gln Ser Gln Leu Leu
385                 390                 395                 400

Thr His Trp Ala Val Ile Ala Glu Glu Arg Asp Lys Lys Phe Ile Val
                405                 410                 415

Leu Ile Pro Arg Lys Asn Gly Gly Lys Leu Glu Asn His Lys Asn Ala
            420                 425                 430

His Ala Phe Leu Gln Glu Lys Asp Arg Lys Glu Pro Asn Asp Ile Lys
        435                 440                 445

Val Tyr His Phe Lys Ser Leu Thr Leu Arg Ser Leu Glu Lys Leu Cys
        450                 455                 460

Phe Lys Glu Ala Lys Asn Thr Phe Ala Pro Glu Ile Lys Lys Glu Thr
465                 470                 475                 480

Asn Pro Lys Ile Trp Phe Pro Thr Tyr Lys Gln Glu Trp Asn Ser Thr
                485                 490                 495

Pro Glu Arg Leu Ile Lys Phe Tyr Lys Gln Val Leu Gln Ser Asn Tyr
            500                 505                 510

Ala Gln Thr Tyr Leu Asp Leu Val Asp Phe Gly Asn Leu Asn Thr Phe
        515                 520                 525

Leu Glu Thr His Phe Thr Thr Leu Glu Glu Phe Glu Ser Asp Leu Glu
        530                 535                 540

Lys Thr Cys Tyr Thr Lys Val Pro Val Tyr Phe Ala Lys Lys Glu Leu
545                 550                 555                 560

Glu Thr Phe Ala Asp Glu Phe Glu Ala Glu Val Phe Glu Ile Thr Thr
                565                 570                 575

Arg Ser Ile Ser Thr Glu Ser Lys Arg Lys Glu Asn Ala His Ala Glu
            580                 585                 590

Ile Trp Arg Asp Phe Trp Ser Arg Glu Asn Glu Glu Asn His Ile
        595                 600                 605
```

```
Thr Arg Leu Asn Pro Glu Val Ser Val Leu Tyr Arg Asp Glu Ile Lys
    610                 615                 620

Glu Lys Ser Asn Thr Ser Arg Lys Asn Arg Lys Ser Asn Ala Asn Asn
625                 630                 635                 640

Arg Phe Ser Asp Pro Arg Phe Thr Leu Ala Thr Thr Ile Thr Leu Asn
                645                 650                 655

Ala Asp Lys Lys Lys Ser Asn Leu Ala Phe Lys Thr Val Glu Asp Ile
                660                 665                 670

Asn Ile His Ile Asp Asn Phe Asn Lys Lys Phe Ser Lys Asn Phe Ser
            675                 680                 685

Gly Glu Trp Val Tyr Gly Ile Asp Arg Gly Leu Lys Glu Leu Ala Thr
690                 695                 700

Leu Asn Val Val Lys Phe Ser Asp Val Lys Asn Val Phe Gly Val Ser
705                 710                 715                 720

Gln Pro Lys Glu Phe Ala Lys Ile Pro Ile Tyr Lys Leu Arg Asp Glu
                725                 730                 735

Lys Ala Ile Leu Lys Asp Glu Asn Gly Leu Ser Leu Lys Asn Ala Lys
                740                 745                 750

Gly Glu Ala Arg Lys Val Ile Asp Asn Ile Ser Asp Val Leu Glu Glu
            755                 760                 765

Gly Lys Glu Pro Asp Ser Thr Leu Phe Glu Lys Arg Glu Val Ser Ser
770                 775                 780

Ile Asp Leu Thr Arg Ala Lys Leu Ile Lys Gly His Ile Ile Ser Asn
785                 790                 795                 800

Gly Asp Gln Lys Thr Tyr Leu Lys Leu Lys Glu Thr Ser Ala Lys Arg
                805                 810                 815

Arg Ile Phe Glu Leu Phe Ser Thr Ala Lys Ile Asp Lys Ser Ser Gln
                820                 825                 830

Phe His Val Arg Lys Thr Ile Glu Leu Ser Gly Thr Lys Ile Tyr Trp
            835                 840                 845

Leu Cys Glu Trp Gln Arg Gln Asp Ser Trp Arg Thr Glu Lys Val Ser
    850                 855                 860

Leu Arg Asn Thr Leu Lys Gly Tyr Leu Gln Asn Leu Asp Leu Lys Asn
865                 870                 875                 880

Arg Phe Glu Asn Ile Glu Thr Ile Glu Lys Ile Asn His Leu Arg Asp
                885                 890                 895

Ala Ile Thr Ala Asn Met Val Gly Ile Leu Ser His Leu Gln Asn Lys
                900                 905                 910

Leu Glu Met Gln Gly Val Ile Ala Leu Glu Asn Leu Asp Thr Val Arg
            915                 920                 925

Glu Gln Ser Asn Lys Lys Met Ile Asp Glu His Phe Glu Gln Ser Asn
930                 935                 940

Glu His Val Ser Arg Arg Leu Glu Trp Ala Leu Tyr Cys Lys Phe Ala
945                 950                 955                 960

Asn Thr Gly Glu Val Pro Pro Gln Ile Lys Glu Ser Ile Phe Leu Arg
                965                 970                 975

Asp Glu Phe Lys Val Cys Gln Ile Gly Ile Leu Asn Phe Ile Asp Val
                980                 985                 990

Lys Gly Thr Ser Ser Asn Cys Pro Asn Cys Asp Gln Glu Ser Arg Lys
            995                 1000                1005

Thr Gly Ser His Phe Ile Cys Asn Phe Gln Asn Asn Cys Ile Phe
    1010                1015                1020

Ser Ser Lys Glu Asn Arg Asn Leu Leu Glu Gln Asn Leu His Asn
```

```
                1025                1030                1035

Ser Asp Asp Val Ala Ala Phe  Asn Ile Ala Lys Arg  Gly Leu Glu
        1040                    1045                1050

Ile Val Lys Val
        1055
```

<210> SEQ ID NO 15
<211> LENGTH: 10
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 15
uaauuucuac                                                              10

<210> SEQ ID NO 16
<211> LENGTH: 6
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 16 aucuac                                                                   6

<210> SEQ ID NO 17
<211> LENGTH: 10
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 17
uaauucccac                                                              10

<210> SEQ ID NO 18
<211> LENGTH: 12
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 18
uaauuuucua cu                                                           12

<210> SEQ ID NO 19
<211> LENGTH: 9
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 19 aauuucuac                                                                9

```
<210> SEQ ID NO 20
<211> LENGTH: 10
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 20
gaauuucuac                                                                10

<210> SEQ ID NO 21
<211> LENGTH: 5
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 21 guaga                                                                      5

<210> SEQ ID NO 22
<211> LENGTH: 5
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 22 guggg                                                                      5

<210> SEQ ID NO 23
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 23

Pro Lys Lys Lys Arg Lys Val
1               5

<210> SEQ ID NO 24
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 24

Lys Arg Pro Ala Ala Thr Lys Lys Ala Gly Gln Ala Lys Lys Lys Lys
1               5                   10                  15

<210> SEQ ID NO 25
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
```

Synthetic peptide"

<400> SEQUENCE: 25

Pro Ala Ala Lys Arg Val Lys Leu Asp
1               5

<210> SEQ ID NO 26
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 26

Arg Gln Arg Arg Asn Glu Leu Lys Arg Ser Pro
1               5                   10

<210> SEQ ID NO 27
<211> LENGTH: 38
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 27

Asn Gln Ser Ser Asn Phe Gly Pro Met Lys Gly Gly Asn Phe Gly Gly
1               5                   10                  15

Arg Ser Ser Gly Pro Tyr Gly Gly Gly Gly Gln Tyr Phe Ala Lys Pro
            20                  25                  30

Arg Asn Gln Gly Gly Tyr
        35

<210> SEQ ID NO 28
<211> LENGTH: 42
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 28

Arg Met Arg Ile Glx Phe Lys Asn Lys Gly Lys Asp Thr Ala Glu Leu
1               5                   10                  15

Arg Arg Arg Arg Val Glu Val Ser Val Glu Leu Arg Lys Ala Lys Lys
            20                  25                  30

Asp Glu Gln Ile Leu Lys Arg Arg Asn Val
        35                  40

<210> SEQ ID NO 29
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 29

Val Ser Arg Lys Arg Pro Arg Pro
1               5

```
<210> SEQ ID NO 30
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 30

Pro Pro Lys Lys Ala Arg Glu Asp
1               5

<210> SEQ ID NO 31
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 31

Pro Gln Pro Lys Lys Lys Pro Leu
1               5

<210> SEQ ID NO 32
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 32

Ser Ala Leu Ile Lys Lys Lys Lys Lys Met Ala Pro
1               5                   10

<210> SEQ ID NO 33
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 33

Asp Arg Leu Arg Arg
1               5

<210> SEQ ID NO 34
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 34

Pro Lys Gln Lys Lys Arg Lys
1               5

<210> SEQ ID NO 35
<211> LENGTH: 10
<212> TYPE: PRT
```

-continued

```
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 35

Arg Lys Leu Lys Lys Lys Ile Lys Lys Leu
1               5                   10

<210> SEQ ID NO 36
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 36

Arg Glu Lys Lys Lys Phe Leu Lys Arg Arg
1               5                   10

<210> SEQ ID NO 37
<211> LENGTH: 20
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 37

Lys Arg Lys Gly Asp Glu Val Asp Gly Val Asp Glu Val Ala Lys Lys
1               5                   10                  15

Lys Ser Lys Lys
            20

<210> SEQ ID NO 38
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 38

Arg Lys Cys Leu Gln Ala Gly Met Asn Leu Glu Ala Arg Lys Thr Lys
1               5                   10                  15

Lys

<210> SEQ ID NO 39
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 39

Pro Ala Ala Lys Lys Lys Lys Leu Asp
1               5

<210> SEQ ID NO 40
<211> LENGTH: 682
```

```
<212> TYPE: DNA
<213> ORGANISM: Homo sapiens

<400> SEQUENCE: 40
cgagagagtg cctcaggtat ggtggggtgg gccaggcttc ctctggggcc tgactgccct    60
ctggggtac atgtgggggc agttgctggc caccgttttg ggctctggga ctcaggcggg   120
tcacctaccc acgttcgtgg ccccatcttt ctcaaggggc tgctgtgagg attgagtgag   180
ttgcacgtgt caagtgctta gagcaggcgt gctgcacaca gcaggccttt ggtcaggttg   240
gctgctgggc tggccctggg gccgtttccc tcactcctgc tcggtgaatt tggctcagca   300
ggcacctgcc tcagctgctc acttgagcct ctgggtctag aaccctctgg ggaccgtttg   360
aggagtgttc agtctccgtg aacgttccct tagcactctg ccacttattg ggtcagctgt   420
taacatcagt acgttaatgt ttcctgatgg tccatgtctg ttactcgcct gtcaagtggc   480
gtgacaccgg gcgtgttccc cagagtgact tttccttta tttcccttca gctaaaataa   540
aggaggagga agctgctaag gactagttct gccctcccgt caccccctgtt tctggcacca   600
ggaatcccca acatgcactg atgttgtgtt tttaacatgt caatctgtcc gttcacatgt   660
gtggtacatg gtgtttgtgg cc                                            682

<210> SEQ ID NO 41
<211> LENGTH: 40
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 41
uaauuucuac ucuuguagau cugauggucc augucuguua                          40

<210> SEQ ID NO 42
<211> LENGTH: 12
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 42
uaauuucuac uc                                                        12

<210> SEQ ID NO 43
<211> LENGTH: 28
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 43
uuguagaucu gaugguccau gucuguua                                       28

<210> SEQ ID NO 44
<211> LENGTH: 40
<212> TYPE: RNA
<213> ORGANISM: Artificial Sequence
<220> FEATURE:
<221> NAME/KEY: source
<223> OTHER INFORMATION: /note="Description of Artificial Sequence:
```

```
Synthetic oligonucleotide"

<400> SEQUENCE: 44
uaauucccac ucuuguggu cugauggucc augucuguua                40

<210> SEQ ID NO 45
<211> LENGTH: 12
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 45
uaauucccac uc                                             12

<210> SEQ ID NO 46
<211> LENGTH: 28
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 46
uugugggucu gaugguccau gucuguua                            28

<210> SEQ ID NO 47
<211> LENGTH: 52
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 47
ucccauagau gauaauuucu acucuuguag aucgauggu ccaugucugu ua   52

<210> SEQ ID NO 48
<211> LENGTH: 24
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 48
ucccauagau gauaauuucu acuc                                24

<210> SEQ ID NO 49
<211> LENGTH: 64
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 49
ucccauagau gaccgcacuc auaguaauuu cuacucuugu agaucugaug guccaugucu   60
guua                                                      64
```

```
<210> SEQ ID NO 50
<211> LENGTH: 36
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 50
ucccauagau gaccgcacuc auaguaauuu cuacuc                                  36

<210> SEQ ID NO 51
<211> LENGTH: 24
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 51
gcagctaata cgactcacta tagg                                               24

<210> SEQ ID NO 52
<211> LENGTH: 30
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 52
ucuuguagau cugauggucc augucuguua                                         30

<210> SEQ ID NO 53
<211> LENGTH: 11
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 53
uaauuucuac u                                                             11

<210> SEQ ID NO 54
<211> LENGTH: 29
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 54
cuuguagauc ugauggucca ugucuguua                                          29

<210> SEQ ID NO 55
<211> LENGTH: 13
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
```

```
<400> SEQUENCE: 55
uaauuucuac ucu                                                    13

<210> SEQ ID NO 56
<211> LENGTH: 27
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 56
uguagaucug augguccaug ucuguua                                     27

<210> SEQ ID NO 57
<211> LENGTH: 14
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 57
uaauuucuac ucuu                                                   14

<210> SEQ ID NO 58
<211> LENGTH: 26
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 58
guagaucuga ugguccaugu cuguua                                      26

<210> SEQ ID NO 59
<211> LENGTH: 50
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 59
gccgaaaggc uaauuucuac ucuuguagau cgauggucc augucuguua              50

<210> SEQ ID NO 60
<211> LENGTH: 22
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 60
gccgaaaggc uaauuucuac uc                                          22

<210> SEQ ID NO 61
<211> LENGTH: 50
<212> TYPE: RNA
<213> ORGANISM: Artificial Sequence
```

```
<220> FEATURE:
<221> NAME/KEY: source
<223> OTHER INFORMATION: /note="Description of Artificial Sequence:
      Synthetic oligonucleotide"

<400> SEQUENCE: 61
uaauuucuac ucuuguagau cugauggucc augucuguua gccgaaaggc                    50

<210> SEQ ID NO 62
<211> LENGTH: 38
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 62
uuguagaucu gaugguccau gucuguuagc cgaaaggc                                 38

<210> SEQ ID NO 63
<211> LENGTH: 40
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 63
uaauuucuac ucuuguagau ctgatggtcc atgtctgtta                               40

<210> SEQ ID NO 64
<211> LENGTH: 40
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 64
uaauucccac ucuugugggu ctgatggtcc atgtctgtta                               40

<210> SEQ ID NO 65
<211> LENGTH: 15
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 65
uaauucccac ucuug                                                          15

<210> SEQ ID NO 66
<211> LENGTH: 14
<212> TYPE: RNA
<213> ORGANISM: Artificial Sequence
<220> FEATURE:
```

```
<221> NAME/KEY: source
<223> OTHER INFORMATION: /note="Description of Artificial Sequence:
      Synthetic oligonucleotide"

<400> SEQUENCE: 66
uaauucccac ucuc                                                          14

<210> SEQ ID NO 67
<211> LENGTH: 19
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 67
uaauucccac ucucuugug                                                     19

<210> SEQ ID NO 68
<211> LENGTH: 15
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 68
uaauucccac uccuc                                                         15

<210> SEQ ID NO 69
<211> LENGTH: 21
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 69
uaauucccac uccucuuguu g                                                  21

<210> SEQ ID NO 70
<211> LENGTH: 15
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 70
uaauucccac ugcuc                                                         15

<210> SEQ ID NO 71
<211> LENGTH: 21
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 71
uaauucccac ugcucuugcu g                                                  21
```

```
<210> SEQ ID NO 72
<211> LENGTH: 16
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 72
uaauucccac ucgcuc                                                        16

<210> SEQ ID NO 73
<211> LENGTH: 23
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 73
uaauucccac ucgcucuugc uug                                                23

<210> SEQ ID NO 74
<211> LENGTH: 16
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 74
uaauucccac ucgcuc                                                        16

<210> SEQ ID NO 75
<211> LENGTH: 23
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 75
uaauucccac ucgcucuugc gug                                                23

<210> SEQ ID NO 76
<211> LENGTH: 17
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 76
uaauucccac uccgcuc                                                       17

<210> SEQ ID NO 77
<211> LENGTH: 25
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
```

<400> SEQUENCE: 77
uaauucccac uccgcucuug cguug                                              25

<210> SEQ ID NO 78
<211> LENGTH: 28
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 78
uuguggguct gatggtccat gtctgtta                                           28

<210> SEQ ID NO 79
<211> LENGTH: 25
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 79
uggguctgat ggtccatgtc tgtta                                              25

<210> SEQ ID NO 80
<211> LENGTH: 30
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 80
uugugugggu ctgatggtcc atgtctgtta                                         30

<210> SEQ ID NO 81
<211> LENGTH: 25
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 81
uggguctgat ggtccatgtc tgtta                                              25

<210> SEQ ID NO 82
<211> LENGTH: 31

<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 82
uuguuguggg uctgatggtc catgtctgtt a                              31

<210> SEQ ID NO 83
<211> LENGTH: 25
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 83
uggguctgat ggtccatgtc tgtta                                     25

<210> SEQ ID NO 84
<211> LENGTH: 31
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 84
uugcuguggg uctgatggtc catgtctgtt a                              31

<210> SEQ ID NO 85
<211> LENGTH: 25
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 85
uggguctgat ggtccatgtc tgtta                                     25

<210> SEQ ID NO 86
<211> LENGTH: 32
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:

```
<221> NAME/KEY: source
<223> OTHER INFORMATION: /note="Description of Combined DNA/RNA
      Molecule: Synthetic oligonucleotide"

<400> SEQUENCE: 86
uugcuugugg guctgatggt ccatgtctgt ta                                    32

<210> SEQ ID NO 87
<211> LENGTH: 25
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 87
uggguctgat ggtccatgtc tgtta                                            25

<210> SEQ ID NO 88
<211> LENGTH: 32
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 88
uugcgugugg guctgatggt ccatgtctgt ta                                    32

<210> SEQ ID NO 89
<211> LENGTH: 25
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 89
uggguctgat ggtccatgtc tgtta                                            25

<210> SEQ ID NO 90
<211> LENGTH: 33
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 90
uugcguugug gguctgatgg tccatgtctg tta                                   33
```

-continued

```
<210> SEQ ID NO 91
<211> LENGTH: 25
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 91
uggguctgat ggtccatgtc tgtta                                         25

<210> SEQ ID NO 92
<211> LENGTH: 55
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 92
tcgtcggcag cgtcagatgt gtataagaga cagagtgttc agtctccgtg aacgt        55

<210> SEQ ID NO 93
<211> LENGTH: 56
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 93
gtctcgtggg ctcggagatg tgtataagag acaggtcctt agcagcttcc tcctcc       56

<210> SEQ ID NO 94
<211> LENGTH: 24
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 94
caagcagaag acggcatacg agat                                          24

<210> SEQ ID NO 95
<211> LENGTH: 29
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 95
aatgatacgg cgaccaccga gatctacac                                     29

<210> SEQ ID NO 96
<211> LENGTH: 10
<212> TYPE: RNA
```

```
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 96
uaauuucuac                                                          10

<210> SEQ ID NO 97
<211> LENGTH: 11
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 97
uaauuucuac u                                                        11

<210> SEQ ID NO 98
<211> LENGTH: 13
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 98
uaauuucuac ucu                                                      13

<210> SEQ ID NO 99
<211> LENGTH: 14
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 99
uaauuucuac ucuu                                                     14

<210> SEQ ID NO 100
<211> LENGTH: 41
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 100
uaauuucuac ucuuguagau ctggtgaagt tggttcggga g                       41

<210> SEQ ID NO 101
<211> LENGTH: 29
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
```

-continued

```
<220> FEATURE:
<221> NAME/KEY: source
<223> OTHER INFORMATION: /note="Description of Combined DNA/RNA
      Molecule: Synthetic oligonucleotide"

<400> SEQUENCE: 101
uuguagauct ggtgaagttg gttcgggag                                    29

<210> SEQ ID NO 102
<211> LENGTH: 11
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 102
ggaauuucua c                                                       11

<210> SEQ ID NO 103
<211> LENGTH: 41
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 103
uaauuucuac ucuuguagau tctgcaggga caataggagc c                      41

<210> SEQ ID NO 104
<211> LENGTH: 29
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 104
uuguagautc tgcagggaca ataggagcc                                    29

<210> SEQ ID NO 105
<211> LENGTH: 41
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 105
uaauuucuac ucuuguagau gggtgcatac ctgtctggct g                      41

<210> SEQ ID NO 106
```

```
<211> LENGTH: 29
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 106
uuguagaugg gtgcatacct gtctggctg                                           29

<210> SEQ ID NO 107
<211> LENGTH: 41
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 107
uaauuucuac ucuuguagau uaugaccugu auggagggga g                             41

<210> SEQ ID NO 108
<211> LENGTH: 29
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 108
uuguagauua ugaccuguau ggaggggag                                           29

<210> SEQ ID NO 109
<211> LENGTH: 41
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 109
uaauuucuac ucuuguagau gcacgaagct ctccgatgtg t                             41

<210> SEQ ID NO 110
<211> LENGTH: 29
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 110
uuguagaugc acgaagctct ccgatgtgt                                           29
```

<210> SEQ ID NO 111
<211> LENGTH: 41
<212> TYPE: DNA
<213> ORGANISM: Artificial Sequence
<220> FEATURE:
<221> NAME/KEY: source
<223> OTHER INFORMATION: /note="Description of Artificial Sequence:
    Synthetic oligonucleotide"
<220> FEATURE:
<221> NAME/KEY: source
<223> OTHER INFORMATION: /note="Description of Combined DNA/RNA
    Molecule: Synthetic oligonucleotide"

<400> SEQUENCE: 111
uaauuucuac ucuuguagau gtgtaacata cctggaggac a                          41

<210> SEQ ID NO 112
<211> LENGTH: 29
<212> TYPE: DNA
<213> ORGANISM: Artificial Sequence
<220> FEATURE:
<221> NAME/KEY: source
<223> OTHER INFORMATION: /note="Description of Artificial Sequence:
    Synthetic oligonucleotide"
<220> FEATURE:
<221> NAME/KEY: source
<223> OTHER INFORMATION: /note="Description of Combined DNA/RNA
    Molecule: Synthetic oligonucleotide"

<400> SEQUENCE: 112
uuguagaugt gtaacatacc tggaggaca                                       29

<210> SEQ ID NO 113
<211> LENGTH: 41
<212> TYPE: DNA
<213> ORGANISM: Artificial Sequence
<220> FEATURE:
<221> NAME/KEY: source
<223> OTHER INFORMATION: /note="Description of Artificial Sequence:
    Synthetic oligonucleotide"
<220> FEATURE:
<221> NAME/KEY: source
<223> OTHER INFORMATION: /note="Description of Combined DNA/RNA
    Molecule: Synthetic oligonucleotide"

<400> SEQUENCE: 113
uaauuucuac ucuuguagau gtcctccctc tagtggctga g                         41

<210> SEQ ID NO 114
<211> LENGTH: 29
<212> TYPE: DNA
<213> ORGANISM: Artificial Sequence
<220> FEATURE:
<221> NAME/KEY: source
<223> OTHER INFORMATION: /note="Description of Artificial Sequence:
    Synthetic oligonucleotide"
<220> FEATURE:
<221> NAME/KEY: source
<223> OTHER INFORMATION: /note="Description of Combined DNA/RNA
    Molecule: Synthetic oligonucleotide"

<400> SEQUENCE: 114
uuguagaugt cctccctcta gtggctgag                                       29

<210> SEQ ID NO 115
<211> LENGTH: 41
<212> TYPE: DNA
<213> ORGANISM: Artificial Sequence
<220> FEATURE:

<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 115
uaauuucuac ucuuguagau agcggcacaa ggctcagctg a                41

<210> SEQ ID NO 116
<211> LENGTH: 29
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 116
uuguagauag cggcacaagg ctcagctga                              29

<210> SEQ ID NO 117
<211> LENGTH: 41
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 117
uaauuucuac ucuuguagau actttccatt ctctgctgga t                41

<210> SEQ ID NO 118
<211> LENGTH: 29
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 118
uuguagauac tttccattct ctgctggat                              29

<210> SEQ ID NO 119
<211> LENGTH: 41
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 119
uaauuucuac ucuuguagau ccuuccgcuc accuccgccu g         41

<210> SEQ ID NO 120
<211> LENGTH: 29
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 120
uuguagaucc uuccgcucac cuccgccug         29

<210> SEQ ID NO 121
<211> LENGTH: 41
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 121
uaauuucuac ucuuguagau cucuuccucc uacucaccau c         41

<210> SEQ ID NO 122
<211> LENGTH: 29
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 122
uuguagaucu cuuccuccua cucaccauc         29

<210> SEQ ID NO 123
<211> LENGTH: 41
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 123
uaauuucuac ucuuguagau cucuuccucc uacucaccau c         41

<210> SEQ ID NO 124
<211> LENGTH: 31
<212> TYPE: RNA
<213> ORGANISM: Artificial Sequence
<220> FEATURE:

<221> NAME/KEY: source
<223> OTHER INFORMATION: /note="Description of Artificial Sequence:
      Synthetic oligonucleotide"

<400> SEQUENCE: 124
ucuuguagau cucuuccucc uacucaccau c                                    31

<210> SEQ ID NO 125
<211> LENGTH: 30
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 125
cuuguagauc ucuuccuccu acucaccauc                                      30

<210> SEQ ID NO 126
<211> LENGTH: 29
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 126
uuguagaucu cuuccuccua cucaccauc                                       29

<210> SEQ ID NO 127
<211> LENGTH: 28
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 127
uguagaucuc uuccuccuac ucaccauc                                        28

<210> SEQ ID NO 128
<211> LENGTH: 27
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 128
guagaucucu uccuccuacu caccauc                                         27

<210> SEQ ID NO 129
<211> LENGTH: 41
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 129
uaauuucuac ucuuguagau gcacgaagcu cuccgaugug u                         41

```
<210> SEQ ID NO 130
<211> LENGTH: 31
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 130
ucuuguagau gcacgaagcu cuccgaugug u                              31

<210> SEQ ID NO 131
<211> LENGTH: 30
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 131
cuuguagaug cacgaagcuc uccgaugugu                                30

<210> SEQ ID NO 132
<211> LENGTH: 29
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 132
uuguagaugc acgaagcucu ccgaugugu                                 29

<210> SEQ ID NO 133
<211> LENGTH: 28
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 133
uguagaugca cgaagcucuc cgaugugu                                  28

<210> SEQ ID NO 134
<211> LENGTH: 27
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 134
guagaugcac gaagcucucc gaugugu                                   27

<210> SEQ ID NO 135
<211> LENGTH: 41
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
```

-continued

<400> SEQUENCE: 135
uaauuucuac ucuuguagau guccucccuc uaguggcuga g                41

<210> SEQ ID NO 136
<211> LENGTH: 31
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 136
ucuuguagau guccucccuc uaguggcuga g                           31

<210> SEQ ID NO 137
<211> LENGTH: 30
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 137
cuuguagaug uccucccucu aguggcugag                             30

<210> SEQ ID NO 138
<211> LENGTH: 29
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 138
uuguagaugu ccucccucua guggcugag                              29

<210> SEQ ID NO 139
<211> LENGTH: 28
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 139
uguagauguc cucccucuag uggcugag                               28

<210> SEQ ID NO 140
<211> LENGTH: 27
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 140
guagaugucc ucccucuagu ggcugag                                27

<210> SEQ ID NO 141
<211> LENGTH: 15
<212> TYPE: DNA
<213> ORGANISM: Artificial Sequence

```
<220> FEATURE:
<221> NAME/KEY: source
<223> OTHER INFORMATION: /note="Description of Artificial Sequence:
      Synthetic primer"

<400> SEQUENCE: 141
gtctcgtggg ctcgg                                                        15

<210> SEQ ID NO 142
<211> LENGTH: 14
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 142
tcgtcggcag cgtc                                                         14

<210> SEQ ID NO 143
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic 6xHis tag"

<400> SEQUENCE: 143

His His His His His His
1               5

<210> SEQ ID NO 144
<211> LENGTH: 29
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: modified_base
<222> LOCATION: (10)..(29)
<223> OTHER INFORMATION: a, c, u, g, unknown or other

<400> SEQUENCE: 144
cuuguagaun nnnnnnnnnn nnnnnnnnn                                         29

<210> SEQ ID NO 145
<211> LENGTH: 30
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: modified_base
<222> LOCATION: (11)..(30)
<223> OTHER INFORMATION: a, c, u, g, unknown or other

<400> SEQUENCE: 145
ucuuguagau nnnnnnnnnn nnnnnnnnnn                                        30

<210> SEQ ID NO 146
<211> LENGTH: 27
<212> TYPE: RNA
<213> ORGANISM: Artificial Sequence
```

```
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: modified_base
<222> LOCATION: (8)..(27)
<223> OTHER INFORMATION: a, c, u, g, unknown or other

<400> SEQUENCE: 146
uguagaunnn nnnnnnnnnn nnnnnnn                                              27

<210> SEQ ID NO 147
<211> LENGTH: 26
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: modified_base
<222> LOCATION: (7)..(26)
<223> OTHER INFORMATION: a, c, u, g, unknown or other

<400> SEQUENCE: 147
guagaunnnn nnnnnnnnnn nnnnnn                                               26

<210> SEQ ID NO 148
<211> LENGTH: 50
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: modified_base
<222> LOCATION: (31)..(50)
<223> OTHER INFORMATION: a, c, u, g, unknown or other

<400> SEQUENCE: 148
gccgaaaggc uaauuucuac ucuuguagau nnnnnnnnnn nnnnnnnnnn                     50

<210> SEQ ID NO 149
<211> LENGTH: 50
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: modified_base
<222> LOCATION: (21)..(40)
<223> OTHER INFORMATION: a, c, u, g, unknown or other

<400> SEQUENCE: 149
uaauuucuac ucuuguagau nnnnnnnnnn nnnnnnnnnn gccgaaaggc                     50

<210> SEQ ID NO 150
<211> LENGTH: 40
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: modified_base
<222> LOCATION: (21)..(40)
```

<223> OTHER INFORMATION: a, c, u, g, unknown or other

<400> SEQUENCE: 150
uaauuucuac ucuuguagau nnnnnnnnnn nnnnnnnnnn        40

<210> SEQ ID NO 151
<211> LENGTH: 40
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: modified_base
<222> LOCATION: (21)..(40)
<223> OTHER INFORMATION: a, c, u, g, unknown or other

<400> SEQUENCE: 151
uaauucccac ucuuguggu nnnnnnnnnn nnnnnnnnnn        40

<210> SEQ ID NO 152
<211> LENGTH: 44
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: modified_base
<222> LOCATION: (25)..(44)
<223> OTHER INFORMATION: a, c, u, g, unknown or other

<400> SEQUENCE: 152
uaauucccac ucucuugugu gggunnnnnn nnnnnnnnnn nnnn        44

<210> SEQ ID NO 153
<211> LENGTH: 46
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: modified_base
<222> LOCATION: (27)..(46)
<223> OTHER INFORMATION: a, c, u, g, unknown or other

<400> SEQUENCE: 153
uaauucccac ugcucuugcu gugggunnnn nnnnnnnnnn nnnnnn        46

<210> SEQ ID NO 154
<211> LENGTH: 48
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: modified_base
<222> LOCATION: (29)..(48)
<223> OTHER INFORMATION: a, c, u, g, unknown or other

<400> SEQUENCE: 154
uaauucccac ucgcucuugc guguggunn nnnnnnnnnn nnnnnnnn        48

```
<210> SEQ ID NO 155
<211> LENGTH: 46
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: modified_base
<222> LOCATION: (27)..(46)
<223> OTHER INFORMATION: a, c, u, g, unknown or other

<400> SEQUENCE: 155
uaauucccac uccucuuguu gugggunnnn nnnnnnnnnn nnnnnn                   46

<210> SEQ ID NO 156
<211> LENGTH: 48
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: modified_base
<222> LOCATION: (29)..(48)
<223> OTHER INFORMATION: a, c, u, g, unknown or other

<400> SEQUENCE: 156
uaauucccac ucgcucuugc uugugggunn nnnnnnnnn nnnnnnnn                  48

<210> SEQ ID NO 157
<211> LENGTH: 50
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: modified_base
<222> LOCATION: (31)..(50)
<223> OTHER INFORMATION: a, c, u, g, unknown or other

<400> SEQUENCE: 157
uaauucccac uccgcucuug cguugugggu nnnnnnnnnn nnnnnnnnnn               50

<210> SEQ ID NO 158
<211> LENGTH: 28
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: modified_base
<222> LOCATION: (9)..(28)
<223> OTHER INFORMATION: a, c, u, g, unknown or other

<400> SEQUENCE: 158
uuguagaunn nnnnnnnnnn nnnnnnnn                                       28

<210> SEQ ID NO 159
<211> LENGTH: 38
<212> TYPE: RNA
<213> ORGANISM: Artificial Sequence
<220> FEATURE:
<221> NAME/KEY: source
<223> OTHER INFORMATION: /note="Description of Artificial Sequence:
```

```
Synthetic oligonucleotide"
<220> FEATURE:
<221> NAME/KEY: modified_base
<222> LOCATION: (9)..(28)
<223> OTHER INFORMATION: a, c, u, g, unknown or other

<400> SEQUENCE: 159
uuguagaunn nnnnnnnnnn nnnnnnnngc cgaaaggc                                    38
```

CRISPR SYSTEMS WITH ENGINEERED DUAL GUIDE NUCLEIC ACIDS

RELATED APPLICATIONS

This application claims the benefit of and priority to International Application No. PCT/US2020/054050, filed on Oct. 2, 2020, which claims priority to U.S. Provisional Patent Application No. 62/910,055, filed on Oct. 3, 2019, the disclosure of which is hereby incorporated by reference in its entirety for all purposes.

SEQUENCE LISTING

The instant application contains a Sequence Listing which has been submitted electronically in ASCII text format and is hereby incorporated by reference in its entirety. The txt file was created Dec. 18, 2022 and is named "P62036812WO-US_Sequence Listing.txt" and is 193,463 bytes in size. The sequence listing contained in this .xml file is part of the specification and is hereby incorporated by reference herein it its entirety.

FIELD OF THE INVENTION

The present invention relates to an engineered Clustered Regularly Interspaced Short Palindromic Repeats (CRISPR) system comprising engineered dual guide nucleic acids (e.g., RNAs) capable of activating a CRISPR-Associated (Cas) nuclease, methods of targeting, editing, and/or modifying a nucleic acid using the engineered CRISPR system, and compositions and cells comprising the engineered CRISPR system.

BACKGROUND OF THE INVENTION

Recent advances have been made in precise genome targeting technologies. For example, specific loci in genomic DNA can be targeted, edited, or otherwise modified by designer meganucleases, zinc finger nucleases, or transcription activator-like effectors (TALEs). Furthermore, the CRISPR-Cas systems of bacterial and archaeal adaptive immunity have been adapted for precise targeting of genomic DNA in eukaryotic cells. Compared to the earlier generations of genome editing tools, the CRISPR-Cas systems are easy to set up, scalable, and amenable to targeting multiple positions within the eukaryotic genome, thereby providing a major resource for new applications in genome engineering.

Two distinct classes of CRISPR-Cas systems have been identified. Class 1 CRISPR-Cas systems utilize multi-protein effector complexes, whereas class 2 CRISPR-Cas systems utilize single-protein effectors (see, Makarova et al. (2017) CELL, 168:328). Among the three types of class 2 CRISPR-Cas systems, type II and type V systems typically target DNA and type VI systems typically target RNA (id.). Naturally occurring type II effector complexes consist of Cas9, CRISPR RNA (crRNA), and trans-activating CRISPR RNA (tracrRNA), but the crRNA and tracrRNA can be fused as a single guide RNA in an engineered system for simplicity (see, Wang et al. (2016) ANNU. REV. BIOCHEM., 85:227). Certain naturally occurring type V systems, such as type V-A, type V-C, and type V-D systems, do not require tracrRNA and use crRNA alone as the guide for cleavage of target DNA (see, Zetsche et al. (2015) CELL, 163:759; Makarova et al. (2017) CELL, 168:328).

The CRISPR-Cas systems have been engineered for various purposes, such as genomic DNA cleavage, base editing, epigenome editing, and genomic imaging (see, e.g., Wang et al. (2016) ANNU. REV. BIOCHEM., 85:227 and Rees et al. (2018) NAT. REV. GENET., 19:770). Although significant developments have been made, there still remains a need for new and useful CRISPR-Cas systems as powerful precise genome targeting tools.

SUMMARY OF THE INVENTION

The invention is based, in part, upon the design of a dual guide CRISPR-Cas system in which a targeter nucleic acid and a modulator nucleic acid, when hybridized to form a complex, can activate a Cas nuclease that, in a naturally occurring system, is activated by a single crRNA in the absence of a tracrRNA. The engineered dual guide CRISPR-Cas system described herein can be used to target, edit, or modify a target nucleic acid such as genomic DNA.

Type V-A, type V-C, and type V-D CRISPR-Cas systems naturally include a Cas nuclease and a single guide RNA (i.e., crRNA). By splitting the single guide RNA into two different nucleic acids, the engineered system describe herein provides better flexibility and tunability. For example, the efficiency of nucleic acid cleavage can be increased or decreased by adjusting the hybridization length and/or affinity of the targeter nucleic acid and the modulator nucleic acid. Furthermore, given the length limitation of nucleic acids that can be synthesized with high yield and accuracy, the use of dual guide nucleic acids allows incorporation of more polynucleotide elements that can improve editing efficacy and/or specificity.

In particular, the dual guide system can be engineered as a tunable system to decrease off-target editing, and thus can be used to edit a nucleic acid with high specificity. The system can be employed in a number of applications, for example, editing cells such as mammalian cells for use in therapy. The decrease in off-target editing is particularly desirable when creating genetically engineered proliferating cells, such as stem cells, progenitor cells, and immune memory cells, to be administered to a subject in need of the therapy. High specificity can be accomplished using the dual guide systems described herein, which optionally further include, for example, one or more chemical modifications to the targeter nucleic acid and/or modulator nucleic acid, an editing enhancer sequence, and/or a donor template-recruiting sequence.

Accordingly, in one aspect, the present invention provides an engineered, non-naturally occurring system comprising:
(a) a targeter nucleic acid comprising:
   (i) a spacer sequence designed to hybridize with a target nucleotide sequence; and
   (ii) a targeter stem sequence; and
(b) a modulator nucleic acid comprising a modulator stem sequence complementary to the targeter stem sequence,
wherein the targeter nucleic acid and the modulator nucleic acid are separate nucleic acids, and wherein a complex comprising the targeter nucleic acid and the modulator nucleic acid is capable of activating a CRISPR Associated (Cas) nuclease that, in a naturally occurring system, is activated by a single crRNA in the absence of a tracrRNA.

In certain embodiments, the Cas nuclease is a type V-A Cas nuclease.

In certain embodiments, the targeter stem sequence and the modulator stem sequence are each 4-10 nucleotides in length. In certain embodiments, the targeter stem sequence and the modulator stem sequence are each 5 nucleotides in length. In certain embodiments, the targeter stem sequence and the modulator stem sequence are hybridized through Watson-Crick base pairing.

In certain embodiments, the spacer sequence is about 20 nucleotides in length. In certain embodiments, the spacer sequence is 18 nucleotides in length or shorter. In certain embodiments, the spacer sequence is 17 nucleotides in length or shorter.

In certain embodiments, the targeter nucleic acid comprises, from 5' to 3', the targeter stem sequence, the spacer sequence, and an optional additional nucleotide sequence.

In certain embodiments, the targeter nucleic acid comprises a ribonucleic acid (RNA). In certain embodiments, the targeter nucleic acid comprises a modified RNA. In certain embodiments, the targeter nucleic acid comprises a combination of RNA and DNA. In certain embodiments, the targeter nucleic acid comprises a chemical modification. In certain embodiments, the chemical modification is present in one or more nucleotides at the 3' end of the targeter nucleic acid. In certain embodiments, the chemical modification is selected from the group consisting of 2'-O-methyl, 2'-fluoro, 2'-O-methoxyethyl, phosphorothioate, phosphorodithioate, pseudouridine, and any combinations thereof.

In certain embodiments, the modulator nucleic acid further comprises an additional nucleotide sequence. In certain embodiments, the additional nucleotide sequence is positioned 5' to the modulator stem sequence. In certain embodiments, the additional nucleotide sequence is 4-50 nucleotides in length. In certain embodiments, the additional nucleotide sequence comprises a donor template-recruiting sequence capable of hybridizing with a donor template. In certain embodiments, the engineered, non-naturally occurring system further comprises the donor template. In certain embodiments, the modulator nucleic acid comprises one or more nucleotides 3' to the modulator stem sequence In certain embodiments, the modulator nucleic acid comprises an RNA. In certain embodiments, the modulator nucleic acid comprises a modified RNA. In certain embodiments, the modulator nucleic acid comprises a combination of RNA and DNA. In certain embodiments, the modulator nucleic acid comprises a chemical modification. In certain embodiments, the chemical modification is present in one or more nucleotides at the 5' end of the modulator nucleic acid. In certain embodiments, the chemical modification is selected from the group consisting of 2'-O-methyl, 2'-fluoro, 2'-O-methoxyethyl, phosphorothioate, phosphorodithioate, pseudouridine, and any combinations thereof.

In certain embodiments, the targeter nucleic acid and the modulator nucleic acid are not covalently linked.

In certain embodiments, the Cas nuclease comprises an amino acid sequence at least 80% identical to SEQ ID NO: 1. In certain embodiments, the Cas nuclease is Cpf1. In certain embodiments, the engineered, non-naturally occurring system further comprises the Cas nuclease. In certain embodiments, the targeter nucleic acid, the modulator nucleic acid, and the Cas nuclease are present in a ribonucleoprotein (RNP) complex.

In another aspect, the present invention provides a eukaryotic cell comprising an engineered, non-naturally occurring system disclosed herein.

In another aspect, the present invention provides a composition (e.g., pharmaceutical composition) comprising an engineered, non-naturally occurring system or a eukaryotic cell disclosed herein.

In another aspect, the present invention provides a method of cleaving a target DNA having a target nucleotide sequence, the method comprising contacting the target DNA with an engineered, non-naturally occurring system disclosed herein, thereby resulting in cleavage of the target DNA.

In certain embodiments, the contacting occurs in vitro.

In certain embodiments, the contacting occurs in a cell ex vivo. In certain embodiments, the target DNA is genomic DNA of the cell. In certain embodiments, the system is delivered into the cell as a pre-formed RNP complex. In certain embodiments, the pre-formed RNP complex is delivered into the cell by electroporation.

In another aspect, the present invention provides a method of editing the genome of a eukaryotic cell, the method comprising delivering an engineered, non-naturally occurring system disclosed herein into the eukaryotic cell, thereby resulting in editing of the genome of the eukaryotic cell.

In certain embodiments, the system is delivered into the cell as a pre-formed RNP complex. In certain embodiments, the system is delivered into the cell by electroporation.

In certain embodiments of the method involving a eukaryotic cell, the cell is an immune cell. In certain embodiments, the immune cell is a T lymphocyte.

BRIEF DESCRIPTION OF THE DRAWINGS

In FIGS. 4A-4F, RNA #1 is a single guide RNA (SEQ ID NO: 150). RNAs #2 (SEQ ID NO: 12), #4 (SEQ ID NO: 15), #6 (SEQ ID NO: 53), #8 (SEQ ID NO: 53), and #10 (SEQ ID NO: 57) represent modulator RNAs, and RNAs #3 (SEQ ID NO: 158), #5 (SEQ ID NO: 145), #7 (SEQ ID NO: 53), #9 (SEQ ID NO: 146), and #11 (SEQ ID NO: 147) represent targeter RNAs. In FIGS. 4G-4H, RNAs #12 (SEQ ID NO: 148) and #14 (SEQ ID NO: 149) are single guide RNAs containing hairpin sequences. RNA #13 (SEQ ID NO: 60) is a modulator RNA corresponding to RNA #12 (SEQ ID NO: 148), and RNA #15 (SEQ ID NO: 159) is a targeter RNA corresponding to RNA #14 (SEQ ID NO: 149). FIG. 4I is a set of photographs showing gel electrophoresis results from an in vitro cleavage experiment using MAD7 complexed with combinations of targeter and modulator RNAs.

FIG. 5A depicts SEQ ID NO: 150. FIG. 5B depicts SEQ ID NO: 151), FIG. 5C depicts SEQ ID NO.45. FIG. 5D depicts SEQ ID NO. 66, FIG. 5E depicts SEQ ID NO: 45. FIG. 5F depicts SEQ ID NO: 66. FIG. 5G depicts SEQ ID NO:45. FIG. 5 H depicts. SEQ. ID NO: 60. FIG. 5I. depicts SEQ. ID NO: 45 Where a crRNA is split into a combination of a modulator RNA and a targeter RNA, thick crosses (within the loop regions, corresponding to combinations 3, 5, 7, 9, 11, 13, and 15) and thin crosses (within the stem regions, corresponding to combinations 4, 6, 8, 10, 12, 14, and 16) indicate the sites where the crRNAs are split. The Gibbs free energy change (AG) during the secondary structure formation of the corresponding crRNA, as predicted by the RNAfold program, is noted for each construct or combination.

DETAILED DESCRIPTION OF THE INVENTION

Figure 1A:
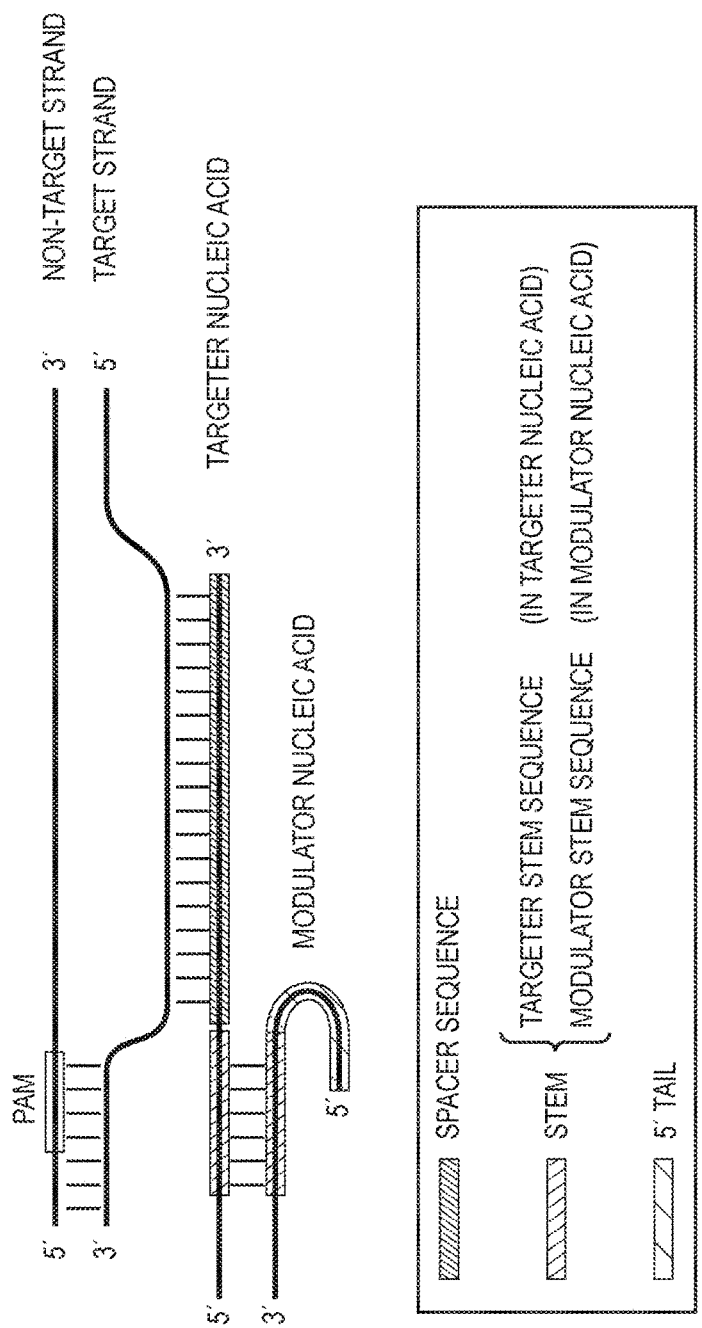
FIG. 1A is a schematic representation showing the structure of an exemplary dual guide type V-A CRISPR-Cas system.
Figure 1B:
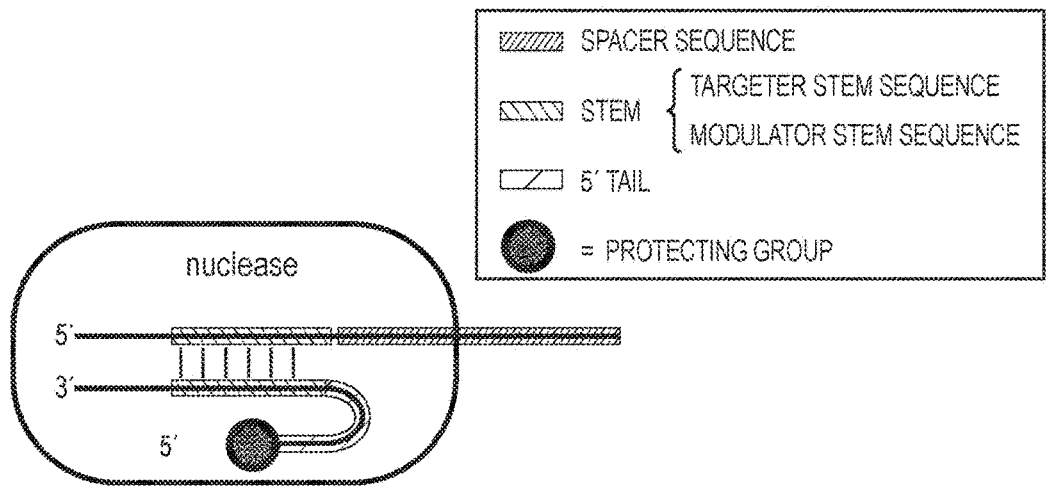
FIGS. 1B-1D are a series of schematic representation showing incorporation of a protecting group (e.g., a protective nucleotide sequence or a chemical modification) (FIG. 1B), a donor template-recruiting sequence (FIG. 1C), and an editing enhancer (FIG. 1D) into the dual guide type V-A CRISPR-Cas system.
Figure 1C:
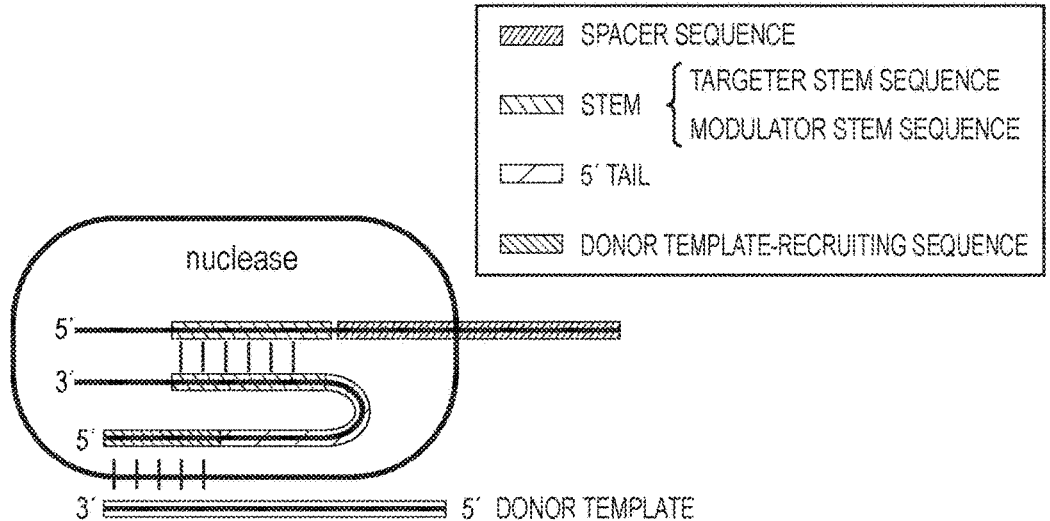

The invention is based, in part, upon the design of a dual guide CRISPR-Cas system in which a targeter nucleic acid and a modulator nucleic acid, when hybridized to form a complex, can activate a Cas nuclease that, in a naturally occurring system, is activated by a single crRNA in the absence of a tracrRNA. The engineered dual guide CRISPR-Cas system described herein can be used to target, edit, or modify a target nucleic acid such as genomic DNA.

Type V-A, type V-C, and type V-D CRISPR-Cas systems naturally include a Cas nuclease and a single guide RNA (i.e., crRNA). By splitting the single guide RNA into two different nucleic acids, the engineered system describe herein provides better flexibility and tunability. For example, the efficiency of nucleic acid cleavage can be increased or decreased by adjusting the hybridization length and/or affinity of the targeter nucleic acid and the modulator nucleic acid. Furthermore, given the length limitation of nucleic acids that can be synthesized with high yield and accuracy, the use of dual guide nucleic acids allows incorporation of more polynucleotide elements that can improve editing efficacy and/or specificity.

In particular, the dual guide system can be engineered as a tunable system to decrease off-target editing, and thus can be used to edit a nucleic acid with high specificity. The system can be employed in a number of applications, for example, editing cells such as mammalian cells for use in therapy. The decrease in off-target editing is particularly desirable when creating genetically engineered proliferating cells, such as stem cells, progenitor cells, and immune memory cells, to be administered to a subject in need of the therapy. High specificity can be accomplished using the dual guide systems described herein, which optionally further include, for example, one or more chemical modifications to the targeter nucleic acid and/or modulator nucleic acid, an editing enhancer sequence, and/or a donor template-recruiting sequence.

The features and uses of the dual guide CRISPR-Cas system are discussed in the following sections.

I. Engineered, Non-Naturally Occurring Dual Guide CRISPR-Cas Systems

The engineered, non-naturally occurring system of the present invention comprises:
  (a) a targeter nucleic acid comprising:
    (i) a spacer sequence designed to hybridize with a target nucleotide sequence; and
    (ii) a targeter stem sequence; and
  (b) a modulator nucleic acid comprising a modulator stem sequence complementary to the targeter stem sequence, wherein the targeter nucleic acid and the modulator nucleic acid are separate nucleic acids, and wherein a complex comprising the targeter nucleic acid and the modulator nucleic acid is capable of activating a Cas nuclease that, in a naturally occurring system, is activated by a single crRNA in the absence of a tracrRNA.

Type V-A, type V-C, and type V-D CRISPR-Cas systems are distinctive subtypes of CRISPR-Cas systems under the classification described in Makarova et al. (2017) CELL, 168:328. Naturally occurring CRISPR-Cas systems of these subtypes lack a tracrRNA and rely on a single crRNA to guide the CRISPR-Cas complex to the target DNA. Naturally occurring type V-A Cas proteins comprise a RuvC-like nuclease domain but lack an HNH endonuclease domain, and recognize a 5' T-rich protospacer adjacent motif (PAM), the 5' orientation determined using the non-target strand (i.e., the strand not hybridized with the spacer sequence) as the coordinate. Naturally occurring type V-A CRISPR-Cas systems cleave a double-stranded DNA to generate a staggered double-stranded break rather than a blunt end. The cleavage site is distant from the PAM site (e.g., separated by at least 10, 11, 12, 13, 14, or 15 nucleotides from the PAM on the non-target strand and/or separated by at least 15, 16, 17, 18, or 19 nucleotides from the sequence complementary to PAM on the target strand).

Accordingly, in another aspect, the instant disclosure provides an engineered, non-naturally occurring system comprising:
  (a) a targeter nucleic acid comprising:
    (i) a spacer sequence designed to hybridize with a target nucleotide sequence; and
    (ii) a targeter stem sequence; and
  (b) a modulator nucleic acid comprising a modulator stem sequence complementary to the targeter stem sequence, wherein the targeter nucleic acid and the modulator nucleic acid are separate nucleic acids, and wherein a complex comprising the targeter nucleic acid and the modulator nucleic acid is capable of activating a type V-A, type V-C, or type V-D Cas nuclease. In certain embodiments, the Cas nuclease is a type V-A Cas nuclease.

Cas Proteins

The terms "CRISPR-Associated protein," "Cas protein," and "Cas," as used interchangeably herein, refer to a naturally occurring Cas protein or an engineered Cas protein. Non-limiting examples of Cas protein engineering includes but are not limited to mutations and modifications of the Cas protein that alter the activity of the Cas, alter the PAM specificity, broaden the range of recognized PAMs, and/or reduce the ability to modify one or more off-target loci as compared to a corresponding unmodified Cas. In certain embodiments, the altered activity of the engineered Cas comprises altered ability (e.g., specificity or kinetics) to bind the naturally occurring crRNA or engineered dual guide nucleic acids, altered ability (e.g., specificity or kinetics) to bind the target nucleotide sequence, altered processivity of nucleic acid scanning, and/or altered effector (e.g., nuclease) activity. A Cas protein having the nuclease activity is referred to as a "CRISPR-Associated nuclease" or "Cas nuclease," as used interchangeably herein.

In certain embodiments, the Cas nuclease that a complex comprising the targeter nucleic acid and the modulator nucleic acid is capable of activating is a type V-A, type V-C, or type V-D Cas nuclease. In certain embodiments, the Cas nuclease is a type V-A nuclease.

In certain embodiments, the type V-A Cas nucleases comprises Cpf1. Cpf1 proteins are known in the art and are described in U.S. Pat. Nos. 9,790,490 and 10,113,179. Cpf1 orthologs can be found in various bacterial and archaeal genomes. For example, in certain embodiments, the Cpf1 protein is derived from *Francisella novicida* (112 (Fn), *Acidaminococcus* sp. BV 31.6 (As), *Lachnospiraceae bacterium* ND2006 (Lb), *Lachnospiraceae bacterium* MA2020 (Lb2), *Candidatus Methanoplasma termitum* (CMt), *Moraxella bovoculi* 237 (Mb), *Porphyromonas creviorica-nis* (Pc), *Prevotella disiens* (Pd), *Francisella tularensis* 1, *Francisella tularensis* subsp. *novicida*, *Prevotella albensis*, *Lachnospiraceae bacterium* MC2017 1, *Butyrivibrio proteoclasticus*, *Peregrinibacteria bacterium* GW2011_GWA2_33_10, *Parcubacteria bacterium* GW2011_GWC2_44_17, *Smithella* sp. SCADC, *Eubacterium eligens*, *Leptospira inadai*, *Porphyromonas macacae*, *Prevotella bryantii*, *Proteocatella sphenisci*, *Anaerovibrio* sp. RM50, *Moraxella caprae*, *Lachnospiraceae bacterium* COE1, or *Eubacterium* coprostanoligenes.

In certain embodiments, the type V-A Cas nuclease comprises AsCpf1 or a variant thereof. In certain embodiments, the type V-A Cas protein comprises an amino acid sequence at least 30%, at least 40%, at least 50%, at least 60%, at least 70%, at least 75%, at least 80%, at least 85%, at least 90%, at least 91%, at least 92%, at least 93%, at least 94%, at least 95%, at least 96%, at least 97%, at least 98%, or at least 99% identical to the amino acid sequence set forth in SEQ ID NO: 3. In certain embodiments, the type V-A Cas protein comprises the amino acid sequence set forth in SEQ ID NO: 3.

```
AsCpf1
                                           (SEQ ID NO: 3)
MTQFEGFTNLYQVSKTLRFELIPQGKTLKHIQEQGFIEEDKARNDHYKEL

KPIIDRIYKTYADQCLQLVQLDWENLSAAIDSYRKEKTEETRNALIEEQA

TYRNAIHDYFIGRTDNLTDAINKRHAEIYKGLFKAELFNGKVLKQLGTVT

TTEHENALLRSFDKFTTYFSGFYENRKNVFSAEDISTAIPHRIVQDNFPK

FKENCHIFTRLITAVPSLREHFENVKKAIGIFVSTSIEEVFSFPFYNQLL
```
```
-continued
TQTQIDLYNQLLGGISREAGTEKIKGLNEVLNLAIQKNDETAHIIASLPH

RFIPLFKQILSDRNTLSFILEEFKSDEEVIQSFCKYKTLLRNENVLETAE

ALFNELNSIDLTHIFISHKKLETISSALCDHWDTLRNALYERRISELTGK

ITKSAKEKVQRSLKHEDINLQEIISAAGKELSEAFKQKTSEILSHAHAAL

DQPLPTTLKKQEEKEILKSQLDSLLGLYHLLDWFAVDESNEVDPEFSARL

TGIKLEMEPSLSFYNKARNYATKKPYSVEKFKLNFQMPTLASGWDVNKEK

NNGAILFVKNGLYYLGIMPKQKGRYKALSFEPTEKTSEGFDKMYYDYFPD

AAKMIPKCSTQLKAVTAHFQTHTTPILLSNNFIEPLEITKEIYDLNNPEK

EPKKFQTAYAKKTGDQKGYREALCKWIDFTRDFLSKYTKTTSIDLSSLRP

SSQYKDLGEYYAELNPLLYHISFQRIAEKEIMDAVETGKLYLFQIYNKDF

AKGHHGKPNLHTLYWTGLFSPENLAKTSIKLNGQAELFYRPKSRMKRMAH

RLGEKMLNKKLKDQKTPIPDTLYQELYDYVNHRLSHDLSDEARALLPNVI

TKEVSHEIIKDRRFTSDKFFFHVPITLNYQAANSPSKFNQRVNAYLKEHP

ETPIIGIDRGERNLIYITVIDSTGKILEQRSLNTIQQFDYQKKLDNREKE

RVAARQAWSVVGTIKDLKQGYLSQVIHEIVDLMIHYQAVVVLENLNFGFK

SKRTGIAEKAVYQQFEKMLIDKLNCLVLKDYPAEKVGGVLNPYQLTDQFT

SFAKMGTQSGFLFYVPAPYTSKIDPLTGFVDPFVWKTIKNHESRKHFLEG

FDFLHYDVKTGDFILHFKMNRNLSFQRGLPGFMPAWDIVFEKNETQFDAK

GTPFIAGKRIVPVIENHRFTGRYRDLYPANELIALLEEKGIVFRDGSNIL

PKLLENDDSHAIDTMVALIRSVLQMRNSNAATGEDYINSPVRDLNGVCFD

SRFQNPEWPMDADANGAYHIALKGQLLLNHLKESKDLKLQNGISNQDWLA

YIQELRN
```

In certain embodiments, the type V-A Cas nuclease comprises LbCpf1 or a variant thereof. In certain embodiments, the type V-A Cas protein comprises an amino acid sequence at least 30%, at least 40%, at least 50%, at least 60%, at least 70%, at least 75%, at least 80%, at least 85%, at least 90%, at least 91%, at least 92%, at least 93%, at least 94%, at least 95%, at least 96%, at least 97%, at least 98%, or at least 99% identical to the amino acid sequence set forth in SEQ ID NO: 4. In certain embodiments, the type V-A Cas protein comprises the amino acid sequence set forth in SEQ ID NO: 4.

```
LbCpf1
                                           (SEQ ID NO: 4)
MSKLEKFTNCYSLSKTLRFKAIPVGKTQENIDNKRLLVEDEKRAEDYKGV

KKLLDRYYLSFINDVLHSIKLKNLNNYISLFRKKTRTEKENKELENLEIN

LRKEIAKAFKGNEGYKSLFKKDIIETILPEFLDDKDEIALVNSFNGFTTA

FTGFFDNRENMFSEEAKSTSIAFRCINENLTRYISNMDIFEKVDAIFDKH

EVQEIKEKILNSDYDVEDFFEGEFFNFVLTQEGIDVYNAIIGGFVTESGE

KIKGLNEYINLYNQKTKQKLPKFKPLYKQVLSDRESLSFYGEGYTSDEEV

LEVFRNTLNKNSEIFSSIKKLEKLFKNFDEYSSAGIFVKNGPAISTISKD

IFGEWNVIRDKWNAEYDDIHLKKKAVVTEKYEDDRRKSFKKIGSFSLEQL

QEYADADLSVVEKLKEIIIQKVDEIYKVYGSSEKLFDADFVLEKSLKKND

AVVAIMKDLLDSVKSFENYIKAFFGEGKETNRDESFYGDFVLAYDILLKV
```

-continued
DHIYDAIRNYVTQKPYSKDKFKLYFQNPQFMGGWDKDKETDYRATILRYG

SKYYLAIMDKKYAKCLQKIDKDDVNGNYEKINYKLLPGPNKMLPKVFFSK

KWMAYYNPSEDIQKIYKNGTFKKGDMFNLNDCHKLIDFFKDSISRYPKWS

NAYDFNFSETEKYKDIAGFYREVEEQGYKVSFESASKKEVDKLVEEGKLY

MFQIYNKDFSDKSHGTPNLHTMYFKLLFDENNHGQIRLSGGAELFMRRAS

LKKEELVVHPANSPIANKNPDNPKKTTTLSYDVYKDKRFSEDQYELHIPI

AINKCPKNIFKINTEVRVLLKHDDNPYVIGIDRGERNLLYIVVVDGKGNI

VEQYSLNEIINNFNGIRIKTDYHSLLDKKEKERFEARQNWTSIENIKELK

AGYISQVVHKICELVEKYDAVIALEDLNSGFKNSRVKVEKQVYQKFEKML

IDKLNYMVDKKSNPCATGGALKGYQITNKFESFKSMSTQNGFIFYIPAWL

TSKIDPSTGFVNLLKTKYTSIADSKKFISSFDRIMYVPEEDLFEFALDYK

NFSRTDADYIKKWKLYSYGNRIRIFRNPKKNNVFDWEEVCLTSAYKELFN

KYGINYQQGDIRALLCEQSDKAFYSSFMALMSLMLQMRNSITGRTDVDFL

ISPVKNSDGIFYDSRNYEAQENAILPKNADANGAYNIARKVLWAIGQFKK

AEDEKLDKVKIAISNKEWLEYAQTSVKH

In certain embodiments, the type V-A Cas nuclease comprises FnCpf1 or a variant thereof. In certain embodiments, the type V-A Cas protein comprises an amino acid sequence at least 30%, at least 40%, at least 50%, at least 60%, at least 70%, at least 75%, at least 80%, at least 85%, at least 90%, at least 91%, at least 92%, at least 93%, at least 94%, at least 95%, at least 96%, at least 97%, at least 98%, or at least 99% identical to the amino acid sequence set forth in SEQ ID NO: 5. In certain embodiments, the type V-A Cas protein comprises the amino acid sequence set forth in SEQ ID NO: 5.

FnCpf1
(SEQ ID NO: 5)
MSIYQEFVNKYSLSKTLRFELIPQGKTLENIKARGLILDDEKRAKDYKKA

KQIIDKYHQFFIEEILSSVCISEDLLQNYSDVYFKLKKSDDDNLQKDFKS

AKDTIKKQISEYIKDSEKFKNLFNQNLIDAKKGQESDLILWLKQSKDNGI

ELFKANSDITDIDEALEIIKSFKGWTTYFKGFHENRKNVYSSNDIPTSII

YRIVDDNLPKFLENKAKYESLKDKAPEAINYEQIKKDLAEELTFDIDYKT

SEVNQRVFSLDEVFEIANFNNYLNQSGITKFNTIIGGKFVNGENTKRKGI

NEYINLYSQQINDKTLKKYKMSVLFKQILSDTESKSFVIDKLEDDSDVVT

TMQSFYEQIAAFKTVEEKSIKETLSLLFDDLKAQKLDLSKIYFKNDKSLT

DLSQQVFDDYSVIGTAVLEYITQQIAPKNLDNPSKKEQELIAKKTEKAKY

LSLETIKLALEEFNKHRDIDKQCRFEEILANFAAIPMIFDEIAQNKDNLA

QISIKYQNQGKKDLLQASAEDDVKAIKDLLDQTNNLLHKLKIFHISQSED

KANILDKDEHFYLVFEECYFELANIVPLYNKIRNYITQKPYSDEKFKLNF

ENSTLANGWDKNKEPDNTAILFIKDDKYYLGVMNKKNNKIFDDKAIKENK

GEGYKKIVYKLLPGANKMLPKVFFSAKSIKEYNPSEDILRIRNHSTHTKN

GSPQKGYEKFEENIEDCRKFIDEYKQSISKHPEWKDFGFRFSDTQRYNSI

DEFYREVENQGYKLTFENISESYIDSVVNQGKLYLFQIYNKDFSAYSKGR

PNLHTLYWKALFDERNLQDVVYKLNGEAELFYRKQSIPKKITHPAKEAIA

-continued
NKNKDNPKKESVFEYDLIKDKRFTEDKFFFHCPITINFKSSGANKFNDEI

NLLLKEKANDVHILSIDRGERHLAYYTLVDGKGNIIKQDTFNIIGNDRMK

TNYHDKLAAIEKDRDSARKDWKKINNIKEMKEGYLSQVVHEIAKLVIEYN

AIVVFEDLNFGFKRGRFKVEKQVYQKLEKMLIEKLNYLVFKDNEFDKTGG

VLRAYQLTAPFETFKKMGKQTGIIYYVPAGFTSKICPVTGFVNQLYPKYE

SVSKSQEFFSKFDKICYNLDKGYFEFSEDYKNEGDKAAKGKWTIASFGSR

LINFRNSDKNHNWDTREVYPTKELEKLLKDYSIEYGHGECIKAAICGESD

KKFFAKLTSVLNTILQMRNSKTGTELDYLISPVADVNGNFFDSRQAPKNM

PQDADANGAYHIGLKGLMLLGRIKNNQEGKKLNLVIKNEEYFEFVQNRNN

In certain embodiments, the type V-A Cas nuclease comprises *Prevotella bryantii* Cpf1 or a variant thereof. In certain embodiments, the type V-A Cas protein comprises an amino acid sequence at least 30%, at least 40%, at least 50%, at least 60%, at least 70%, at least 75%, at least 80%, at least 85%, at least 90%, at least 91%, at least 92%, at least 93%, at least 94%, at least 95%, at least 96%, at least 97%, at least 98%, or at least 99% identical to the amino acid sequence set forth in SEQ ID NO: 6. In certain embodiments, the type V-A Cas protein comprises the amino acid sequence set forth in SEQ ID NO: 6.

*Prevotella bryantii* Cpf1
(SEQ ID NO: 6)
MQINNLKIIYMKFTDFTGLYSLSKTLRFELKPIGKTLENIKKAGLLEQDQ

HRADSYKKVKKIIDEYHKAFIEKSLSNFELKYQSEDKLDSLEEYLMYYSM

KRIEKTEKDKFAKIQDNLRKQIADHLKGDESYKTIFSKDLIRKNLPDFVK

SDEERTLIKEFKDFTTYFKGFYENRENMYSAEDKSTAISHRIIHENLP

KFVDNINAFSKIILIPELREKLNQIYQDFEEYLNVESIDEIFHLDYFSMV

MTQKQIEVYNAIIGGKSTNDKKIQGLNEYINLYNQKHKDCKLPKLKLLFK

QILSDRIAISWLPDNFKDDQEALDSIDTCYKNLLNDGNVLGEGNLKLLLE

NIDTYNLKGIFIRNDLQLTDISQKMYASWNVIQDAVILDLKKQVSRKKKE

SAEDYNDRLKKLYTSQESFSIQYLNDCLRAYGKTENIQDYFAKLGAVNNE

HEQTINLFAQVRNAYTSVQAILTTPYPENANLAQDKETVALIKNLLDSLK

RLQRFIKPLLGKGDESDKDERFYGDFTPLWETLNQITPLYNMVRNYMTRK

PYSQEKIKLNFENSTLLGGWDLNKEHDNTAIILRKNGLYYLAIMKKSANK

IFDKDKLDNSGDCYEKMVYKLLPGANKMLPKVFFSKSRIDEFKPSENIIE

NYKKGTHKKGANFNLADCHNLIDFFKSSISKHEDWSKFNFHFSDTSSYED

LSDFYREVEQQGYSISFCDVSVEYINKMVEKGDLYLFQIYNKDFSEFSKG

TPNMHTLYWNSLFSKENLNNIIYKLNGQAEIFFRKKSLNYKRPTHPAHQA

IKNKNKCNEKKESIFDYDLVKDKRYTVDKFQFHVPITMNFKSTGNTNINQ

QVIDYLRTEDDTHIIGIDRGERHLLYLVVIDSHGKIVEQFTLNEIVNEYG

GNIYRTNYHDLLDTREQNREKARESWQTIENIKELKEGYISQVIHKITDL

MQKYHAVVVLEDLNMGFMRGRQKVEKQVYQKFEEMLINKLNYLVNKKADQ

NSAGGLLHAYQLTSKFESFQKLGKQSGFLFYIPAWNTSKIDPVTGFVNLF

DTRYESIDKAKAFFGKFDSIRYNADKDWFEFAFDYNNFTTKAEGTRTNWT

ICTYGSRIRTFRNQAKNSQWDNEEIDLTKAYKAFFAKHGINIYDNIKEAI

-continued

AMETEKSFFEDLLHLLKLTLQMRNSITGTTTDYLISPVHDSKGNFYDSRI

CDNSLPANADANGAYNIARKGLMLIQQIKDSTSSNRFKFSPITNKDWLIF

AQEKPYLND

In certain embodiments, the type V-A Cas nuclease comprises *Proteocatella sphenisci* Cpf1 or a variant thereof. In certain embodiments, the type V-A Cas protein comprises an amino acid sequence at least 30%, at least 40%, at least 50%, at least 60%, at least 70%, at least 75%, at least 80%, at least 85%, at least 90%, at least 91%, at least 92%, at least 93%, at least 94%, at least 95%, at least 96%, at least 97%, at least 98%, or at least 99% identical to the amino acid sequence set forth in SEQ ID NO: 7. In certain embodiments, the type V-A Cas protein comprises the amino acid sequence set forth in SEQ ID NO: 7.

*Proteocatella sphenisci* Cpf1
(SEQ ID NO: 7)
MENFKNLYPINKTLRFELRPYGKTLENFKKSGLLEKDAFKANSRRSMQAI

IDEKFKETIEERLKYTEFSECDLGNMTSKDKKITDKAATNLKKQVILSFD

DEIFNNYLKPDKNIDALFKNDPSNPVISTFKGFTTYFVNFFEIRKHIFKG

ESSGSMAYRIIDENLTTYLNNIEKIKKLPEELKSQLEGIDQIDKLNNYNE

FITQSGITHYNEIIGGISKSENVKIQGINEGINLYCQKNKVKLPRLTPLY

KMILSDRVSNSFVLDTIENDTELIEMISDLINKTEISQDVIMSDIQNI

FIKYKQLGNLPGISYSSIVNAICSDYDNNFGDGKRKKSYENDRKKHLETN

VYSINYISELLTDTDVSSNIKMRYKELEQNYQVCKENFNATNWMNIKNIK

QSEKTNLIKDLLDILKSIQRFYDLFDIVDEDKNPSAEFYTWLSKNAEKLD

FEFNSVYNKSRNYLTRKQYSDKKIKLNFDSPTLAKGWDANKEIDNSTIIM

RKFNNDRGDYDYFLGIWNKSTPANEKIIPLEDNGLFEKMQYKLYPDPSKM

LPKQFLSKIWKAKHPTTPEFDKKYKEGREIKKGPDFEKEFLHELIDCFKH

GLVNHDEKYQDVFGFNLRNTEDYNSYTEFLEDVERCNYNLSFNKIADTSN

LINDGKLYVFQIWSKDFSIDSKGTKNLNTIYFESLFSEENMIEKMFKL

SGEAEIFYRPASLNYCEDIIKKGHHHAELKDKFDYPIIKDKRYSQDKFFF

HVPMVINYKSEKLNSKSLNNRTNENLGQFTHIIGIDRGERHLIYLTVVDV

STGEIVEQKHLDEIINTDTKGVEHKTHYLNKLEEKSKTRDNERKSWEAIE

TIKELKEGYISHVINEIQKLQEKYNALIVMENLNYGFKNSRIKVEKQVYQ

KFETALIKKFNYIIDKKDPETYIHGYQLTNPITTLDKIGNQSGIVLYIPA

WNTSKIDPVTGFVNLLYADDLKYKNQEQAKSFIQKIDNIYFENGEFKFDI

DFSKWNNRYSISKTKWTLTSYGTRIQTFRNPQKNNKWDSAEYDLTEEFKL

ILNIDGTLKSQDVETYKKFMSLFKLMLQLRNSVTGTDIDYMISPVTDKTG

THFDSRENIKNLPADADANGAYNIARKGIMAIENIMNGISDPLKISNE

DYLKYIQNQQE

In certain embodiments, the type V-A Cas nuclease comprises *Anaerovibrio* sp. RM50 Cpf1 or a variant thereof. In certain embodiments, the type V-A Cas protein comprises an amino acid sequence at least 30%, at least 40%, at least 50%, at least 60%, at least 70%, at least 75%, at least 80%, at least 85%, at least 90%, at least 91%, at least 92%, at least 93%, at least 94%, at least 95%, at least 96%, at least 97%, at least 98%, or at least 99% identical to the amino acid sequence set forth in SEQ ID NO: 8. In certain embodiments, the type V-A Cas protein comprises the amino acid sequence set forth in SEQ ID NO: 8.

*Anaerovibrio* sp. RM50 Cpf1
(SEQ ID NO: 8)
MVAFIDEFVGQYPVSKTLRFEARPVPETKKWLESDQCSVLFNDQKRNEYY

GVLKELLDDYYRAYIEDALTSFTLDKALLENAYDLYCNRDTNAFSSCCEK

LRKDLVKAFGNLKDYLLGSDQLKDLVKLKAKVDAPAGKGKKKIEVDSRLI

NWLNNNAKYSAEDREKYIKAIESFEGFVTYLTNYKQARENIVIFSSEDKS

TAIAFRVIDQNMVTYFGNIRIYEKIKAKYPELYSALKGFEKFFSPTAYSE

ILSQSKIDEYNYQCIGRPIDDADFKGVNSLINEYRQKNGIKARELPVMSM

LYKQILSDRDNSFMSEVINRNEEAIECAKNGYKVSYALFNELLQLYKKIF

TEDNYGNIYVKTQPLTELSQALFGDWSILRNALDNGKYDKDIINLAELEK

YFSEYCKVLDADDAAKIQDKFNLKDYFIQKNALDATLPDLDKITQYKPHL

DAMLQAIRKYKLFSMYNGRKKMDVPENGIDFSNEFNAIYDKLSEFSILYD

RIRNFATKKPYSDEKMKLSFNMPTMLAGWDYNNETANGCFLFIKDGKYFL

GVADSKSKNIFDFKKNPHLLDKYSSKDIYYKVKYKQVSGSAKMLPKVVFA

GSNEKIFGHLISKRILEIREKKLYTAAAGDRKAVAEWIDFMKSAIAIHPE

WNEYFKFKFKNTAEYDNANKFYEDIDKQTYSLEKVEIPTEYIDEMVSQHK

LYLFQLYTKDFSDKKKKKGTDNLHTMYWHGVFSDENLKAVTEGTQPIIKL

NGEAEMFMRNPSIEFQVTHEHNKPIANKNPLNTKKESVFNYDLIKDKRYT

ERKFYFHCPITLNFRADKPIKYNEKINRFVENNPDVCIIGIDRGERHLLY

YTVINQTGDILEQGSLNKISGSYTNDKGEKVNKETDYHDLLDRKEKGKHV

AQQAWETIENIKELKAGYLSQVVYKLTQLMLQYNAVIVLENLNVGFKRGR

TKVEKQVYQKFEKAMIDKLNYLVFKDRGYEMNGSYAKGLQLTDKFESFDK

IGKQTGCIYYVIPSYTSHIDPKTGFVNLLNAKLRYENITKAQDTIRKFDS

ISYNAKADYFEFAFDYRSFGVDMARNEWVVCTCGDLRWEYSAKTRETKAY

SVTDRLKELFKAHGIDYVGGENLVSHITEVADKHFLSTLLFYLRLVLKMR

YTVSGTENENDFILSPVEYAPGKFFDSREATSTEPMNADANGAYHIALKG

LMTIRGIEDGKLHNYGKGGENAAWFKFMQNQEYKNNG

In certain embodiments, the type V-A Cas nuclease comprises *Moraxella caprae* Cpf1 or a variant thereof. In certain embodiments, the type V-A Cas protein comprises an amino acid sequence at least 30%, at least 40%, at least 50%, at least 60%, at least 70%, at least 75%, at least 80%, at least 85%, at least 90%, at least 91%, at least 92%, at least 93%, at least 94%, at least 95%, at least 96%, at least 97%, at least 98%, or at least 99% identical to the amino acid sequence set forth in SEQ ID NO: 9. In certain embodiments, the type V-A Cas protein comprises the amino acid sequence set forth in SEQ ID NO: 9.

*Moraxella caprae* Cpf1
(SEQ ID NO: 9)
MLFQDFTHLYPLSKTMRFELKPIGKTLEHIHAKNFLSQDETMADMYQKVK

AILDDYHRDFIADMMGEVKLTKLAEFYDVYLKFRKNPKDDGLQKQLKDLQ

AVLRKEIVKPIGNGGKYKAGYDRLFGAKLFKDGKELGDLAKFVIAQEGES

-continued

```
SPKLAHLAHFEKFSTYFTGFHDNRKNMYSDEDKHTAITYRLIHENLPRFI

DNLQILATIKQKHSALYDQIINELTASGLDVSLASHLDGYHKLLTQEGIT

AYNTLLGGISGEAGSRKIQGINELINSHHNQHCHKSERIAKLRPLHKQIL

SDGMGVSFLPSKFADDSEMCQAVNEFYRHYADVFAKVQSLFDGFDDHQKD

GIYVEHKNLNELSKQAFGDFALLGRVLDGYYVDVVNPEFNERFAKAKTDN

AKAKLTKEKDKFIKGVHSLASLEQAIEHYTARHDDESVQAGKLGQYFKHG

LAGVDNPIQKIHNNHSTIKGFLERERPAGERALPKIKSGKNPEMTQLRQL

KELLDNALNVAHFAKLLTTKTTLDNQDGNFYGEFGALYDELAKIPTLYNK

VRDYLSQKPFSTEKYKLNFGNPTLLNGWDLNKEKDNFGIILQKDGCYYLA

LLDKAHKKVFDNAPNTGKNVYQKMIYKLLPGPNKMLPKVFFAKSNLDYYN

PSAELLDKYAQGTHKKGNNFNLKDCHALIDFFKAGINKHPEWQHFGFKFS

PTSSYQDLSDFYREVEPQGYQVKFVDINADYINELVEQGQLYLFQIYNKD

FSPKAHGKPNLHTLYFKALFSKDNLANPIYKLNGEAQIFYRKASLDMNET

TIHRAGEVLENKNPDNPKKRQFVYDIIKDKRYTQDKFMLHVPITMNFGVQ

GMTIKEFNKKVNQSIQQYDEVNVIGIDRGERHLLYLTVINSKGEILEQRS

LNDITTASANGTQMTTPYHKILDKREIERLNARVGWGEIETIKELKSGYL

SHVVHQISQLMLKYNAIVVLEDLNFGFKRGRFKVEKQIYQNFENALIKKL

NHLVLKDEADDEIGSYKNALQLTNNFTDLKSIGKQTGFLFYVPAWNTSKI

DPETGFVDLLKPRYENIAQSQAFFGKFDKICYNADKDYFEFHIDYAKFTD

KAKNSRQIWKICSHGDKRYVYDKTANQNKGATKGINVNDELKSLFARHHI

NDKQPNLVMDICQNNDKEFHKSLIYLLKTLLALRYSNASSDEDFILSPVA

NDEGMFFNSALADDTQPQNADANGAYHIALKGLWVLEQIKNSDDLNKVKL

AIDNQTWLNFAQNR
```

In certain embodiments, the type V-A Cas nuclease comprises *Lachnospiraceae bacterium* COE1 Cpf1 or a variant thereof. In certain embodiments, the type V-A Cas protein comprises an amino acid sequence at least 30%, at least 40%, at least 50%, at least 60%, at least 70%, at least 75%, at least 80%, at least 85%, at least 90%, at least 91%, at least 92%, at least 93%, at least 94%, at least 95%, at least 96%, at least 97%, at least 98%, or at least 99% identical to the amino acid sequence set forth in SEQ ID NO: 10. In certain embodiments, the type V-A Cas protein comprises the amino acid sequence set forth in SEQ ID NO: 10.

```
Lachnospiraceae bacterium COE1 Cpf1
                                       (SEQ ID NO: 10)
MHENNGKIADNFIGIYPVSKTLRFELKPVGKTQEYIEKHGILDEDLKRAG

DYKSVKKIIDAYHKYFIDEALNGIQLDGLKNYYELYEKKRDNNEEKEFQK

IQMSLRKQIVKRFSEHPQYKYLFKKELIKNVLPEFTKDNAEEQTLVKSFQ

EFTTYFEGFHQNRKNMYSDEEKSTAIAYRVVHQNLPKYIDNMRIFSMILN

TDIRSDLTELFNNLKTKMDITIVEEYFAIDGFNKVVNQKGIDVYNTILGA

FSTDDNTKIKGLNEYINLYNQKNKAKLPKLKPLFKQILSDRDKISFIPEQ

FDSDTEVLEAVDMFYNRLLQFVIENEGQITISKLLTNFSAYDLNKIYVKN

DTTISAISNDLFDDWSYISKAVRENYDSENVDKNKRAAAYEEKKEKALSK

IKMYSIEELNFFVKKYSCNECHIEGYFERRILEILDKMRYAYESCKILHD

KGLINNISLCQDRQAISELKDFLDSIKEVQWLLKPLMIGQEQADKEEAFY

TELLRIWEELEPITLLYNKVRNYVTKKPYTLEKVKLNFYKSTLLDGWDKN

KEKDNLGIILLKDGQYYLGIMNRRNNKIADDAPLAKTDNVYRKMEYKLLT

KVSANLPRIFLKDKYNPSEEMLEKYEKGTHLKGENFCIDDCRELIDFFKK

GIKQYEDWGQFDFKFSDTESYDDISAFYKEVEHQGYKITFRDIDETYIDS

LVNEGKLYLFQIYNKDFSPYSKGTKNLHTLYWEMLFSQQNLQNIVYKLNG

NAEIFYRKASINQKDVVVHKADLPIKNKDPQNSKKESMFDYDIIKDKRFT

CDKYQFHVPITMNFKALGENHFNRKVNRLIHDAENMHIIGIDRGERNLIY

LCMIDMKGNIVKQISLNEIISYDKNKLEHKRNYHQLLKTREDENKSARQS

WQTIHTIKELKEGYLSQVIHVITDLMVEYNAIVVLEDLNFGFKQGRQKFE

RQVYQKFEKMLIDKLNYLVDKSKGMDEDGGLLHAYQLTDEFKSFKQLGKQ

SGFLYYIPAWNTSKLDPTTGFVNLFYTKYESVEKSKEFINNFTSILYNQE

REYFEFLFDYSAFTSKAEGSRLKWTVCSKGERVETYRNPKKNNEWDTQKI

DLTFELKKLFNDYSISLLDGDLREQMGKIDKADFYKKFMKLFALIVQMRN

SDEREDKLISPVLNKYGAFFETGKNERMPLDADANGAYNIARKGLWIIEK

IKNTDVEQLDKVKLTISNKEWLQYAQEHIL
```

In certain embodiments, the type V-A Cas nuclease comprises *Eubacterium coprostanoligenes* Cpf1 or a variant thereof. In certain embodiments, the type V-A Cas protein comprises an amino acid sequence at least 30%, at least 40%, at least 50%, at least 60%, at least 70%, at least 75%, at least 80%, at least 85%, at least 90%, at least 91%, at least 92%, at least 93%, at least 94%, at least 95%, at least 96%, at least 97%, at least 98%, or at least 99% identical to the amino acid sequence set forth in SEQ ID NO: 11. In certain embodiments, the type V-A Cas protein comprises the amino acid sequence set forth in SEQ ID NO: 11.

```
Eubacterium coprostanoligenes Cpf1
                                       (SEQ ID NO: 11)
MDFFKNDMYFLCINGIIVISKLFAYLFLMYKRGVVMIKDNFVNVYSLSKT

IRMALIPWGKTEDNFYKKFLLEEDEERAKNYIKVKGYMDEYHKNFIESAL

NSVVLNGVDEYCELYFKQNKSDSEVKKIESLEASMRKQISKAMKEYTVDG

VKIYPLLSKKEFIRELLPEFLTQDEEIETLEQFNDFSTYFQGFWENRKNI

YTDEEKSTGVPYRCINDNLPKFLDNVKSFEKVILALPQKAVDELNANFNG

VYNVDVQDVFSVDYFNFVLSQSGIEKYNNIIGGYSNSDASKVQGLNEKIN

LYNQQIAKSDKSKKLPLLKPLYKQILSDRSSLSFIPEKFKDDNEVLNSIN

VLYDNIAESLEKANDLMSDIANYNTDNIFISSGVAVTDISKKVFGDWSLI

RNNWNDEYESTHKKGKNEEKFYEKEDKEFKKIKSFSVSELQRLANSDLSI

VDYLVDESASLYADIKTAYNNAKDLLSNEYSHSKRLSKNDDAIELIKSFL

DSIKNYEAFLKPLCGTGKEESKDNAFYGAFLECFEEIRQVDAVYNKVRNH

ITQKPYSNDKIKLNFQNPQFLAGWDKNKERAYRSVLLRNGEKYYLAIMEK

GKSKLFEDFPEDESSPFEKIDYKLLPEPSKMLPKVFFATSNKDLFNPSDE

ILNIRATGSFKKGDSFNLDDCHKFIDFYKASIENHPDWSKFDFDFSETND

YEDISKFFKEVSDQGYSIGYRKISESYLEEMVDNGSLYMFQLYNKDFSEN
```

```
RKSKGTPNLHTLYFKMLFDERNLEDVVYKLSGGAEMFYRKPSIDKNEMIV

HPKNQPIDNKNPNNVKKTSTFEYDIVKDMRYTKPQFQLHLPIVLNFKANS

KGYINDDVRNVLKNSEDTYVIGIDRGERNLVYACVVDGNGKLVEQVPLNV

IEADNGYKTDYHKLLNDREEKRNEARKSWKTIGNIKELKEGYISQVVHKI

CQLVVKYDAVIAMEDLNSGFVNSRKKVEKQVYQKFERMLTQKLNYLVDKK

LDPNEMGGLLNAYQLTNEATKVRNGRQDGIIFYIPAWLTSKIDPTTGFVN

LLKPKYNSVSASKEFFSKFDEIRYNEKENYFEFSFNYDNFPKCNADFKRE

WTVCTYGDRIRTFRDPENNNKFNSEVVVLNDEFKNLFVEFDIDYTDNLKE

QILAMDEKSFYKKLMGLLSLTLQMRNSISKNVDVDYLISPVKNSNGEFYD

SRNYDITSSLPCDADSNGAYNIARKGLWAINQIKQADDETKANISIKNSE

WLQYAQNCDEV
```

In certain embodiments, the type V-A Cas nuclease is not Cpf1. In certain embodiments, the type V-A Cas nuclease is not AsCpf1.

In certain embodiments, the type V-A Cas nuclease comprises MAD1, MAD2, MAD3, MAD4, MAD5, MAD6, MAD7, MAD8, MAD9, MAD10, MAD11, MAD12, MAD13, MAD14, MAD15, MAD16, MAD17, MAD18, MAD19, or MAD20, or variants thereof. MAD1-MAD20 are known in the art and are described in U.S. Pat. No. 9,982,279.

In certain embodiments, the type V-A Cas nuclease comprises MAD7 or a variant thereof. In certain embodiments, the type V-A Cas protein comprises an amino acid sequence at least 30%, at least 40%, at least 50%, at least 60%, at least 70%, at least 75%, at least 80%, at least 85%, at least 90%, at least 91%, at least 92%, at least 93%, at least 94%, at least 95%, at least 96%, at least 97%, at least 98%, or at least 99% identical to the amino acid sequence set forth in SEQ ID NO: 1. In certain embodiments, the type V-A Cas protein comprises the amino acid sequence set forth in SEQ ID NO: 1.

```
MAD7
                                          (SEQ ID NO: 1)
MNNGTNNFQNFIGISSLQKTLRNALIPTETTQQFIVKNGIIKEDELRGE

NRQILKDIMDDYYRGFISETLSSIDDIDWTSLFEKMEIQLKNGDNKDTL

IKEQTEYRKAIHKKFANDDRFKNMFSAKLISDILPEFVIHNNNYSASEK

EEKTQVIKLFSRFATSFKDYFKNRANCFSADDISSSSCHRIVNDNAEIF

FSNALVYRRIVKSLSNDDINKISGDMKDSLKEMSLEEIYSYEKYGEFIT

QEGISFYNDICGKVNSFMNLYCQKNKENKNLYKLQKLHKQILCIADTSY

EVPYKFESDEEVYQSVNGFLDNISSKHIVERLRKIGDNYNGYNLDKIYI

VSKFYESVSQKTYRDWETINTALEIHYNNILPGNGKSKADKVKKAVKND

LQKSITEINELVSNYKLCSDDNIKAETYIHEISHILNNFEAQELKYNPE

IHLVESELKASELKNVLDVIMNAFHWCSVFMTEELVDKDNNFYAELEEI

YDEIYPVISLYNLVRNYVTQKPYSTKKIKLNFGIPTLADGWSKSKEYSN

NAIILMRDNLYYLGIFNAKNKPDKKIIEGNTSENKGDYKKMIYNLLPGP

NKMIPKVFLSSKTGVETYKPSAYILEGYKQNKHIKSSKDFDITFCHDLI

DYFKNCIAIHPEWKNFGFDFSDTSTYEDISGFYREVELQGYKIDWTYIS
```

```
EKDIDLLQEKGQLYLFQIYNKDFSKKSTGNDNLHTMYLKNLFSEENLKD

IVLKLNGEAEIFFRKSSIKNPIIHKKGSILVNRTYEAEEKDQFGNIQIV

RKNIPENIYQELYKYFNDKSDKELSDEAAKLKNVVGHHEAATNIVKDYR

YTYDKYFLHMPITINFKANKTGFINDRILQYIAKEKDLHVIGIDRGERN

LIYVSVIDTCGNIVEQKSFNIVNGYDYQIKLKQQEGARQIARKEWKEIG

KIKEIKEGYLSLVIHEISKMVIKYNAIIAMEDLSYGFKKGRFKVERQVY

QKFETMLINKLNYLVFKDISITENGGLLKGYQLTYIPDKLKNVGHQCGC

IFYVPAAYTSKIDPTTGFVNIFKFKDLTVDAKREFIKKFDSIRYDSEKN

LFCFTFDYNNFITQNTVMSKSSWSVYTYGVRIKRRFVNGRFSNESDTID

ITKDMEKTLEMTDINWRDGHDLRQDIIDYEIVQHIFEIFRLTVQMRNSL

SELEDRDYDRLISPVLNENNIFYDSAKAGDALPKDADANGAYCIALKGL

YEIKQITENWKEDGKFSRDKLKISNKDWFDFIQNKRYL
```

In certain embodiments, the type V-A Cas nuclease comprises MAD2 or a variant thereof. In certain embodiments, the type V-A Cas protein comprises an amino acid sequence at least 30%, at least 40%, at least 50%, at least 60%, at least 70%, at least 75%, at least 80%, at least 85%, at least 90%, at least 91%, at least 92%, at least 93%, at least 94%, at least 95%, at least 96%, at least 97%, at least 98%, or at least 99% identical to the amino acid sequence set forth in SEQ ID NO: 2. In certain embodiments, the type V-A Cas protein comprises the amino acid sequence set forth in SEQ ID NO: 2.

```
MAD2
                                          (SEQ ID NO: 2)
MSSLTKFTNKYSKQLTIKNELIPVGKTLENIKENGLIDGDEQLNENYQKA

KIIVDDFLRDFINKALNNTQIGNWRELADALNKEDEDNIEKLQDKIRGII

VSKFETFDLFSSYSIKKDEKIIDDDNDVEEEELDLGKKTSSFKYIFKKNL

FKLVLPSYLKTTNQDKLKIISSFDNFSTYFRGFFENRKNIFTKKPISTSI

AYRIVHDNFPKFLDNIRCFNVWQTECPQLIVKADNYLKSKNVIAKDKSLA

NYFTVGAYDYFLSQNGIDFYNNIIGGLPAFAGHEKIQGLNEFINQECQKD

SELKSKLKNRHAFKMAVLFKQILSDREKSFVIDEFESDAQVIDAVKNFYA

EQCKDNNVIFNLLNLIKNIAFLSDDELDGIFIEGKYLSSVSQKLYSDWSK

LRNDIEDSANSKQGNKELAKKIKTNKGDVEKAISKYEFSLSELNSIVHDN

TKFSDLLSCTLHKVASEKLVKVNEGDWPKHLKNNEEKQKIKEPLDALLEI

YNTLLIFNCKSFNKNGNFYVDYDRCINELSSVVYLYNKTRNYCTKKPYNT

DKFKLNFNSPQLGEGFSKSKENDCLTLLFKKDDNYYVGIIRKGAKINFDD

TQAIADNTDNCIFKMNYFLLKDAKKFIPKCSIQLKEVKAHFKKSEDDYIL

SDKEKFASPLVIKKSTFLLATAHVKGKKGNIKKFQKEYSKENPTEYRNSL

NEWIAFCKEFLKTYKAATIFDITTLKKAEEYADIVEFYKDVDNLCYKLEF

CPIKTSFIENLIDNGDLYLFRINNKDFSSKSTGTKNLHTLYLQAIFDERN

LNNPTIMLNGGAELFYRKESIEQKNRITHKAGSILVNKVCKDGTSLDDKI

RNEIYQYENKFIDTLSDEAKKVLPNVIKKEATHDITKDKRFTSDKFFFHC

PLTINYKEGDTKQFNNEVLSFLRGNPDINIIGIDRGERNLIYVTVINQKG

EILDSVSFNTVTNKSSKIEQTVDYEEKLAVREKERIEAKRSWDSISKIAT
```

-continued
LKEGYLSAIVHEICLLMIKHNAIVVLENLNAGFKRIRGGLSEKSVYQKFE
KMLINKLNYFVSKKESDWNKPSGLLNGLQLSDQFESFEKLGIQSGFIFYV
PAAYTSKIDPTTGFANVLNLSKVRNVDAIKSFFSNFNEISYSKKEALFKF
SFDLDSLSKKGFSSFVKFSKSKWNVYTFGERIIKPKNKQGYREDKRINLT
FEMKKLLNEYKVSFDLENNLIPNLTSANLKDTFWKELFFIFKTTLQLRNS
VTNGKEDVLISPVKNAKGEFFVSGTHNKTLPQDCDANGAYHIALKGLMIL
ERNNLVREEKDTKKIMAISNVDWFEYVQKRRGVL In certain embodiments, the type V-A Cas nucleases comprises Csm1. Csm1 proteins are known in the art and are described in U.S. Pat. No. 9,896,696. Csm1 orthologs can be found in various bacterial and archaeal genomes. For example, in certain embodiments, the Csm1 protein is derived from *Smithella* sp. SCADC (Sm), *Sulfuricurvum* sp. (Ss), or *Microgenomates* (*Roizmanbacteria*) *bacterium* (Mb).

In certain embodiments, the type V-A Cas nuclease comprises SmCsm1 or a variant thereof. In certain embodiments, the type V-A Cas protein comprises an amino acid sequence at least 30%, at least 40%, at least 50%, at least 60%, at least 70%, at least 75%, at least 80%, at least 85%, at least 90%, at least 91%, at least 92%, at least 93%, at least 94%, at least 95%, at least 96%, at least 97%, at least 98%, or at least 99% identical to the amino acid sequence set forth in SEQ ID NO: 12. In certain embodiments, the type V-A Cas protein comprises the amino acid sequence set forth in SEQ ID NO: 12.

*Smithella* sp. SCADC Csm1
(SEQ ID NO: 12)
MEKYKITKTIRFKLLPDKIQDISRQVAVLQNSTNAEKKNNLLRLVQRGQE
LPKLLNEYIRYSDNHKLKSNVTVHFRWLRLFTKDLFYNWKKDNTEKKIKI
SDVVYLSHVFEAFLKEWESTIERVNADCNKPEESKTRDAEIALSIRKLGI
KHQLPFIKGFVDNSNDKNSEDTKSKLTALLSEFEAVLKICEQNYLPSQSS
GIAIAKASFNYYTINKKQKDFEAEIVALKKQLHARYGNKKYDQLLRELNL
IPLKELPLKELPLIEFYSEIKKRKSTKKSEFLEAVSNGLVFDDLKSKFPL
FQTESNKYDEYLKLSNKITQKSTAKSLLSKDSPEAQKLQTEITKLKKNRG
EYFKKAFGKYVQLCELYKEIAGKRGKLKGQIKGIENERIDSQRLQYWALV
LEDNLKHSLILIPKEKTNELYRKVWGAKDDGASSSSSSTLYYFESMTYRA
LRKLCFGINGNTFLPEIQKELPQYNQKEFGEFCFHKSNDDKEIDEPKLIS
FYQSVLKTDFVKNTLALPQSVFNEVAIQSFETRQDFQIALEKCCYAKKQI
ISESLKKEILENYNTQIFKITSLDLQRSEQKNLKGHTRIWNRFWTKQNEE
INYNLRLNPEIAIVWRKAKKTRIEKYGERSVLYEPEKRNRYLHEQYTLCT
TVTDNALNNEITFAFEDTKKKGTEIVKYNEKINQTLKKEFNKNQLWFYGI
DAGEIELATLALMNKDKEPQLFTVYELKKLDFFKHGYIYNKERELVIREK
PYKAIQNLSYFLNEELYEKTFRDGKFNETYNELFKEKHVSAIDLTTAKVI
NGKIILNGDMITFLNLRILHAQRKIYEELIENPHAELKEKDYKLYFEIEG
KDKDIYISRLDFEYIKPYQEISNYLFAYFASQQINEAREEEQINQTKRAL
AGNMIGVIYYLYQKYRGIISIEDLKQTKVESDRNKFEGNIERPLEWALYR
KFQQEGYVPPISELIKLRELEKFPLKDVKQPKYENIQQFGIIKFVSPEET
STTCPKCLRRFKDYDKNKQEGFCKCQCGFDTRNDLKGFEGLNDPDKVAAF
NIAKRGFEDLQKYK In certain embodiments, the type V-A Cas nuclease comprises SsCsm1 or a variant thereof. In certain embodiments, the type V-A Cas protein comprises an amino acid sequence at least 30%, at least 40%, at least 50%, at least 60%, at least 70%, at least 75%, at least 80%, at least 85%, at least 90%, at least 91%, at least 92%, at least 93%, at least 94%, at least 95%, at least 96%, at least 97%, at least 98%, or at least 99% identical to the amino acid sequence set forth in SEQ ID NO: 13. In certain embodiments, the type V-A Cas protein comprises the amino acid sequence set forth in SEQ ID NO: 13.

*Sulfuricurvum* sp. Csm1
(SEQ ID NO: 13)
MLHAFTNQYQLSKTLRFGATLKEDEKKCKSHEELKGFVDISYENMKSSAT
IAESLNENELVKKCERCYSEIVKFHNAWEKIYYRTDQIAVYKDFYRQLSR
KARFDAGKQNSQLITLASLCGMYQGAKLSRYITNYWKDNITRQKSFLKDF
SQQLHQYTRALEKSDKAHTKPNLINFNKTFMVLANLVNEIVIPLSNGAIS
FPNISKLEDGEESHLIEFALNDYSQLSELIGELKDAIATNGGYTPFAKVT
LNHYTAEQKPHVFKNDIDAKIRELKLIGLVETLKGKSSEQIEEYFSNLDK
FSTYNDRNQSVIVRTQCFKYKPIPFLVKHQLAKYISEPNGWDEDAVAKVL
DAVGAIRSPAHDYANNQEGFDLNHYPIKVAFDYAWEQLANSLYTTVTFPQ
EMCEKYLNSIYGCEVSKEPVFKFYADLLYIRKNLAVLEHKNNLPSNQEEF
ICKINNTFENIVLPYKISQFETYKKDILAWINDGHDHKKYTDAKQQLGFI
RGGLKGRIKAEEVSQKDKYGKIKSYYENPYTKLTNEFKQISSTYGKTFAE
LRDKFKEKNEITKITHFGIIIEDKNRDRYLLASELKHEQINHVSTILNKL
DKSSEFITYQVKSLTSKTLIKLIKNHTTKKGAISPYADFHTSKTGENKNE
IEKNWDNYKREQVLVEYVKDCLTDSTMAKNQNWAEFGWNFEKCNSYEDIE
HEIDQKSYLLQSDTISKQSIASLVEGGCLLLPIINQDITSKERKDKNQFS
KDWNHIFEGSKEFRLHPEFAVSYRTPIEGYPVQKRYGRLQFVCAFNAHIV
PQNGEFINLKKQIENENDEDVQKRNVTEENKKVNHALSDKEYVVIGIDRG
LKQLATLCVLDKRGKILGDFEIYKKEFVRAEKRSESHWEHTQAETRHILD
LSNLRVETTIEGKKVLVDQSLTLVKKNRDTPDEEATEENKQKIKLKQLSY
IRKLQHKMQTNEQDVLDLINNEPSDEEFKKRIEGLISSFGEGQKYADLPI
NTMREMISDLQGVIARGNNQTEKNKIIELDAADNLKQGIVANMIGIVNYI
FAKYSYKAYISLEDLSRAYGGAKSGYDGRYLPSTSQDEDVDFKEQQNQML
AGLGTYQFFEMQLLKKLQKIQSDNTVLRFVPAFRSADNYRNILRLEETKY
KSKPFGVVHFIDPKFTSKKCPVCSKTNVYRDKDDILVCKECGFRSDSQLK
ERENNIHYIHNGDDNGAYHIALKSVENLIQMK In certain embodiments, the type V-A Cas nuclease comprises MbCsm1 or a variant thereof. In certain embodiments, the type V-A Cas protein comprises an amino acid sequence at least 30%, at least 40%, at least 50%, at least 60%, at least 70%, at least 75%, at least 80%, at least 85%, at least 90%, at least 91%, at least 92%, at least 93%, at least 94%, at least 95%, at least 96%, at least 97%, at least 98%, or at least 99% identical to the amino acid sequence set forth in SEQ ID NO: 14. In certain embodiments, the type V-A Cas protein comprises the amino acid sequence set forth in SEQ ID NO: 14.

```
Microgenomates (Roizmanbacteria) bacterium Csm1
                                       (SEQ ID NO: 14)
MEIQELKNLYEVKKTVRFELKPSKKKIFEGGDVIKLQKDFEKVQKFFLDI

FVYKNEHTKLEFKKKREIKYTWLRTNTKNEFYNWRGKSDTGKNYALNKIG

FLAEEILRWLNEWQELTKSLKDLTQREEHKQERKSDIAFVLRNFLKRQNL

PFIKDFFNAVIDIQGKQGKESDDKIRKFREEIKEIEKNLNACSREYLPTQ

SNGVLLYKASFSYYTLNKTPKEYEDLKKEKESELSSVLLKEIYRRKRFNR

TTNQKDTLFECTSDWLVKIKLGKDIYEWTLDEAYQKMKIWKANQKSNFIE

AVAGDKLTHQNFRKQFPLFDASDEDFETFYRLTKALDKNPENAKKIAQKR

GKFFNAPNETVQTKNYHELCELYKRIAVKRGKIIAEIKGIENEEVQSQLL

THWAVIAEERDKKFIVLIPRKNGGKLENHKNAHAFLQEKDRKEPNDIKVY

HFKSLTLRSLEKLCFKEAKNTFAPEIKKETNPKIWFPTYKQEWNSTPERL

IKFYKQVLQSNYAQTYLDLVDFGNLNTFLETHFTTLEEFESDLEKTCYTK

VPVYFAKKELETFADEFEAEVFEITTRSISTESKRKENAHAEIWRDFWSR

ENEEENHITRLNPEVSVLYRDEIKEKSNTSRKNRKSNANNRFSDPRFTLA

TTITLNADKKKSNLAFKTVEDINIHIDNFNKKFSKNFSGEWVYGIDRGLK

ELATLNVVKFSDVKNVFGVSQPKEFAKIPIYKLRDEKAILKDENGLSLKN

AKGEARKVIDNISDVLEEGKEPDSTLFEKREVSSIDLTRAKLIKGHIISN

GDQKTYLKLKETSAKRRIFELFSTAKIDKSSQFHVRKTIELSGTKIYWLC

EWQRQDSWRTEKVSLRNTLKGYLQNLDLKNRFENIETIEKINHLRDAITA

NMVGILSHLQNKLEMQGVIALENLDTVREQSNKKMIDEHFEQSNEHVSRR

LEWALYCKFANTGEVPPQIKESIFLRDEFKVCQIGILNFIDVKGTSSNCP

NCDQESRKTGSHFICNFQNNCIFSSKENRNLLEQNLHNSDDVAAFNIAKR

GLEIVKV
```

More type V-A Cas nucleases and their corresponding naturally occurring CRISPR-Cas systems can be identified by computational and experimental methods known in the art, e.g., as described in U.S. Pat. No. 9,790,490 and Shmakov et al. (2015) MOL. CELL, 60:385. Exemplary computational methods include analysis of putative Cas proteins by homology modeling, structural BLAST, PSI-BLAST, or HHPred, and analysis of putative CRISPR loci by identification of CRISPR arrays. Exemplary experimental methods include in vitro cleavage assays and in-cell nuclease assays (e.g., the Surveyor assay) as described in Zetsche et al. (2015) CELL, 163:759.

In certain embodiments, the Cas nuclease directs cleavage of one or both strands at the target locus, such as the target strand (i.e., the strand having the target nucleotide sequence that hybridizes with a single guide nucleic acid or dual guide nucleic acids) and/or the non-target strand. In certain embodiments, the Cas nuclease directs cleavage of one or both strands within about 1, 2, 3, 4, 5, 6, 7, 8, 9, 10, 15, 20, 25, 50, 100, 200, 500, or more nucleotides from the first or last nucleotide of the target nucleotide sequence or its complementary sequence. In certain embodiments, the cleavage is staggered, i.e. generating sticky ends. In certain embodiments, the cleavage generates a staggered cut with a 5' overhang. In certain embodiments, the cleavage generates a staggered cut with a 5' overhang of 1 to 5 nucleotides, e.g., of 4 or 5 nucleotides. In certain embodiments, the cleavage site is distant from the PAM, e.g., the cleavage occurs after the 18th nucleotide on the non-target strand and after the 23rd nucleotide on the target strand.

In certain embodiments, the engineered, non-naturally occurring system of the present invention further comprises the Cas nuclease that a complex comprising the targeter nucleic acid and the modulator nucleic acid is capable of activating. In other embodiments, the engineered, non-naturally occurring system of the present invention further comprises a Cas protein that is related to the Cas nuclease that a complex comprising the targeter nucleic acid and the modulator nucleic acid is capable of activating. For example, in certain embodiments, the Cas protein comprises an amino acid sequence at least 80% (e.g., at least 85%, at least 90%, at least 91%, at least 92%, at least 93%, at least 94%, at least 95%, at least 96%, at least 97%, at least 98%, or at least 99%) identical to the Cas nuclease. In certain embodiments, the Cas protein comprises a nuclease-inactive mutant of the Cas nuclease. In certain embodiments, the Cas protein further comprises an effector domain.

In certain embodiments, the Cas protein lacks substantially all DNA cleavage activity. Such a Cas protein can be generated by introducing one or more mutations to an active Cas nuclease (e.g., a naturally occurring Cas nuclease). A mutated Cas protein is considered to lack substantially all DNA cleavage activity when the DNA cleavage activity of the protein has no more than about 25%, 10%, 5%, 1%, 0.1%, 0.01%, or less of the DNA cleavage activity of the corresponding non-mutated form, for example, nil or negligible as compared with the non-mutated form. Thus, the Cas protein may comprise one or more mutations (e.g., a mutation in the RuvC domain of a type V-A Cas protein) and be used as a generic DNA binding protein with or without fusion to an effector domain. Exemplary mutations include D908A, E993A, and D1263A with reference to the amino acid positions in AsCpf1; D832A, E925A, and D1180A with reference to the amino acid positions in LbCpf1; and D917A, E1006A, and D1255A with reference to the amino acid position numbering of the FnCpf1. More mutations can be designed and generated according to the crystal structure described in Yamano et al. (2016) CELL, 165:949.

It is understood that the Cas protein, rather than losing nuclease activity to cleave all DNA, may lose the ability to cleave only the target strand or only the non-target strand of a double-stranded DNA, thereby being functional as a nickase (see, Gao et al. (2016) CELL. RES., 26:901). Accordingly, in certain embodiments, the Cas nuclease is a Cas nickase. In certain embodiments, the Cas nuclease has the activity to cleave the non-target strand but lacks substantially the activity to cleave the target strand, e.g., by a mutation in the Nuc domain. In certain embodiments, the Cas nuclease has the cleavage activity to cleave the target strand but lacks substantially the activity to cleave the non-target strand.

In other embodiments, the Cas nuclease has the activity to cleave a double-stranded DNA and result in a double-strand break.

Cas proteins that lack substantially all DNA cleavage activity or have the ability to cleave only one strand may also be identified from naturally occurring systems. For example, certain naturally occurring CRISPR-Cas systems may retain the ability to bind the target nucleotide sequence but lose entire or partial DNA cleavage activity in eukaryotic (e.g., mammalian or human) cells. Such type V-A proteins are disclosed, for example, in Kim et al. (2017) ACS SYNTH. BIOL. 6 (7): 1273-82 and Zhang et al. (2017) CELL DISCOV. 3:17018.

The activity of the Cas protein (e.g., Cas nuclease) can be altered, thereby creating an engineered Cas protein. In certain embodiments, the altered activity of the engineered Cas protein comprises increased targeting efficiency and/or decreased off-target binding. While not wishing to be bound by theory, it is hypothesized that off-target binding can be recognized by the Cas protein, for example, by the presence of one or more mismatches between the spacer sequence and the target nucleotide sequence, which may affect the stability and/or conformation of the CRISPR-Cas complex. In certain embodiments, the altered activity comprises modified binding, e.g., increased binding to the target locus (e.g., the target strand or the non-target strand) and/or decreased binding to off-target loci. In certain embodiments, the altered activity comprises altered charge in a region of the protein that associates with a single guide nucleic acid or dual guide nucleic acids. In certain embodiments, the altered activity of the engineered Cas protein comprises altered charge in a region of the protein that associates with the target strand and/or the non-target strand. In certain embodiments, the altered activity of the engineered Cas protein comprises altered charge in a region of the protein that associates with an off-target locus. The altered charge can include decreased positive charge, decreased negative charge, increased positive charge, and increased negative charge. For example, decreased negative charge and increased positive charge may generally strengthen the binding to the nucleic acid(s) whereas decreased positive charge and increased negative charge may weaken the binding to the nucleic acid(s). In certain embodiments, the altered activity comprises increased or decreased steric hindrance between the protein and a single guide nucleic acid or dual guide nucleic acids. In certain embodiments, the altered activity comprises increased or decreased steric hindrance between the protein and the target strand and/or the non-target strand. In certain embodiments, the altered activity comprises increased or decreased steric hindrance between the protein and an off-target locus. In certain embodiments, the modification or mutation comprises a substitution of Lys, His, Arg, Glu, Asp, Ser, Gly, or Thr. In certain embodiments, the modification or mutation comprises a substitution with Gly, Ala, Ile, Glu, or Asp. In certain embodiments, the modification or mutation comprises an amino acid substitution in the groove between the WED and RuvC domain of the Cas protein (e.g., a type V-A Cas protein).

In certain embodiments, the altered activity of the engineered Cas protein comprises increased nuclease activity to cleave the target locus. In certain embodiments, the altered activity of the engineered Cas protein comprises decreased nuclease activity to cleave an off-target locus. In certain embodiments, the altered activity of the engineered Cas protein comprises altered helicase kinetics. In certain embodiments, the engineered Cas protein comprises a modification that alters formation of the CRISPR complex.

In certain embodiments, a protospacer adjacent motif (PAM) or PAM-like motif directs binding of the Cas protein complex to the target locus. Many Cas proteins have PAM specificity. The precise sequence and length requirements for the PAM differ depending on the Cas protein used. PAM sequences are typically 2-5 base pairs in length and are adjacent to (but located on a different strand of target DNA from) the target nucleotide sequence. PAM sequences can be identified using a method known in the art, such as testing cleavage, targeting, or modification of oligonucleotides having the target nucleotide sequence and different PAM sequences.

Exemplary PAM sequences are provided in Table 1. In one embodiment, the Cas protein is MAD7 and the PAM is TTTN, wherein N is A, C, G, or T. In one embodiment, the Cas protein is MAD7 and the PAM is CTTN, wherein N is A, C, G, or T. In another embodiment, the Cas protein is AsCpf1 and the PAM is TTTN, wherein N is A, C, G, or T. In another embodiment, the Cas protein is FnCpf1 and the PAM is 5' TTN, wherein N is A, C, G, or T. PAM sequences for certain other type V-A Cas proteins are disclosed in Zetsche et al. (2015) CELL, 163:759 and U.S. Pat. No. 9,982,279. Further, engineering of the PAM Interacting (PI) domain of a Cas protein may allow programing of PAM specificity, improve target site recognition fidelity, and increase the versatility of the engineered, non-naturally occurring system. Exemplary approaches to alter the PAM specificity of Cpf1 is described in Gao et al. (2017) NAT. BIOTECHNOL., 35:789.

In certain embodiments, the engineered Cas protein comprises a modification that alters the Cas protein specificity in concert with modification to targeting range. Cas mutants can be designed to have increased target specificity as well as accommodating modifications in PAM recognition, for example by choosing mutations that alter PAM specificity (e.g., in the PI domain) and combining those mutations with groove mutations that increase (or if desired, decrease) specificity for the on-target locus versus off-target loci. The Cas modifications described herein can be used to counter loss of specificity resulting from alteration of PAM recognition, enhance gain of specificity resulting from alteration of PAM recognition, counter gain of specificity resulting from alteration of PAM recognition, or enhance loss of specificity resulting from alteration of PAM recognition.

In certain embodiments, the engineered Cas protein comprises one or more nuclear localization signal (NLS) motifs. In certain embodiments, the engineered Cas protein comprises at least 2 (e.g., at least 3, at least 4, at least 5, at least 6, at least 7, at least 8, at least 9, or at least 10) NLS motifs. Non-limiting examples of NLS motifs include: the NLS of SV40 large T-antigen, having the amino acid sequence of PKKKRKV (SEQ ID NO: 23); the NLS from nucleoplasmin, e.g., the nucleoplasmin bipartite NLS having the amino acid sequence of KRPAATKKAGQAKKKK (SEQ ID NO: 24); the c-myc NLS, having the amino acid sequence of PAAKRVKLD (SEQ ID NO: 25) or RQRRNELKRSP (SEQ ID NO: 26); the hRNPA1 M9 NLS, having the amino acid sequence of NQSSNFGPMKGGNFG-GRSSGPYGGGGQYFAKPRNQGGY (SEQ ID NO: 27); the importin-α IBB domain NLS, having the amino acid sequence of RMRIZFKNKGKDTAELRRRRVEVS-VELRKAKKDEQILKRRNV (SEQ ID NO: 28); the myoma T protein NLS, having the amino acid sequence of VSRKRPRP (SEQ ID NO: 29) or PPKKARED (SEQ ID NO: 30); the human p53 NLS, having the amino acid sequence of PQPKKKPL (SEQ ID NO: 31); the mouse c-abl IV NLS, having the amino acid sequence of SALIKKKKK-MAP (SEQ ID NO: 32); the influenza virus NS1 NLS, having the amino acid sequence of DRLRR (SEQ ID NO: 33) or PKQKKRK (SEQ ID NO: 34); the hepatitis virus 8 antigen NLS, having the amino acid sequence of RKLKK-KIKKL (SEQ ID NO: 35); the mouse Mx1 protein NLS, having the amino acid sequence of REKKKFLKRR (SEQ ID NO: 36); the human poly (ADP-ribose) polymerase NLS, having the amino acid sequence of KRKGDEVDGVDE-VAKKKSKK (SEQ ID NO: 37); the human glucocorticoid receptor NLS, having the amino acid sequence of RKCLQAGMNLEARKTKK (SEQ ID NO: 38), and synthetic NLS motifs such as PAAKKKKLD (SEQ ID NO: 39).

In general, the one or more NLS motifs are of sufficient strength to drive accumulation of the Cas protein in a detectable amount in the nucleus of a eukaryotic cell. The strength of nuclear localization activity may derive from the number of NLS motif(s) in the Cas protein, the particular NLS motif(s) used, the position(s) of the NLS motif(s), or a combination of these factors. In certain embodiments, the engineered Cas protein comprises at least 1 (e.g., at least 2, at least 3, at least 4, at least 5, at least 6, at least 7, at least 8, at least 9, or at least 10) NLS motif(s) at or near the N-terminus (e.g., within about 1, 2, 3, 4, 5, 10, 15, 20, 25, 30, 40, 50, or more amino acids along the polypeptide chain from the N-terminus). In certain embodiments, the engineered Cas protein comprises at least 1 (e.g., at least 2, at least 3, at least 4, at least 5, at least 6, at least 7, at least 8, at least 9, or at least 10) NLS motif(s) at or near the C-terminus (e.g., within about 1, 2, 3, 4, 5, 10, 15, 20, 25, 30, 40, 50, or more amino acids along the polypeptide chain from the C-terminus). In certain embodiments, the engineered Cas protein comprises at least 1 (e.g., at least 2, at least 3, at least 4, at least 5, at least 6, at least 7, at least 8, at least 9, or at least 10) NLS motif(s) at or near the C-terminus and at least 1 (e.g., at least 2, at least 3, at least 4, at least 5, at least 6, at least 7, at least 8, at least 9, or at least 10) NLS motif(s) at or near the N-terminus. In certain embodiments, the engineered Cas protein comprises one, two, or three NLS motifs at or near the C-terminus. In certain embodiments, the engineered Cas protein comprises one NLS motif at or near the N-terminus and one, two, or three NLS motifs at or near the C-terminus. In certain embodiments, the engineered Cas protein comprises a nucleoplasmin NLS at or near the C-terminus.

Detection of accumulation in the nucleus may be performed by any suitable technique. For example, a detectable marker may be fused to the nucleic acid-targeting protein, such that location within a cell may be visualized. Cell nuclei may also be isolated from cells, the contents of which may then be analyzed by any suitable process for detecting the protein, such as immunohistochemistry, Western blot, or enzyme activity assay. Accumulation in the nucleus may also be determined indirectly, such as by an assay that detects the effect of the nuclear import of a Cas protein complex (e.g., assay for DNA cleavage or mutation at the target locus, or assay for altered gene expression activity) as compared to a control not exposed to the Cas protein or exposed to a Cas protein lacking one or more of the NLS motifs.

The Cas protein in the invention may comprise a chimeric Cas protein, e.g., a Cas protein having enhanced function by being a chimera. Chimeric Cas proteins may be new Cas proteins containing fragments from more than one naturally occurring Cas proteins or variants thereof. For example, fragments of multiple type V-A Cas homologs (e.g., orthologs) may be fused to form a chimeric Cas protein. In certain embodiments, the chimeric Cas protein comprises fragments of Cpf1 orthologs from multiple species and/or strains.

In certain embodiments, the Cas protein comprises one or more effector domains. The one or more effector domains may be located at or near the N-terminus of the Cas protein and/or at or near the C-terminus of the Cas protein. In certain embodiments, an effector domain comprised in the Cas protein is a transcriptional activation domain (e.g., VP64), a transcriptional repression domain (e.g., a KRAB domain or an SID domain), an exogenous nuclease domain (e.g., FokI), a deaminase domain (e.g., cytidine deaminase or adenine deaminase), or a reverse transcriptase domain (e.g., a high fidelity reverse transcriptase domain). Other activities of effector domains include but are not limited to methylase activity, demethylase activity, transcription release factor activity, translational initiation activity, translational activation activity, translational repression activity, histone modification (e.g., acetylation or demethylation) activity, single-stranded RNA cleavage activity, double-strand RNA cleavage activity, single-strand DNA cleavage activity, double-strand DNA cleavage activity, and nucleic acid binding activity.

In certain embodiments, the Cas protein comprises one or more protein domains that enhance homology-directed repair (HDR) and/or inhibit non-homologous end joining (NHEJ). Exemplary protein domains having such functions are described in Jayavaradhan et al. (2019) NAT. COMMUN. 10 (1): 2866 and Janssen et al. (2019) MOL. THER. NUCLEIC ACIDS 16:141-54. In certain embodiments, the Cas protein comprises a dominant negative version of p53-binding protein 1 (53BP1), for example, a fragment of 53BP1 comprising a minimum focus forming region (e.g., amino acids 1231-1644 of human 53BP1). In certain embodiments, the Cas protein comprises a motif that is targeted by APC-Cdh1, such as amino acids 1-110 of human Geminin, thereby resulting in degradation of the fusion protein during the HDR non-permissive G1 phase of the cell cycle.

In certain embodiments, the Cas protein comprises an inducible or controllable domain. Non-limiting examples of inducers or controllers include light, hormones, and small molecule drugs. In certain embodiments, the Cas protein comprises a light inducible or controllable domain. In certain embodiments, the Cas protein comprises a chemically inducible or controllable domain.

In certain embodiments, the Cas protein comprises a tag protein or peptide for ease of tracking or purification. Non-limiting examples of tag proteins and peptides include fluorescent proteins (e.g., green fluorescent protein (GFP), YFP, RFP, CFP, mCherry, tdTomato), HIS tags (e.g., 6×His tag), hemagglutinin (HA) tag, FLAG tag, and Myc tag.

In certain embodiments, the Cas protein is conjugated to a non-protein moiety, such as a fluorophore useful for genomic imaging. In certain embodiments, the Cas protein is covalently conjugated to the non-protein moiety. The terms "CRISPR-Associated protein," "Cas protein," "Cas," "CRISPR-Associated nuclease," and "Cas nuclease" are used herein to include such conjugates despite the presence of one or more non-protein moieties.

Targeter and Modulator Nucleic Acids

The engineered, non-naturally occurring system of the present invention comprises a targeter nucleic acid and a modulator nucleic acid that, when hybridized to form a complex, are capable of activating a Cas nuclease disclosed herein. In certain embodiments, the Cas nuclease is activated by a single crRNA in the absence of a tracrRNA in a naturally occurring system. In certain embodiments, the Cas nuclease is a type V-A, type V-C, or type V-D nuclease.

The term "targeter nucleic acid," as used herein, refers to a nucleic acid comprising (i) a spacer sequence designed to hybridize with a target nucleotide sequence; and (ii) a targeter stem sequence capable of hybridizing with an additional nucleic acid to form a complex, wherein the complex is capable of activating a Cas nuclease (e.g., a type V-A Cas nuclease) under suitable conditions, and wherein the targeter nucleic acid alone, in the absence of the additional nucleic acid, is not capable of activating the Cas nuclease under the same conditions.

The term "modulator nucleic acid," as used herein in connection with a given targeter nucleic acid and its corresponding Cas nuclease, refers to a nucleic acid capable of hybridizing with the targeter nucleic acid to form a complex, wherein the complex, but not the modulator nucleic acid alone, is capable of activating the type Cas nuclease under suitable conditions.

The term "suitable conditions," as used in the definitions of "targeter nucleic acid" and "modulator nucleic acid," refers to the conditions under which a naturally occurring CRISPR-Cas system is operative, such as in a prokaryotic cell, in a eukaryotic (e.g., mammalian or human) cell, or in an in vitro assay.

The targeter nucleic acid and/or the modulator nucleic acid can be synthesized chemically or produced in a biological process (e.g., catalyzed by an RNA polymerase in an in vitro reaction). Such reaction or process may limit the lengths of the targeter and modulator nucleic acids. In certain embodiments, the targeter nucleic acid is no more than 100, 90, 80, 70, 60, 50, 40, 30, or 25 nucleotides in length. In certain embodiments, the targeter nucleic acid is at least 20, 25, 30, 40, 50, 60, 70, 80, or 90 nucleotides in length. In certain embodiments, the targeter nucleic acid is 20-100, 20-90, 20-80, 20-70, 20-60, 20-50, 20-40, 20-30, 20-25, 25-100, 25-90, 25-80, 25-70, 25-60, 25-50, 25-40, 25-30, 30-100, 30-90, 30-80, 30-70, 30-60, 30-50, 30-40, 40-100, 40-90, 40-80, 40-70, 40-60, 40-50, 50-100, 50-90, 50-80, 50-70, 50-60, 60-100, 60-90, 60-80, 60-70, 70-100, 70-90, 70-80, 80-100, 80-90, or 90-100 nucleotides in length. In certain embodiments, the modulator nucleic acid is no more than 100, 90, 80, 70, 60, 50, 40, 30, or 20 nucleotides in length. In certain embodiments, the modulator nucleic acid is at least 10, 15, 20, 25, 30, 40, 50, 60, 70, 80, or 90 nucleotides in length. In certain embodiments, the modulator nucleic acid is 10-100, 10-90, 10-80, 10-70, 10-60, 10-50, 10-40, 10-30, 10-20, 15-100, 15-90, 15-80, 15-70, 15-60, 15-50, 15-40, 15-30, 15-20, 20-100, 20-90, 20-80, 20-70, 20-60, 20-50, 20-40, 20-30, 25-100, 25-90, 25-80, 25-70, 25-60, 25-50, 25-40, 25-30, 30-100, 30-90, 30-80, 30-70, 30-60, 30-50, 30-40, 40-100, 40-90, 40-80, 40-70, 40-60, 40-50, 50-100, 50-90, 50-80, 50-70, 50-60, 60-100, 60-90, 60-80, 60-70, 70-100, 70-90, 70-80, 80-100, 80-90, or 90-100 nucleotides in length.

In naturally occurring type V-A CRISPR-Cas systems, the crRNA comprises a scaffold sequence (also called direct repeat sequence) and a spacer sequence that hybridizes with the target nucleotide sequence. In certain naturally occurring type V-A CRISPR-Cas systems, the scaffold sequence forms a stem-loop structure in which the stem consists of five consecutive base pairs. A dual guide type V-A CRISPR-Cas system may be derived from a naturally occurring type V-A CRISPR-Cas system, or a variant thereof in which the Cas protein is guided to the target nucleotide sequence by a crRNA alone, such system referred to herein as a "single guide type V-A CRISPR-Cas system." In a dual guide type V-A CRISPR-Cas system disclosed herein, the targeter nucleic acid comprises the chain of the stem sequence between the spacer and the loop (the "targeter stem sequence") and the spacer sequence, and the modulator nucleic acid comprises the other chain of the stem sequence (the "modulator stem sequence") and the 5' tail positioned 5' to the modulator stem sequence. The targeter stem sequence is 100% complementary to the modulator stem sequence. As such, the double-stranded complex of the targeter nucleic acid and the modulator nucleic acid retains the orientation of the 5' tail, the modulator stem sequence, the targeter stem sequence, and the spacer sequence of a single guide type V-A CRISPR-Cas system but lacks the loop structure between the modulator stem sequence and the targeter stem sequence. A schematic representation of an exemplary double-stranded complex is shown in FIG. 1.

Notwithstanding the general structural similarity, it has been discovered that the stem-loop structure of the crRNA in a naturally occurring type V-A CRISPR complex is dispensable for the functionality of the CRISPR system. This discovery is surprising because the prior art has suggested that the stem-loop structure is critical (see, Zetsche et al. (2015) CELL, 163:759) and that removal of the loop structure by "splitting" the crRNA abrogated the activity of a AsCpf1 CRISPR system (see, Li et al. (2017) NAT. BIOMED. ENG., 1:0066).

It is contemplated that the length of the duplex may be a factor in providing an operative dual guide CRISPR system. In certain embodiments, the targeter stem sequence and the modulator stem sequence each consist of 4-10 nucleotides that base pair with each other. In certain embodiments, the targeter stem sequence and the modulator stem sequence each consist of 4-9, 4-8, 4-7, 4-6, 4-5, 5-10, 5-9, 5-8, 5-7, or 5-6 nucleotides that base pair with each other. In certain embodiments, the targeter stem sequence and the modulator stem sequence each consist of 4, 5, 6, 7, 8, 9, or 10 nucleotides. It is understood that the composition of the nucleotides in each sequence affects the stability of the duplex, and a C-G base pair confers greater stability than an A-U base pair. In certain embodiments, 20%-80%, 20%-70%, 20%-60%, 20%-50%, 20%-40%, 20%-30%, 30%-80%, 30%-70%, 30%-60%, 30%-50%, 30%-40%, 40%-80%, 40%-70%, 40%-60%, 40%-50%, 50%-80%, 50%-70%, 50%-60%, 60%-80%, 60%-70%, or 70%-80% of the base pairs are C-G base pairs.

In certain embodiments, the targeter stem sequence and the modulator stem sequence each consist of 5 nucleotides. As such, the targeter stem sequence and the modulator stem sequence form a duplex of 5 base pairs. In certain embodiments, 0-4, 0-3, 0-2, 0-1, 1-5, 1-4, 1-3, 1-2, 2-5, 2-4, 2-3, 3-5, 3-4, or 4-5 out of the 5 base pairs are C-G base pairs. In certain embodiments, 0, 1, 2, 3, 4, or 5 out of the 5 base pairs are C-G base pairs. In certain embodiments, the targeter stem sequence consists of 5'-GUAGA-3' (SEQ ID NO: 21) and the modulator stem sequence consists of 5'-UCUAC-3'. In certain embodiments, the targeter stem sequence consists of 5'-GUGGG-3' (SEQ ID NO: 22) and the modulator stem sequence consists of 5'-CCCAC-3'.

It is also contemplated that the compatibility of the duplex for a given Cas nuclease may be a factor in providing an operative dual guide CRISPR system. For example, the targeter stem sequence and the modulator stem sequence can be derived from a naturally occurring crRNA capable of activating a Cas nuclease in the absence of a tracrRNA. In certain embodiments, the nucleotide sequences of the targeter stem sequence and the modulator stem sequence are identical to the corresponding stem sequences of a stem-loop structure in such naturally occurring crRNA.

In certain embodiments, the targeter nucleic acid comprises, from 5' to 3', a targeter stem sequence and a spacer sequence. The spacer sequence is designed to hybridize with the target nucleotide sequence. To provide sufficient targeting to the target nucleotide sequence, the spacer sequence is generally 16 or more nucleotides in length. In certain embodiments, the spacer sequence is at least 16, 17, 18, 19, 20, 21, 22, 23, 24, 25, 26, 27, 28, 29, 30, 35, 40, 45, 50, or 75 nucleotides in length. In certain embodiments, the spacer sequence is shorter than or equal to 75, 50, 45, 40, 35, 30, 25, or 20 nucleotides in length. Shorter spacer sequence may be desirable for reducing off-target events. Accordingly, in certain embodiments, the spacer sequence is shorter than or equal to 19, 18, or 17 nucleotides. In certain embodiments, the spacer sequence is 17-30 nucleotides in length, e.g., 20-30 nucleotides, 20-25 nucleotides, 20-24 nucleotides, 20-23 nucleotides, 23-25 nucleotides, 20-22 nucleotides, or about 20 nucleotides in length. In certain embodiments, the spacer sequence is 20 nucleotides in length. In certain embodiments, the spacer sequence is at least about 50%, 60%, 70%, 75%, 80%, 85%, 90%, 95%, 96%, 97%, 98%, or 99% complementary to the target nucleotide sequence. In certain embodiments, the spacer sequence is 100% complementary to the target nucleotide sequence in the seed region (about 5 base pairs proximal to the PAM). In certain embodiments, the spacer sequence is 100% complementary to the target nucleotide sequence. It has been reported that compared to DNA binding, DNA cleavage is less tolerant to mismatches between the spacer sequence and the target nucleotide sequence (see, Klein et al. (2018) CELL REPORTS, 22:1413). Accordingly, in specific embodiments, when the engineered, non-naturally occurring system comprises a Cas nuclease, the spacer sequence is 100% complementary to the target nucleotide sequence.

Proper design of the spacer sequence is dependent upon the selection of target nucleotide sequence. For example, to select a target nucleotide sequence in a specific gene in a given genome, sequence analysis can be conducted to minimize potential hybridization of the spacer sequence with any other loci in the genome. The association of the target nucleotide sequence with a PAM recognized by the Cas protein is also considered by many design methods. In a type V-A CRISPR-Cas system, the PAM is immediately upstream from the target sequence when using the non-target strand (i.e., the strand not hybridized with the spacer sequence) as the coordinate. Computational models have been developed to assess the targetability of the target nucleotide sequence as well as any potential off-target effect, for example, as disclosed in Doench et al. (2016) NAT. BIOTECHNOL., 34:184; Chuai et al. (2018) GENOME BIOLOGY, 19:80; and Klein et al. (2018) CELL REPORTS, 22:1413. Although computational methods are useful for selection of spacer sequences, it is generally advisable to design multiple spacer sequences and select one or more with high efficiency and specificity based upon the results of in vitro and/or in vivo experiments.

In certain embodiments, the 3' end of the targeter stem sequence is linked by no more than 1, 2, 3, 4, 5, 6, 7, 8, 9, or 10 nucleotides to the 5' end of the spacer sequence. In certain embodiments, the targeter stem sequence and the spacer sequence are adjacent to each other, directly linked by an internucleotide bond. In certain embodiments, the targeter stem sequence and the spacer sequence are linked by one nucleotide, e.g., a uridine. In certain embodiments, the targeter stem sequence and the spacer sequence are linked by two or more nucleotides. In certain embodiments, the targeter stem sequence and the spacer sequence are linked by 1, 2, 3, 4, 5, 6, 7, 8, 9, or 10 nucleotides.

In certain embodiments, the targeter nucleic acid further comprises an additional nucleotide sequence 5' to the targeter stem sequence. In certain embodiments, the additional nucleotide sequence comprises at least 1 (e.g., at least 2, at least 3, at least 4, at least 5, at least 6, at least 7, at least 8, at least 9, at least 10, at least 15, at least 20, at least 25, at least 30, at least 35, at least 40, at least 45, or at least 50) nucleotides. In certain embodiments, the additional nucleotide sequence consists of 1, 2, 3, 4, 5, 6, 7, 8, 9, 10, 15, 20, 25, 30, 35, 40, 45, or 50 nucleotides. In certain embodiments, the additional nucleotide sequence consists of 2 nucleotides. In certain embodiments, the additional nucleotide sequence is reminiscent to the loop or a fragment thereof (e.g., one, two, three, or four nucleotides at the 3' end of the loop) in a crRNA of a corresponding single guide CRISPR-Cas system. It is understood that an additional nucleotide sequence 5' to the targeter stem sequence is dispensable. Accordingly, in certain embodiments, the targeter nucleic acid does not comprise any additional nucleotide 5' to the targeter stem sequence.

In certain embodiments, the targeter nucleic acid further comprises an additional nucleotide sequence containing one or more nucleotides at the 3' end that does not hybridize with the target nucleotide sequence. The additional nucleotide sequence may protect the targeter nucleic acid from degradation by 3'-5' exonuclease. In certain embodiments, the additional nucleotide sequence is no more than 100 nucleotides in length. In certain embodiments, the additional nucleotide sequence is no more than 90, 80, 70, 60, 50, 40, 30, 20, or 10 nucleotides in length. In certain embodiments, the additional nucleotide sequence is at least 1, 2, 3, 4, 5, 6, 7, 8, 9, 10, 15, 20, 25, 30, 35, 40, 45, or 50 nucleotides in length. In certain embodiments, the additional nucleotide sequence is 5-100, 5-50, 5-40, 5-30, 5-25, 5-20, 5-15, 5-10, 10-100, 10-50, 10-40, 10-30, 10-25, 10-20, 10-15, 15-100, 15-50, 15-40, 15-30, 15-25, 15-20, 20-100, 20-50, 20-40, 20-30, 20-25, 25-100, 25-50, 25-40, 25-30, 30-100, 30-50, 30-40, 40-100, 40-50, or 50-100 nucleotides in length.

In certain embodiments, the additional nucleotide sequence forms a hairpin with the spacer sequence. Such secondary structure may increase the specificity of the engineered, non-naturally occurring system (see, Kocak et al. (2019) NAT. BIOTECH. 37:657-66). In certain embodiments, the free energy change during the hairpin formation is greater than or equal to −20 kcal/mol, −15 kcal/mol, −14 kcal/mol, −13 kcal/mol, −12 kcal/mol, −11 kcal/mol, or −10 kcal/mol. In certain embodiments, the free energy change during the hairpin formation is greater than or equal to −5 kcal/mol, −6 kcal/mol, −7 kcal/mol, −8 kcal/mol, −9 kcal/mol, −10 kcal/mol, −11 kcal/mol, −12 kcal/mol, −13 kcal/mol, −14 kcal/mol, or −15 kcal/mol. In certain embodiments, the free energy change during the hairpin formation is in the range of −20 to −10 kcal/mol, −20 to −11 kcal/mol, −20 to −12 kcal/mol, −20 to −13 kcal/mol, −20 to −14 kcal/mol, −20 to −15 kcal/mol, −15 to −10 kcal/mol, −15 to −11 kcal/mol, −15 to −12 kcal/mol, −15 to −13 kcal/mol, −15 to −14 kcal/mol, −14 to −10 kcal/mol, −14 to −11 kcal/mol, −14 to −12 kcal/mol, −14 to −13 kcal/mol, −13 to −10 kcal/mol, −13 to −11 kcal/mol, −13 to −12 kcal/mol, −12 to −10 kcal/mol, −12 to −11 kcal/mol, or −11 to −10 kcal/mol. In other embodiments, the targeter nucleic acid does not comprise any nucleotide 3' to the spacer sequence.

In certain embodiments, the modulator nucleic acid further comprises an additional nucleotide sequence 3' to the modulator stem sequence. In certain embodiments, the additional nucleotide sequence comprises at least 1 (e.g., at least 2, at least 3, at least 4, at least 5, at least 6, at least 7, at least 8, at least 9, at least 10, at least 15, at least 20, at least 25, at least 30, at least 35, at least 40, at least 45, or at least 50) nucleotides. In certain embodiments, the additional nucleotide sequence consists of 1, 2, 3, 4, 5, 6, 7, 8, 9, 10, 15, 20, 25, 30, 35, 40, 45, or 50 nucleotides. In certain embodiments, the additional nucleotide sequence consists of 1 nucleotide (e.g., uridine). In certain embodiments, the additional nucleotide sequence consists of 2 nucleotides. In certain embodiments, the additional nucleotide sequence is reminiscent to the loop or a fragment thereof (e.g., one, two, three, or four nucleotides at the 5' end of the loop) in a crRNA of a corresponding single guide CRISPR-Cas system. It is understood that an additional nucleotide sequence 3' to the modulator stem sequence is dispensable. Accordingly, in certain embodiments, the modulator nucleic acid does not comprise any additional nucleotide 3' to the modulator stem sequence.

It is understood that the additional nucleotide sequence 5' to the targeter stem sequence and the additional nucleotide sequence 3' to the modulator stem sequence, if present, may interact with each other. For example, although the nucleotide immediately 5' to the targeter stem sequence and the nucleotide immediately 3' to the modulator stem sequence do not form a Watson-Crick base pair (otherwise they would constitute part of the targeter stem sequence and part of the modulator stem sequence, respectively), other nucleotides in the additional nucleotide sequence 5' to the targeter stem sequence and the additional nucleotide sequence 3' to the modulator stem sequence may form one, two, three, or more base pairs (e.g., Watson-Crick base pairs). Such interaction may affect the stability of the complex comprising the targeter nucleic acid and the modulator nucleic acid.

The stability of a complex comprising a targeter nucleic acid and a modulator nucleic acid can be assessed by the Gibbs free energy change (ΔG) during the formation of the complex, either calculated or actually measured. Where all the predicted base pairing in the complex occurs between a base in the targeter nucleic acid and a base in the modulator nucleic acid, i.e., there is no intra-strand secondary structure, the ΔG during the formation of the complex correlates generally with the ΔG during the formation of a secondary structure within the corresponding single guide nucleic acid. Methods of calculating or measuring the ΔG are known in the art. An exemplary method is RNAfold (rna.tbi.univie.ac.at/cgi-bin/RNAWebSuite/RNAfold.cgi) as disclosed in Gruber et al. (2008) NUCLEIC ACIDS RES., 36 (Web Server issue): W70-W74. Unless indicated otherwise, the ΔG values in the present disclosure are calculated by RNAfold for the formation of a secondary structure within a corresponding single guide nucleic acid. In certain embodiments, the ΔG is lower than or equal to −1 kcal/mol, e.g., lower than or equal to −2 kcal/mol, lower than or equal to −3 kcal/mol, lower than or equal to −4 kcal/mol, lower than or equal to −5 kcal/mol, lower than or equal to −6 kcal/mol, lower than or equal to −7 kcal/mol, lower than or equal to −7.5 kcal/mol, or lower than or equal to −8 kcal/mol. In certain embodiments, the ΔG is greater than or equal to −10 kcal/mol, e.g., greater than or equal to −9 kcal/mol, greater than or equal to −8.5 kcal/mol, or greater than or equal to −8 kcal/mol. In certain embodiments, the ΔG is in the range of −10 to −4 kcal/mol. In certain embodiments, the ΔG is in the range of −8 to −4 kcal/mol, −7 to −4 kcal/mol, −6 to −4 kcal/mol, −5 to −4 kcal/mol, −8 to −4.5 kcal/mol, −7 to −4.5 kcal/mol, −6 to −4.5 kcal/mol, or −5 to −4.5 kcal/mol. In certain embodiments, the ΔG is about −8 kcal/mol, −7 kcal/mol, −6 kcal/mol, −5 kcal/mol, −4.9 kcal/mol, −4.8 kcal/mol, −4.7 kcal/mol, −4.6 kcal/mol, −4.5 kcal/mol, −4.4 kcal/mol, −4.3 kcal/mol, −4.2 kcal/mol, −4.1 kcal/mol, or −4 kcal/mol.

It is understood that the ΔG may be affected by a sequence in the targeter nucleic acid that is not within the targeter stem sequence, and/or a sequence in the modulator nucleic acid that is not within the modulator stem sequence. For example, one or more base pairs (e.g., Watson-Crick base pair) between an additional sequence 5' to the targeter stem sequence and an additional sequence 3' to the modulator stem sequence may reduce the ΔG, i.e., stabilize the nucleic acid complex. In certain embodiments, the nucleotide immediately 5' to the targeter stem sequence comprises a uracil or is a uridine, and the nucleotide immediately 3' to the modulator stem sequence comprises a uracil or is a uridine, thereby forming a nonconventional U-U base pair.

In certain embodiments, the modulator nucleic acid comprises a nucleotide sequence referred to herein as a "5' tail" positioned 5' to the modulator stem sequence. Where the CRISPR system is a type V-A CRISPR system, the 5' tail in a dual guide system is reminiscent to the nucleotide sequence positioned 5' to the stem-loop structure of the scaffold sequence in a crRNA (the single guide). Accordingly, the 5' tail can comprise the corresponding nucleotide sequences when a dual guide system is engineered from a single guide system.

Without being bound by theory, it is contemplated that the 5' tail may participate in the formation of the CRISPR-Cas complex. For example, in certain embodiments, the 5' tail forms a pseudoknot structure with the modulator stem sequence, which is recognized by the Cas protein (see, Yamano et al. (2016) CELL, 165:949). In certain embodiments, the 5' tail is at least 3 (e.g., at least 4 or at least 5) nucleotides in length. In certain embodiments, the 5' tail is 3, 4, or 5 nucleotides in length. In certain embodiments, the nucleotide at the 3' end of the 5' tail comprises a uracil or is a uridine. In certain embodiments, the second nucleotide in the 5' tail, the position counted from the 3' end, comprises a uracil or is a uridine. In certain embodiments, the third nucleotide in the 5' tail, the position counted from the 3' end, comprises an adenine or is an adenosine. This third nucleotide may form a base pair (e.g., a Watson-Crick base pair) with a nucleotide 5' to the modulator stem sequence. Accordingly, in certain embodiments, the modulator nucleic acid comprises a uridine or a uracil-containing nucleotide 5' to the modulator stem sequence. In certain embodiments, the 5' tail comprises the nucleotide sequence of 5'-AUU-3'. In certain embodiments, the 5' tail comprises the nucleotide sequence of 5'-AAUU-3'. In certain embodiments, the 5' tail comprises the nucleotide sequence of 5'-UAAUU-3'. In certain embodiments, the 5' tail is positioned immediately 5' to the modulator stem sequence.

In certain embodiments, the targeter nucleic acid and/or the modulator nucleic acid are designed to reduce the degree of secondary structure other than the hybridization between the targeter stem sequence and the modulator stem sequence. In certain embodiments, no more than about 75%, 50%, 40%, 30%, 25%, 20%, 15%, 10%, 5%, 1%, or fewer of the nucleotides of the targeter nucleic acid and/or the modulator nucleic acid participate in self-complementary base pairing when optimally folded. Optimal folding may be determined by any suitable polynucleotide folding algorithm. Some programs are based on calculating the minimal Gibbs free energy. An example of one such algorithm is mFold, as described by Zuker and Stiegler (Nucleic Acids Res. 9 (1981), 133-148). Another example folding algorithm is the online webserver RNAfold, developed at Institute for Theoretical Chemistry at the University of Vienna, using the centroid structure prediction algorithm (see e.g., A. R. Gruber et al., 2008, Cell 106(1): 23-24; and PA Carr and GM Church, 2009, Nature Biotechnology 27 (12): 1151-62).

The targeter nucleic acid is directed to a specific target nucleotide sequence, and the donor template is designed to modify the target nucleotide sequence or a sequence nearby. It is understood, therefore, that association of the targeter or modulator nucleic acid with a donor template can increase editing efficiency and reduce off-targeting. In a multiplex method (e.g., as disclosed in the "Multiplex Methods" subsection of section II infra), association of a donor template with a modulator nucleic acid allows combination of a targeter nucleic acid library with a donor template library, making designs of screening or selection assays more efficient and flexible. Accordingly, in certain embodiments, the modulator nucleic acid further comprises a donor template-recruiting sequence capable of hybridizing with a donor template (see FIG. 1C). Donor templates are described in the "Donor Templates" subsection of section II infra. The donor template and donor template-recruiting sequence can be designed such that they bear sequence complementarity. In certain embodiments, the donor template-recruiting sequence is at least 90% (e.g., at least 91%, at least 92%, at least 93%, at least 94%, at least 95%, at least 96%, at least 97%, at least 98%, or at least 99%) complementary to at least a portion of the donor template. In certain embodiments, the donor template-recruiting sequence is 100% complementary to at least a portion of the donor template. In certain embodiments, where the donor template comprises an engineered sequence not homologous to the sequence to be repaired, the donor template-recruiting sequence is capable of hybridizing with the engineered sequence in the donor template. In certain embodiments, the donor template-recruiting sequence is at least 20, 25, 30, 35, 40, 45, 50, 55, 60, 65, 70, 75, 80, 85, 90, 95, or 100 nucleotides in length. In certain embodiments, the donor template-recruiting sequence is positioned at the 5' end of the modulator nucleic acid. In certain embodiments, the donor template-recruiting sequence is linked to the 5' tail, if present, or to the modulator stem sequence, of the modulator nucleic acid through an internucleotide bond or a nucleotide linker.

Figure 1D:
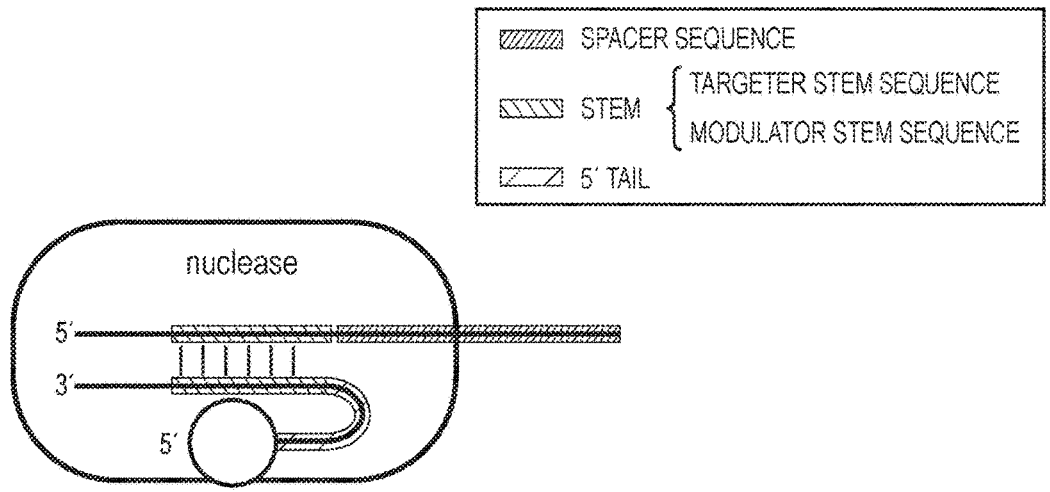

In certain embodiments, the modulator nucleic acid further comprises an editing enhancer sequence, which increases the efficiency of gene editing and/or homology-directed repair (HDR) (see FIG. 1D). Exemplary editing enhancer sequences are described in Park et al. (2018) NAT. COMMUN. 9:3313. In certain embodiments, the editing enhancer sequence is positioned 5' to the 5' tail, if present, or 5' to the modulator stem sequence. In certain embodiments, the editing enhancer sequence is 1-50, 4-50, 9-50, 15-50, 25-50, 1-25, 4-25, 9-25, 15-25, 1-15, 4-15, 9-15, 1-9, 4-9, or 1-4 nucleotides in length. In certain embodiments, the editing enhancer sequence is about 1, 2, 3, 4, 5, 6, 7, 8, 9, 10, 15, 20, 25, 30, 35, 40, 45, 50, or 55 nucleotides in length. The editing enhancer sequence is designed to minimize homology to the target nucleotide sequence or any other sequence that the engineered, non-naturally occurring system may be contacted to, e.g., the genome sequence of a cell into which the engineered, non-naturally occurring system is delivered. In certain embodiments, the editing enhancer is designed to minimize the presence of hairpin structure. The editing enhancer can comprise one or more of the chemical modifications disclosed herein.

The modulator and/or targeter nucleic acids can further comprise a protective nucleotide sequence that prevents or reduces nucleic acid degradation. In certain embodiments, the protective nucleotide sequence is at least 5 (e.g., at least 10, at least 15, at least 20, at least 25, at least 30, at least 35, at least 40, at least 45, or at least 50) nucleotides in length. The length of the protective nucleotide sequence increases the time for an exonuclease to reach the 5' tail, modulator stem sequence, targeter stem sequence, and/or spacer sequence, thereby protecting these portions of the modulator and/or targeter nucleic acids from degradation by an exonuclease. In certain embodiments, the protective nucleotide sequence forms a secondary structure, such as a hairpin or a tRNA structure, to reduce the speed of degradation by an exonuclease (see, for example, Wu et al. (2018) CELL. MOL. LIFE SCI., 75 (19): 3593-3607). Secondary structures can be predicted by methods known in the art, such as the online webserver RNAfold developed at University of Vienna using the centroid structure prediction algorithm (see, Gruber et al. (2008) NUCLEIC ACIDS RES., 36: W70). Certain chemical modifications, which may be present in the protective nucleotide sequence, can also prevent or reduce nucleic acid degradation, as disclosed in the "RNA Modifications" subsection infra.

A protective nucleotide sequence is typically located at the 5' end, at the 3' end, or at both ends, of the modulator or targeter nucleic acid. In certain embodiments, the modulator nucleic acid comprises a protective nucleotide sequence at the 5' end, optionally through a nucleotide linker (see FIG. 1B). In certain embodiments, the modulator nucleic acid comprises a protective nucleotide sequence at the 3' end. In certain embodiments, the modulator nucleic acid comprises a protective nucleotide sequence at the 5' end. In certain embodiments, the modulator nucleic acid comprises a protective nucleotide sequence at the 3' end.

As described above, various nucleotide sequences can be present in the 5' portion of a modulator nucleic acid, including but not limited to a donor template-recruiting sequence, an editing enhancer sequence, a protective nucleotide sequence, and a linker connecting such sequence to the 5' tail, if present, or to the modulator stem sequence. It is understood that the functions of donor template recruitment, editing enhancement, protection against degradation, and linkage are not exclusive to each other, and one nucleotide sequence can have one or more of such functions. For example, in certain embodiments, the modulator nucleic acid comprises a nucleotide sequence that is both a donor template-recruiting sequence and an editing enhancer sequence. In certain embodiments, the modulator nucleic acid comprises a nucleotide sequence that is both a donor template-recruiting sequence and a protective sequence. In certain embodiments, the modulator nucleic acid comprises a nucleotide sequence that is both an editing enhancer sequence and a protective sequence. In certain embodiments, the modulator nucleic acid comprises a nucleotide sequence that is a donor template-recruiting sequence, an editing enhancer sequence, and a protective sequence. In certain embodiments, the nucleotide sequence 5' to the 5' tail, if present, or 5' to the modulator stem sequence is 1-90, 1-80, 1-70, 1-60, 1-50, 1-40, 1-30, 1-20, 1-10, 10-90, 10-80, 10-70, 10-60, 10-50, 10-40, 10-30, 10-20, 20-90, 20-80, 20-70, 20-60, 20-50, 20-40, 20-30, 30-90, 30-80, 30-70, 30-60, 30-50, 30-40, 40-90, 40-80, 40-70, 40-60, 40-50, 50-90, 50-80, 50-70, 50-60, 60-90, 60-80, 60-70, 70-90, 70-80, or 80-90 nucleotides in length.

In certain embodiments, the engineered, non-naturally occurring system further comprises one or more compounds (e.g., small molecule compounds) that enhance HDR and/or inhibit NHEJ. Exemplary compounds having such functions are described in Maruyama et al. (2015) NAT BIOTECHNOL. 33 (5): 538-42; Chu et al. (2015) NAT BIOTECHNOL. 33 (5): 543-48; Yu et al. (2015) CELL STEM CELL 16 (2): 142-47; Pinder et al. (2015) NUCLEIC ACIDS RES. 43 (19): 9379-92; and Yagiz et al. (2019) COMMUN. BIOL. 2:198. In certain embodiments, the engineered, non-naturally occurring system further comprises one or more compounds selected from the group consisting of DNA ligase IV antagonists (e.g., SCR7 compound, Ad4 E1B55K protein, and Ad4 E4orf6 protein), RAD51 agonists (e.g., RS-1), DNA-dependent protein kinase (DNA-PK) antagonists (e.g., NU7441 and KU0060648), β3-adrenergic receptor agonists (e.g., L755507), inhibitors of intracellular protein transport from the ER to the Golgi apparatus (e.g., brefeldin A), and any combinations thereof.

The sequences of the modulator nucleic acid and the targeter nucleic acid should be compatible with the Cas protein. Exemplary sequences that are operative with certain type V-A Cas proteins are provided in Table 1. It is understood that these sequences are merely illustrative, and other guide nucleic acid sequences may also be used with these Cas proteins.

TABLE 1

Type V-A Cas Protein and Corresponding Guide Nucleic Acid Sequences

| Cas Protein[1] | Modulator Sequence[2] | Targeter Stem Sequence | PAM[3] |
|---|---|---|---|
| MAD7 (SEQ ID NO: 1) | UAAUUUCUAC (SEQ ID NO: 15) | GUAGA (SEQ ID NO: 21) | 5' TTTN |
| MAD7 (SEQ ID NO: 1) | AUCUAC (SEQ ID NO: 16) | GUAGA (SEQ ID NO: 21) | 5' TTTN |
| MAD7 (SEQ ID NO: 1) | GGAAUUUCUAC (SEQ ID NO: 102) | GUAGA (SEQ ID NO: 21) | 5' TTTN |
| MAD7 (SEQ ID NO: 1) | UAAUUCCCAC (SEQ ID NO: 17) | GUGGG (SEQ ID NO: 22) | 5' TTTN |
| MAD2 (SEQ ID NO: 2) | AUCUAC (SEQ ID NO: 16) | GUAGA (SEQ ID NO: 21) | 5' TTTN |
| AsCpf1 (SEQ ID NO: 3) | UAAUUUCUAC (SEQ ID NO: 15) | GUAGA (SEQ ID NO: 21) | 5' TTTN |
| LbCpf1 (SEQ ID NO: 4) | UAAUUUCUAC (SEQ ID NO: 15) | GUAGA (SEQ ID NO: 21) | 5' TTTN |
| FnCpf1 (SEQ ID NO: 5) | UAAUUUCUACU (SEQ ID NO: 18) | GUAGA (SEQ ID NO: 21) | 5' TTN |
| *Prevotella bryantii* Cpf1 (SEQ ID NO: 6) | AAUUUCUAC (SEQ ID NO: 19) | GUAGA (SEQ ID NO: 21) | 5' TTTC |
| *Proteocatella sphenisci* Cpf1 (SEQ ID NO: 7) | AAUUUCUAC (SEQ ID NO: 19) | GUAGA (SEQ ID NO: 21) | 5' TTTC |
| *Anaerovibrio* sp. RM50 Cpf1 (SEQ ID NO: 8) | AAUUUCUAC (SEQ ID NO: 19) | GUAGA (SEQ ID NO: 21) | 5' TTTC |
| *Moraxella caprae* Cpf1 (SEQ ID NO: 9) | GAAUUUCUAC (SEQ ID NO: 20) | GUAGA (SEQ ID NO: 21) | 5' TTTC |
| *Lachnospiraceae* bacterium COE1 Cpf1 (SEQ ID NO: 10) | GAAUUUCUAC (SEQ ID NO: 20) | GUAGA (SEQ ID NO: 21) | 5' TTTC |
| *Eubacterium coprostanoligenes* Cpf1 (SEQ ID NO: 11) | GAAUUUCUAC (SEQ ID NO: 20) | GUAGA (SEQ ID NO: 21) | 5' TTTC |
| *Smithella* sp. SCADC Csm1 (SEQ ID NO: 12) | GAAUUUCUAC (SEQ ID NO: 20) | GUAGA (SEQ ID NO: 21) | 5' TTTC |
| *Sulfuricurvum* sp. Csm1 (SEQ ID NO: 13) | GAAUUUCUAC (SEQ ID NO: 20) | GUAGA (SEQ ID NO: 21) | 5' TTTC |
| Microgenomates (Roizmanbacteria) bacterium Csm1 (SEQ ID NO: 14) | GAAUUUCUAC (SEQ ID NO: 20) | GUAGA (SEQ ID NO: 21) | 5' TTTC |

[1]The amino acid sequences of the Cas proteins are provided at the end of the specification.
[2]It is understood that a "modulator sequence" listed herein may constitute the nucleotide sequence of a modulator nucleic acid. Alternatively, additional nucleotide sequences can be comprised in the modulator nucleic acid 5' and/or 3' to a "modulator sequence" listed herein.
[3]In the consensus PAM sequences, N represents A, C, G, or T. When the PAM sequence is preceded by "5'," it means that the PAM is immediately upstream from the target sequence when using the non-target strand (i.e., the strand not hybridized with the spacer sequence) as the coordinate.

In certain embodiments, the targeter nucleic acid of the engineered, non-naturally occurring system comprises a targeter stem sequence listed in Table 1. In certain embodiments, the targeter nucleic acid and the modulator nucleic acid of the engineered, non-naturally occurring system comprise, respectively, a targeter stem sequence and a modulator sequence listed in the same line of Table 1. In certain embodiments, the engineered, non-naturally occurring system further comprises a Cas nuclease comprising the amino acid sequence set forth in the SEQ ID NO listed in the same line of Table 1. In certain embodiments, the engineered, non-naturally occurring system is useful for targeting, editing, or modifying a nucleic acid comprising a target nucleotide sequence close or adjacent to (e.g., immediately downstream of) a PAM listed in the same line of Table 1 when using the non-target strand (i.e., the strand not hybridized with the spacer sequence) as the coordinate.

In certain embodiments, the engineered, non-naturally occurring system is tunable or inducible. For example, in certain embodiments, the targeter nucleic acid, the modulator nucleic acid, and/or the Cas protein can be introduced to the target nucleotide sequence at different times, the system becoming active only when all components are present. In certain embodiments, the amounts of the targeter nucleic acid, the modulator nucleic acid, and/or the Cas protein can be titrated to achieve desirable efficiency and specificity. In certain embodiments, excess amount of a nucleic acid comprising the targeter stem sequence or the modulator stem sequence can be added to the system, thereby dissociating the complex of the targeter nucleic and modulator nucleic acid and turning off the system.

RNA Modifications

The targeter nucleic acid may comprise a DNA (e.g., modified DNA), an RNA (e.g., modified RNA), or a combination thereof. The modulator nucleic acid may comprise a DNA (e.g., modified DNA), an RNA (e.g., modified RNA), or a combination thereof. In certain embodiments, the targeter nucleic acid is an RNA and the modulator nucleic acid is an RNA. A targer nucleic acid in the form of an RNA is also called targeter RNA, and a modulator nucleic acid in the form of an RNA is also called modulator RNA. The nucleotide sequences disclosed herein are presented as DNA sequences by including thymidines (T) and/or RNA sequences including uridines (U). It is understood that corresponding DNA sequences, RNA sequences, and DNA/RNA chimeric sequences are also contemplated. For example, where a spacer sequence is presented as a DNA sequence, a nucleic acid comprising this spacer sequence as an RNA can be derived from the DNA sequence disclosed herein by replacing each T with U. As a result, for the purpose of describing a nucleotide sequence, T and U are used interchangeably herein.

In certain embodiments, the targeter nucleic acid and/or the modulator nucleic acid are RNAs with one or more modifications in a ribose group, one or more modifications in a phosphate group, one or more modifications in a nucleobase, one or more terminal modifications, or a combination thereof. Exemplary modifications are disclosed in U.S. Patent Application Publication Nos. 2016/0289675, 2017/0355985, 2018/0119140, Watts et al. (2008) Drug Discov. Today 13:842-55, and Hendel et al. (2015) NAT. BIOTECHNOL. 33:985.

Modifications in a ribose group include but are not limited to modifications at the 2' position or modifications at the 4' position. For example, in certain embodiments, the ribose comprises 2'-O—C1-4alkyl, such as 2'-O-methyl (2'-OMe). In certain embodiments, the ribose comprises 2'-O—C1-3alkyl-O—C1-3alkyl, such as 2'-methoxyethoxy (2'-O—CH$_2$CH$_2$OCH$_3$) also known as 2'-O-(2-methoxyethyl) or 2'-MOE. In certain embodiments, the ribose comprises 2'-O-allyl. In certain embodiments, the ribose comprises 2'-O-2,4-Dinitrophenol (DNP). In certain embodiments, the ribose comprises 2'-halo, such as 2'-F, 2'-Br, 2'-Cl, or 2'-I. In certain embodiments, the ribose comprises 2'-NH$_2$. In certain embodiments, the ribose comprises 2'-H (e.g., a deoxynucleotide). In certain embodiments, the ribose comprises 2'-arabino or 2'-F-arabino. In certain embodiments, the ribose comprises 2'-LNA or 2'-ULNA. In certain embodiments, the ribose comprises a 4'-thioribosyl.

Modifications in a phosphate group include but are not limited to a phosphorothioate internucleotide linkage, a chiral phosphorothioate internucleotide linkage, a phosphorodithioate internucleotide linkage, a boranophosphonate internucleotide linkage, a C$_{1-4}$alkyl phosphonate internucleotide linkage such as a methylphosphonate internucleotide linkage, a boranophosphonate internucleotide linkage, a phosphonocarboxylate internucleotide linkage such as a phosphonoacetate internucleotide linkage, a phosphonocarboxylate ester internucleotide linkage such as a phosphonoacetate ester internucleotide linkage, an amide linkage, a thiophosphonocarboxylate internucleotide linkage such as a thiophosphonoacetate internucleotide linkage, a thiophosphonocarboxylate ester internucleotide linkage such as a thiophosphonoacetate ester internucleotide linkage, and a 2',5'-linkage having a phosphodiester linker or any of the linkers above. Various salts, mixed salts and free acid forms are also included.

Modifications in a nucleobase include but are not limited to 2-thiouracil, 2-thiocytosine, 4-thiouracil, 6-thioguanine, 2-aminoadenine, 2-aminopurine, pseudouracil, hypoxanthine, 7-deazaguanine, 7-deaza-8-azaguanine, 7-deazaadenine, 7-deaza-8-azaadenine, 5-methylcytosine, 5-methyluracil, 5-hydroxymethylcytosine, 5-hydroxymethyluracil, 5,6-dehydrouracil, 5-propynylcytosine, 5-propynyluracil, 5-ethynylcytosine, 5-ethynyluracil, 5-allyluracil, 5-allylcytosine, 5-aminoallyluracil, 5-aminoallyl-cytosine, 5-bromouracil, 5-iodouracil, diaminopurine, difluorotoluene, dihydrouracil, an abasic nucleotide, Z base, P base, Unstructured Nucleic Acid, isoguanine, isocytosine (see, Piccirilli et al. (1990) NATURE, 343:33), 5-methyl-2-pyrimidine (see, Rappaport (1993) BIOCHEMISTRY, 32:3047), x(A,G,C,T), and y(A,G,C,T).

Terminal modifications include but are not limited to polyethyleneglycol (PEG), hydrocarbon linkers (such as heteroatom (O,S,N)-substituted hydrocarbon spacers; halo-substituted hydrocarbon spacers; keto-, carboxyl-, amido-, thionyl-, carbamoyl-, thionocarbamaoyl-containing hydrocarbon spacers), spermine linkers, dyes such as fluorescent dyes (for example, fluoresceins, rhodamines, cyanines), quenchers (for example, dabcyl, BHQ), and other labels (for example biotin, digoxigenin, acridine, streptavidin, avidin, peptides and/or proteins). In certain embodiments, a terminal modification comprises a conjugation (or ligation) of the RNA to another molecule comprising an oligonucleotide (such as deoxyribonucleotides and/or ribonucleotides), a peptide, a protein, a sugar, an oligosaccharide, a steroid, a lipid, a folic acid, a vitamin and/or other molecule. In certain embodiments, a terminal modification incorporated into the RNA is located internally in the RNA sequence via a linker such as 2-(4-butylamidofluorescein) propane-1,3-diol bis (phosphodiester) linker, which is incorporated as a phosphodiester linkage and can be incorporated anywhere between two nucleotides in the RNA.

The modifications disclosed above can be combined in the targeter nucleic acid and/or the modulator nucleic acid that are in the form of RNA. In certain embodiments, the modification in the RNA is selected from the group consisting of incorporation of 2'-O-methyl-3'phosphorothioate, 2'-O-methyl-3'-phosphonoacetate, 2'-O-methyl-3'-thiophosphonoacetate, 2'-halo-3'-phosphorothioate (e.g., 2'-fluoro-3'-phosphorothioate), 2'-halo-3'-phosphonoacetate (e.g., 2'-fluoro-3'-phosphonoacetate), and 2'-halo-3'-thiophosphonoacetate (e.g., 2'-fluoro-3'-thiophosphonoacetate).

In certain embodiments, the modification alters the stability of the RNA. In certain embodiments, the modification enhances the stability of the RNA, e.g., by increasing nuclease resistance of the RNA relative to a corresponding RNA without the modification. Stability-enhancing modifications include but are not limited to incorporation of 2'-O-methyl, a 2'-O—C$_{1-4}$alkyl, 2'-halo (e.g., 2'-F, 2'-Br, 2'-Cl, or 2'-I), 2'MOE, a 2'-O—C$_{1-3}$alkyl-O—C$_{1-3}$alkyl, 2'-NH$_2$, 2'-H (or 2'-deoxy), 2'-arabino, 2'-F-arabino, 4'-thioribosyl sugar moiety, 3'-phosphorothioate, 3'-phosphonoacetate, 3'-thiophosphonoacetate, 3'-methylphosphonate, 3'-boranophosphate, 3'-phosphorodithioate, locked nucleic acid ("LNA") nucleotide which comprises a methylene bridge between the 2' and 4' carbons of the ribose ring, and unlocked nucleic acid ("ULNA") nucleotide. Such modifications are suitable for use as a protecting group to prevent or reduce degradation of the 5' tail, modulator stem sequence, targeter stem sequence, and/or spacer sequence (see, the "Targeter and Modulator nucleic acids" subsection supra).

In certain embodiments, the modification alters the specificity of the engineered, non-naturally occurring system. In certain embodiments, the modification enhances the specification of the engineered, non-naturally occurring system, e.g., by enhancing on-target binding and/or cleavage, or reducing off-target binding and/or cleavage, or a combination thereof. Specificity-enhancing modifications include but are not limited to 2-thiouracil, 2-thiocytosine, 4-thiouracil, 6-thioguanine, 2-aminoadenine, and pseudouracil.

In certain embodiments, the modification alters the immunostimulatory effect of the RNA relative to a corresponding RNA without the modification. For example, in certain embodiments, the modification reduces the ability of the RNA to activate TLR7, TLR8, TLR9, TLR3, RIG-I, and/or MDA5.

In certain embodiments, the targeter nucleic acid and/or the modulator nucleic acid comprise at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 modified nucleotides. The modification can be made at one or more positions in the targeter nucleic acid and/or the modulator nucleic acid such that these nucleic acids retain functionality. For example, the modified nucleic acids can still direct the Cas protein to the target nucleotide sequence and allow the Cas protein to exert its effector function. It is understood that the particular modification(s) at a position may be selected based on the functionality of the nucleotide at the position. For example, a specificity-enhancing modification may be suitable for a nucleotide in the spacer sequence, the targeter stem sequence, or the modulator stem sequence. A stability-enhancing modification may be suitable for one or more terminal nucleotides in the targeter nucleic acid and/or the modulator nucleic acid. In certain embodiments, at least 1 (e.g., at least 2, at least 3, at least 4, or at least 5) terminal nucleotides at the 5' end and/or at least 1 (e.g., at least 2, at least 3, at least 4, or at least 5) terminal nucleotides at the 3' end of the targeter nucleic acid are modified nucleotides. In certain embodiments, 5 or fewer (e.g., 1 or fewer, 2 or fewer, 3 or fewer, or 4 or fewer) terminal nucleotides at the 5' end and/or 5 or fewer (e.g., 1 or fewer, 2 or fewer, 3 or fewer, or 4 or fewer) terminal nucleotides at the 3' end of the targeter nucleic acid are modified nucleotides. In certain embodiments, at least 1 (e.g., at least 2, at least 3, at least 4, or at least 5) terminal nucleotides at the 5' end and/or at least 1 (e.g., at least 2, at least 3, at least 4, or at least 5) terminal nucleotides at the 3' end of the modulator nucleic acid are modified nucleotides. In certain embodiments, 5 or fewer (e.g., 1 or fewer, 2 or fewer, 3 or fewer, or 4 or fewer) terminal nucleotides at the 5' end and/or 5 or fewer (e.g., 1 or fewer, 2 or fewer, 3 or fewer, or 4 or fewer) terminal nucleotides at the 3' end of the modulator nucleic acid are modified nucleotides. Selection of positions for modifications is described in U.S. Patent Application Publication Nos. 2016/0289675 and 2017/0355985. As used in this paragraph, where the targeter or modulator nucleic acid is a combination of DNA and RNA, the nucleic acid as a whole is considered as an RNA, and the DNA nucleotide(s) are considered as modification(s) of the RNA, including a 2'-H modification of the ribose and optionally a modification of the nucleobase.

It is understood that the targeter nucleic acid and the modulator nucleic acid, while not in the same nucleic acids, i.e., not linked end-to-end through a traditional internucleotide bond, can be covalently conjugated to each other through one or more chemical modifications introduced into these nucleic acids, thereby increasing the stability of the double-stranded complex and/or improving other characteristics of the system.

II. Methods of Targeting, Editing, and/or Modifying Genomic DNA

The engineered, non-naturally occurring system disclosed herein are useful for targeting, editing, and/or modifying a target nucleic acid, such as a DNA (e.g., genomic DNA) in a cell or organism. Accordingly, in one aspect, the present invention provides a method of modifying a target nucleic acid (e.g., DNA) having a target nucleotide sequence, the method comprising contacting the target nucleic acid with the engineered, non-naturally occurring system disclosed herein, thereby resulting in modification of the target nucleic acid.

The engineered, non-naturally occurring system can be contacted with the target nucleic acid as a complex. Accordingly, in certain embodiments, the method comprises contacting the target nucleic acid with a dual guide CRISPR-Cas complex comprising (a) a targeter nucleic acid comprising (i) a spacer sequence designed to hybridize with the target nucleotide sequence and (ii) a targeter stem sequence; (b) a modulator nucleic acid comprising a modulator stem sequence complementary to the targeter stem sequence; and (c) a Cas protein, wherein the targeter nucleic acid and the modulator nucleic acid are separate nucleic acids, and wherein the targeter nucleic acid and the modulator nucleic acid form a complex that is capable of activating a Cas nuclease that, in a naturally occurring system, is activated by a single crRNA in the absence of a tracrRNA, thereby resulting in modification of the target nucleic acid. In certain embodiments, the Cas protein comprises an amino acid sequence at least 80% (e.g., at least 85%, at least 90%, at least 91%, at least 92%, at least 93%, at least 94%, at least 95%, at least 96%, at least 97%, at least 98%, or at least 99%) identical to the Cas nuclease.

The Cas protein and the Cas nuclease can be identical. Accordingly, in certain embodiments, the present invention provides a method of cleaving a target nucleic acid (e.g., DNA) having a target nucleotide sequence, the method comprising contacting the target nucleic acid with the engineered, non-naturally occurring system disclosed herein, thereby resulting in leavage of the target DNA. In certain embodiments, the method comprises contacting the target nucleic acid with a dual guide CRISPR-Cas complex comprising (a) a targeter nucleic acid comprising (i) a spacer sequence designed to hybridize with the target nucleotide sequence and (ii) a targeter stem sequence; (b) a modulator nucleic acid comprising a modulator stem sequence complementary to the targeter stem sequence; and (c) a Cas nuclease, wherein the targeter nucleic acid and the modulator nucleic acid are separate nucleic acids, wherein in a naturally occurring system the Cas nuclease is activated by a single crRNA in the absence of a tracrRNA, thereby resulting in cleavage of the target nucleic acid by the Cas nuclease.

In certain embodiments, the Cas nuclease is a type V-A, type V-C, or type V-D Cas nuclease. In certain embodiments, the Cas nuclease is a type V-A Cas nuclease. In certain embodiments, the target nucleic acid further comprises a cognate PAM positioned relative to the target nucleotide sequence such that (a) the dual guide CRISPR-Cas complex binds the target nucleic acid; or (b) the Cas nuclease is activated when the dual guide CRISPR-Cas complex binds the target nucleic acid.

The dual guide CRISPR-Cas complex may be delivered to a cell by introducing a pre-formed ribonucleoprotein (RNP) complex into the cell. Alternatively, one or more components of the dual guide CRISPR-Cas complex may be expressed in the cell. Exemplary methods of delivery are known in the art and described in, for example, U.S. Pat. Nos. 10,113,167 and 8,697,359 and U.S. Patent Application Publication Nos. 2015/0344912, 2018/0044700, 2018/0003696, 2018/0119140, 2017/0107539, 2018/0282763, and 2018/0363009.

It is understood that contacting a DNA (e.g., genomic DNA) in a cell with a dual guide CRISPR-Cas complex does not require delivery of all components of the complex into the cell. For examples, one or more of the components may be pre-existing in the cell. In certain embodiments, the cell (or a parental/ancestral cell thereof) has been engineered to express the Cas protein, and the targeter nucleic acid (or a nucleic acid comprising a regulatory element operably linked to a nucleotide sequence encoding the targeter nucleic acid) and the modulator nucleic acid (or a nucleic acid comprising a regulatory element operably linked to a nucleotide sequence encoding the modulator nucleic acid) are delivered into the cell. In certain embodiments, the cell (or a parental/ancestral cell thereof) has been engineered to express the modulator nucleic acid, and the Cas protein (or a nucleic acid comprising a regulatory element operably linked to a nucleotide sequence encoding the Cas protein) and the targeter nucleic acid (or a nucleic acid comprising a regulatory element operably linked to a nucleotide sequence encoding the targeter nucleic acid) are delivered into the cell. In certain embodiments, the cell (or a parental/ancestral cell thereof) has been engineered to express the Cas protein and the modulator nucleic acid, and the targeter nucleic acid (or a nucleic acid comprising a regulatory element operably linked to a nucleotide sequence encoding the targeter nucleic acid) is delivered into the cell.

In certain embodiments, the target DNA is in the genome of a target cell. Accordingly, in another aspect, the present invention provides a cell comprising the non-naturally occurring system or a CRISPR expression system described herein. In addition, the present invention provides a cell whose genome has been modified by the dual guide CRISPR-Cas system or complex disclosed herein.

The target cells can be mitotic or post-mitotic cells from any organism, such as a bacterial cell, an archaeal cell, a cell of a single-cell eukaryotic organism, a plant cell, an algal cell, e.g., *Botryococcus braunii, Chlamydomonas reinhardtii, Nannochloropsis gaditana, Chlorella pyrenoidosa, Sargassum patens* C. Agardh, and the like, a fungal cell (e.g., a yeast cell), an animal cell, a cell from an invertebrate animal (e.g. fruit fly, enidarian, echinoderm, nematode, etc.), a cell from a vertebrate animal (e.g., fish, amphibian, reptile, bird, mammal), a cell from a mammal, a cell from a rodent, or a cell from a human. The types of target cells include but are not limited to a stem cell (e.g., an embryonic stem (ES) cell, an induced pluripotent stem (iPS) cell, a germ cell), a somatic cell (e.g., a fibroblast, a hematopoietic cell, a T lymphocyte (e.g., $CD8^+$ T lymphocyte), an NK cell, a neuron, a muscle cell, a bone cell, a hepatocyte, a pancreatic cell), an in vitro or in vivo embryonic cell of an embryo at any stage (e.g., a 1-cell, 2-cell, 4-cell, 8-cell; stage zebrafish embryo). Cells may be from established cell lines or may be primary cells (i.e., cells and cells cultures that have been derived from a subject and allowed to grow in vitro for a limited number of passages of the culture). For example, primary cultures are cultures that may have been passaged within 0 times, 1 time, 2 times, 4 times, 5 times, 10 times, or 15 times, but not enough times to go through the crisis stage. Typically, the primary cell lines of the present invention are maintained for fewer than 10 passages in vitro. If the cells are primary cells, they may be harvest from an individual by any suitable method. For example, leukocytes may be harvested by apheresis, leukocytapheresis, or density gradient separation, while cells from tissues such as skin, muscle, bone marrow, spleen, liver, pancreas, lung, intestine, or stomach can be harvested by biopsy. The harvested cells may be used immediately, or may be stored under frozen conditions with a cryopreservative and thawed at a later time in a manner as commonly known in the art.

Ribonucleoprotein (RNP) Delivery and "Cas RNA" Delivery

The engineered, non-naturally occurring system disclosed herein can be delivered into a cell by suitable methods known in the art, including but not limited to ribonucleoprotein (RNP) delivery and "Cas RNA" delivery described below.

In certain embodiments, a dual guide CRISPR-Cas system including a targeter nucleic acid, a modulator nucleic acid, and a Cas protein can be combined into a RNP complex and then delivered into the cell as a pre-formed complex. This method is suitable for active modification of the genetic or epigenetic information in a cell during a limited time period. For example, where the Cas protein has nuclease activity to modify the genomic DNA of the cell, the nuclease activity only needs to be retained for a period of time to allow DNA cleavage, and prolonged nuclease activity may increase off-targeting. Similarly, certain epigenetic modifications can be maintained in a cell once established and can be inherited by daughter cells.

A "ribonucleoprotein" or "RNP," as used herein, refers to a complex comprising a nucleoprotein and a ribonucleic acid. A "nucleoprotein" as provided herein refers to a protein capable of binding a nucleic acid (e.g., RNA, DNA). Where the nucleoprotein binds a ribonucleic acid it is referred to as "ribonucleoprotein." The interaction between the ribonucleoprotein and the ribonucleic acid may be direct, e.g., by covalent bond, or indirect, e.g., by non-covalent bond (e.g. electrostatic interactions (e.g. ionic bond, hydrogen bond, halogen bond), van der Waals interactions (e.g. dipole-dipole, dipole-induced dipole, London dispersion), ring stacking (pi effects), hydrophobic interactions, and the like). In certain embodiments, the ribonucleoprotein includes an RNA-binding motif non-covalently bound to the ribonucleic acid. For example, positively charged aromatic amino acid residues (e.g., lysine residues) in the RNA-binding motif may form electrostatic interactions with the negative nucleic acid phosphate backbones of the RNA.

To ensure efficient loading of the Cas protein, the targeter nucleic acid and the modulator nucleic acid can be provided in excess molar amount (e.g., about 2 fold, about 3 fold, about 4 fold, or about 5 fold) relative to the Cas protein. In certain embodiments, the targeter nucleic acid and the modulator nucleic acid are annealed under suitable conditions prior to complexing with the Cas protein. In other embodiments, the targeter nucleic acid, the modulator nucleic acid, and the Cas protein are directly mixed together to form an RNP.

A variety of delivery methods can be used to introduce an RNP disclosed herein into a cell. Exemplary delivery methods or vehicles include but are not limited to microinjection, liposomes (see, e.g., U.S. Patent Publication No. 2017/0107539) such as molecular trojan horses liposomes that delivers molecules across the blood brain barrier (see, Pardridge et al. (2010) COLD SPRING HARB. PROTOC., doi: 10.1101/pdb.prot5407), immunoliposomes, virosomes, microvesicles (e.g., exosomes and ARMMs), polycations, lipid: nucleic acid conjugates, electroporation, cell permeable peptides (see, U.S. Patent Publication No. 2018/0363009), nanoparticles, nanowires (see, Shalek et al. (2012) NANO LETTERS, 12:6498), exosomes, and perturbation of cell membrane (e.g., by passing cells through a constriction in a microfluidic system, see, U.S. Patent Publication No. 2018/0003696). Where the target cell is a proliferating cell, the efficiency of RNP delivery can be enhanced by cell cycle synchronization (see, U.S. Patent Publication No. 2018/0044700).

In other embodiments, the dual guide CRISPR-Cas system is delivered into a cell in a "Cas RNA" approach, i.e., delivering a targeter nucleic acid, a modulator nucleic acid, and an RNA (e.g., messenger RNA (mRNA)) encoding a Cas protein. The RNA encoding the Cas protein can be translated in the cell and form a complex with the targeter nucleic acid and the modulator nucleic acid intracellularly. Similar to the RNP approach, RNAs have limited half-lives in cells, even though stability-increasing modification(s) can be made in one or more of the RNAs. Accordingly, the "Cas RNA" approach is suitable for active modification of the genetic or epigenetic information in a cell during a limited time period, such as DNA cleavage, and has the advantage of reducing off-targeting.

The mRNA can be produced by transcription of a DNA comprising a regulatory element operably linked to a Cas coding sequence. Given that multiple copies of Cas protein can be generated from one mRNA, the targeter nucleic acid and the modulator nucleic acid are generally provided in excess molar amount (e.g., at least 5 fold, at least 10 fold, at least 20 fold, at least 30 fold, at least 50 fold, or at least 100 fold) relative to the mRNA. In certain embodiments, the targeter nucleic acid and the modulator nucleic acid are annealed under suitable conditions prior to delivery into the cells. In other embodiments, the targeter nucleic acid and the modulator nucleic acid are delivered into the cells without annealing in vitro.

A variety of delivery systems can be used to introduce an "Cas RNA" system into a cell. Non-limiting examples of delivery methods or vehicles include microinjection, biolistic particles, liposomes (see, e.g., U.S. Patent Publication No. 2017/0107539) such as molecular trojan horses liposomes that delivers molecules across the blood brain barrier (see, Pardridge et al. (2010) COLD SPRING HARB. PROTOC., doi: 10.1101/pdb.prot5407), immunoliposomes, virosomes, polycations, lipid: nucleic acid conjugates, electroporation, nanoparticles, nanowires (see, Shalek et al. (2012) NANO LETTERS, 12:6498), exosomes, and perturbation of cell membrane (e.g., by passing cells through a constriction in a microfluidic system, see, U.S. Patent Publication No. 2018/0003696). Specific examples of the "nucleic acid only" approach by electroporation are described in International (PCT) Publication No. WO2016/164356.

In other embodiments, the dual guide CRISPR-Cas system is delivered into a cell in the form of a targeter nucleic acid, a modulator nucleic acid, and a DNA comprising a regulatory element operably linked to a Cas coding sequence. The DNA can be provided in a plasmid, viral vector, or any other form described in the "CRISPR Expression Systems" subsection. Such delivery method may result in constitutive expression of Cas protein in the target cell (e.g., if the DNA is maintained in the cell in an episomal vector or is integrated into the genome), and may increase the risk of off-targeting which is undesirable when the Cas protein has nuclease activity. Notwithstanding, this approach is useful when the Cas protein comprises a non-nuclease effector (e.g., a transcriptional activator or repressor). It is also useful for research purposes and for genome editing of plants.

CRISPR Expression Systems

In another aspect, the present invention provides a CRISPR expression system comprising: (a) a nucleic acid comprising a first regulatory element operably linked to a nucleotide sequence encoding a targeter nucleic acid disclosed herein comprising (i) a spacer sequence designed to hybridize with a target nucleotide sequence and (ii) a targeter stem sequence; (b) a nucleic acid comprising a second regulatory element operably linked to a nucleotide sequence encoding a modulator nucleic acid disclosed herein comprising a modulator stem sequence complementary to the targeter stem sequence, wherein the targeter nucleic acid and the modulator nucleic acid are expressed as separate nucleic acids, and wherein a complex comprising the targeter nucleic acid and the modulator nucleic acid is capable of activating a Cas nuclease that, in a naturally occurring system, is activated by a single crRNA in the absence of a tracrRNA.

In certain embodiments, the CRISPR expression system further comprises (c) a nucleic acid comprising a third regulatory element operably linked to a nucleotide sequence encoding a Cas protein disclosed herein. In certain embodiments, the Cas protein comprises an amino acid sequence at least 80% (e.g., at least 85%, at least 90%, at least 91%, at least 92%, at least 93%, at least 94%, at least 95%, at least 96%, at least 97%, at least 98%, or at least 99%) identical to the Cas nuclease, thereby resulting in modification of the target nucleic acid (e.g., DNA). In certain embodiments, the Cas protein and the Cas nuclease are identical, and the method results in cleavage of the target nucleic acid. In certain embodiments, the Cas nuclease is a type V-A, type V-C, or type V-D Cas nuclease. In certain embodiments, the Cas nuclease is a type V-A Cas nuclease.

As used in this context, the term "operably linked" is intended to mean that the nucleotide sequence of interest is linked to the regulatory element in a manner that allows for expression of the nucleotide sequence (e.g., in an in vitro transcription/translation system or in a host cell when the vector is introduced into the host cell).

The form of elements (a), (b), and (c) of the CRISPR expression system described above may be independently selected from various nucleic acids such as DNA (e.g., modified DNA) and RNA (e.g., modified RNA). In certain embodiments, elements (a) and (b) are each in the form of DNA. In certain embodiments, the CRISPR expression system further comprises element (c) in the form of DNA. The third regulatory element can be a constitutive or inducible promoter that drives the expression of the Cas protein. In other embodiments, the CRISPR expression system further comprises element (c) in the form of RNA (e.g., mRNA).

Elements (a), (b), and/or (c) can be provided in one or more vectors. The term "vector," as used herein, refers to a nucleic acid molecule capable of transporting another nucleic acid to which it has been linked. Conventional viral and non-viral based gene transfer methods can be used to introduce nucleic acids in cells, such as prokaryotic cells, eukaryotic cells, mammalian cells, or target tissues. Non-viral vector delivery systems include DNA plasmids, RNA (e.g. a transcript of a vector described herein), naked nucleic acid, and nucleic acid complexed with a delivery vehicle, such as a liposome. Viral vector delivery systems include DNA and RNA viruses, which have either episomal or integrated genomes after delivery to the cell. Gene therapy procedures are known in the art and disclosed in Van Brunt (1988) BIOTECHNOLOGY, 6:1149; Anderson (1992) SCIENCE, 256:808; Nabel & Feigner (1993) TIBTECH, 11:211; Mitani & Caskey (1993) TIBTECH, 11:162; Dillon (1993) TIBTECH, 11:167; Miller (1992) NATURE, 357:455; Vigne, (1995) RESTORATIVE NEUROLOGY AND NEUROSCIENCE, 8:35; Kremer & Perricaudet (1995) BRITISH MEDICAL BULLETIN, 51:31; Haddada et al. (1995) CURRENT TOPICS IN MICROBIOLOGY AND IMMUNOLOGY, 199:297; Yu et al. (1994) GENE THERAPY, 1:13; and Doerfler and Bohm (Eds.) (2012) The Molecular Repertoire of Adenoviruses II: Molecular Biology of Virus- Cell Interactions. In certain embodiments, at least one of the vectors is a DNA plasmid. In certain embodiments, at least one of the vectors is a viral vector (e.g., retrovirus, adenovirus, or adeno-associated virus).

Certain vectors are capable of autonomous replication in a host cell into which they are introduced (e.g., bacterial vectors having a bacterial origin of replication and episomal mammalian vectors). Other vectors (e.g., non-episomal mammalian vectors and replication defective viral vectors) do not autonomously replicate in the host cell. Certain vectors, however, may be integrated into the genome of the host cell and thereby are replicated along with the host genome. A skilled person in the art will appreciate that different vectors may be suitable for different delivery methods and have different host tropism, and will be able to select one or more vectors suitable for the use.

The term "regulatory element," as used herein, refers to a transcriptional and/or translational control sequence, such as a promoter, enhancer, transcription termination signal (e.g., polyadenylation signal), internal ribosomal entry sites (IRES), protein degradation signal, and the like, that provide for and/or regulate transcription of a non-coding sequence (e.g., a targeter nucleic acid or a modulator nucleic acid) or a coding sequence (e.g., a Cas protein) and/or regulate translation of an encoded polypeptide. Such regulatory elements are described, for example, in Goeddel, GENE EXPRESSION TECHNOLOGY: METHODS IN ENZYMOLOGY, 185, Academic Press, San Diego, Calif. (1990). Regulatory elements include those that direct constitutive expression of a nucleotide sequence in many types of host cell and those that direct expression of the nucleotide sequence only in certain host cells (e.g., tissue-specific regulatory sequences). A tissue-specific promoter may direct expression primarily in a desired tissue of interest, such as muscle, neuron, bone, skin, blood, specific organs (e.g., liver, pancreas), or particular cell types (e.g., lymphocytes). Regulatory elements may also direct expression in a temporal-dependent manner, such as in a cell-cycle dependent or developmental stage-dependent manner, which may or may not also be tissue or cell-type specific. In certain embodiments, a vector comprises one or more pol III promoter (e.g., 1, 2, 3, 4, 5, or more pol III promoters), one or more pol II promoters (e.g., 1, 2, 3, 4, 5, or more pol II promoters), one or more pol I promoters (e.g., 1, 2, 3, 4, 5, or more pol I promoters), or combinations thereof. Examples of pol III promoters include, but are not limited to, U6 and HI promoters. Examples of pol II promoters include, but are not limited to, the retroviral Rous sarcoma virus (RSV) LTR promoter (optionally with the RSV enhancer), the cytomegalovirus (CMV) promoter (optionally with the CMV enhancer), the SV40 promoter, the dihydrofolate reductase promoter, the β-actin promoter, the phosphoglycerol kinase (PGK) promoter, and the EF1α promoter. Also encompassed by the term "regulatory element" are enhancer elements, such as WPRE; CMV enhancers; the R-U5' segment in LTR of HTLV-I (see, Takebe et al. (1988) MOL. CELL. BIOL., 8:466); SV40 enhancer; and the intron sequence between exons 2 and 3 of rabbit β-globin (see, O'Hare et al. (1981) PROC. NATL. ACAD. SCI. USA., 78:1527). It will be appreciated by those skilled in the art that the design of the expression vector can depend on factors such as the choice of the host cell to be transformed, the level of expression desired, etc. A vector can be introduced into host cells to produce transcripts, proteins, or peptides, including fusion proteins or peptides, encoded by nucleic acids as described herein (e.g., CRISPR transcripts, proteins, enzymes, mutant forms thereof, or fusion proteins thereof).

In certain embodiments, the nucleotide sequence encoding the Cas protein is codon optimized for expression in a eukaryotic host cell, e.g., a yeast cell, a mammalian cell (e.g., a mouse cell, a rat cell, or a human cell), or a plant cell. Various species exhibit particular bias for certain codons of a particular amino acid. Codon bias (differences in codon usage between organisms) often correlates with the efficiency of translation of messenger RNA (mRNA), which is in turn believed to be dependent on, among other things, the properties of the codons being translated and the availability of particular transfer RNA (tRNA) molecules. The predominance of selected tRNAs in a cell is generally a reflection of the codons used most frequently in peptide synthesis. Accordingly, genes can be tailored for optimal gene expression in a given organism based on codon optimization. Codon usage tables are readily available, for example, at the "Codon Usage Database" available at kazusa.or.jp/codon/ and these tables can be adapted in a number of ways (see, Nakamura et al. (2000) NUCL. ACIDS RES., 28:292). Computer algorithms for codon optimizing a particular sequence for expression in a particular host cell, such as Gene Forge (Aptagen; Jacobus, Pa.), are also available. In certain embodiments, the codon optimization facilitates or improves expression of the Cas protein in the host cell.

Donor Templates

Cleavage of a target nucleotide sequence in the genome of a cell by the dual guide CRISPR-Cas system or complex disclosed herein can activate the DNA damage pathways, which may rejoin the cleaved DNA fragments by NHEJ or HDR. HDR requires a repair template, either endogenous or exogenous, to transfer the sequence information from the repair template to the target.

In certain embodiments, the engineered, non-naturally occurring system or CRISPR expression system further comprises a donor template. As used herein, the term "donor template" refers to a nucleic acid designed to serve as a repair template at or near the target nucleotide sequence upon introduction into a cell or organism. In certain embodiments, the donor template is complementary to a polynucleotide comprising the target nucleotide sequence or a portion thereof. When optimally aligned, a donor template may overlap with one or more nucleotides of a target nucleotide sequences (e.g. about or more than about 1, 5, 10, 15, 20, 25, 30, 35, 40, or more nucleotides). The nucleotide sequence of the donor template is typically not identical to the genomic sequence that it replaces. Rather, the donor template may contain one or more substitutions, insertions, deletions, inversions or rearrangements with respect to the genomic sequence, so long as sufficient homology is present to support homology-directed repair. In certain embodiments, the donor template comprises a non-homologous sequence flanked by two regions of homology (i.e., homology arms), such that homology-directed repair between the target DNA region and the two flanking sequences results in insertion of the non-homologous sequence at the target region. In certain embodiments, the donor template comprises a non-homologous sequence 10-100 nucleotides, 50-500 nucleotides, 100-1,000 nucleotides, 200-2,000 nucleotides, or 500-5,000 nucleotides in length positioned between two homology arms.

Generally, the homologous region(s) of a donor template has at least 50% sequence identity to a genomic sequence with which recombination is desired. The homology arms are designed or selected such that they are capable of recombining with the nucleotide sequences flanking the target nucleotide sequence under intracellular conditions. In certain embodiments, where HDR of the non-target strand is desired, the donor template comprises a first homology arm homologous to a sequence 5' to the target nucleotide sequence and a second homology arm homologous to a sequence 3' to the target nucleotide sequence. In certain embodiments, the first homology arm is at least 50% (e.g., at least 60%, at least 70%, at least 75%, at least 80%, at least 85%, at least 90%, at least 91%, at least 92%, at least 93%, at least 94%, at least 95%, at least 96%, at least 97%, at least 98%, at least 99%, or 100%) identical to a sequence 5' to the target nucleotide sequence. In certain embodiments, the second homology arm is at least 50% (e.g., at least 60%, at least 70%, at least 75%, at least 80%, at least 85%, at least 90%, at least 91%, at least 92%, at least 93%, at least 94%, at least 95%, at least 96%, at least 97%, at least 98%, at least 99%, or 100%) identical to a sequence 3' to the target nucleotide sequence. In certain embodiments, when the donor template sequence and a polynucleotide comprising a target nucleotide sequence are optimally aligned, the nearest nucleotide of the donor template is within about 1, 5, 10, 15, 20, 25, 50, 75, 100, 200, 300, 400, 500, 1000, 2000, 3000, 4000, or more nucleotides from the target nucleotide sequence.

In certain embodiments, the donor template further comprises an engineered sequence not homologous to the sequence to be repaired. Such engineered sequence can harbor a barcode and/or a sequence capable of hybridizing with a donor template-recruiting sequence disclosed herein.

In certain embodiments, the donor template further comprises one or more mutations relative to the genomic sequence, wherein the one or more mutations reduce or prevent cleavage, by the same CRISPR-Cas system, of the donor template or of a modified genomic sequence with at least a portion of the donor template sequence incorporated. In certain embodiments, in the donor template, the PAM adjacent to the target nucleotide sequence and recognized by the Cas nuclease is mutated to a sequence not recognized by the same Cas nuclease. In certain embodiments, in the donor template, the target nucleotide sequence (e.g., the seed region) is mutated. In certain embodiments, the one or more mutations are silent with respect to the reading frame of a protein-coding sequence encompassing the mutated sites.

The donor template can be provided to the cell as single-stranded DNA, single-stranded RNA, double-stranded DNA, or double-stranded RNA. It is understood that the dual guide CRISPR-Cas system disclosed herein may possess nuclease activity to cleave the target strand, the non-target strand, or both. When HDR of the target strand is desired, a donor template having a nucleic acid sequence complementary to the target strand is also contemplated.

The donor template can be introduced into a cell in linear or circular form. If introduced in linear form, the ends of the donor template may be protected (e.g., from exonucleolytic degradation) by methods known to those of skill in the art. For example, one or more dideoxynucleotide residues are added to the 3' terminus of a linear molecule and/or self-complementary oligonucleotides are ligated to one or both ends (see, for example, Chang et al. (1987) PROC. NATL. ACAD SCI USA, 84:4959; Nehls et al. (1996) SCIENCE, 272:886; see also the chemical modifications for increasing stability and/or specificity of RNA disclosed supra). Additional methods for protecting exogenous polynucleotides from degradation include, but are not limited to, addition of terminal amino group(s) and the use of modified internucleotide linkages such as, for example, phosphorothioates, phosphoramidates, and O-methyl ribose or deoxyribose residues. As an alternative to protecting the termini of a linear donor template, additional lengths of sequence may be included outside of the regions of homology that can be degraded without impacting recombination.

A donor template can be a component of a vector as described herein, contained in a separate vector, or provided as a separate polynucleotide, such as an oligonucleotide, linear polynucleotide, or synthetic polynucleotide. In certain embodiments, the donor template is a DNA. In certain embodiments, a donor template is in the same nucleic acid as a sequence encoding the targeter nucleic acid, a sequence encoding the modulator nucleic acid, and/or a sequence encoding the Cas protein, where applicable. In certain embodiments, a donor template is provided in a separate nucleic acid. A donor template polynucleotide may be of any suitable length, such as about or at least about 50, 75, 100, 150, 200, 500, 1000, 2000, 3000, 4000, or more nucleotides in length.

A donor template can be introduced into a cell as an isolated nucleic acid. Alternatively, a donor template can be introduced into a cell as part of a vector (e.g., a plasmid) having additional sequences such as, for example, replication origins, promoters and genes encoding antibiotic resistance, that are not intended for insertion into the DNA region of interest. Alternatively, a donor template can be delivered by viruses (e.g., adenovirus, adeno-associated virus (AAV)). In certain embodiments, the donor template is introduced as an AAV, e.g., a pseudotyped AAV. The capsid proteins of the AAV can be selected by a person skilled in the art based upon the tropism of the AAV and the target cell type. For example, in certain embodiments, the donor template is introduced into a hepatocyte as AAV8 or AAV9. In certain embodiments, the donor template is introduced into a hematopoietic stem cell, a hematopoietic progenitor cell, or a T lymphocyte (e.g., CD8 T lymphocyte) as AAV6 or an AAVHSC (see, U.S. Pat. No. 9,890,396). It is understood that the sequence of a capsid protein (VP1, VP2, or VP3) may be modified from a wild-type AAV capsid protein, for example, having at least 50% (e.g., at least 60%, at least 70%, at least 75%, at least 80%, at least 85%, at least 90%, at least 91%, at least 92%, at least 93%, at least 94%, at least 95%, at least 96%, at least 97%, at least 98%, or at least 99%) sequence identity to a wild-type AAV capsid sequence.

The donor template can be delivered to a cell (e.g., a primary cell) by various delivery methods, such as a viral or non-viral method disclosed herein. In certain embodiments, a non-viral donor template is introduced into the target cell as a naked nucleic acid or in complex with a liposome or poloxamer. In certain embodiments, a non-viral donor template is introduced into the target cell by electroporation. In other embodiments, a viral donor template is introduced into the target cell by infection. The engineered, non-naturally occurring system can be delivered before, after, or simultaneously with the donor template (see, International (PCT) Application Publication No. WO2017/053729). A skilled person in the art will be able to choose proper timing based upon the form of delivery (consider, for example, the time needed for transcription and translation of RNA and protein components) and the half-life of the molecule(s) in the cell. In particular embodiments, where the dual guide CRISPR-Cas system including the Cas protein is delivered by electroporation (e.g., as an RNP), the donor template (e.g., as an AAV) is introduced into the cell within 4 hours (e.g., within 1, 2, 3, 4, 5, 6, 7, 8, 9, 10, 11, 12, 13, 14, 15, 16, 17, 18, 19, 20, 25, 30, 35, 40, 45, 50, 55, 60, 90, 120, 150, 180, 210, or 240 minutes) after the introduction of the engineered, non-naturally occurring system.

In certain embodiments, the donor template is conjugated covalently to the modulator nucleic acid. Covalent linkages suitable for this conjugation are known in the art and are described, for example, in U.S. Pat. No. 9,982,278 and Savic et al. (2018) ELIFE 7: e33761. In certain embodiments, the donor template is covalently linked to the modulator nucleic acid (e.g., the 5' end of the modulator nucleic acid) through an internucleotide bond. In certain embodiments, the donor template is covalently linked to the modulator nucleic acid (e.g., the 5' end of the modulator nucleic acid) through a linker.

Efficiency and Specificity

The engineered, non-naturally occurring system of the present invention has the advantage that the efficiency of nucleic acid targeting, cleavage, or modification can be increased or decreased by, for example, adjusting the hybridization of dual guide nucleic acids and the length of the spacer sequence.

In certain embodiments, the engineered, non-naturally occurring system has high efficiency. For example, in certain embodiments, at least 10%, at least 20%, at least 30%, at least 40%, at least 50%, at least 60%, at least 70%, at least 75%, at least 80%, at least 85%, at least 90%, at least 91%, at least 92%, at least 93%, at least 94%, at least 95%, at least 96%, at least 97%, at least 98%, or at least 99% of a population of nucleic acids having the target nucleotide sequence and a cognate PAM, when contacted with the engineered, non-naturally occurring system, is targeted, cleaved, or modified. In certain embodiments, the genomes of at least 10%, at least 20%, at least 30%, at least 40%, at least 50%, at least 60%, at least 70%, at least 75%, at least 80%, at least 85%, at least 90%, at least 91%, at least 92%, at least 93%, at least 94%, at least 95%, at least 96%, at least 97%, at least 98%, or at least 99% of a population of cells, when contacted with the engineered, non-naturally occurring system, are targeted, cleaved, or modified.

It has been observed that the occurrence of on-target events and the occurrence of off-target events are generally correlated. For certain therapeutic purposes, low on-target efficiency can be tolerated and low off-target frequency is more desirable. For example, when editing or modifying a proliferating cell that will be delivered to a subject and proliferate in vivo, tolerance to off-target events is low. Prior to delivery, however, it is possible to assess the on-target and off-target events, thereby selecting one or more colonies that have the desired edit or modification and lack any undesired edit or modification.

The method disclosed herein is suitable for such use. In certain embodiments, when a population of nucleic acids having the target nucleotide sequence and a cognate PAM is contacted with the engineered, non-naturally occurring system disclosed herein, the frequency of off-target events (e.g., targeting, cleavage, or modification, depending on the function of the CRISPR-Cas system) is reduced by at least 50%, at least 60%, at least 70%, at least 75%, at least 80%, at least 85%, at least 90%, at least 91%, at least 92%, at least 93%, at least 94%, at least 95%, at least 96%, at least 97%, at least 98%, or at least 99% relative to the frequency of off-target events when using the corresponding CRISPR system containing a single guide nucleic acid (e.g., a single crRNA consisting of the sequences of the targeter and modulator nucleic acids) under the same conditions. In certain embodiments, when genomic DNA having the target nucleotide sequence and a cognate PAM is contacted with the engineered, non-naturally occurring system disclosed herein in a population of cells, the frequency of off-target events (e.g., targeting, cleavage, or modification, depending on the function of the CRISPR-Cas system) is reduced by at least 50%, at least 60%, at least 70%, at least 75%, at least 80%, at least 85%, at least 90%, at least 91%, at least 92%, at least 93%, at least 94%, at least 95%, at least 96%, at least 97%, at least 98%, or at least 99% relative to the frequency of off-target events when using the corresponding CRISPR system containing a single guide nucleic acid (e.g., a single crRNA consisting of the sequences of the targeter and modulator nucleic acids) under the same conditions. In certain embodiments, when delivered into a population of cells comprising genomic DNA having the target nucleotide sequence and a cognate PAM, the frequency of off-target events (e.g., targeting, cleavage, or modification, depending on the function of the CRISPR-Cas system) in the cells receiving the engineered, non-naturally occurring system disclosed herein is reduced by at least 50%, at least 60%, at least 70%, at least 75%, at least 80%, at least 85%, at least 90%, at least 91%, at least 92%, at least 93%, at least 94%, at least 95%, at least 96%, at least 97%, at least 98%, or at least 99% relative to the frequency of off-target events in the cells receiving the corresponding CRISPR system containing a single guide nucleic acid (e.g., a single crRNA consisting of the sequences of the targeter and modulator nucleic acids) under the same conditions. Methods of assessing off-target events were summarized in Lazzarotto et al. (2018) NAT PROTOC. 13 (11): 2615-42, and include discovery of in situ Cas off-targets and verification by sequencing (DISCOVER-seq) as disclosed in Wienert et al. (2019) SCIENCE 364 (6437): 286-89; genome-wide unbiased identification of double-stranded breaks (DSBs) enabled by sequencing (GUIDE-seq) as disclosed in Kleinstiver et al. (2016) NAT. BIOTECH. 34:869-74; circularization for in vitro reporting of cleavage effects by sequencing (CIRCLE-seq) as described in Kocak et al. (2019) NAT. BIOTECH. 37:657-66. In certain embodiments, the off-target events include targeting, cleavage, or modification at a given off-target locus (e.g., the locus with the highest occurrence of off-target events detected). In certain embodiments, the off-target events include targeting, cleavage, or modification at all the loci with detectable off-target events, collectively.

Multiplex Methods

The method of targeting, editing, and/or modifying a genomic DNA disclosed herein can be conducted in multiplicity. For example, a library of targeter nucleic acids can be used to target multiple genomic loci; a library of donor templates can also be used to generate multiple insertions, deletions, and/or substitutions. The multiplex assay can be conducted in a screening method wherein each separate cell culture (e.g., in a well of a 96-well plate or a 384-well plate) is exposed to a different targeter nucleic acid or a different combination of targeter nucleic acid and donor template. The multiplex assay can also be conducted in a selection method wherein a cell culture is exposed to a mixed population of different targeter nucleic acids and/or donor templates, and the cells with desired characteristics (e.g., functionality) are enriched or selected by advantageous survival or growth, resistance to a certain agent, expression of a detectable protein (e.g., a fluorescent protein that is detectable by flow cytometry), etc.

In certain embodiments, the multiplex method employs a plurality of targeter nucleic acids that are capable of hybridizing with different target nucleotide sequences. In certain embodiments, the plurality of targeter nucleic acids comprise a common targeter stem sequence. In certain embodiments, the multiplex method employs a single modulator nucleic acid capable of hybridizing with the plurality of targeter nucleic acids. In certain embodiments, the multiplex method employs a single Cas protein (e.g., Cas nuclease) disclosed herein.

In certain embodiments, the multiplex method employs a plurality of targeter nucleic acids that are capable of hybridizing with different target nucleotide sequences that are close to or adjacent to different PAMs. In certain embodiments, the plurality of targeter nucleic acids comprise different targeter stem sequences. In certain embodiments, the multiplex method employs a plurality of modulator nucleic acids each capable of hybridizing with a different targeter nucleic acid. In certain embodiments, the multiplex method employs a plurality of Cas proteins (e.g., Cas nucleases) disclosed herein that have different PAM specificity.

In certain embodiments, the multiplex method further comprises introducing one or more donor templates into the population of cells. In certain embodiments, the multiplex method employs a plurality of modulator nucleic acids each comprising a different donor template-recruiting sequence, wherein each donor template-recruiting sequence is capable of hybridizing with a different donor template.

In certain embodiments, the plurality of targeter nucleic acids and/or the plurality of donor templates are designed for saturation editing. For example, in certain embodiments, each nucleotide position in a sequence of interest is systematically modified with each of all four traditional bases, A, T, G and C. In other embodiments, at least one sequence in each gene from a pool of genes of interest is modified, for example, according to a CRISPR design algorithm. In certain embodiments, each sequence from a pool of exogenous elements of interest (e.g., protein coding sequences, non-protein coding genes, regulatory elements) is inserted into one or more given loci of the genome.

It is understood that the multiplex methods suitable for the purpose of carrying out a screening or selection method, which is typically conducted for research purposes, may be different from the methods suitable for therapeutic purposes. For example, constitutive expression of certain elements (e.g., a Cas nuclease and/or a modulator nucleic acid) may be undesirable for therapeutic purposes due to the potential of increased off-targeting. Conversely, for research purposes, constitutive expression of a Cas nuclease and/or a modulator nucleic acid may be desirable. For example, the constitutive expression provides a large window during which other elements can be introduced. When a stable cell line is established for the constitutive expression, the number of exogenous elements that need to be co-delivered into a single cell is also reduced. Therefore, constitutive expression of certain elements can increase the efficiency and reduce the complexity of a screening or selection process. Inducible expression of certain elements of the system disclosed herein may also be used for research purposes given similar advantages. Expression may be induced by an exogenous agent (e.g., a small molecule) or by an endogenous molecule or complex present in a particular cell type (e.g., at a particular stage of differentiation). Methods known in the art, such as those described in the "CRISPR Expression Systems" subsection supra, can be used for constitutively or inducibly expressing one or more elements.

It is further understood that despite the need to introduce at least three elements—the targeter nucleic acid, the modulator nucleic acid, and the Cas protein—these three elements can be delivered into the cell as a single complex of pre-formed RNP. Therefore, the efficiency of the screening or selection process can also be achieved by pre-assembling a plurality of RNP complexes in a multiplex manner.

In certain embodiments, the method disclosed herein further comprises a step of identifying a targeter nucleic acid, a modulator nucleic acid, a Cas protein, a donor template, or a combination of two or more of these elements from the screening or selection process. A set of barcodes may be used, for example, in the donor template between two homology arms, to facilitate the identification. In specific embodiments, the method further comprises harvesting the population of cells; selectively amplifying a genomic DNA or RNA sample including the target nucleotide sequence(s) and/or the barcodes; and/or sequencing the genomic DNA or RNA sample and/or the barcodes that has been selectively amplified.

In another aspect, the present invention provides a library comprising a plurality of targeter nucleic acids disclosed herein, optionally further comprising one or more modulator nucleic acids disclosed herein. In another aspect, the present invention provides a library comprising a plurality of nucleic acids each comprising a regulatory element operably linked to a different targeter nucleic acid disclosed herein, optionally further comprising a regulatory element operably linked to a modulator nucleic acid disclosed herein. These libraries can be used in combination with one or more Cas proteins or Cas-coding nucleic acids disclosed herein, and/or one or more donor templates as disclosed herein for a screening or selection method.

III. Pharmaceutical Compositions

The present invention provides a composition (e.g., pharmaceutical composition) comprising an engineered, non-naturally occurring system or a eukaryotic cell disclosed herein. In certain embodiments, the composition comprises a complex of the targeter nucleic acid and the modulator nucleic acid. In certain embodiments, the composition comprises an RNP comprising the targeter nucleic acid, the modulator nucleic acid, and a Cas protein (e.g., the Cas nuclease that the targeter nucleic acid and the modulator nucleic acid are capable of activating or a related Cas protein).

In addition, the present invention provides a method of producing a composition, the method comprising incubating the targeter nucleic acid and the modulator nucleic acid of an engineered, non-naturally occurring system disclosed herein under suitable conditions, thereby producing a composition (e.g., pharmaceutical composition) comprising a complex of the targeter nucleic acid and the modulator nucleic acid. In certain embodiments, the method further comprises incubating the targeter nucleic acid and the modulator nucleic acid with a Cas protein (e.g., the Cas nuclease that the targeter nucleic acid and the modulator nucleic acid are capable of activating or a related Cas protein), thereby producing a complex of the targeter nucleic acid, the modulator nucleic acid, and the Cas protein (e.g., an RNP). In certain embodiments, the method further comprises purifying the complex (e.g., the RNP).

For therapeutic use, an engineered, non-naturally occurring system, a CRISPR expression system, or a cell comprising such system or modified by such system disclosed herein is combined with a pharmaceutically acceptable carrier. The term "pharmaceutically acceptable" as used herein refers to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit-to-risk ratio.

The term "pharmaceutically acceptable carrier" as used herein refers to buffers, carriers, and excipients suitable for use in contact with the tissues of human beings and animals without excessive toxicity, irritation, allergic response, or other problem or complication, commensurate with a reasonable benefit/risk ratio. Pharmaceutically acceptable carriers include any of the standard pharmaceutical carriers, such as a phosphate buffered saline solution, water, emulsions (e.g., such as an oil/water or water/oil emulsions), and various types of wetting agents. The compositions also can include stabilizers and preservatives. For examples of carriers, stabilizers and adjuvants, see, e.g., Martin, Remington's Pharmaceutical Sciences, 15th Ed., Mack Publ. Co., Easton, PA (1975). Pharmaceutically acceptable carriers include buffers, solvents, dispersion media, coatings, isotonic and absorption delaying agents, and the like, that are compatible with pharmaceutical administration. The use of such media and agents for pharmaceutically active substances is known in the art.

In certain embodiments, a pharmaceutical composition disclosed herein comprises a salt, e.g., NaCl, $MgCl_2$, KCl, $MgSO_4$, etc.; a buffering agent, e.g., a Tris buffer, N-(2-Hydroxyethyl) piperazine-N'-(2-ethanesulfonic acid) (HEPES), 2-(N-Morpholino) ethanesulfonic acid (MES), MES sodium salt, 3-(N-Morpholino) propanesulfonic acid (MOPS), N-tris [Hydroxymethyl]methyl-3-aminopropanesulfonic acid (TAPS), etc.; a solubilizing agent; a detergent, e.g., a non-ionic detergent such as Tween-20, etc.; a nuclease inhibitor; and the like. For example, in certain embodiments, a subject composition comprises a subject DNA-targeting RNA and a buffer for stabilizing nucleic acids.

In certain embodiments, a pharmaceutical composition may contain formulation materials for modifying, maintaining or preserving, for example, the pH, osmolarity, viscosity, clarity, color, isotonicity, odor, sterility, stability, rate of dissolution or release, adsorption or penetration of the composition. In such embodiments, suitable formulation materials include, but are not limited to, amino acids (such as glycine, glutamine, asparagine, arginine or lysine); antimicrobials; antioxidants (such as ascorbic acid, sodium sulfite or sodium hydrogen-sulfite); buffers (such as borate, bicarbonate, Tris-HCl, citrates, phosphates or other organic acids); bulking agents (such as mannitol or glycine); chelating agents (such as ethylenediamine tetraacetic acid (EDTA)); complexing agents (such as caffeine, polyvinylpyrrolidone, beta-cyclodextrin or hydroxypropyl-beta-cyclodextrin); fillers; monosaccharides; disaccharides; and other carbohydrates (such as glucose, mannose or dextrins); proteins (such as serum albumin, gelatin or immunoglobulins); coloring, flavoring and diluting agents; emulsifying agents; hydrophilic polymers (such as polyvinylpyrrolidone); low molecular weight polypeptides; salt-forming counterions (such as sodium); preservatives (such as benzalkonium chloride, benzoic acid, salicylic acid, thimerosal, phenethyl alcohol, methylparaben, propylparaben, chlorhexidine, sorbic acid or hydrogen peroxide); solvents (such as glycerin, propylene glycol or polyethylene glycol); sugar alcohols (such as mannitol or sorbitol); suspending agents; surfactants or wetting agents (such as pluronics, PEG, sorbitan esters, polysorbates such as polysorbate 20, polysorbate, triton, tromethamine, lecithin, cholesterol, tyloxapal); stability enhancing agents (such as sucrose or sorbitol); tonicity enhancing agents (such as alkali metal halides, preferably sodium or potassium chloride, mannitol sorbitol); delivery vehicles; diluents; excipients and/or pharmaceutical adjuvants (see, *Remington's Pharmaceutical Sciences,* 18th ed. (Mack Publishing Company, 1990).

In certain embodiments, a pharmaceutical composition may contain nanoparticles, e.g., polymeric nanoparticles, liposomes, or micelles (See Anselmo et al. (2016) BIOENG. TRANSL. MED. 1:10-29). In certain embodiment, the pharmaceutical composition comprises an inorganic nanoparticle. Exemplary inorganic nanoparticles include, e.g., magnetic nanoparticles (e.g., $Fe_3MnO_2$) or silica. The outer surface of the nanoparticle can be conjugated with a positively charged polymer (e.g., polyethylenimine, polylysine, polyserine) which allows for attachment (e.g., conjugation or entrapment) of payload. In certain embodiment, the pharmaceutical composition comprises an organic nanoparticle (e.g., entrapment of the payload inside the nanoparticle). Exemplary organic nanoparticles include, e.g., SNALP liposomes that contain cationic lipids together with neutral helper lipids which are coated with polyethylene glycol (PEG) and protamine and nucleic acid complex coated with lipid coating. In certain embodiment, the pharmaceutical composition comprises a liposome, for example, a liposome disclosed in International Application Publication No. WO 2015/148863.

In certain embodiments, the pharmaceutical composition comprises a targeting moiety to increase target cell binding or update of nanoparticles and liposomes. Exemplary targeting moieties include cell specific antigens, monoclonal antibodies, single chain antibodies, aptamers, polymers, sugars, and cell penetrating peptides. In certain embodiments, the pharmaceutical composition comprises a fusogenic or endosome-destabilizing peptide or polymer.

In certain embodiments, a pharmaceutical composition may contain a sustained- or controlled-delivery formulation. Techniques for formulating sustained- or controlled-delivery means, such as liposome carriers, bio-erodible microparticles or porous beads and depot injections, are also known to those skilled in the art. Sustained-release preparations may include, e.g., porous polymeric microparticles or semipermeable polymer matrices in the form of shaped articles, e.g., films, or microcapsules. Sustained release matrices may include polyesters, hydrogels, polylactides, copolymers of L-glutamic acid and gamma ethyl-L-glutamate, poly (2-hydroxyethyl-inethacrylate), ethylene vinyl acetate, or poly-D (-)-3-hydroxybutyric acid. Sustained release compositions may also include liposomes that can be prepared by any of several methods known in the art.

A pharmaceutical composition of the invention can be administered by a variety of methods known in the art. The route and/or mode of administration vary depending upon the desired results. Administration can be intravenous, intramuscular, intraperitoneal, or subcutaneous, or administered proximal to the site of the target. The pharmaceutically acceptable carrier should be suitable for intravenous, intramuscular, subcutaneous, parenteral, spinal or epidermal administration (e.g., by injection or infusion). Depending on the route of administration, the active compound, i.e., the multispecific antibody of the invention, may be coated in a material to protect the compound from the action of acids and other natural conditions that may inactivate the compound.

Formulation components suitable for parenteral administration include a sterile diluent such as water for injection, saline solution, fixed oils, polyethylene glycols, glycerin, propylene glycol or other synthetic solvents; antibacterial agents such as benzyl alcohol or methyl parabens; antioxidants such as ascorbic acid or sodium bisulfite; chelating agents such as EDTA; buffers such as acetates, citrates or phosphates; and agents for the adjustment of tonicity such as sodium chloride or dextrose.

For intravenous administration, suitable carriers include physiological saline, bacteriostatic water, CREMOPHOR® ELTM (BASF, Parsippany, NJ) or phosphate buffered saline (PBS). The carrier should be stable under the conditions of manufacture and storage, and should be preserved against microorganisms. The carrier can be a solvent or dispersion medium containing, for example, water, ethanol, polyol (for example, glycerol, propylene glycol, and liquid polyetheylene glycol), and suitable mixtures thereof.

Pharmaceutical formulations preferably are sterile. Sterilization can be accomplished by any suitable method, e.g., filtration through sterile filtration membranes. Where the composition is lyophilized, filter sterilization can be conducted prior to or following lyophilization and reconstitution. In certain embodiments, a multispecific antibody is lyophilized, and then reconstituted in buffered saline, at the time of administration.

Pharmaceutical compositions of the invention can be prepared in accordance with methods well known and routinely practiced in the art. See, e.g., Remington: The Science and Practice of Pharmacy, Mack Publishing Co., 20th ed., 2000; and Sustained and Controlled Release Drug Delivery Systems, J. R. Robinson, ed., Marcel Dekker, Inc., New York, 1978. Pharmaceutical compositions are preferably manufactured under GMP conditions. Typically, a therapeutically effective dose or efficacious dose of the multispecific antibody of the invention is employed in the pharmaceutical compositions of the invention. The multispecific antibodies of the invention are formulated into pharmaceutically acceptable dosage forms by conventional methods known to those of skill in the art. Dosage regimens are adjusted to provide the optimum desired response (e.g., a therapeutic response). For example, a single bolus may be administered, several divided doses may be administered over time or the dose may be proportionally reduced or increased as indicated by the exigencies of the therapeutic situation. It is especially advantageous to formulate parenteral compositions in dosage unit form for ease of administration and uniformity of dosage. Dosage unit form as used herein refers to physically discrete units suited as unitary dosages for the subjects to be treated; each unit contains a predetermined quantity of active compound calculated to produce the desired therapeutic effect in association with the required pharmaceutical carrier.

Actual dosage levels of the active ingredients in the pharmaceutical compositions of the invention can be varied so as to obtain an amount of the active ingredient which is effective to achieve the desired therapeutic response for a particular patient, composition, and mode of administration, without being toxic to the patient. The selected dosage level depends upon a variety of pharmacokinetic factors including the activity of the particular compositions of the present invention employed, or the ester, salt or amide thereof, the route of administration, the time of administration, the rate of excretion of the particular compound being employed, the duration of the treatment, other drugs, compounds and/or materials used in combination with the particular compositions employed, the age, sex, weight, condition, general health and prior medical history of the patient being treated, and like factors.

IV. Therapeutic Uses

The engineered, non-naturally occurring system and CRISPR expression system disclosed herein are useful for targeting, editing, and/or modifying the genomic DNA in a cell or organism. These systems, as well as a cell comprising one of the systems or a cell whose genome has been modified by the engineered, non-naturally occurring system, can be used to treat a disease or disorder in which modification of genetic or epigenetic information is desirable. Accordingly, in another aspect, the present invention provides a method of treating a disease or disorder, the method comprising administering to a subject in need thereof a non-naturally occurring system, a CRISPR expression system, or a cell disclosed herein.

The term "subject" includes human and non-human animals. Non-human animals include all vertebrates, e.g., mammals and non-mammals, such as non-human primates, sheep, dog, cow, chickens, amphibians, and reptiles. Except when noted, the terms "patient" or "subject" are used herein interchangeably.

The terms "treatment", "treating", "treat", "treated", and the like, as used herein, refer to obtaining a desired pharmacologic and/or physiologic effect. The effect may be therapeutic in terms of a partial or complete cure for a disease and/or adverse effect attributable to the disease or delaying the disease progression. "Treatment", as used herein, covers any treatment of a disease in a mammal, e.g., in a human, and includes: (a) inhibiting the disease, i.e., arresting its development; and (b) relieving the disease, i.e., causing regression of the disease. It is understood that a disease or disorder may be identified by genetic methods and treated prior to manifestation of any medical symptom.

For therapeutic purposes, the method disclosed herein is particularly suitable for editing or modifying a proliferating cell, such as a stem cell (e.g., a hematopoietic stem cell), a progenitor cell (e.g., a hematopoietic progenitor cell or a lymphoid progenitor cell), or a memory cell (e.g., a memory T cell). Given that such cell is delivered to a subject and will proliferate in vivo, tolerance to off-target events is low. Prior to delivery, however, it is possible to assess the on-target and off-target events, thereby selecting one or more colonies that have the desired edit or modification and lack any undesired edit or modification. Therefore, lower editing or modifying efficiency can be tolerated for such cell. The engineered, non-naturally occurring system of the present invention has the advantage of increasing or decreasing the efficiency of nucleic acid cleavage by, for example, adjusting the hybridization of dual guide nucleic acids. As a result, it can be used to minimize off-target events when creating genetically engineered proliferating cells.

For minimization of toxicity and off-target effect, it is important to control the concentration of the dual guide CRISPR-Cas system delivered. Optimal concentrations can be determined by testing different concentrations in a cellular, tissue, or non-human eukaryote animal model and using deep sequencing to analyze the extent of modification at potential off-target genomic loci. The concentration that gives the highest level of on-target modification while minimizing the level of off-target modification should be selected for ex vivo or in vivo delivery.

Gene Therapies

It is understood that the engineered, non-naturally occurring system and CRISPR expression system disclosed herein can be used to treat a genetic disease or disorder, i.e., a disease or disorder associated with or otherwise mediated by an undesirable mutation in the genome of a subject.

Exemplary genetic diseases or disorders include age-related macular degeneration, adrenoleukodystrophy (ALD), Alagille syndrome, alpha-1-antitrypsin deficiency, argininemia, argininosuccinic aciduria, ataxia (e.g., Friedreich ataxia, spinocerebellar ataxias, ataxia telangiectasia, essential tremor, spastic paraplegia), autism, biliary atresia, biotinidase deficiency, carbamoyl phosphate synthetase I deficiency, carbohydrate deficient glycoprotein syndrome (CDGS), a central nervous system (CNS)-related disorder (e.g., Alzheimer's disease, amyotrophic lateral sclerosis (ALS), canavan disease (CD), ischemia, multiple sclerosis (MS), neuropathic pain, Parkinson's disease), Bloom's syndrome, cancer, Charcot-Marie-Tooth disease (e.g., peroneal muscular atrophy, hereditary motor sensory neuropathy), congenital hepatic porphyria, citrullinemia, Crigler-Najjar syndrome, cystic fibrosis (CF), Dentatorubro-Pallidoluysian Atrophy (DRPLA). diabetes insipidus, Fabry, familial hypercholesterolemia (LDL receptor defect), Fanconi's anemia, fragile X syndrome, a fatty acid oxidation disorder, galactosemia, glucose-6-phosphate dehydrogenase (G6PD), glycogen storage diseases (e.g., type I (glucose-6-phosphatase deficiency, Von Gierke II (alpha glucosidase deficiency, Pompe), III (debrancher enzyme deficiency, Cori), IV (brancher enzyme deficiency, Anderson), V (muscle glycogen phosphorylase deficiency, McArdle), VII (muscle phosphofructokinase deficiency, Tauri), VI (liver phosphorylase deficiency, Hers), IX (liver glycogen phosphorylase kinase deficiency)), hemophilia A (associated with defective factor VIII), hemophilia B (associated with defective factor IX), Huntington's disease, glutaric aciduria, hypophosphatemia, Krabbe, lactic acidosis, Lafora disease, Leber's Congenital Amaurosis, Lesch Nyhan syndrome, a lysosomal storage disease, metachromatic leukodystrophy disease (MLD), mucopolysaccharidosis (MPS) (e.g., Hunter syndrome, Hurler syndrome, Maroteaux-Lamy syndrome, Sanfilippo syndrome, Scheie syndrome, Morquio syndrome, other, MPSI, MPSII, MPSIII, MSIV, MPS 7), a muscular/skeletal disorder (e.g., muscular dystrophy, Duchenne muscular dystrophy), myotonic Dystrophy (DM), neoplasia, N-acetylglutamate synthase deficiency, ornithine transcarbamylase deficiency, phenylketonuria, primary open angle glaucoma, retinitis pigmentosa, schizophrenia, Severe Combined Immune Deficiency (SCID), Spinobulbar Muscular Atrophy (SBMA), sickle cell anemia, Usher syndrome, Tay-Sachs disease, thalassemia (e.g., β-Thalassemia), trinucleotide repeat disorders, tyrosinemia, Wilson's disease, Wiskott-Aldrich syndrome, X-linked chronic granulomatous disease (CGD), X-linked severe combined immune deficiency, and xeroderma pigmentosum.

Additional exemplary genetic diseases or disorders and associated information are available on the world wide web at kumc.edu/gec/support, genome.gov/10001200, and ncbi.nlm.nih.gov/books/NBK22183/. Additional exemplary genetic diseases or disorders, associated genetic mutations, and gene therapy approaches to treat genetic diseases or disorders are described in International (PCT) Publication Nos. WO2013/126794, WO2013/163628, WO2015/048577, WO2015/070083, WO2015/089354, WO2015/134812, WO2015/138510, WO2015/148670, WO2015/148860, WO2015/148863, WO2015/153780, WO2015/153789, and WO2015/153791, and U.S. Patent Publication Nos. 2009/0222937, 2009/0271881, 2009/0271881, 2010/0229252, 2010/0311124, 2011/0016540, 2011/0023139, 2011/0023144, 2011/0023145, 2011/0023145, 2011/0023146, 2011/0023153, 2011/0091441, 2011/0158957, 2011/0182867, 2011/0225664, 2012/0159653, 2012/0328580, 2013/0145487, and 2013/0202678.

Immune Cell Engineering

It is understood that the engineered, non-naturally occurring system and CRISPR expression system disclosed herein can be used to engineer an immune cell. Immune cells include but are not limited to lymphocytes (e.g., B lymphocytes or B cells, T lymphocytes or T cells, and natural killer cells), myeloid cells (e.g., monocytes, macrophages, eosinophils, mast cells, basophils, and granulocytes), and the stem and progenitor cells that can differentiate into these cell types (e.g., hematopoietic stem cells, hematopoietic progenitor cells, and lymphoid progenitor cells). The cells can include autologous cells derived from a subject to be treated, or alternatively allogenic cells derived from a donor.

In certain embodiments, the immune cell is a T cell, which can be, for example, a cultured T cell, a primary T cell, a T cell from a cultured T cell line (e.g., Jurkat, SupTi), or a T cell obtained from a mammal, for example, from a subject to be treated. If obtained from a mammal, the T cell can be obtained from numerous sources, including but not limited to blood, bone marrow, lymph node, the thymus, or other tissues or fluids. T cells can also be enriched or purified. The T cell can be any type of T cell and can be of any developmental stage, including but not limited to, $CD4^+$/$CD8^+$ double positive T cells, $CD4^+$ helper T cells (e.g., Th1 and Th2 cells), $CD8^+$ T cells (e.g., cytotoxic T cells), tumor infiltrating lymphocytes (TILs), memory T cells (e.g., central memory T cells and effector memory T cells), regulatory T cells, naive T cells, and the like.

In certain embodiments, an immune cell, e.g., a T cell, is engineered to express an exogenous gene. For example, in certain embodiments, an engineered CRISPR system disclosed herein may be used to engineer an immune cell to express an exogenous gene. For example, in certain embodiments, an engineered CRISPR system disclosed herein may catalyze DNA cleavage at a gene locus, allowing for site-specific integration of the exogenous gene at the gene locus by HDR.

In certain embodiments, an immune cell, e.g., a T cell, is engineered to express a chimeric antigen receptor (CAR), i.e., the T cell comprises an exogenous nucleotide sequence encoding a CAR. As used herein, the term "chimeric antigen receptor" or "CAR" refers to any artificial receptor including an antigen-specific binding moiety and one or more signaling chains derived from an immune receptor. CARs can comprise a single chain fragment variable (scFv) of an antibody specific for an antigen coupled via hinge and transmembrane regions to cytoplasmic domains of T cell signaling molecules, e.g. a T cell costimulatory domain (e.g., from CD28, CD137, OX40, ICOS, or CD27) in tandem with a T cell triggering domain (e.g. from CD3ζ). A T cell expressing a chimeric antigen receptor is referred to as a CAR T cell. Exemplary CAR T cells include CD19 targeted CTL019 cells (see, Grupp et al. (2015) BLOOD, 126:4983), 19-28z cells (see, Park et al. (2015) J. CLIN. ONCOL., 33:7010), and KTE-C19 cells (see, Locke et al. (2015) BLOOD, 126:3991). Additional exemplary CAR T cells are described in U.S. Pat. Nos. 8,399,645, 8,906,682, 7,446,190, 9,181,527, 9,272,002, and 9,266,960, U.S. Patent Publication Nos. 2016/0362472, 2016/0200824, and 2016/0311917, and International (PCT) Publication Nos. WO2013/142034, WO2015/120180, WO2015/188141, WO2016/120220, and WO2017/040945. Exemplary approaches to express CARs using CRISPR systems are described in Hale et al. (2017) MOL THER METHODS CLIN DEV., 4:192, Macleod et al. (2017) MOL THER, 25:949, and Eyquem et al. (2017) NATURE, 543:113.

In certain embodiments, an immune cell, e.g., a T cell, binds an antigen, e.g., a cancer antigen, through an endogenous T cell receptor (TCR). In certain embodiments, an immune cell, e.g., a T cell, is engineered to express an exogenous TCR, e.g., an exogenous naturally occurring TCR or an exogenous engineered TCR. T cell receptors comprise two chains referred to as the α- and β-chains, that combine on the surface of a T cell to form a heterodimeric receptor that can recognize MHC-restricted antigens. Each of α- and β-chain comprises a constant region and a variable region. Each variable region of the α- and β-chains defines three loops, referred to as complementary determining regions (CDRs) known as $CDR_1$, $CDR_2$, and $CDR_3$ that confer the T cell receptor with antigen binding activity and binding specificity.

In certain embodiments, a CAR or TCR binds a cancer antigen selected from B-cell maturation antigen (BCMA), mesothelin, prostate specific membrane antigen (PSMA), prostate stem cell antigen (PCSA), carbonic anhydrase IX (CAIX), carcinoembryonic antigen (CEA), CD5, CD7, CD10, CD19, CD20, CD22, CD30, CD33, CD34, CD38, CD41, CD44, CD49f, CD56, CD70, CD74, CD123, CD133, CD138, epithelial glycoprotein2 (EGP 2), epithelial glycoprotein-40 (EGP-40), epithelial cell adhesion molecule (EpCAM), receptor-type tyrosine-protein kinase (FLT3), folate-binding protein (FBP), fetal acetylcholine receptor (AChR), folate receptor-α and β (FRa and β), Ganglioside G2 (GD2), Ganglioside G3 (GD3), epidermal growth factor receptor 2 (HER-2/ERB2), epidermal growth factor receptor vIII (EGFRvIII), ERB3, ERB4, human telom erase reverse transcriptase (hTERT), Interleukin-13 receptor subunit alpha-2 (IL-13Ra2), K-light chain, kinase insert domain receptor (KDR), Lewis A (CA19.9), Lewis Y (LeY), LI cell adhesion molecule (LICAM), melanoma-associated antigen 1 (melanoma antigen family Al, MAGE-A1), Mucin 16 (MUC-16), Mucin 1 (MUC-1; e.g., a truncated MUC-1), KG2D ligands, cancer-testis antigen NY-ESO-1, oncofetal antigen (h5T4), tumor-associated glycoprotein 72 (TAG-72), vascular endothelial growth factor R2 (VEGF-R2), Wilms tumor protein (WT-1), type 1 tyrosine-protein kinase transmembrane receptor (ROR1), B7-H3 (CD276), B7-H6 (Nkp30), Chondroitin sulfate proteoglycan-4 (CSPG4), DNAX Accessory Molecule (DNAM-1), Ephrin type A Receptor 2 (EpHA2), Fibroblast Associated Protein (FAP), Gp100/HLA-A2, Glypican 3 (GPC3), HA-IH, HERK-V, IL-1 IRa, Latent Membrane Protein 1 (LMP1), Neural cell-adhesion molecule (N-CAM/CD56), and Trail Receptor (TRAIL-R).

Genetic loci suitable for insertion of a CAR- or exogenous TCR-encoding sequence include but are not limited to safe harbor loci (e.g., the AAVS1 locus), TCR subunit loci (e.g., the TCRα constant (TRAC) locus), and other loci associated with certain advantages (e.g., the CCR5 locus, the inactivation of which may prevent or reduce HIV infection). It is understood that insertion in the TRAC locus reduces tonic CAR signaling and enhances T cell potency (see, Eyquem et al. (2017) NATURE, 543:113). Furthermore, inactivation of the endogenous TRAC gene may reduce a graft-versus-host disease (GVHD) response, thereby allowing use of allogeneic T cells as starting materials for preparation of CAR-T cells. Accordingly, in certain embodiments, an immune cell, e.g., a T cell, is engineered to have reduced expression of an endogenous TCR or TCR subunit, e.g., TCRα subunit constant (TRAC). The cell may be engineered to have partially reduced or no expression of the endogenous TCR or TCR subunit. For example, in certain embodiments, the immune cell, e.g., a T cell, is engineered to have less than 80% (e.g., less than 70%, less than 60%, less than 50%, less than 40%, less than 30%, less than 20%, less than 10%, or less than 5%) of the expression of the endogenous TCR or TCR subunit relative to a corresponding unmodified or parental cell. In certain embodiments, the immune cell, e.g., a T cell, is engineered to have no detectable expression of the endogenous TCR or TCR subunit. Exemplary approaches to reduce expression of TCRs using CRISPR systems are described in U.S. Pat. No. 9,181,527, Liu et al. (2017) CELL RES, 27: 154, Ren et al. (2017) CLIN CANCER RES, 23: 2255, Cooper et al. (2018) LEUKEMIA, 32: 1970, and Ren et al. (2017) ONCOTARGET, 8: 17002.

It is understood that certain immune cells, such as T cells, also express major histocompatibility complex (MHC) or human leukocyte antigen (HLA) genes, and inactivation of these endogenous gene may reduce a GVHD response, thereby allowing use of allogeneic T cells as starting materials for preparation of CAR-T cells. Accordingly, in certain embodiments, an immune cell, e.g., a T-cell, is engineered to have reduced expression of one or more endogenous class I or class II MHCs or HLAs (e.g., beta 2-microglobulin (B2M), class II major histocompatibility complex transactivator (CIITA), HLA-E, and/or HLA-G). The cell may be engineered to have partially reduced or no expression of an endogenous MHC or HLA. For example, in certain embodiments, the immune cell, e.g., a T-cell, is engineered to have less than less than 80% (e.g., less than 70%, less than 60%, less than 50%, less than 40%, less than 30%, less than 20%, less than 10%, or less than 5%) of the expression of endogenous MHC (e.g., B2M, CIITA, HLA-E, or HLA-G) relative to a corresponding unmodified or parental cell. In certain embodiments, the immune cell, e.g., a T cell, is engineered to have no detectable expression of an endogenous MHC (e.g., B2M, CIITA, HLA-E, or HLA-G). Exemplary approaches to reduce expression of MHCs using CRISPR systems are described in Liu et al. (2017) CELL RES, 27:154, Ren et al. (2017) CLIN CANCER RES, 23:2255, and Ren et al. (2017) ONCOTARGET, 8:17002.

Other genes that may be inactivated to reduce a GVHD response include but are not limited to CD3, CD52, and deoxycytidine kinase (DCK). For example, inactivation of CK may render the immune cells (e.g., T cells) resistant to purine nucleotide analogue (PNA) compounds, which are often used to compromise the host immune system in order to reduce a GVHD response during an immune cell therapy.

In certain embodiments, an immune cell, e.g., a T cell, is engineered to have reduced expression of an endogenous gene. For example, in certain embodiments, an engineered CRISPR system disclosed herein may be used to engineer an immune cell to have reduced expression of an endogenous gene. For example, in certain embodiments, an engineered CRISPR system disclosed herein may result in DNA cleavage at a gene locus, thereby inactivating the targeted gene. In other embodiments, an engineered CRISPR system disclosed herein may be fused to an effector domain (e.g., a transcriptional repressor or histone methylase) to reduce the expression of the target gene.

It is understood that the activity of an immune cell (e.g., T cell) may be enhanced by inactivating or reducing the expression of an immune suppressor such as an immune checkpoint protein. Accordingly, in certain embodiments, an immune cell, e.g., a T cell, is engineered to have reduced expression of an immune checkpoint protein. Exemplary immune checkpoint proteins expressed by wild-type T cells include but are not limited to PD-1, CTLA-4, A2AR, B7-H3, B7-H4, BTLA, KIR, LAG3, TIM-3, TIGIT, VISTA, PTPN6 (SHP-1), and FAS. The cell may be modified to have partially reduced or no expression of the immune checkpoint protein. For example, in certain embodiments, the immune cell, e.g., a T cell, is engineered to have less than 80% (e.g., less than 70%, less than 60%, less than 50%, less than 40%, less than 30%, less than 20%, less than 10%, or less than 5%) of the expression of the immune checkpoint protein relative to a corresponding unmodified or parental cell. In certain embodiments, the immune cell, e.g., a T cell, is engineered to have no detectable expression of the immune checkpoint protein. Exemplary approaches to reduce expression of immune checkpoint proteins using CRISPR systems are described in International (PCT) Publication No.

WO2017/017184, Cooper et al. (2018) LEUKEMIA, 32: 1970, Su et al. (2016) ONCOIMMUNOLOGY, 6: e1249558, and Zhang et al. (2017) FRONT MED, 11: 554.

In certain embodiments, an immune cell, e.g., a T cell, is modified to express a dominant-negative form of an immune checkpoint protein. In certain embodiments, the dominant-negative form of the checkpoint inhibitor can act as a decoy receptor to bind or otherwise sequester the natural ligand that would otherwise bind and activate the wild-type immune checkpoint protein. Examples of engineered immune cells, for example, T cells containing dominant-negative forms of an immune suppressor are described, for example, in International (PCT) Publication No. WO2017/040945.

In certain embodiments, an immune cell, e.g., a T cell, is modified to express a gene (e.g., a transcription factor, a cytokine, or an enzyme) that regulates the survival, proliferation, activity, or differentiation (e.g., into a memory cell) of the immune cell. In certain embodiments, the immune cell is modified to express TET2, FOXO1, IL-12, IL-15, IL-18, IL-21, IL-7, GLUT1, GLUT3, HK1, HK2, GAPDH, LDHA, PDK1, PKM2, PFKFB3, PGK1, ENO1, GYS1, and/or ALDOA. In certain embodiments, the modification is an insertion of a nucleotide sequence encoding the protein operably linked to a regulatory element. In certain embodiments, the modification is a substitution of a single nucleotide polymorphism (SNP) site in the endogenous gene.

In certain embodiments, an immune cell, e.g., a T cell, is modified to express a protein (e.g., a cytokine or an enzyme) that regulates the microenvironment that the immune cell is designed to migrate to (e.g., a tumor microenvironment). In certain embodiments, the immune cell is modified to express CA9, CA12, a V-ATPase subunit, NHE1, and/or MCT-1.

V. Kits

It is understood that the engineered, non-naturally occurring system, the CRISPR expression system, and the library disclosed herein can be packaged in a kit suitable for use by a medical provider. Accordingly, in another aspect, the invention provides kits containing any one or more of the elements disclosed in the above systems, libraries, methods, and compositions. In certain embodiments, the kit comprises an engineered, non-naturally occurring system as disclosed herein and instructions for using the kit. The instructions may be specific to the applications and methods described herein. In certain embodiments, one or more of the elements of the system are provided in a solution. In certain embodiments, one or more of the elements of the system are provided in lyophilized form, and the kit further comprises a diluent. Elements may be provided individually or in combinations, and may be provided in any suitable container, such as a vial, a bottle, a tube, or immobilized on the surface of a solid base (e.g., chip or microarray). In certain embodiments, the kit comprises one or more of the nucleic acids and/or proteins described herein. In certain embodiments, the kit provides all elements of the systems of the invention.

In certain embodiments of a kit comprising the engineered, non-naturally occurring system, the targeter nucleic acid and the modulator nucleic acid are provided in separate containers. In other embodiments, the targeter nucleic acid and the modulator nucleic acid are pre-complexed, and the complex is provided in a single container. In certain embodiments, the kit comprises a Cas protein or a nucleic acid comprising a regulatory element operably linked to a nucleic acid encoding Cas protein provided in a separate container. In other embodiments, the kit comprises a Cas protein pre-complexed with the targeter nucleic acid and the modulator nucleic acid, and the complex is provided in a single container.

In order to target multiple target nucleotide sequences, e.g., for use in a screening or selection process, a kit may be provided comprising multiple targeter nucleic acids. Accordingly, in certain embodiments, the kit comprises a plurality of targeter nucleic acids as disclosed herein (e.g., in separate tubes or immobilized on the surface of a solid base such as a chip or a microarray), optionally one or more modulator nucleic acids as disclosed herein, and optionally a Cas protein or a regulatory element operably linked to a nucleic acid encoding a Cas protein as disclosed herein. Such kits are useful for identifying a targeter nucleic acid with the highest efficiency and/or specificity to target a given gene, for identifying a gene implicated in a physiological or pathological pathway, or for engineering a cell to achieve desired functionality in a multiplex assay. In certain embodiments, the kit further comprises one or more donor templates provided in one or more separate containers. In certain embodiments, the kit comprises a plurality of donor templates as disclosed herein (e.g., in separate tubes or immobilized on the surface of a solid base such as a chip or a microarray), one or more targeter nucleic acids disclosed herein, and one or more modulator nucleic acids as disclosed herein, and optionally a Cas protein or a regulatory element operably linked to a nucleic acid encoding a Cas protein as disclosed herein. Such kits are useful for identifying a donor template that introduces optimal genetic modification in a multiplex assay. The CRISPR expression systems as disclosed herein are also suitable for use in a kit.

In certain embodiments, a kit further comprises one or more reagents and/or buffers for use in a process utilizing one or more of the elements described herein. Reagents may be provided in any suitable container and may be provided in a form that is usable in a particular assay, or in a form that requires addition of one or more other components before use (e.g., in concentrate or lyophilized form). A buffer may be a reaction or storage buffer, including but not limited to a sodium carbonate buffer, a sodium bicarbonate buffer, a borate buffer, a Tris buffer, a MOPS buffer, a HEPES buffer, and combinations thereof. In some embodiments, the buffer is alkaline. In certain embodiments, the buffer has a pH from about 7 to about 10. In certain embodiments, the kit further comprises a pharmaceutically acceptable carrier. In certain embodiments, the kit further comprises one or more devices or other materials for administration to a subject.

Throughout the description, where compositions are described as having, including, or comprising specific components, or where processes and methods are described as having, including, or comprising specific steps, it is contemplated that, additionally, there are compositions of the present invention that consist essentially of, or consist of, the recited components, and that there are processes and methods according to the present invention that consist essentially of, or consist of, the recited processing steps.

In the application, where an element or component is said to be included in and/or selected from a list of recited elements or components, it should be understood that the element or component can be any one of the recited elements or components, or the element or component can be selected from a group consisting of two or more of the recited elements or components.

Further, it should be understood that elements and/or features of a composition or a method described herein can be combined in a variety of ways without departing from the spirit and scope of the present invention, whether explicit or implicit herein. For example, where reference is made to a particular compound, that compound can be used in various embodiments of compositions of the present invention and/or in methods of the present invention, unless otherwise understood from the context. In other words, within this application, embodiments have been described and depicted in a way that enables a clear and concise application to be written and drawn, but it is intended and will be appreciated that embodiments may be variously combined or separated without parting from the present teachings and invention(s). For example, it will be appreciated that all features described and depicted herein can be applicable to all aspects of the invention(s) described and depicted herein.

The terms "a" and "an" and "the" and similar references in the context of describing the invention (especially in the context of the following claims) are to be construed to cover both the singular and the plural, unless otherwise indicated herein or clearly contradicted by context. For example, the term "a cell" includes a plurality of cells, including mixtures thereof. Where the plural form is used for compounds, salts, and the like, this is taken to mean also a single compound, salt, or the like.

It should be understood that the expression "at least one of" includes individually each of the recited objects after the expression and the various combinations of two or more of the recited objects unless otherwise understood from the context and use. The expression "and/or" in connection with three or more recited objects should be understood to have the same meaning unless otherwise understood from the context.

The use of the term "include," "includes," "including," "have," "has," "having," "contain," "contains," or "containing," including grammatical equivalents thereof, should be understood generally as open-ended and non-limiting, for example, not excluding additional unrecited elements or steps, unless otherwise specifically stated or understood from the context.

Where the use of the term "about" is before a quantitative value, the present invention also includes the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present invention remain operable. Moreover, two or more steps or actions may be conducted simultaneously.

The use of any and all examples, or exemplary language herein, for example, "such as" or "including," is intended merely to illustrate better the present invention and does not pose a limitation on the scope of the invention unless claimed. No language in the specification should be construed as indicating any non-claimed element as essential to the practice of the present invention.

EXAMPLES

The following Examples are merely illustrative and are not intended to limit the scope or content of the invention in any way.

Example 1. In Vitro Cleavage of Target DNA by Dual Guide MAD7 CRISPR-Cas Systems MAD7 is a type V-A Cas protein that has endonuclease activity when complexed with a single guide RNA, also known as a crRNA in a type V-A system (see, U.S. Pat. No. 9,982,279). This example describes cleavage of target DNA using MAD7 in complex with dual guide nucleic acids in an in vitro cleavage assay.

Briefly, two different crRNAs, named crRNA1 and crRNA2, were designed to target the DNMT1 gene. In particular, crRNA2 has been reported to have better ability to activate LbCas12a and FnoCas12a in zebrafish (see, Liu et al. (2019) NUC. ACIDS RES. 47 (8): 4169-80). Predicted secondary structures of crRNA1 and crRNA2 are shown in FIG. 2A. Also designed were a set of targeter and modulator RNAs corresponding to crRNA1, named crRNA1_targeter1 and crRNA1_modulator1, respectively, and a set of targeter and modulator RNAs corresponding to crRNA2, named crRNA2_targeter1 and crRNA2_modulator1, respectively. Each set of dual guide RNAs represents split of the corresponding single guide RNA at the middle position of the loop region. The nucleotide sequences of these guide RNAs are provided in Table 2.

TABLE 2

Nucleotide Sequences of Tested Single and Dual Guide RNAs

| Guide RNA | Nucleotide Sequence | SEQ ID NO |
|---|---|---|
| crRNA1 | UAAUUUCUACUCUUGUAGAUCUGAUGGUCCAUGUCUGUUA | 41 |
| crRNA1_modulator1 | UAAUUUCUACUC | 42 |
| crRNA1_targeter1 | UUGUAGAUCUGAUGGUCCAUGUCUGUUA | 43 |
| crRNA2 | UAAUUCCCACUCUUGUGGGUCUGAUGGUCCAUGUCUGUUA | 44 |
| crRNA2_modulator1 | UAAUUCCCACUC | 45 |
| crRNA2_targeter1 | UUGUGGGUCUGAUGGUCCAUGUCUGUUA | 46 |

These guide RNAs were chemically synthesized. Human DNMT1 target DNA was prepared by PCR and contained the nucleotide sequence of 5'-CGAGAGAGTGCCTCAGGTATGGTGGGGTGGGCCAGGCTTCCTCTGGGGCCTGACTG CCCTCTGGGGGTACATGTGGGGGCAGTTGCTGGCCACCGTTTTGGGCTCTGGGACTC AGGCGGGTCACCTACCCACGTTCGTGGCCCCATCTTTCTCAAGGGGCTGCTGTGAGG ATTGAGTGAGTTGCACGTGTCAAGTGCTTAGAGCAGGCGTGCTGCACACAGCAGGC CTTTGGTCAGGTTGGCTGCTGGGCTGGCCCTGGGGCCGTTTCCCTCACTCCTGCTCGG TGAATTTGGCTCAGCAGGCACCTGCCTCAGCTGCTCACTTGAGCCTCTGGGTCTAGAACCCTCTGGGGACCGTTTGAGGAGTGTTCAGTCTCCGTGAACGTTCCCTTAGCACTC TGCCACTTATTGGGTCAGCTGTTAACATCAGTACGTTAATGTTTCCTGATGGTCCATG TCTGTTACTCGCCTGTCAAGTGGCGTGACACCGGGCGTGTTCCCCAGAGTGACTTTT CCTTTTATTTCCCTTCAGCTAAAATAAAGGAGGAGGAAGCTGCTAAGGACTAGTTCT GCCCTCCCGTCACCCCTGTTTCTGGCACCAGGAATCCCCAAC-ATGCACTGATGTTGT GTTTTTAACATGTCAATCTGTCCGTTCACATGTGTGGTACATGGTGTTTGTGGCC-3' (SEQ ID NO: 40). MAD7 protein, which contained a nucleoplasmin NLS at the C-terminus, was expressed in *E. Coli* and purified by fast protein liquid chromatography (FPLC).

The single guide and dual guide CRISPR-Cas systems were tested in an in vitro cleavage assay. Briefly, 1 µM MAD7 protein was incubated for 10 minutes at room temperature with 1 µM crRNA1, 1 µM crRNA1_modulator1, 1 UM crRNA1_targeter1, a combination of 1 HM crRNA1_modulator1 and 1 µM crRNA1_targeter1, 1 µM crRNA2, 1 µM crRNA2_modulator1, 1 µM crRNA2_targeter1, or a combination of 1 µM crRNA2_modulator1 and 1 µM crRNA2_targeter1 to form an RNP complex. Then DNMT1 target DNA was added into the solution at a 10:1 or 1:1 molar ratio of MAD7 to target DNA. After a 10-minute incubation at 37° C., the samples were analyzed by electrophoresis in an agarose gel.

Figure 2B:
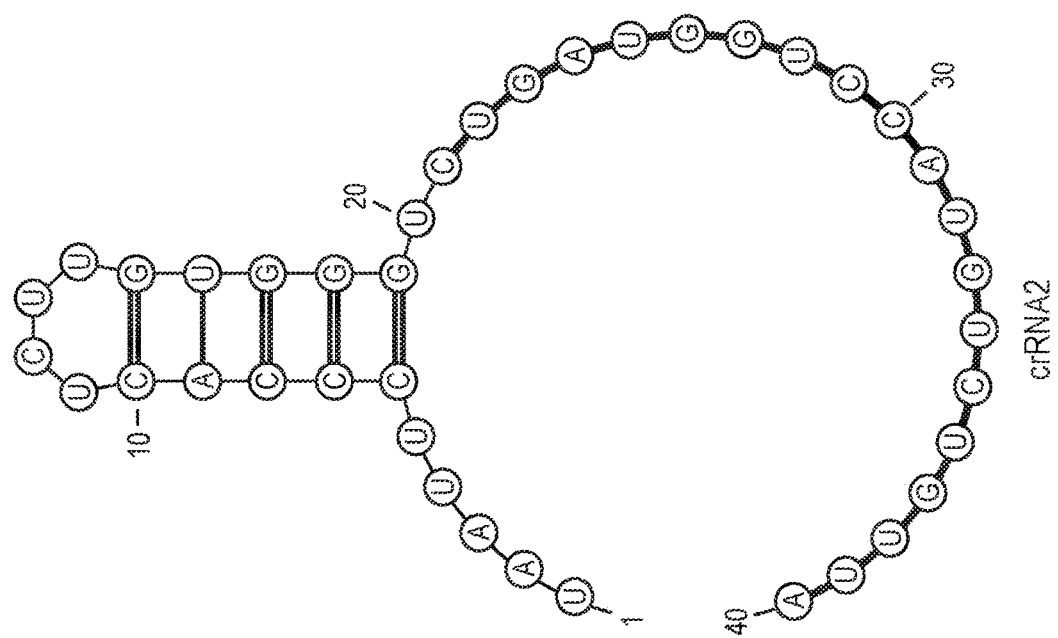
FIG. 2B is a schematic representation showing the predicted secondary structure of a second crRNA tested in an in vitro cleavage experiment (SEQ ID NO: 44).
Figure 2A:
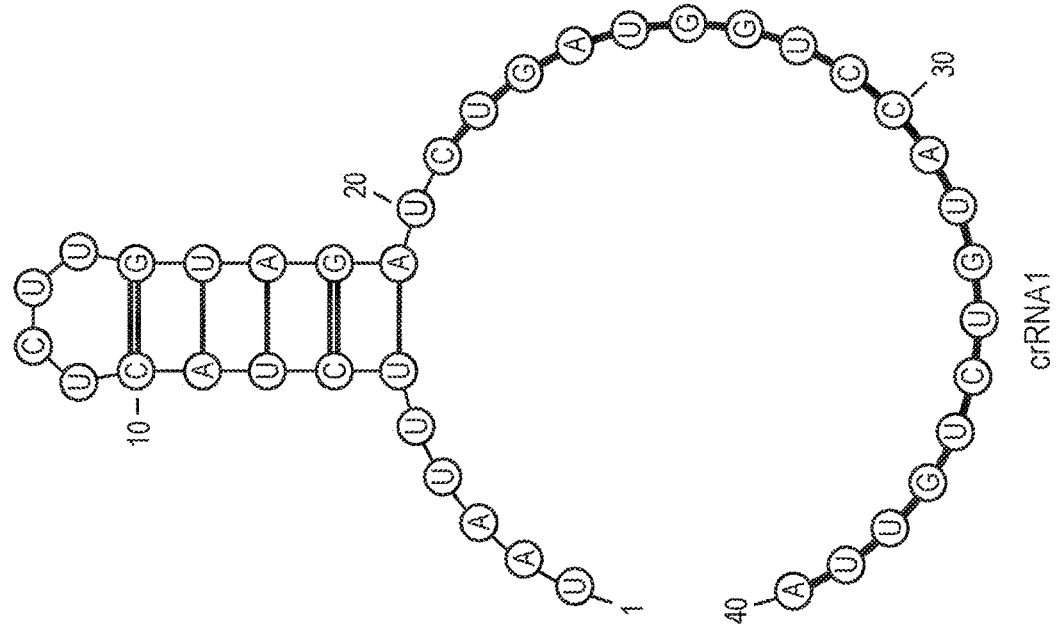
FIG. 2A is a schematic representation showing the predicted secondary structure of a first crRNA tested in an in vitro cleavage experiment (SEQ ID NO: 41).
Figure 2C:
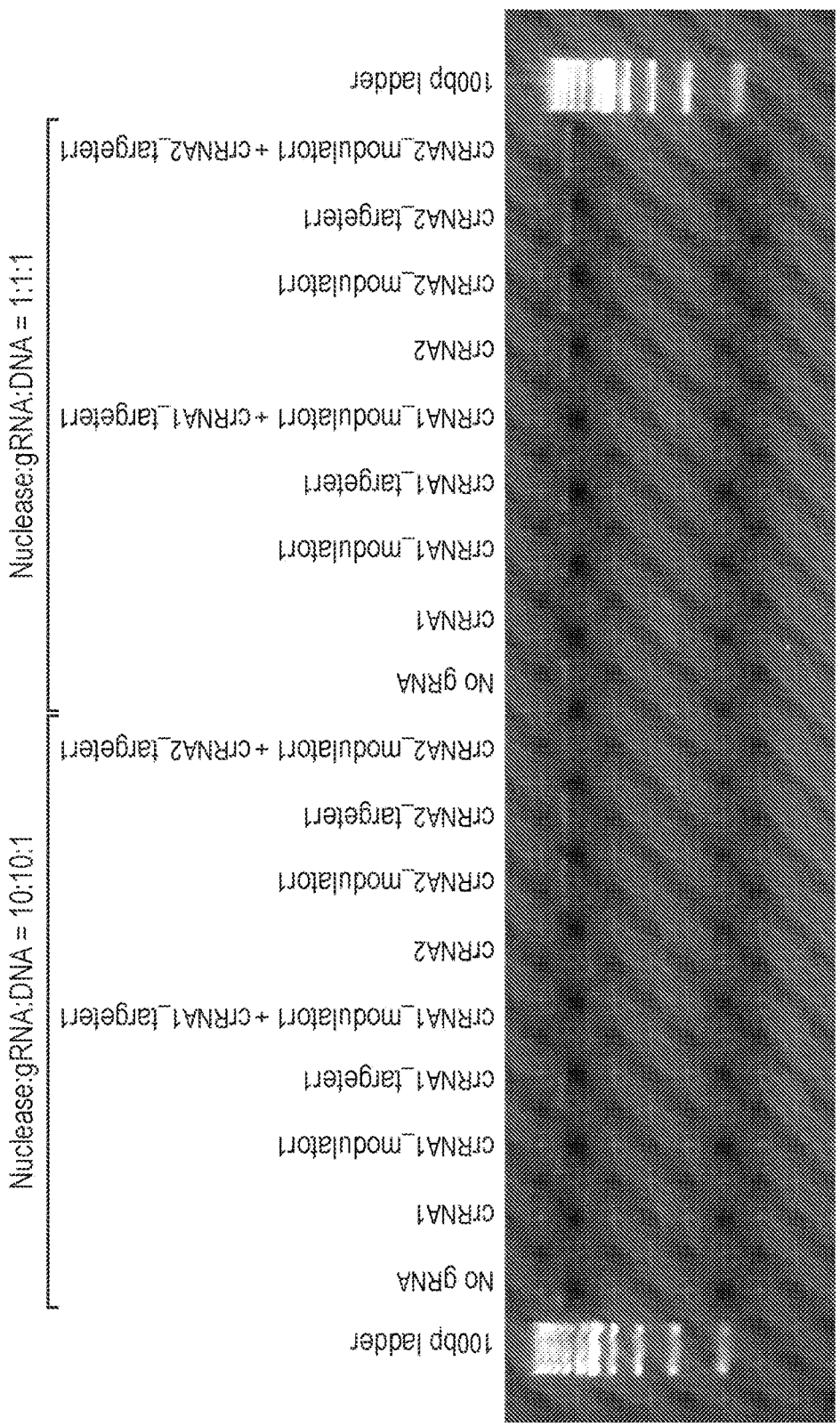
FIG. 2C is a photograph showing gel electrophoresis results from an in vitro cleavage experiment using MAD7 complexed with two different crRNAs, referred to as "crRNA1" and "crRNA2," and their corresponding sets of targeter RNAs and modulator RNAs that were chemically transcribed.

As shown in FIG. 2B, crRNA1, crRNA2, and their corresponding sets of dual guide RNAs activated the nuclease activity of MAD7 to cleave the DNMT1 target DNA. By contrast, crRNA1_modulator1, crRNA1_targeter1, crRNA2_modulator1, or crRNA2_targeter1 alone did not exhibit such activity. The ability of crRNA1 to activate MAD7 nuclease under these conditions was greater than that of crRNA2. For each of crRNA1 and crRNA2, the ability of the single guide RNA to activate MAD7 nuclease was greater than that of the corresponding dual guide system.

Extension of Modulator RNAs at the 5' End

Next assessed was whether the CRISPR-Cas system could tolerate the addition of a nucleotide sequence at the 5' end of the crRNAs or modulator RNAs. Two crRNA sequences, named crRNA3 and crRNA4, were designed to contain additional nucleotide sequences at the 5' end of crRNA1. The corresponding dual guide systems included modulator RNAs, named crRNA3_modulator1 and crRNA4_modulator1, paired with crRNA1_targeter1 as the targeter RNA. The sequences of these newly designed guide RNAs are provided in Table 3. The additional nucleotide sequences at the 5' end of the RNAs are underlined.

TABLE 3

Nucleotide Sequences of Tested crRNAs and Modulator RNAs

| Guide RNA | Nucleotide Sequence | SEQ ID NO |
|---|---|---|
| crRNA3 | UCCCAUAGAUGAUAAUUUCU ACUCUUGUAGAUCUGAUGGU CCAUGUCUGUUA | 47 |
| crRNA3_modulator1 | UCCCAUAGAUGAUAAUUUCU ACUC | 48 |
| crRNA4 | UCCCAUAGAUGACCGCACUC AUAGUAAUUUCUACUCUUGU AGAUCUGAUGGUCCAUGUCU GUUA | 49 |
| crRNA4_modulator1 | UCCCAUAGAUGACCGCACUC AUAGUAAUUUCUACUC | 50 |

These guide RNAs were chemically synthesized. An in vitro cleavage assay was conducted using the method described above. Each guide RNA was used at the concentration of 1 µM when incubated with MAD7 to form an RNP. The molar ratio of MAD7 and target DNA was 10:1.

Figure 3:
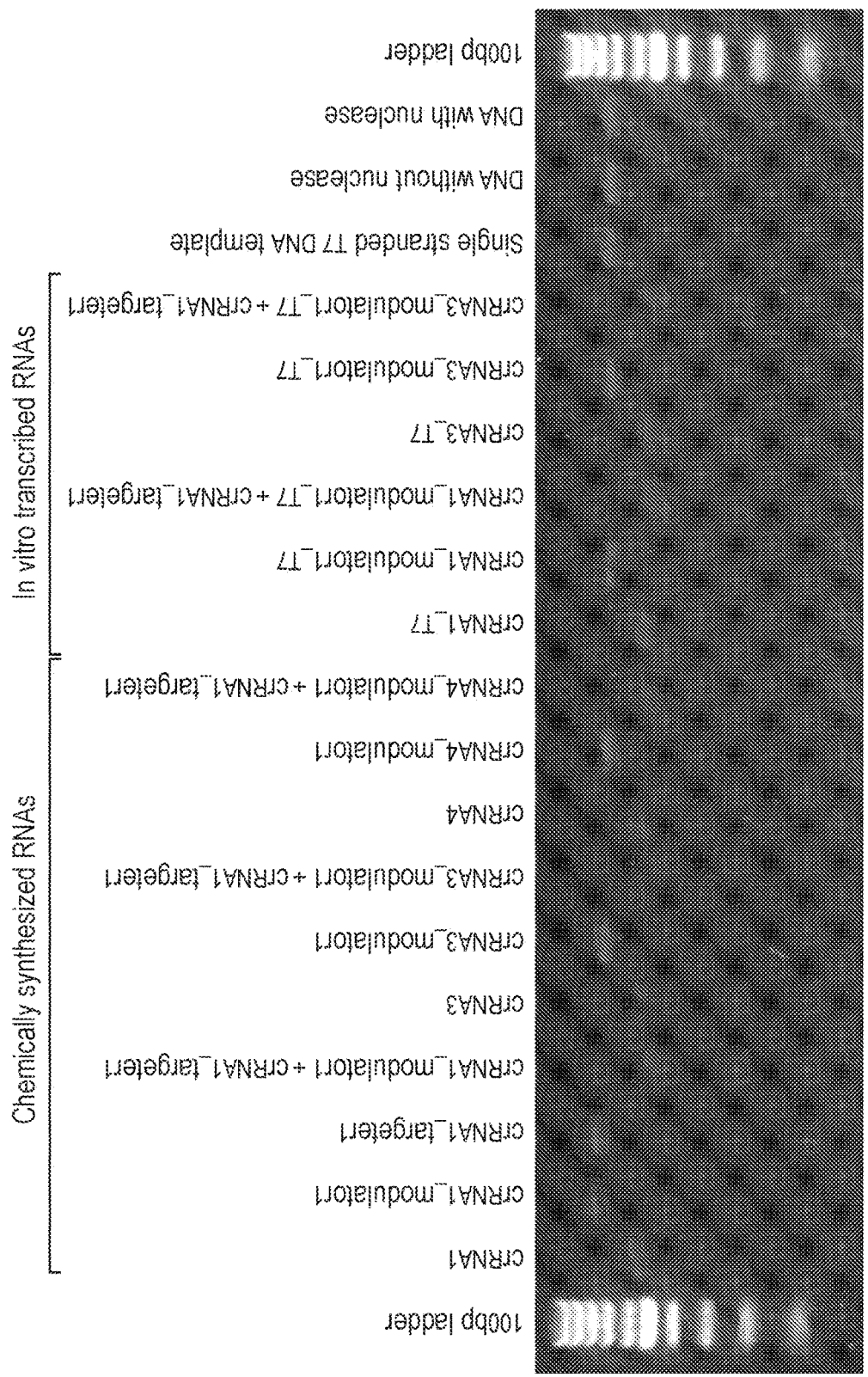
FIG. 3 is a photograph showing gel electrophoresis results from an in vitro cleavage experiment using MAD7 complexed with three different crRNAs, referred to as "crRNA1," "crRNA3," and "crRNA4," and their corresponding sets of targeter RNA and modulator RNAs, either chemically synthesized or produced by in vitro transcription.

As shown in FIG. 3, crRNA1, crRNA3, and crRNA4 all activated the nuclease activity of MAD7 to cleave the DNMT1 target DNA. Moreover, each of crRNA1_modulator1, crRNA3_modulator1, and crRNA4_modulator1, in combination with crRNA1_targeter1, activated MAD7 nuclease. By contrast, none of the targeter or modulator RNAs alone exhibited such activity. Therefore, under these conditions, the additional nucleotide sequences at the 5' end of a crRNA or a modulator RNA did not appear to have any negative impact on the ability of the guide RNA to activate MAD7 nuclease.

In Vitro Transcribed Modulator RNAs

Next assessed was the activity of in vitro transcribed RNAs in a single guide or dual guide CRISPR-Cas system. Briefly, crRNA1 and crRNA3 were transcribed in vitro from chemically synthesized double-stranded template DNAs using the MegaScript kit (Ambion). The template DNAs contained a T7 promoter, which had the nucleotide sequence of GCAGCTAATACGACTCACTATAGG (SEQ ID NO: 51), immediately upstream of the sequence encoding the RNA of interest. As a result, the in vitro transcribed RNAs, named crRNA1_T7 and crRNA3_T7, contained the nucleotide sequence of GG at the 5' end of the transcribed RNA. The RNAs were purified with the Oligo Clean and Concentration kit (Zymogen) and quantified on a Nanodrop. The quality of the in vitro transcribed RNAs was assessed on an agarose gel.

To generate corresponding dual guide systems, template DNAs containing a T7 promoter immediately upstream of a sequence encoding crRNA1_modulator1 or crRNA3 modulator1 were in vitro transcribed. The resulting RNAs, named crRNA1 modulator1_T7 and crRNA3_modulator1_T7, each contained the nucleotide sequence of GG at the 5' end of the transcribed RNA. The RNA samples were purified, and their quantity and quality were assessed as described above. These in vitro transcribed modulator RNAs were used in combination with chemically synthesized crRNA1_targeter1.

The in vitro transcribed RNAs were tested in an in vitro cleavage assay using the method described above. Each guide RNA was used at the concentration of 1 µM when incubated with MAD7 to form an RNP. The molar ratio of MAD7 and target DNA was 10:1.

As shown in FIG. 3, crRNA1_T7 and crRNA3_T7 retained the ability to activate MAD7 nuclease. Similarly, the combinations of (1) crRNA1_modulator1 T7 and crRNA1_targeter1 and (2) crRNA3_modulator1_T7 and crRNA1_targeter1 retained their ability to activate MAD7 nuclease. Therefore, under these conditions, the in vitro transcribed crRNAs and modulator RNAs, despite containing additional nucleotide sequences at the 5' end, were suitable for use in the single and dual guide CRISPR-Cas systems, respectively.

"Loop" Termini of Modulator and Targeter RNAs

The dual guide RNAs described above were designed by splitting single guide RNAs at the middle position of the crRNA loop. Next assessed were variants of the dual guide RNA systems in which a single guide RNA was split at different positions in the loop. As shown in FIGS. 4A-4F, crRNA1 (also called RNA #1 herein) was split at different positions in the loop to generate modulator RNAs named RNAs #2, #4, #6, #8, and #10, and targeter RNAs named RNAs #3, #5, #7, #9, and #11. The nucleotide sequences of these guide RNAs are provided in Table 4.

TABLE 4

Nucleotide Sequences of
Tested Single and Dual Guide RNAs

| Guide RNA | Nucleotide Sequence | SEQ ID NO |
|---|---|---|
| RNA #1 | UAAUUUCUACUCUUGUAGAUCUGAUGGUCC AUGUCUGUUA | 41 |
| RNA #2 | UAAUUUCUACUC | 42 |
| RNA #3 | UUGUAGAUCUGAUGGUCCAUGUCUGUUA | 43 |
| RNA #4 | UAAUUUCUAC | 15 |
| RNA #5 | UCUUGUAGAUCUGAUGGUCCAUGUCUGUUA | 52 |
| RNA #6 | UAAUUUCUACU | 53 |
| RNA #7 | CUUGUAGAUCUGAUGGUCCAUGUCUGUUA | 54 |
| RNA #8 | UAAUUUCUACUCU | 55 |
| RNA #9 | UGUAGAUCUGAUGGUCCAUGUCUGUUA | 56 |
| RNA #10 | UAAUUUCUACUCUU | 57 |
| RNA #11 | GUAGAUCUGAUGGUCCAUGUCUGUUA | 58 |

These guide RNAs were chemically synthesized. An in vitro cleavage assay was conducted using the method described above. Each guide RNA was used at the concentration of 1 μM when incubated with MAD7 to form an RNP. The molar ratio of MAD7 and target DNA was 10:1.

As shown in FIG. 4I, the pairs of guide RNAs #2 and #3, #4 and #5, #6 and #7, and #8 and #9, and #10 and #11 activated the nuclease activity of MAD7 to cleave the DNMT1 target DNA. None of these targeter or modulator RNAs alone exhibited such activity. Therefore, under these conditions, the position in the loop at which crRNA1 was split did not appear to affect the activity of the dual guide RNA system.

Surprisingly, combinations of any modulator RNA selected from RNAs #2, #4, #6, #8, and #10 with any targeter RNA selected from RNAs #3, #5, #7, #9, and #11 were shown to activate MAD7 nuclease (FIG. 4I). In particular, the combination of RNAs #4 and #11 contained no sequence from the loop of crRNA1, and the combination of RNAs #10 and #5 contained the loop sequence of crRNA1 in both the modulator RNA and the targeter RNA. Therefore, under these conditions, the loop of a corresponding single guide RNA or a fragment of the loop was dispensable in the dual guide system. When the loop or a loop fragment was present, its length in either the targeter RNA or the modulator RNA did not appear to affect the activity of the dual guide RNA system.

Inclusion of Additional Hairpin Sequences

Figure 4A:
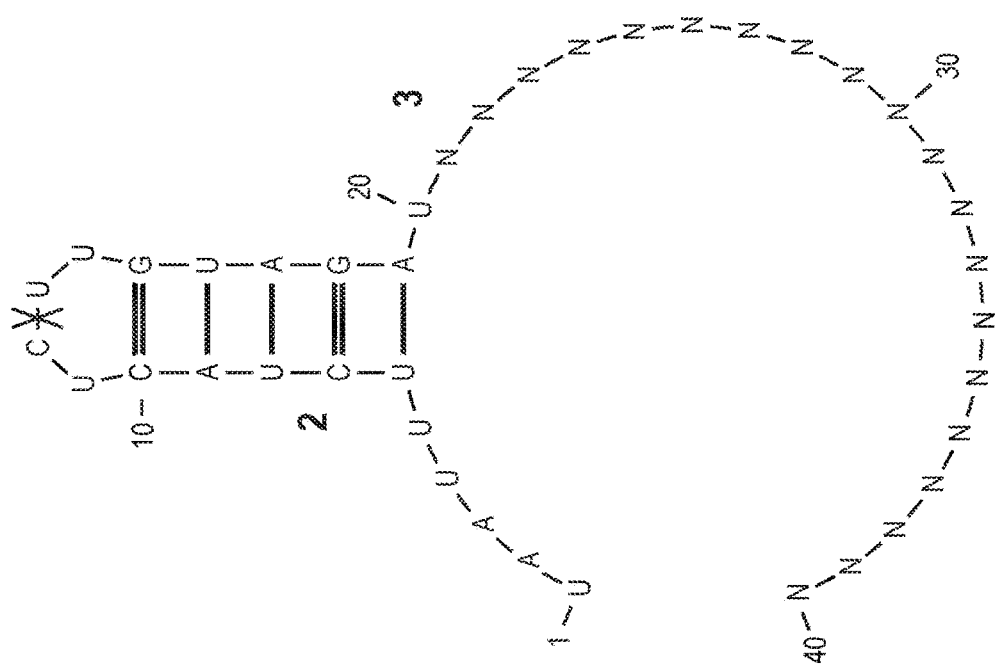
FIGS. 4A-4H are a series of schematic representations showing the predicted secondary structure of hybridized targeter and modulator RNAs. Crosses (within the loop regions) indicate the sites where the RNAs are split into a targeter RNA and a modulator RNA.
Figure 4B:
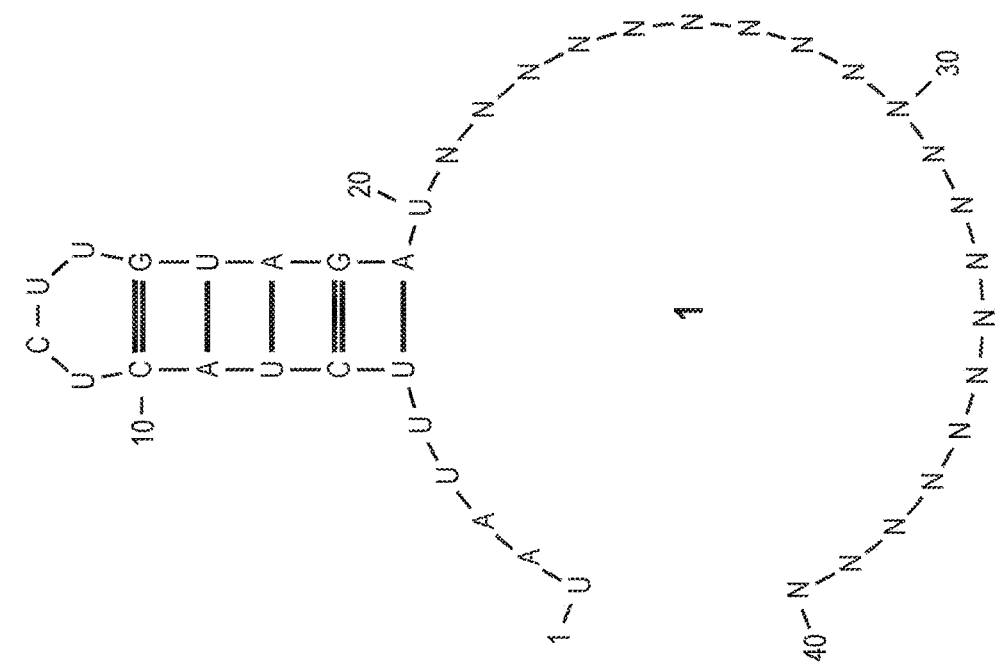
Figure 4D:
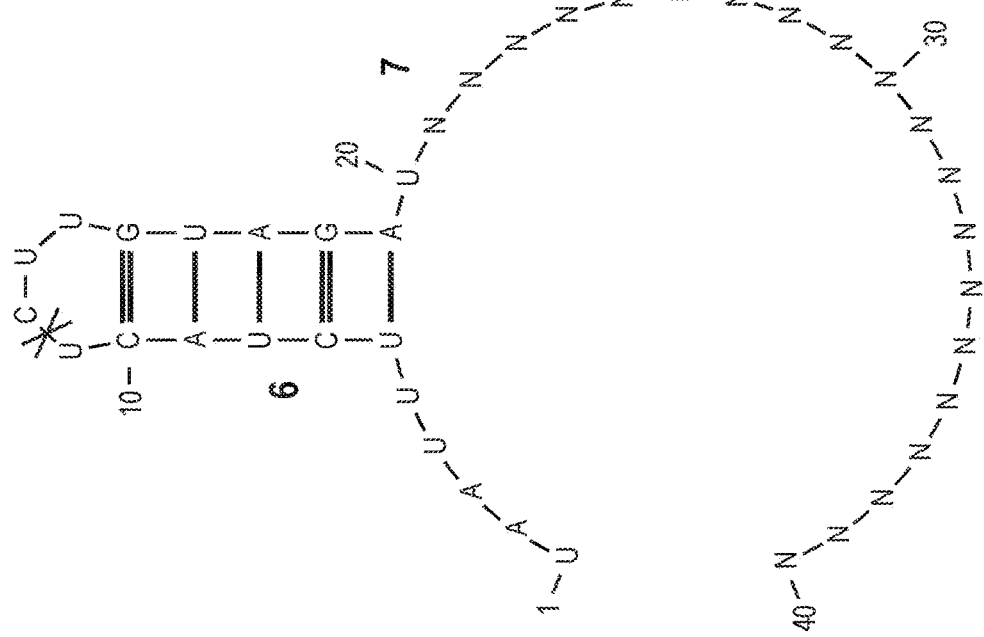
Figure 4C:
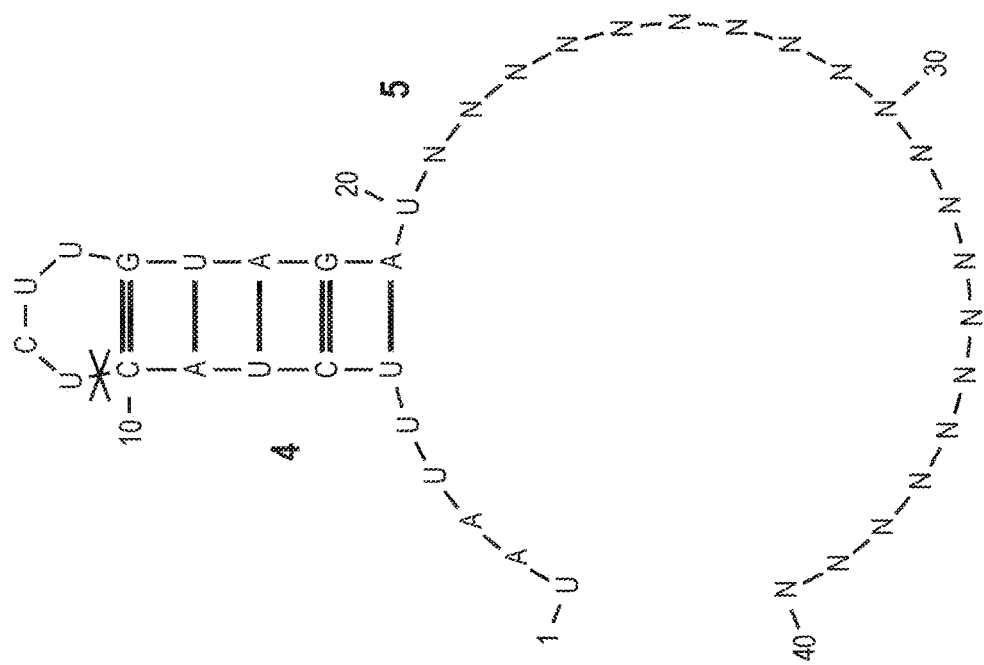
Figure 4F:
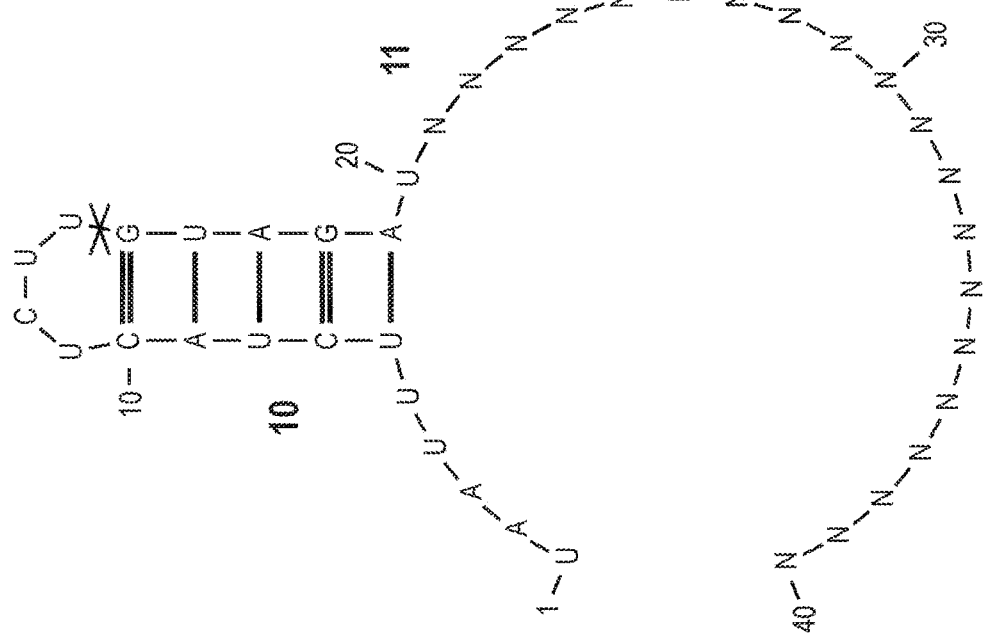
Figure 4E:
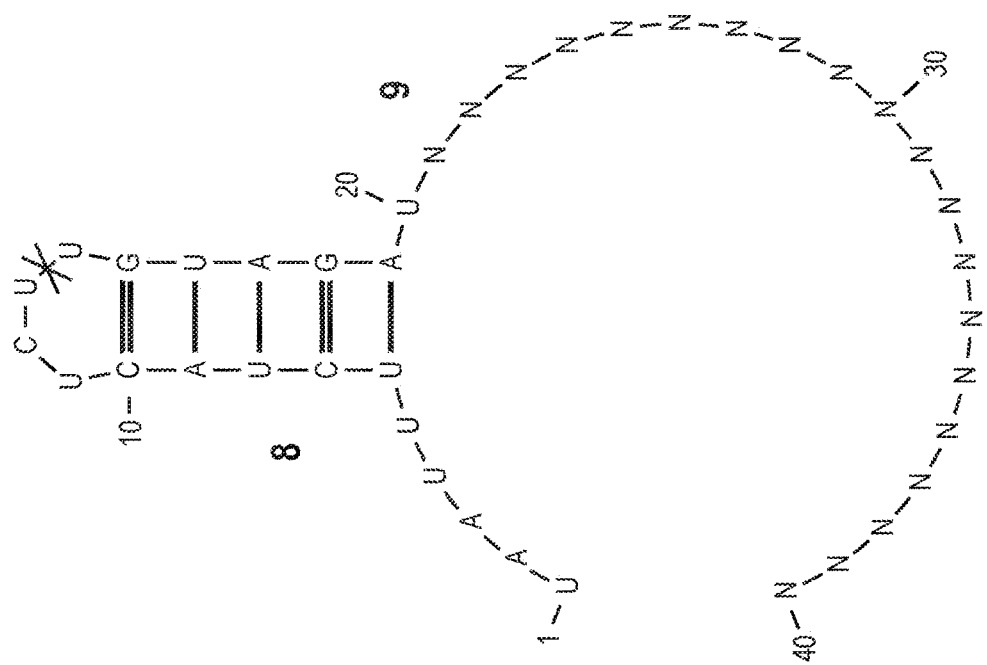
Figure 4H:
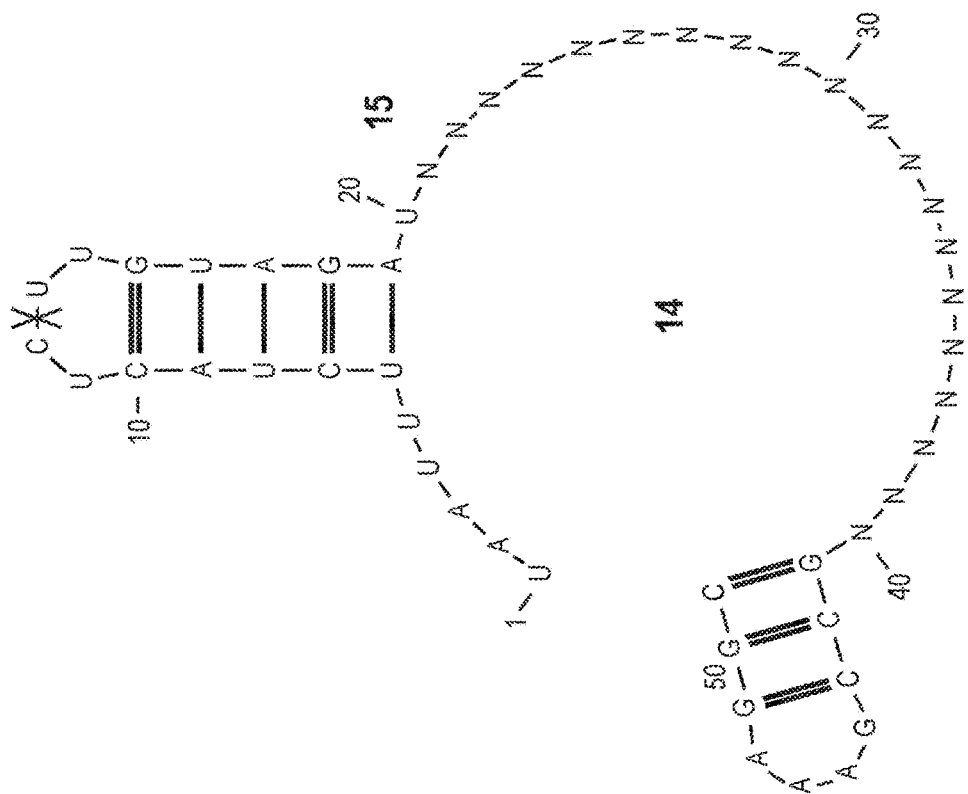
Figure 4G:
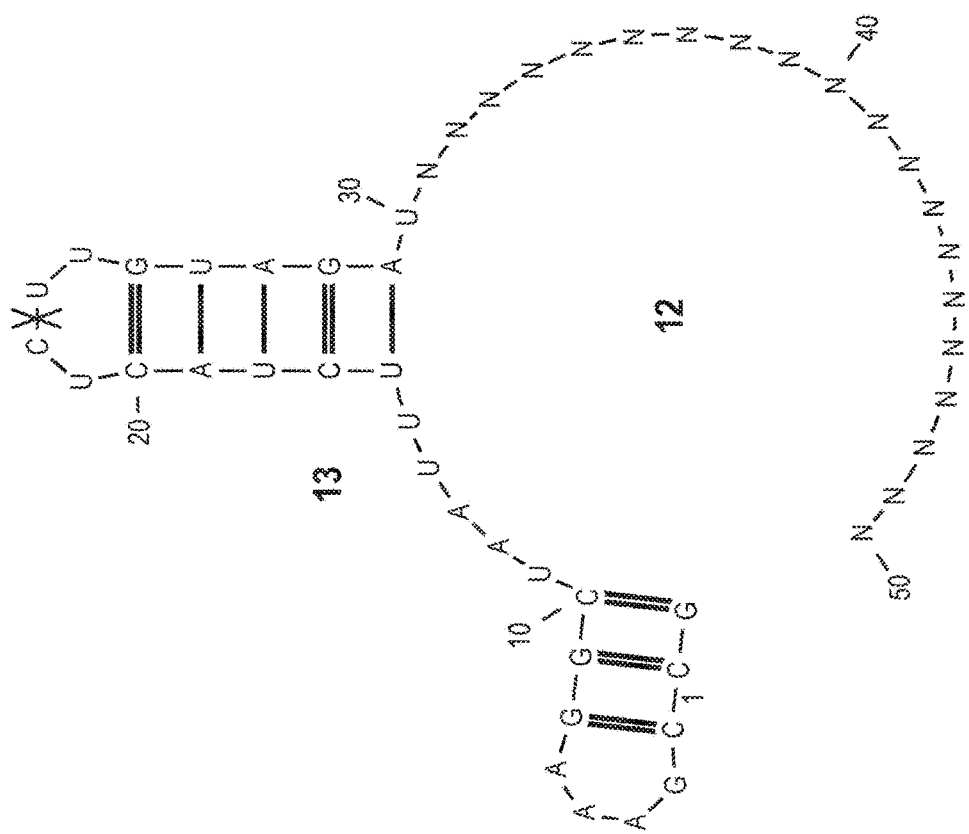
Figure 41:
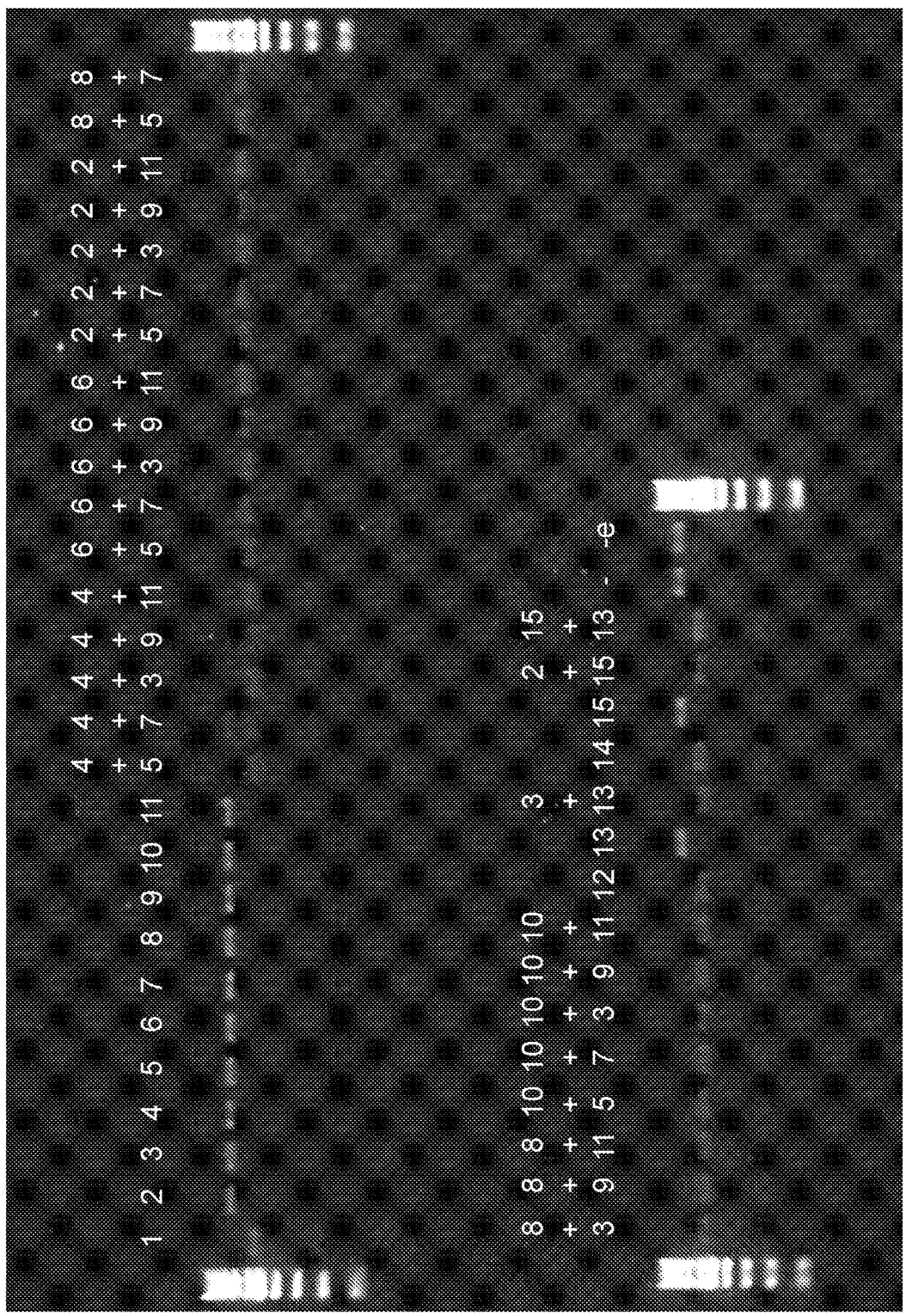

Next assessed were dual guide RNA systems including a hairpin sequence at the 5' end of a modulator RNA or at the 3' end of a targeter RNA. As shown in FIGS. 4G-4H, a hairpin sequence was added at the 5' end or 3' end of crRNA1 to generate single guide RNA named RNAs #12 and 14, respectively. A modulator RNA corresponding to RNA #12, which included the hairpin sequence added at the 5' end of crRNA1_modulator1, was designed and named RNA #13. A targeter RNA corresponding to RNA #14, which included the hairpin sequence added at the 3' end of crRNA1_targeter1, was designed and named RNA #15. The nucleotide sequences of these guide RNAs are provided in Table 5. The hairpin sequences in the guide RNAs are underlined.

TABLE 5

Nucleotide Sequences of
Tested Single and Dual Guide RNAs

| Guide RNA | Nucleotide Sequence | SEQ ID NO |
|---|---|---|
| RNA #12 | GCCGAAAGGCUAAUUUCUACUCUUGUAGAU CUGAUGGUCCAUGUCUGUUA | 59 |
| RNA #13 | GCCGAAAGGCUAAUUUCUACUC | 60 |
| RNA #14 | UAAUUUCUACUCUUGUAGAUCUGAUGGUCC AUGUCUGUUAGCCGAAAGGC | 61 |
| RNA #15 | UUGUAGAUCUGAUGGUCCAUGUCUGUUAGC CGAAAGGC | 62 |

These guide RNAs were chemically synthesized. An in vitro cleavage assay was conducted using the method described above. Each guide RNA was used at the concentration of 1 μM when incubated with MAD7 to form an RNP. The molar ratio of MAD7 and target DNA was 10:1.

As shown in FIG. 4I, the hairpin-containing single guide RNAs #12 and 14 activated the nuclease activity of MAD7 to cleave the DNMT1 target DNA. The corresponding modulator RNA #13 and targeter RNA #15, which contained the hairpin sequence at the 5' end and the 3' end, respectively, did not show such activity alone. However, when modulator RNA #13 was combined with targeter RNA #3 (as described in the "'Loop' Termini of Modulator and Targeter RNAs" subsection) to form a dual guide system, this pair of RNAs activated MAD7 nuclease. Similarly, when targeter RNA #15 was combined with modulator RNA #2 (as described in the "'Loop' Termini of Modulator and Targeter RNAs" subsection) to form a dual guide system, this pair of RNAs activated MAD7 nuclease. Notably, the combination of modulator RNA #13 and targeter RNA #15, each containing a pairpin sequence, also activated MAD7 nuclease. Therefore, under these conditions, the hairpin sequence added at the 5' end of a modulator RNA or at the 3' end of a targeter RNA did not appear to negatively affect the activity of a dual guide system.

Base Pairing Between Modulator RNA and Targeter RNA

To assess the impact of modulator RNA-targeter RNA base pairing on the activity of dual guide systems, more single and dual guide systems were designed and tested. Specifically, crRNA constructs were designed to introduce additional base pairing between the modulator RNA and the targeter RNA. The nucleotides in the modulator RNA that formed these base pairs were positioned 3' to the modulator stem sequence, and the nucleotides in the targeter RNA that formed these base pairs were positioned 5' to the targeter stem sequence. As shown in FIGS. 5A-5I, constructs 1 and 2 were identical to crRNA1 and crRNA2 described above. The other constructs were split either within the loop regions to generate combinations 3, 5, 7, 9, 11, 13, and 15 or within the stem regions to generate combinations 4, 6, 8, 10, 12, 14, and 16. The nucleotides sequences of these guide RNAs are provided in Table 6. The Gibbs free energy change (ΔG) of the corresponding crRNAs was calculated by the RNAfold program and are noted in FIGS. 5A-5I.

TABLE 6

Nucleotide Sequences of Tested Single and Dual Guide RNAs

| Construct | crRNA Sequence | SEQ ID NO |
|---|---|---|
| 1 | UAAUUCUACUCUUGUAGAUCTGATGGTCCATGTCTGTTA | 63 |
| 2 | UAAUUCCCACUCUUGUGGGUCTGATGGTCCATGTCTGTTA | 64 |

| Combination | Modulator RNA Sequence | SEQ ID NO | Targeter RNA Sequence | SEQ ID NO |
|---|---|---|---|---|
| 3 | UAAUUCCCACUC | 45 | UUGUGGGUCTGATGGTCCATGTCTGTTA | 78 |
| 4 | UAAUUCCCACUCUUG | 65 | UGGGUCTGATGGTCCATGTCTGTTA | 79 |
| 5 | UAAUUCCCACUCUC | 66 | UUGUGUGGGUCTGATGGTCCATGTCTGTTA | 80 |
| 6 | UAAUUCCCACUCUCUUGUG | 67 | UGGGUCTGATGGTCCATGTCTGTTA | 81 |
| 7 | UAAUUCCCACUCCUC | 68 | UUGUUGUGGGUCTGATGGTCCATGTCTGTTA | 82 |
| 8 | UAAUUCCCACUCCUCUGUUG | 69 | UGGGUCTGATGGTCCATGTCTGTTA | 83 |
| 9 | UAAUUCCCACUGCUC | 70 | UUGCUGUGGGUCTGATGGTCCATGTCTGTTA | 84 |
| 10 | UAAUUCCCACUCUCUUGCUG | 71 | UGGGUCTGATGGTCCATGTCTGTTA | 85 |
| 11 | UAAUUCCCACUCGCUC | 72 | UUGCUUGUGGGUCTGATGGTCCATGTCTGTTA | 86 |
| 12 | UAAUUCCCACUCGCUCUUGCUUG | 73 | UGGGUCTGATGGTCCATGTCTGTTA | 87 |
| 13 | UAAUUCCCACUCGCUC | 74 | UUGCGUGUGGGUCTGATGGTCCATGTCTGTTA | 88 |
| 14 | UAAUUCCCACUCGCUCUUGCGUG | 75 | UGGGUCTGATGGTCCATGTCTGTTA | 89 |
| 15 | UAAUUCCCACUCCGCUC | 76 | UUGCGUUGUGGGUCTGATGGTCCATGTCTGTTA | 90 |
| 16 | UAAUUCCCACUCCGCUCUUGCGUUG | 77 | UGGGUCTGATGGTCCATGTCTGTTA | 91 |

The guide RNAs were chemically synthesized. An in vitro cleavage assay was conducted using the method described above, except that the MAD7 protein was incubated with an equimolar amount of RNA(s) at 25° C. for 20 min to form an RNP, and the RNPs were incubated with the target DNA for 30 minutes. Each guide RNA was used at the concentration of 1 μM when incubated with MAD7 to form an RNP. The molar ratio of MAD7 and target DNA was 10:1.

Figure 5B:
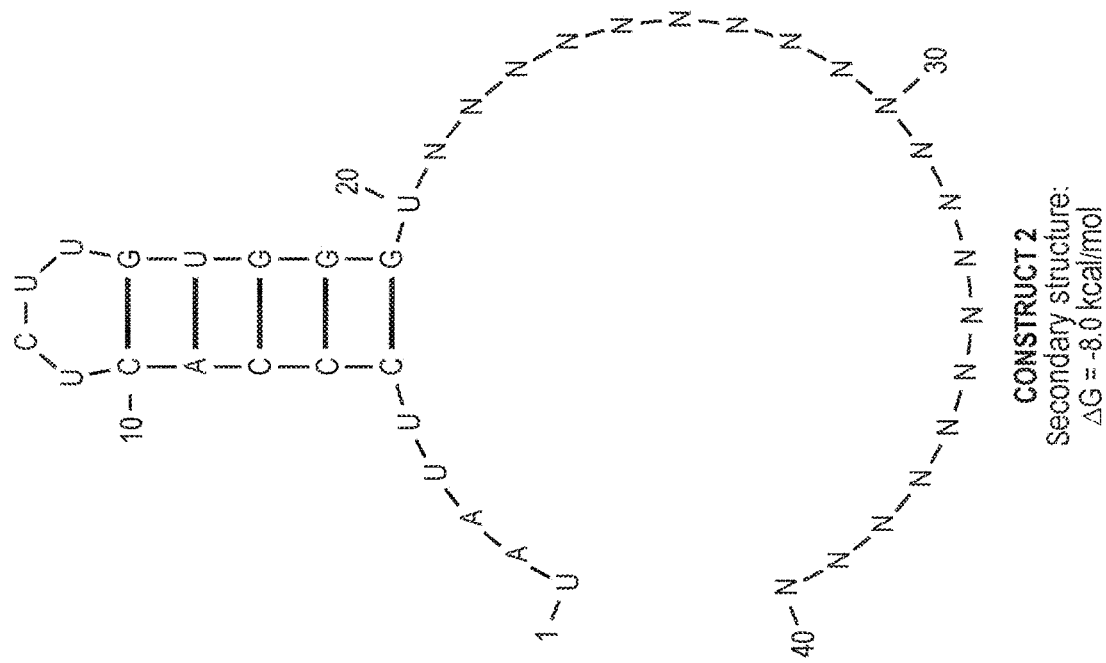
FIGS. 5A-5I are a series of schematic representations showing the predicted secondary structures of crRNAs.
Figure 5A:
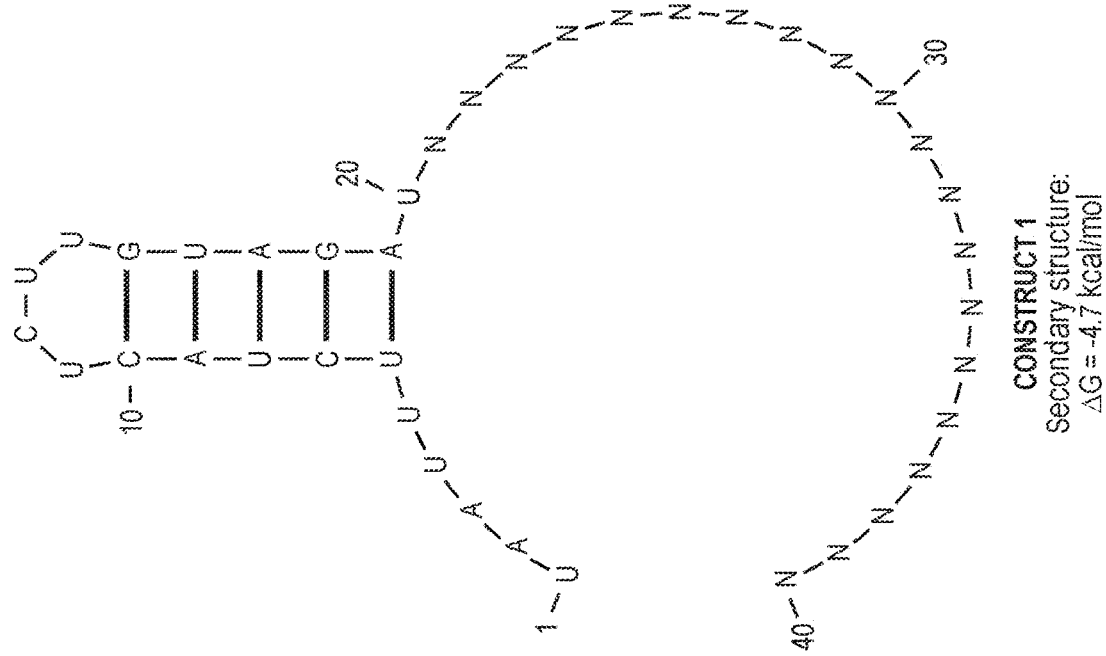
Figure 5D:
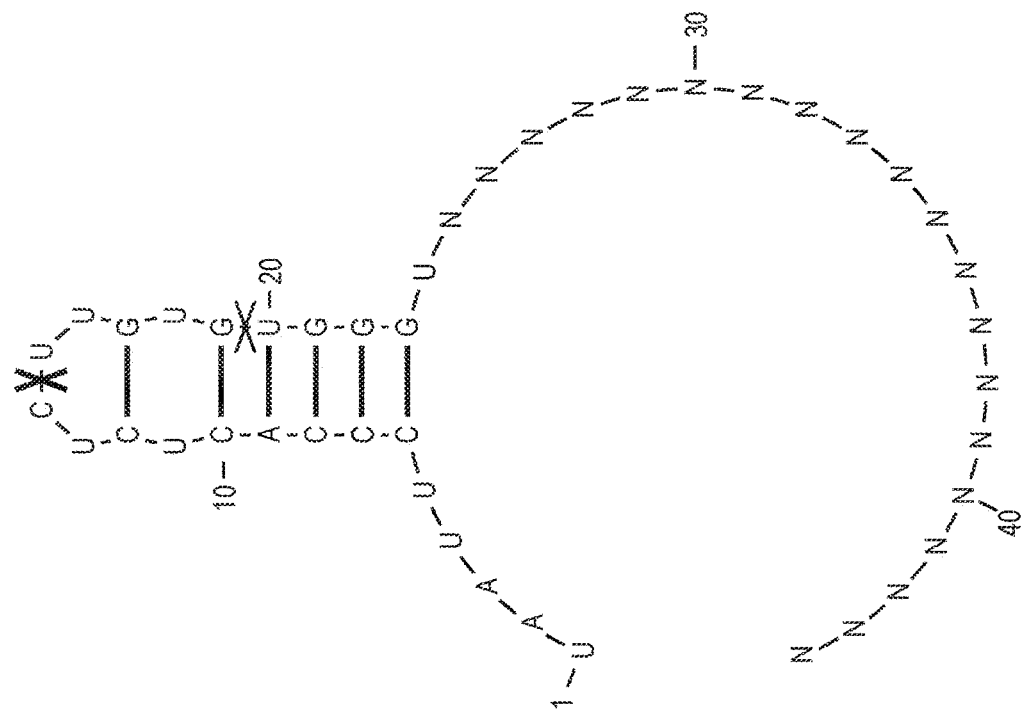
Figure 5C:
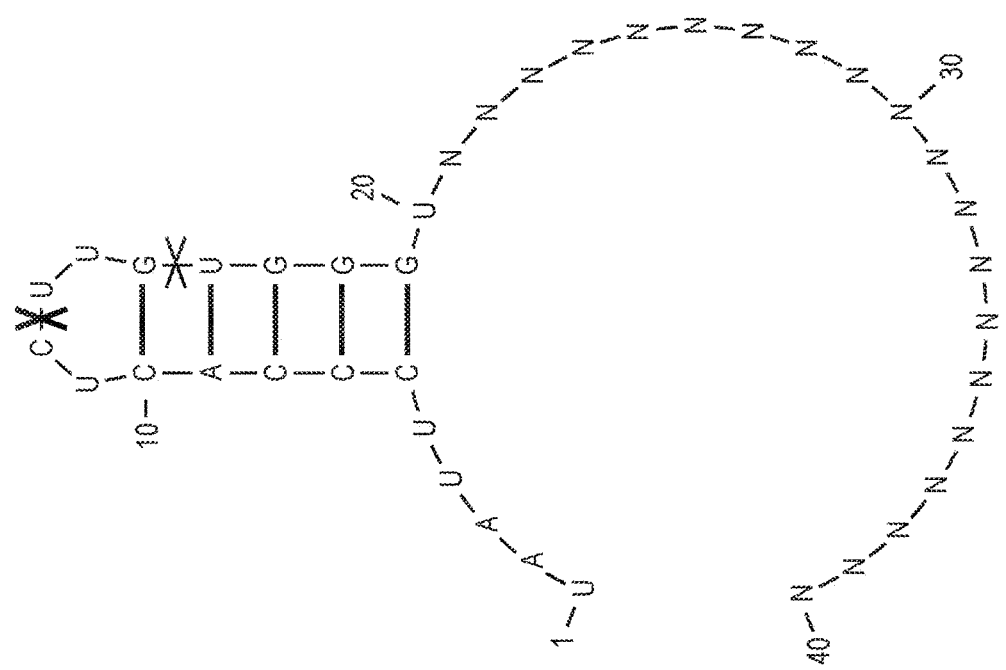
Figure 5F:
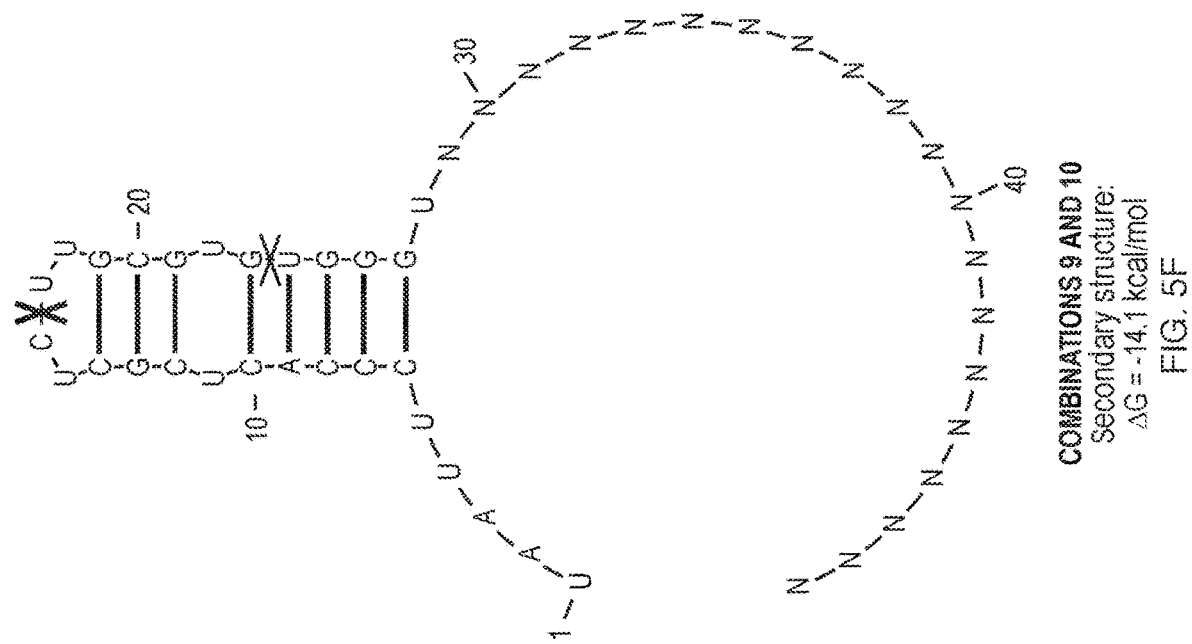
Figure 5E:
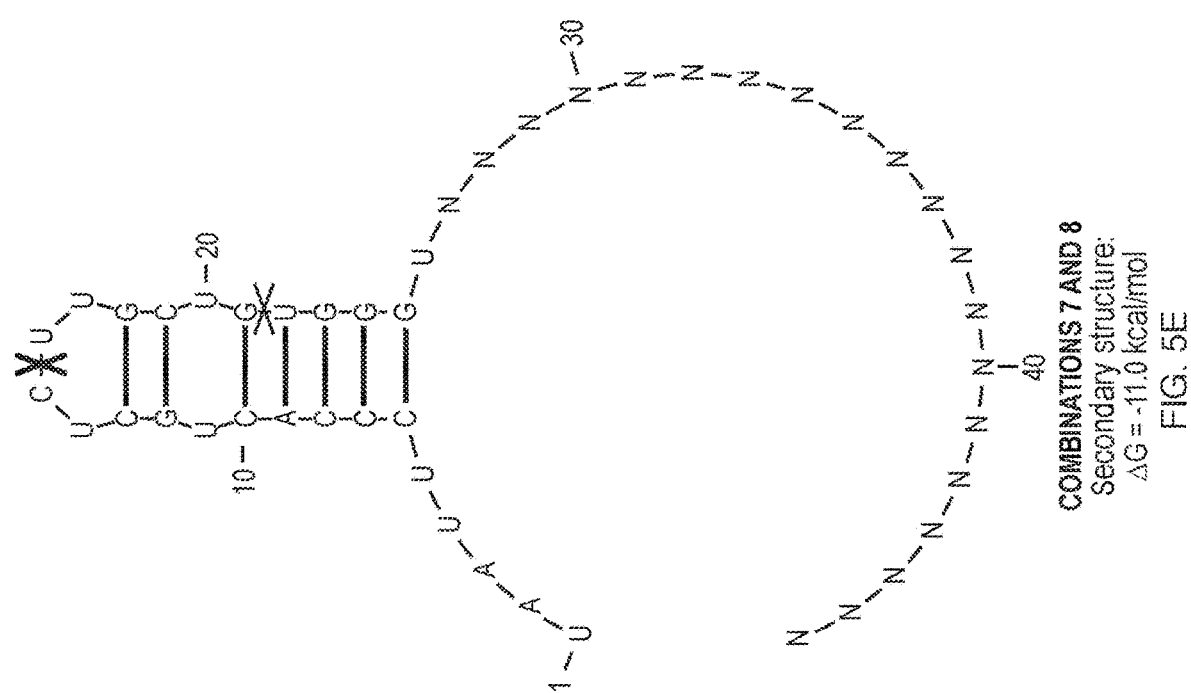
Figure 5H:
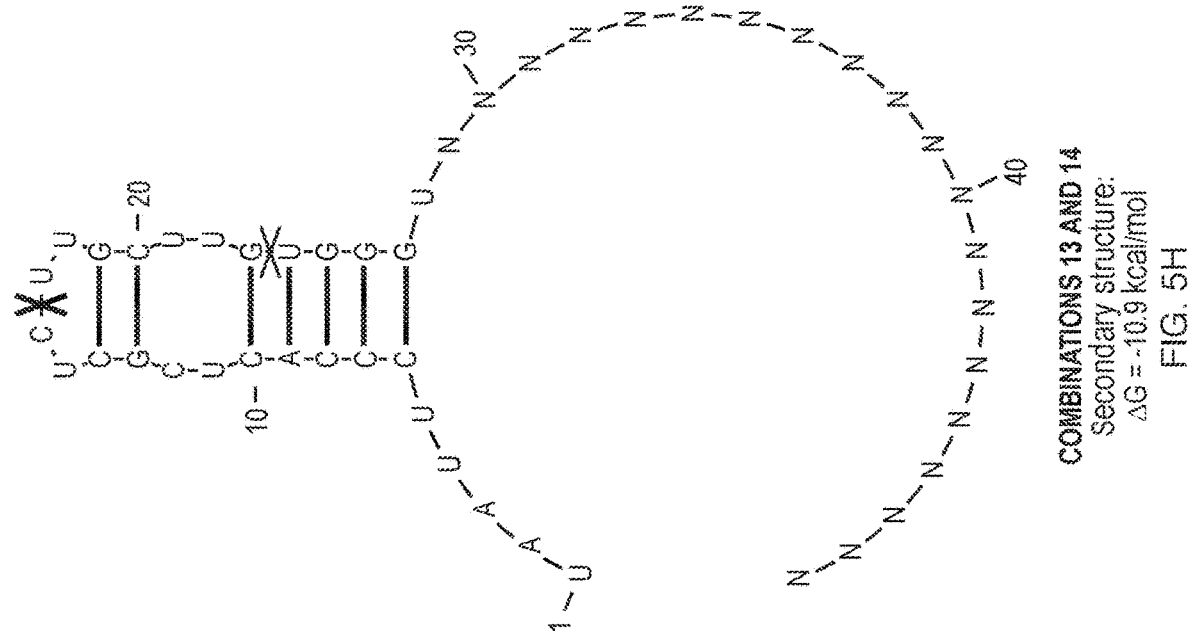
Figure 5G:
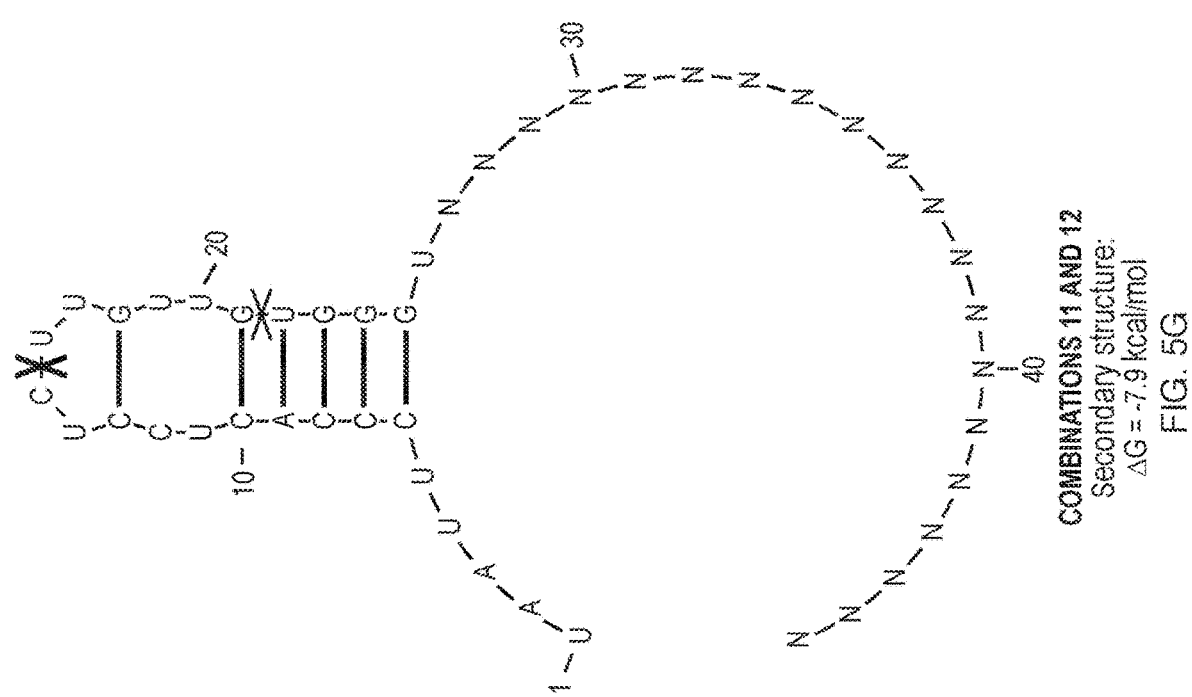
Figure 5I:
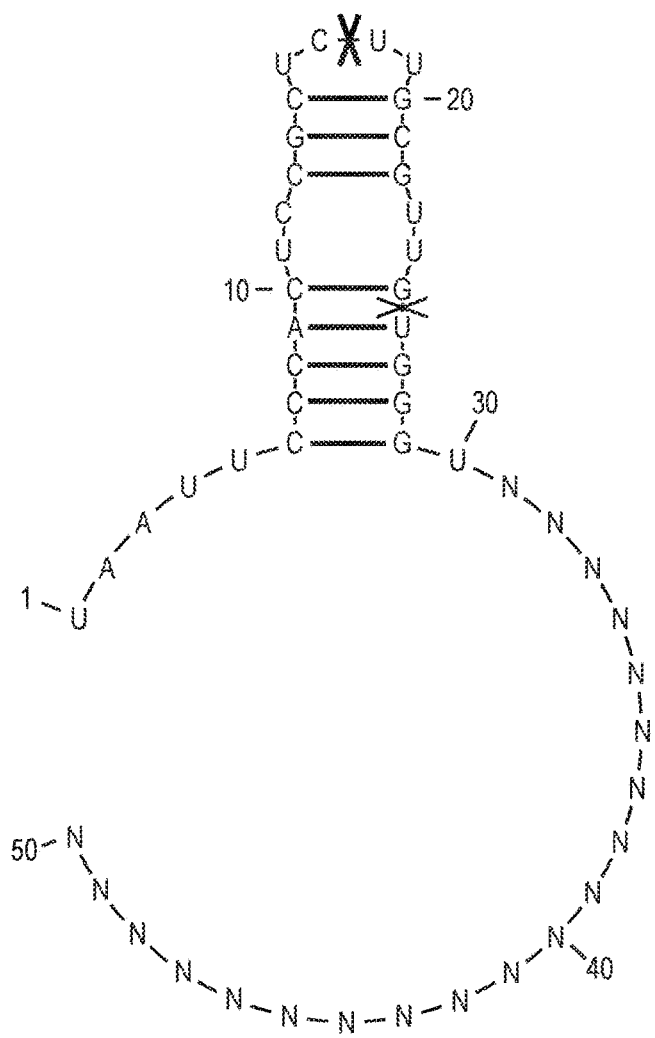
Figures 5J, 5K:
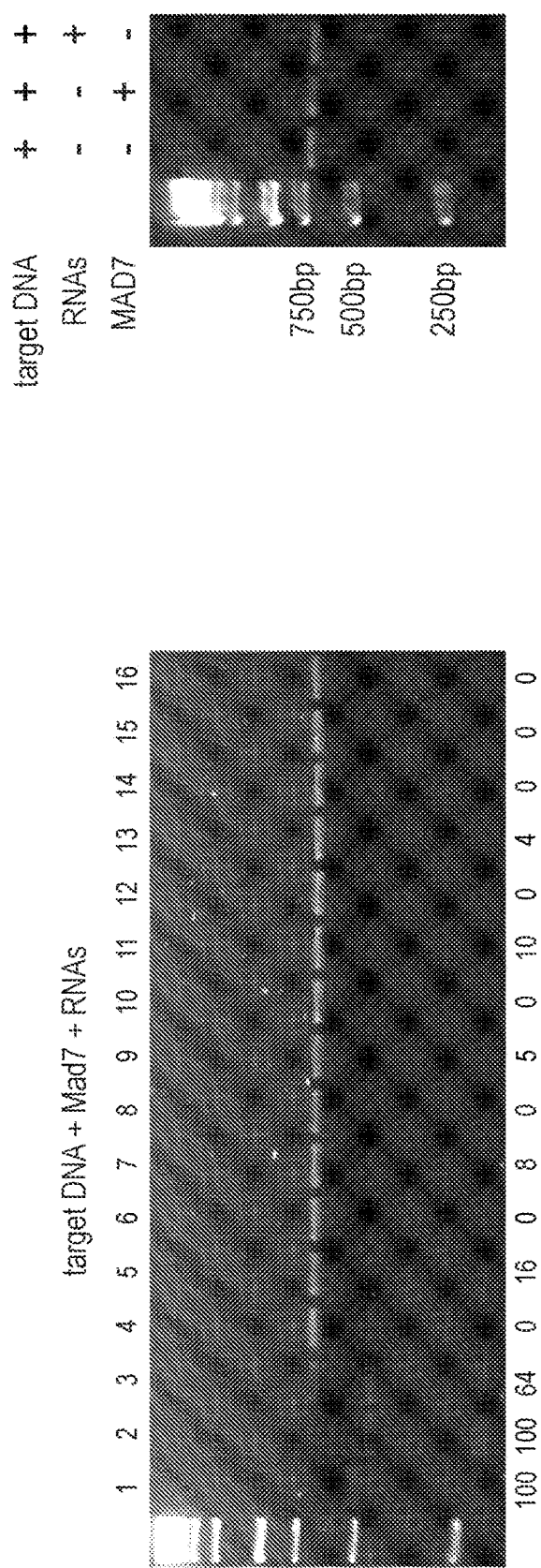
FIGS. 5J-5K are photographs showing gel electrophoresis results from an in vitro cleavage experiment using MAD7 complexed with crRNA constructs or combinations of targeter and modulator RNAs. The ratio of cleaved product in FIG. 5J was determined by measuring the relative intensities of the bands.

As shown in FIGS. 5J-5K, splitting the crRNAs within the stem regions into dual guides abrogated the activity of the CRISPR-Cas system. However, where the crRNAs were split within the loop regions, the ability of the dual guide system to activate MAD7 nuclease was reduced in the systems that contained additional base pairing between the modulator RNA and the targeter RNA.

Example 2. Cleavage of Genomic DNA by Dual Guide MAD7 CRISPR-Cas Systems

This example describes cleavage of the genomic DNA of Jurkat cells using MAD7 in complex with single guide or dual guide nucleic acids.

Briefly, Jurkat cells were grown in RPMI 1640 medium (Thermo Fisher Scientific, A1049101) supplemented with 10% fetus bovine serum at 37° C. in a 5% $CO_2$ environment, and split every 2-3 days to a density of 100,000 cells/mL. MAD7 protein, which contained a nucleoplasmin NLS at the C-terminus, was expressed in *E. Coli* and purified by FPLC. RNP complexes were prepared by incubating 150 pmol MAD7 protein with 150 pmol crRNA1 or a combination of 150 pmol crRNA1_modulator1 and 150 pmol crRNA1_targeter1, as described in Example 1, for 10 minutes at room temperature. The RNPs were mixed with 200,000 Jurkat cells in a final volume of 25 μL. Electroporation was carried out on a 4D-NUCLEOFECTOR® (Lonza) using program CA-137. Following electroporation, the cells were cultured for three days.

Genomic DNA of the cells was extracted using the Quick Extract DNA extraction solution 1.0 (Epicentre). The DNMT1 gene was amplified from the genomic DNA samples in a PCR reaction using a forward primer having the nucleotide sequence of TCGTCGGCAGCGTCA-GATGTGTATAAGAGACAGAGTGTTCAGTCTCCGT-GAACGT (SEQ ID NO: 92) and a reverse primer having the nucleotide sequence of GTCTCGTGGGCTCG-GAGATGTGTATAAGAGACAGGTCCT-TAGCAGCTTCCTCCTCC (SEQ ID NO: 93). The amplified DNA was purified and used as template in a second PCR reaction using Nextera indexing primers Index 1 and Index 2. The sequence of Index 1 was CAAGCAGAAGACGG-CATACGAGAT[i7]GTCTCGTGGGCTCGG (SEQ ID NO: 94) and the sequence of Index 2 was AATGA-TACGGCGACCACCGAGATCTACAC[i5] TCGTCGGCAGCGTC (SEQ ID NO: 95), where i7 and i5 represented barcodes for multiplexing. The PCR products were analyzed by next-generation sequencing, and the data were analyzed with the AmpliCan package (see, Labun et al. (2019), *Accurate analysis of genuine CRISPR editing events with ampliCan*, GENOME RES., electronically published in advance). The quality of the sequencing results was verified in FIG. 6B. Editing efficiency was determined by the number of edited reads relative to the total number of reads obtained under each condition. The experiment was conducted in duplicate.

Figure 6A:
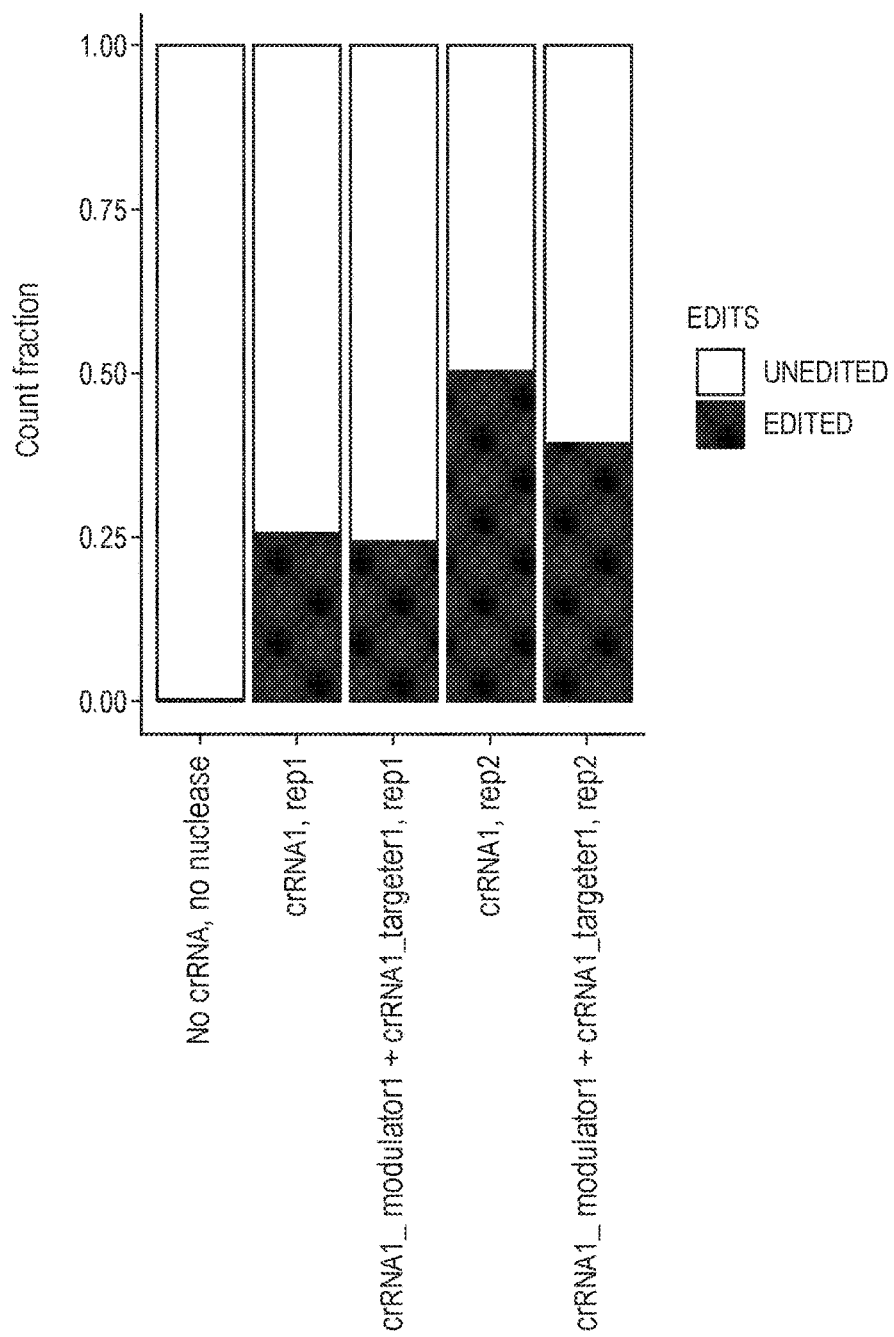
FIG. 6A is a bar graph showing the read fraction of edited and unedited copies of target DNA by each crRNA or a corresponding set of targeter RNA and modulator RNA tested. "Rep1" and "rep2" means the first and second replicates, respectively, of the same experiment.
Figure 6B:
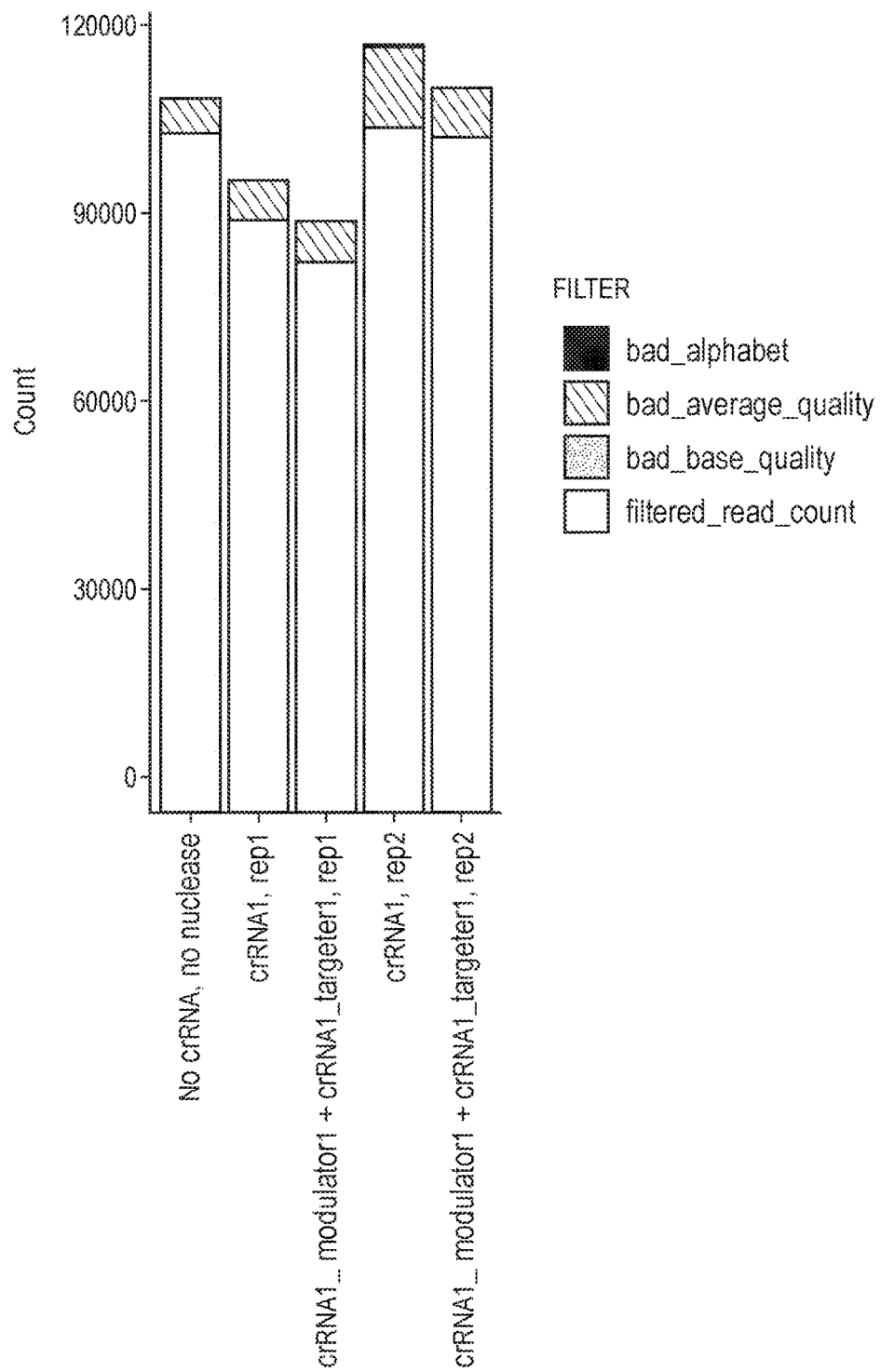
FIG. 6B is a bar graph showing the number of sequencing reads obtained in each condition. The colors indicate the quality of the reads.

As shown in FIG. 6A, the combination of crRNA1_modulator1 and crRNA1_targeter1, in complex with MAD7, edited 25-40% of the DNMT1 genomic locus in the population of Jurkat cells. This observed efficiency was similar to the efficiency achieved by using crRNA1 and MAD7.

Example 3. Cleavage of Other Target Sites by Dual Guide MAD7 CRISPR-Cas Systems Examples 1 and 2 describe cleavage of a target DNA having the sequence of the human DNMT1 gene. This example describes cleavage of other target DNAs using MAD7 in complex with dual guide nucleic acids.

Briefly, crRNAs and corresponding targeter RNAs were designed to target other human genes. These targeter RNAs can be combined with crRNA1_modulator1 to generate a dual guide system. The sequences of the guide RNAs used in this experiment are provided in Table 7. Guide RNAs targeting other human genes are also designed.

TABLE 7

Nucleotide Sequences of Exemplary Single and Dual Guide RNAs

| Guide RNA | Nucleotide Sequence | Target Gene | SEQ ID NO |
| --- | --- | --- | --- |
| crRNA1_modulator1 | UAAUUUCUACUC | N/A | 42 |
| crRNA_CD90 | UAAUUUCUACUCUUGUAGAU CTGGTGAAGTTGGTTCGGGAG | CD90 | 100 |
| crRNA_CD90_targeter | UUGUAGAUCTGGTGAAGTTG GTTCGGGAG | CD90 | 101 |
| crRNA_PDCD1_23 | UAAUUUCUACUCUUGUAGAU TCTGCAGGGACAATAGGAGCC | PDCD1 | 103 |
| crRNA_PDCD1_23_targeter | UUGUAGAUTCTGCAGGGACA ATAGGAGCC | PDCD1 | 104 |
| crRNA_LAG3 | UAAUUUCUACUCUUGUAGAU GGGTGCATACCTGTCTGGCTG | LAG3 | 105 |
| crRNA_LAG3_targeter | UUGUAGAUGGGTGCATACCT GTCTGGCTG | LAG3 | 106 |
| crRNA_PTPN11 | UAAUUUCUACUCUUGUAGAU UAUGACCUGUAUGGAGGGGAG | PTPN11 | 107 |
| crRNA_PTPN11_targeter | UUGUAGAUUAUGACCUGUAU GGAGGGGAG | PTPN11 | 108 |
| crRNA_PDCD1_8 | UAAUUUCUACUCUUGUAGAU GCACGAAGCTCTCCGATGTGT | PDCD1 | 109 |
| crRNA_PDCD1_8_targeter | UUGUAGAUGCACGAAGCTCT CCGATGTGT | PDCD1 | 110 |
| crRNA_FAS | UAAUUUCUACUCUUGUAGAU GTGTAACATACCTGGAGGACA | FAS | 111 |
| crRNA_FAS_targeter | UUGUAGAUGTGTAACATACC TGGAGGACA | FAS | 112 |
| crRNA_TIGIT | UAAUUUCUACUCUUGUAGAU GTCCTCCCTCTAGTGGCTGAG | TIGIT | 113 |
| crRNA_TIGIT_targeter | UUGUAGAUGTCCTCCCTCTA GTGGCTGAG | TIGIT | 114 |
| crRNA_CTLA4 | UAAUUUCUACUCUUGUAGAU AGCGGCACAAGGCTCAGCTGA | CTLA4 | 115 |
| crRNA_CTLA4_targeter | UUGUAGAUAGCGGCACAAGG CTCAGCTGA | CTLA4 | 116 |
| crRNA_B2M | UAAUUUCUACUCUUGUAGAU ACTTTCCATTCTCTGCTGGAT | B2M | 117 |
| crRNA_B2M_targeter | UUGUAGAUACTTTCCATTCT CTGCTGGAT | B2M | 118 |
| crRNA_PDCD1_2 | UAAUUUCUACUCUUGUAGAU CCTTCCGCTCACCTCCGCCTG | PDCD1 | 119 |
| crRNA_PDCD1_2 targeter | UUGUAGAUCCTTCCGCTCAC CTCCGCCTG | PDCD1 | 120 |

TABLE 7-continued

Nucleotide Sequences of Exemplary Single and Dual Guide RNAs

| Guide RNA | Nucleotide Sequence | Target Gene | SEQ ID NO |
|---|---|---|---|
| crRNA_CD52 | UAAUUUCUACUCUUGUAGAU CTCTTCCTCCTACTCACCATC | CD52 | 121 |
| crRNA_CD52_targeter | UUGUAGAUCTCTTCCTCCTA CTCACCATC | CD52 | 122 |

The guide RNAs were chemically synthesized. In cell cleavage assay was conducted using the method described in Example 2.

Figure 7:
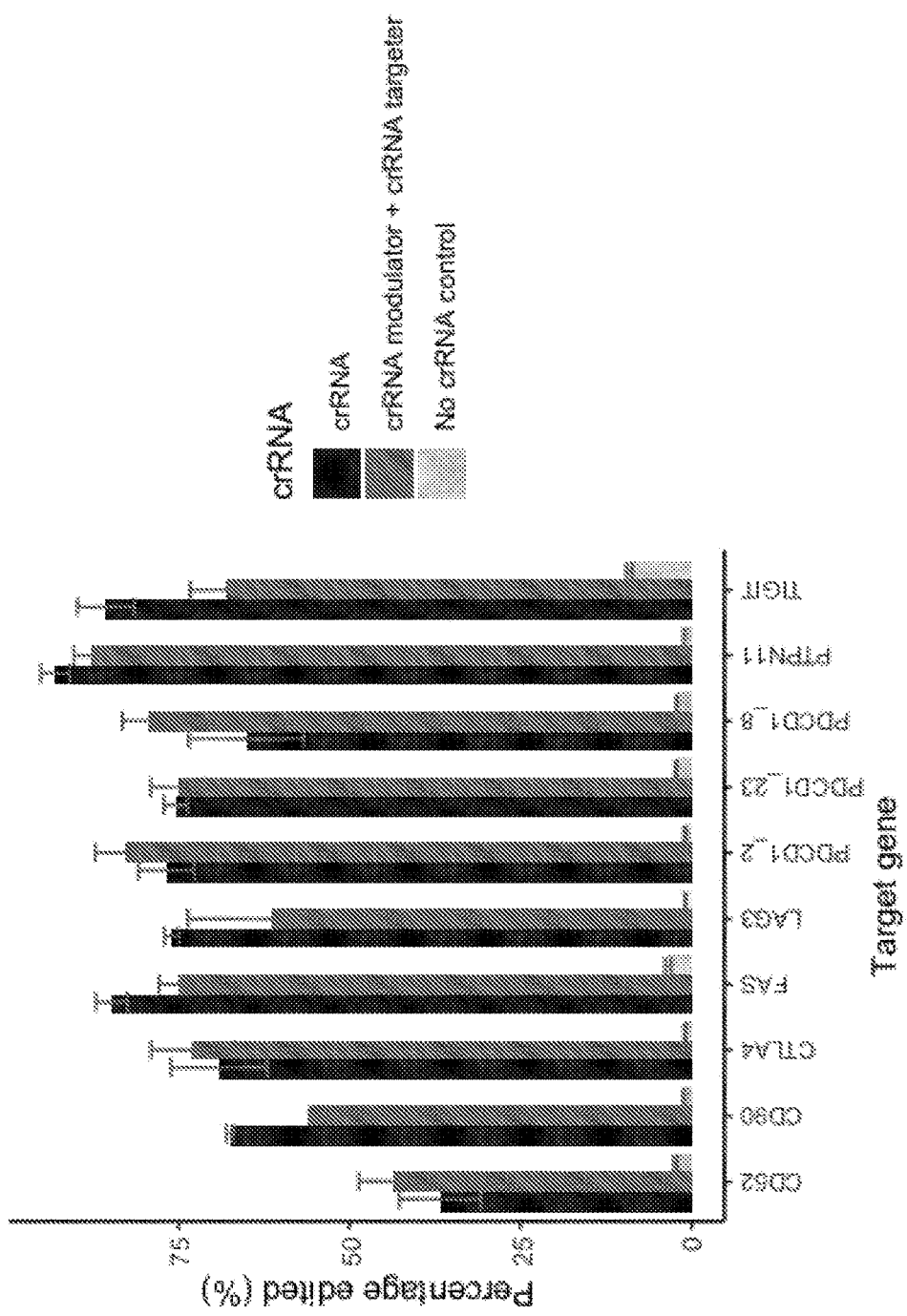
FIG. 7 is a bar graph showing the percentage of edited copies of the target locus (shown on the x-axis) in the genome of Jurkat cells.

As shown in FIG. 7, in each of the target loci tested, the dual guide RNAs edited the human genome at similar efficiencies as the respective single guide RNA.

Example 4. Cleavage of Other Target Sites by Dual Guide MAD7 CRISPR-Cas Systems Using Different Splits in the crRNA Loops This example describes cleavage of DNAs using MAD7 in complex with dual guide nucleic acids split at different positions in the cRNA loop.

Briefly, the crRNAs targeting CD52, PDCD1, and TIGIT and modulator RNAs and targeter RNAs in a dual guide CRISPR system were chemically synthesized. The nucleotide sequences of these RNAs are shown in Table 8 below.

TABLE 8

Nucleotide Sequences of Exemplary Single and Dual Guide RNAs

| Guide RNA | Nucleotide Sequence | Target Gene | SEQ ID NO |
|---|---|---|---|
| crRNA_modulator1 | UAAUUUCUAC | N/A | 96 |
| crRNA_modulator2 | UAAUUUCUACU | N/A | 97 |
| crRNA_modulator3 | UAAUUUCUACUC | N/A | 42 |
| crRNA_modulator4 | UAAUUUCUACUCU | N/A | 98 |
| crRNA_modulator5 | UAAUUUCUACUCUU | N/A | 99 |
| crRNA_CD52 | UAAUUUCUACUCUUGUAGAUC UCUUCCUCCUACUCACCAUC | CD52 | 123 |
| crRNA_CD52_targeter1 | UCUUGUAGAUCUCUUCCUCCU ACUCACCAUC | CD52 | 124 |
| crRNA_CD52_targeter2 | CUUGUAGAUCUCUUCCUCCUA CUCACCAUC | CD52 | 125 |
| crRNA_CD52_targeter3 | UUGUAGAUCUCUUCCUCCUAC UCACCAUC | CD52 | 126 |
| crRNA_CD52_targeter4 | UGUAGAUCUCUUCCUCCUACU CACCAUC | CD52 | 127 |
| crRNA_CD52_targeter5 | GUAGAUCUCUUCCUCCUACUC ACCAUC | CD52 | 128 |
| crRNA_PDCD1 | UAAUUUCUACUCUUGUAGAUG CACGAAGCUCUCCGAUGUGU | PDCD1 | 129 |
| crRNA_PDCD1_targeter1 | UCUUGUAGAUGCACGAAGCUC UCCGAUGUGU | PDCD1 | 130 |
| crRNA_PDCD1_targeter2 | CUUGUAGAUGCACGAAGCUCU CCGAUGUGU | PDCD1 | 131 |

TABLE 8-continued

Nucleotide Sequences of Exemplary Single and Dual Guide RNAs

| Guide RNA | Nucleotide Sequence | Target Gene | SEQ ID NO |
|---|---|---|---|
| crRNA_PDCD1_targeter3 | UUGUAGAUGCACGAAGCUCUC CGAUGUGU | PDCD1 | 132 |
| crRNA_PDCD1_targeter4 | UGUAGAUGCACGAAGCUCUCC GAUGUGU | PDCD1 | 133 |
| crRNA_PDCD1_targeter5 | GUAGAUGCACGAAGCUCUCCG AUGUGU | PDCD1 | 134 |
| crRNA_TIGIT | UAAUUUCUACUCUUGUAGAUG UCCUCCCUCUAGUGGCUGAG | TIGIT | 135 |
| crRNA_TIGIT_targeter1 | UCUUGUAGAUGUCCUCCCUCU AGUGGCUGAG | TIGIT | 136 |
| crRNA_TIGIT_targeter2 | CUUGUAGAUGUCCUCCCUCUA GUGGCUGAG | TIGIT | 137 |
| crRNA_TIGIT_targeter3 | UUGUAGAUGUCCUCCCUCUAG UGGCUGAG | TIGIT | 138 |
| crRNA_TIGIT_targeter4 | UGUAGAUGUCCUCCCUCUAGU GGCUGAG | TIGIT | 139 |
| crRNA_TIGIT_targeter5 | GUAGAUGUCCUCCCUCUAGUG GCUGAG | TIGIT | 140 |

In Table 8, crRNA_CD52, crRNA_PDCD1, and crRNA_TIGIT were used as single guide RNAs targeting CD52, PDCD1, and TIGIT, respectively. crRNA_modulator1 was used in combination with crRNA_CD52_targeter1, crRNA_PDCD1_targeter1, or crRNA_TIGIT_targeter1 as dual guide RNAs corresponding to the respective single guide RNA, wherein the single guide RNA is split at the first internucleotide bond from the 5'end of the loop. crRNA_modulator2 was used in combination with crRNA_CD52_targeter2, crRNA_PDCD1_targeter2, or crRNA_TIGIT_targeter2 as dual guide RNAs corresponding to the respective single guide RNA, wherein the single guide RNA is split at the second internucleotide bond from the 5'end of the loop. crRNA_modulator3 was used in combination with crRNA_CD52_targeter3, crRNA_PDCD1_targeter3, or crRNA_TIGIT_targeter3 as dual guide RNAs corresponding to the respective single guide RNA, wherein the single guide RNA is split at the third internucleotide bond from the 5'end of the loop. crRNA_modulator4 was used in combination with crRNA_CD52_targeter4, crRNA_PDCD1_targeter4, or crRNA_TIGIT_targeter4 as dual guide RNAs corresponding to the respective single guide RNA, wherein the single guide RNA is split at the fourth internucleotide bond from the 5'end of the loop. crRNA_modulator5 was used in combination with crRNA_CD52_targeter5, crRNA_PDCD1_targeter5, or crRNA_TIGIT_targeter5 as dual guide RNAs corresponding to the respective single guide RNA, wherein the single guide RNA is split at the fifth internucleotide bond from the 5'end of the loop. An in-cell cleavage assay was conducted using the method described in Examples 1 above.

Figure 8:
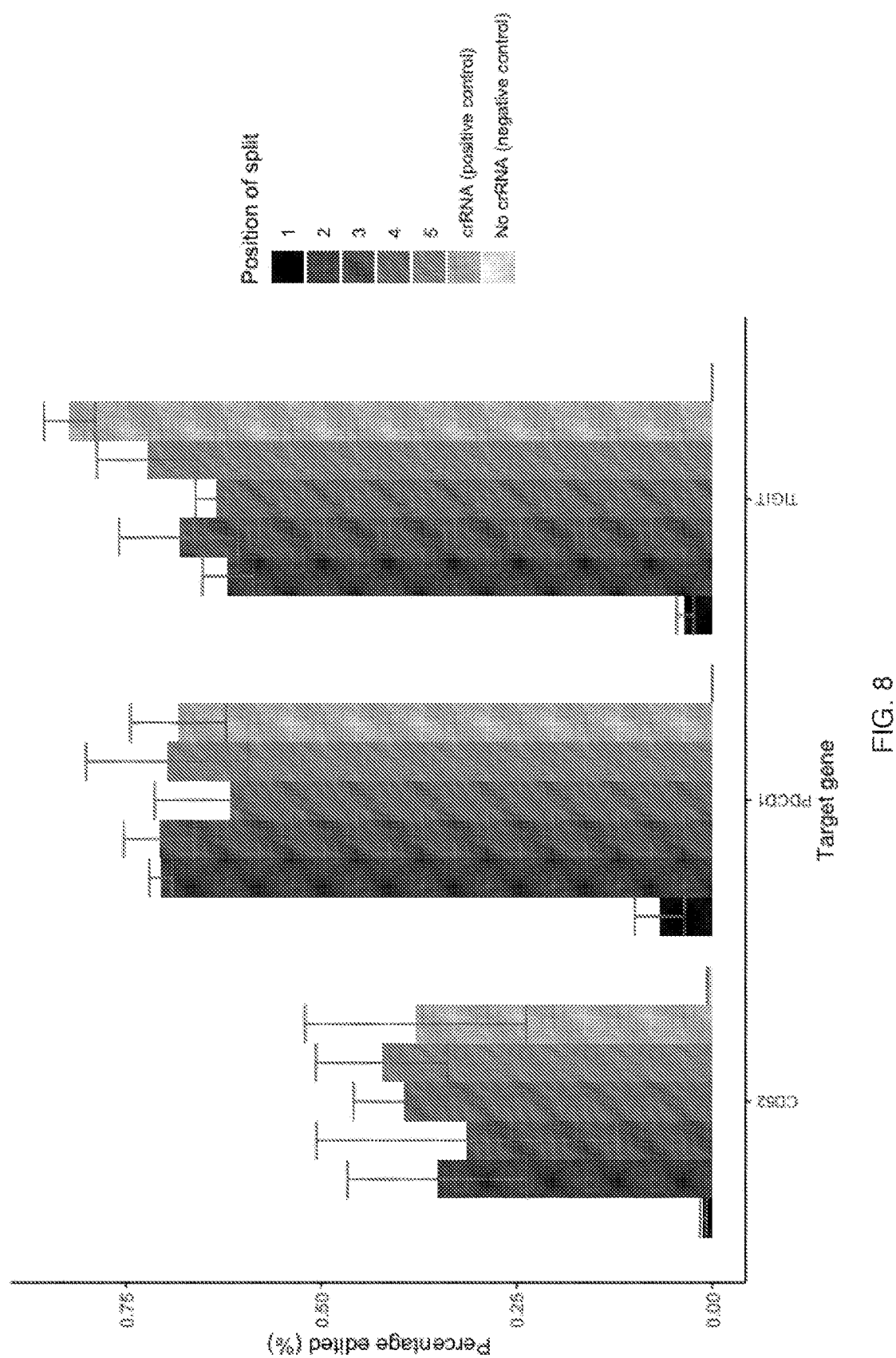
FIG. 8 is a bar graph showing the percentage of genome copies edited in the CD52, PDCD1, or TIGIT genes of Jurkat cells after delivery of dual guide CRISPR systems with the crRNA split at different sites (1, 2, 3, 4, or 5 nucleotides with regards to the 5'end of the loop).

As shown in FIG. 8, for each target gene tested, the dual guide CRISPR system edited the genomes of cells in the in-cell cleavage assay at similar efficiencies where the split position is 2, 3, 4, or 5, and at significantly lower efficiencies where the split position is 1 (i.e., split at the first internucleotide bond of the loop from the 5' end). This result suggested that the modulator RNA should include at least one nucleotide (e.g., uridine) 3' to the modulator stem sequence for optimal activity in cells.

INCORPORATION BY REFERENCE

The entire disclosure of each of the patent and scientific documents referred to herein is incorporated by reference for all purposes.

EQUIVALENTS

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes that come within the meaning and range of equivalency of the claims are intended to be embraced therein.

The invention claimed is:

1. An engineered, non-naturally occurring system comprising:
   (a) a targeter nucleic acid comprising, from 5' to 3':
      (i) a targeter stem sequence; and
      (ii) a spacer sequence designed to hybridize with a target nucleotide sequence; and
   (b) a modulator nucleic acid comprising a modulator stem sequence complementary to the targeter stem sequence, wherein the targeter nucleic acid and the modulator nucleic acid are separate nucleic acids, wherein a loop structure between the modulator stem sequence and the targeter stem sequence is absent, and wherein a complex comprising the targeter nucleic acid and the modulator nucleic acid is capable of activating a CRISPR Associated (Cas) nuclease that, in a naturally occurring system, is activated by a single crRNA in the absence of a tracrRNA, wherein the Cas nuclease comprises a Type V-A Cas nuclease; and
   (c) the Type V-A Cas nuclease,
   wherein the Type V-A Cas nuclease is an engineered Cas protein comprising one or more nuclear localization signal (NLS) motifs.

2. The engineered, non-naturally occurring system of claim 1 wherein the targeter stem sequence and the modulator stem sequence are each 4-10 nucleotides in length.

3. The engineered, non-naturally occurring system of claim 1 wherein the spacer sequence is 18 nucleotides in length or shorter.

4. The engineered, non-naturally occurring system of claim 1 wherein the targeter nucleic acid comprises, from 5' to 3', the targeter stem sequence, the spacer sequence, and an additional nucleotide sequence.

5. The engineered, non-naturally occurring system of claim 1 wherein the targeter nucleic acid, the modulator nucleic acid, or both, comprises a ribonucleic acid (RNA).

6. The engineered, non-naturally occurring system of claim 5 wherein the targeter nucleic acid, the modulator nucleic acid, or both, comprises a chemically modified RNA.

7. The engineered, non-naturally occurring system of claim 6 wherein the chemical modification is present in one or more nucleotides at the 3' end of the targeter nucleic acid, in one or more nucleotides at the 5' end of the modulator nucleic acid, or both.

8. The engineered, non-naturally occurring system of claim 7 wherein the chemical modification is selected from the group consisting of 2'-O-methyl, 2'-fluoro, 2'-O-methoxyethyl, phosphorothioate, phosphorodithioate, pseudouridine, and any combinations thereof.

9. The engineered, non-naturally occurring system of claim 1 wherein the modulator nucleic acid further comprises an additional nucleotide sequence positioned 5' to the modulator stem sequence, and 4-50 nucleotides in length.

10. The engineered, non-naturally occurring system of claim 9 wherein the additional nucleotide sequence comprises a donor template-recruiting sequence capable of hybridizing with a donor template.

11. The engineered, non-naturally occurring system of claim 10 further comprising the donor template.

12. The engineered, non-naturally occurring system of claim 1 wherein the targeter nucleic acid and the modulator nucleic acid are not covalently linked.

13. The engineered, non-naturally occurring system of claim 1 wherein the Cas nuclease comprises an amino acid sequence at least 80% identical to SEQ ID NO: 1.

14. The engineered, non-naturally occurring system of claim 1 wherein the Cas nuclease comprises an amino acid sequence at least 95% identical to SEQ ID NO: 1.

15. The engineered, non-naturally occurring system of claim 1 wherein the targeter nucleic acid, the modulator nucleic acid, and the Cas nuclease are present in a ribonucleoprotein (RNP) complex.

16. A CRISPR expression system comprising
   (a) a nucleic acid comprising a first regulatory element operably linked to a nucleotide sequence encoding a targeter nucleic acid comprising, from 5' to 3':
      (i) a targeter stem sequence; and
      (ii) a spacer sequence designed to hybridize with a target nucleotide sequence;
   (b) a nucleic acid comprising a second regulatory element operably linked to a nucleotide sequence encoding a modulator nucleic acid comprising a modulator stem sequence complementary to the targeter stem sequence, wherein the targeter nucleic acid and the modulator nucleic acid are expressed as separate nucleic acids, wherein a loop structure between the modulator stem sequence and the targeter stem sequence is absent, and wherein a complex comprising the targeter nucleic acid and the modulator nucleic acid is capable of activating a Cas nuclease that, in a naturally occurring system, is activated by a single crRNA in the absence of a tracrRNA, wherein the Cas nuclease comprises a Type V-A nuclease; and
   (c) a nucleic acid comprising a third regulatory element operably linked to a nucleotide sequence encoding a Type V-A Cas nuclease.

17. The expression system of claim 16 wherein one or more of the nucleic acids is codon optimized for expression in a prokaryotic cell.

18. The expression system of claim 16 wherein one or more of the nucleic acids is codon optimized for expression in *E. coli*.

19. The expression system of claim 16 wherein one or more of the nucleic acids is codon optimized for expression in a eukaryotic cell.

20. A method of cleaving a target DNA having a target nucleotide sequence, the method comprising contacting the target DNA with an engineered, non-naturally occurring system comprising (a) a targeter nucleic acid comprising, from 5' to 3':
  (i) a targeter stem sequence; and
  (ii) a spacer sequence designed to hybridize with the target nucleotide sequence; and
(b) a modulator nucleic acid comprising a modulator stem sequence complementary to the targeter stem sequence, wherein the targeter nucleic acid and the modulator nucleic acid are separate nucleic acids, wherein a loop structure between the modulator stem sequence and the targeter stem sequence is absent, and wherein a complex comprising the targeter nucleic acid and the modulator nucleic acid is capable of activating a CRISPR Associated (Cas) nuclease that, in a naturally occurring system, is activated by a single crRNA in the absence of a tracrRNA, wherein the Cas nuclease comprises a type V-A Cas nuclease, and
(c) the Cas nuclease;
thereby resulting in cleavage of the target DNA.

21. The method of claim 20 wherein the contacting occurs in vitro.

22. The method of claim 20 wherein the contacting occurs in a cell ex vivo.

23. The method of claim 22 wherein the target DNA is genomic DNA of the cell.

24. The method of claim 22 wherein the system is delivered into the cell as a pre-formed RNP complex.

25. The method of claim 24 wherein the pre-formed RNP complex is delivered into the cell by electroporation.

26. A method of editing a genome of a eukaryotic cell, the method comprising delivering an engineered, non-naturally occurring system comprising (a) a targeter nucleic acid comprising, from 5' to 3':
  (i) a targeter stem sequence; and
  (ii) a spacer sequence designed to hybridize with a target nucleotide sequence within the genome; and
(b) a modulator nucleic acid comprising a modulator stem sequence complementary to the targeter stem sequence, wherein the targeter nucleic acid and the modulator nucleic acid are separate nucleic acids, wherein a loop structure between the modulator stem sequence and the targeter stem sequence is absent, and wherein a complex comprising the targeter nucleic acid and the modulator nucleic acid is capable of activating a CRISPR Associated (Cas) nuclease that, in a naturally occurring system, is activated by a single crRNA in the absence of a tracrRNA, wherein the Cas nuclease comprises a type V-A Cas nuclease, and
(c) the Cas nuclease; and/or a polynucleotide or polynucleotides coding for one or more of (a), (b), and/or (c),
into the eukaryotic cell, thereby resulting in editing of the genome of the eukaryotic cell.

27. The method of claim 26, wherein the system is delivered into the cell as a pre-formed RNP complex.

28. The method of claim 27 wherein the system is delivered into the cell by electroporation.

29. The method of claim 26 wherein the cell is an immune cell or a stem cell.

30. The method of claim 29 wherein the cell is an immune cell that is a T lymphocyte.

* * * * *